United States Patent
Farley et al.

(10) Patent No.: US 10,124,875 B1
(45) Date of Patent: *Nov. 13, 2018

(54) CONTINUOUS MULTI-CHAMBER SUPER PRESSURE BALLOON

(71) Applicant: World View Enterprises Inc., Tucson, AZ (US)

(72) Inventors: Rodger Farley, Columbia, MD (US); Taber Kyle MacCallum, Tucson, AZ (US); G. Ryan Lee, Tucson, AZ (US); Sebastian Padilla, Tucson, AZ (US)

(73) Assignee: World View Enterprises Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,645

(22) Filed: Jan. 5, 2018

Related U.S. Application Data

(60) Provisional application No. 62/443,945, filed on Jan. 9, 2017, provisional application No. 62/574,135, filed on Oct. 18, 2017.

(51) Int. Cl.
  B64B 1/40 (2006.01)
  B64B 1/58 (2006.01)
(52) U.S. Cl.
  CPC . B64B 1/58 (2013.01); B64B 1/40 (2013.01)
(58) Field of Classification Search
  CPC .... B64B 1/40; B64B 1/44; B64B 1/50; B64B 1/54; B64B 1/58; B64B 1/62
  See application file for complete search history.

(56) References Cited

U.S. PATENT DOCUMENTS

| 1,012,559 A | 12/1911 | Kalaba |
| 1,056,503 A | 3/1913 | Cooper |

(Continued)

FOREIGN PATENT DOCUMENTS

| CN | 2844003 | 12/2006 |
| CN | 200988579 | 12/2007 |

(Continued)

OTHER PUBLICATIONS

"Homepage", World View Website, http://worldview.space, May 8, 2015, 1 page.

(Continued)

*Primary Examiner* — Richard G Davis
(74) *Attorney, Agent, or Firm* — Knobbe Martens Olson & Bear LLP

(57) ABSTRACT

Described herein are features for a high altitude lighter-than-air (LTA) system and associated methods. The LTA may include a continuous multi-chamber super-pressure balloon (SPB). The SPB may include two, three, four or more chambers. There may be more than one such multi-chamber SPB. A ring may provide structural support between each chamber. A plurality of tendons may extend upwardly and downwardly from the ring around respective upper and lower chambers to bias each of the SPB chambers to a pumpkin shape. The SPB may use a compressor to provide a variable amount of ballast air by pumping in or expelling out ambient air. A zero-pressure balloon (ZPB) may be attached with the continuous multi-chamber SPB. The ZPB may provide lift for the system. The multi-chamber SPB may include lifting gas and ballast air to provide both lifting and descent functions. The SPB may have an internal barrier separating a lift gas compartment from a variable ballast air compartment.

19 Claims, 41 Drawing Sheets

(56) References Cited

U.S. PATENT DOCUMENTS

| | | |
|---|---|---|
| 1,093,311 A | 4/1914 | Chaumeret |
| 1,108,484 A | 8/1914 | Banic |
| 1,178,864 A | 4/1916 | Loson |
| 1,277,892 A | 9/1918 | Evans |
| 1,299,123 A | 4/1919 | Calthrop |
| 1,303,474 A | 5/1919 | Hall |
| 1,308,033 A | 7/1919 | Benton |
| 1,329,359 A | 2/1920 | Berg |
| 1,477,338 A | 12/1923 | Finley |
| 1,646,586 A | 10/1927 | Loth |
| 1,656,780 A | 1/1928 | Diago |
| 1,682,509 A | 8/1928 | Harwick |
| 1,705,854 A | 3/1929 | Coughlin |
| 1,826,245 A | 10/1931 | Hammerle |
| 1,829,561 A | 10/1931 | Knight |
| 2,008,107 A | 7/1935 | Norden |
| 2,083,743 A | 6/1937 | Poole |
| 2,708,082 A | 5/1955 | Moore et al. |
| 2,950,881 A | 8/1960 | Schwoebel |
| 2,954,187 A | 9/1960 | Winzen |
| 2,977,069 A | 3/1961 | Huch et al. |
| 3,015,456 A | 1/1962 | Deisinger |
| 3,045,952 A | 7/1962 | Underwood |
| 3,073,040 A | 1/1963 | Schueller |
| 3,087,696 A | 4/1963 | Sepp, Jr. |
| 3,093,346 A | 6/1963 | Faget et al. |
| 3,098,630 A | 7/1963 | Conners |
| 3,146,500 A | 9/1964 | Volkert |
| 3,195,834 A | 7/1965 | Huch et al. |
| 3,260,480 A | 7/1966 | Ash et al. |
| 3,270,908 A | 9/1966 | Faget et al. |
| 3,312,427 A | 4/1967 | Yost |
| 3,424,405 A | 1/1969 | Struble, Jr. |
| 3,432,122 A | 3/1969 | Flickinger et al. |
| 3,434,680 A | 3/1969 | Ferguson |
| 3,446,458 A | 5/1969 | Rogallo |
| 3,465,482 A | 9/1969 | Chandler |
| 3,558,083 A | 1/1971 | Conley et al. |
| 3,606,212 A | 9/1971 | Paine |
| 3,814,353 A | 6/1974 | Nelson |
| 3,906,970 A | 9/1975 | Saito et al. |
| 4,105,173 A | 8/1978 | Bucker |
| 4,113,206 A | 9/1978 | Wheeler |
| 4,134,227 A | 1/1979 | Kupperman et al. |
| 4,215,834 A | 8/1980 | Dunlap |
| 4,361,295 A | 11/1982 | Wenzel |
| RE31,205 E | 4/1983 | Jalbert |
| 4,424,945 A | 1/1984 | Dell |
| 4,581,897 A | 4/1986 | Sankrithi |
| 4,601,443 A | 7/1986 | Jones et al. |
| 4,664,343 A | 5/1987 | Lofts et al. |
| 4,828,207 A | 5/1989 | Haynes |
| 4,865,274 A | 9/1989 | Fisher |
| 4,889,394 A | 12/1989 | Ruspa |
| 4,936,528 A | 6/1990 | Butner et al. |
| 5,028,018 A | 7/1991 | Krebber |
| 5,244,169 A | 9/1993 | Brown et al. |
| 5,274,976 A | 1/1994 | Burkhart |
| 5,327,904 A | 7/1994 | Hannum |
| 5,333,817 A | 8/1994 | Kalisz et al. |
| 5,362,017 A | 11/1994 | Puckett |
| 5,511,748 A | 4/1996 | Scott |
| 5,620,153 A | 4/1997 | Ginsberg |
| 5,718,399 A | 2/1998 | Cheng |
| 5,884,981 A | 3/1999 | Ichikawa |
| 5,893,536 A | 4/1999 | Lee et al. |
| 6,116,538 A | 9/2000 | Häfelfinger |
| 6,220,547 B1 | 4/2001 | Smith et al. |
| 6,234,425 B1 | 5/2001 | Rand et al. |
| 6,237,241 B1 | 5/2001 | Aaron et al. |
| 6,290,172 B1 | 9/2001 | Yajima et al. |
| 6,360,988 B1 | 3/2002 | Monroe |
| 6,364,251 B1 | 4/2002 | Yim |
| 6,425,640 B1 | 7/2002 | Hussaini |
| 6,527,223 B1 | 3/2003 | Mondale |
| 6,565,042 B1 | 5/2003 | Yamada |
| 6,596,370 B2 | 7/2003 | Hyuga et al. |
| 6,604,333 B1 | 8/2003 | Schiedeggr et al. |
| 6,626,400 B1 | 9/2003 | Booth |
| 6,648,272 B1 | 11/2003 | Kothman |
| 6,705,572 B1 | 3/2004 | Christopher |
| 6,799,810 B1 | 10/2004 | Wang |
| 6,883,756 B2 | 4/2005 | Preston |
| 6,889,942 B2 | 5/2005 | Preston |
| 7,168,922 B2 | 1/2007 | Stagg et al. |
| D557,817 S | 12/2007 | Verfuerth |
| 7,313,362 B1 | 12/2007 | Sainct |
| D575,410 S | 8/2008 | Best |
| 7,469,857 B2 | 12/2008 | Voss |
| 7,530,527 B2 | 5/2009 | Kelleher |
| 7,556,040 B2 | 7/2009 | Meyer et al. |
| 7,584,928 B2 | 9/2009 | Hoffman |
| 7,775,604 B2 | 8/2010 | Chen |
| D632,804 S | 2/2011 | Afasano |
| 8,091,826 B2 | 1/2012 | Voorhees |
| 8,100,367 B1 | 1/2012 | Rousseau |
| 8,116,763 B1 | 2/2012 | Olsen |
| 8,167,240 B2 | 5/2012 | Greiner |
| 8,267,348 B2 | 9/2012 | Alavi |
| 8,448,898 B1 | 5/2013 | Frolov et al. |
| 8,505,847 B2 | 8/2013 | Ciampa et al. |
| 8,622,338 B2 | 1/2014 | Ciampa et al. |
| 8,718,477 B2 | 5/2014 | DeVaul et al. |
| 8,777,156 B2 | 7/2014 | Piini et al. |
| 8,781,727 B1 | 7/2014 | Bonawitz et al. |
| 8,804,228 B1 | 8/2014 | Biffle et al. |
| 8,812,176 B1 | 8/2014 | Biffle et al. |
| 8,814,084 B2 | 8/2014 | Shenhar |
| 8,820,678 B2 | 9/2014 | DeVaul et al. |
| 8,833,696 B1 | 9/2014 | Teller et al. |
| 8,849,571 B1 | 9/2014 | Bonawitz et al. |
| 8,862,403 B1 | 10/2014 | Piponi et al. |
| 8,874,356 B1 | 10/2014 | Bonawitz |
| 8,880,326 B1 | 11/2014 | Bonawitz et al. |
| 8,897,933 B1 | 11/2014 | Teller et al. |
| 8,910,905 B2 | 12/2014 | DeVaul et al. |
| 8,917,995 B1 | 12/2014 | Biffle et al. |
| 8,918,047 B1 | 12/2014 | Teller et al. |
| 8,948,927 B1 | 2/2015 | Piponi |
| 8,971,274 B1 | 3/2015 | Teller et al. |
| 8,988,253 B2 | 3/2015 | Teller et al. |
| 8,996,024 B1 | 3/2015 | Teller et al. |
| 8,998,128 B2 | 4/2015 | Ratner |
| 9,010,691 B1 | 4/2015 | Ratner et al. |
| 9,016,634 B1 | 4/2015 | Ratner et al. |
| 9,027,874 B1 | 5/2015 | Roach et al. |
| 9,033,274 B2 | 5/2015 | DeVaul et al. |
| 9,033,281 B1 | 5/2015 | Adams |
| 9,045,213 B1 | 6/2015 | DeVaul |
| 9,067,666 B1 | 6/2015 | Roach et al. |
| 9,085,348 B1 | 7/2015 | Roach et al. |
| 9,090,323 B1 | 7/2015 | Ratner |
| 9,093,754 B2 | 7/2015 | Behroozi et al. |
| 9,096,301 B1 | 8/2015 | Biffle et al. |
| 9,097,361 B1 | 8/2015 | Ratner |
| 9,106,336 B1 | 8/2015 | Brouillet |
| 9,114,866 B1 | 8/2015 | Roach |
| 9,120,551 B1 | 9/2015 | Ratner |
| 9,139,278 B1 | 9/2015 | Roach et al. |
| 9,139,279 B2 | 9/2015 | Heppe |
| 9,148,215 B1 | 9/2015 | Bonawitz |
| 9,153,854 B1 | 10/2015 | Biffle et al. |
| 9,174,718 B1 | 11/2015 | Roach et al. |
| 9,174,720 B1 | 11/2015 | Ratner |
| 9,174,738 B1 | 11/2015 | Roach et al. |
| 9,193,480 B2 | 11/2015 | Smith et al. |
| 9,195,938 B1 | 11/2015 | Bonawitz et al. |
| 9,201,426 B1 | 12/2015 | Bonawitz |
| 9,203,148 B1 | 12/2015 | Teller et al. |
| 9,211,942 B1 | 12/2015 | Roach |
| 9,221,531 B1 | 12/2015 | Brookes |
| 9,233,746 B2 | 1/2016 | DeVaul et al. |
| 9,242,712 B1 | 1/2016 | Ratner |
| 9,254,906 B1 | 2/2016 | Behroozi et al. |

(56) References Cited

U.S. PATENT DOCUMENTS

| | | |
|---|---|---|
| 9,266,598 B1 | 2/2016 | DeVaul |
| 9,275,551 B2 | 3/2016 | Bonawitz et al. |
| 9,281,554 B1 | 3/2016 | Behroozi et al. |
| 9,285,450 B2 | 3/2016 | DeVaul et al. |
| 9,290,258 B1 | 3/2016 | DeVaul |
| 9,296,461 B1 | 3/2016 | Roach |
| 9,296,462 B1 | 3/2016 | Brookes et al. |
| 9,300,388 B1 | 3/2016 | Behroozi et al. |
| 9,306,668 B2 | 4/2016 | DeVaul et al. |
| 9,318,789 B1 | 4/2016 | Henrich et al. |
| 9,321,517 B1 | 4/2016 | DeVaul |
| 9,327,816 B1 | 5/2016 | Mathe et al. |
| 9,327,817 B1 | 5/2016 | Roach |
| 9,327,818 B1 | 5/2016 | Roach |
| 9,329,600 B2 | 5/2016 | DeVaul et al. |
| 9,340,272 B1 | 5/2016 | DeVaul et al. |
| 9,346,531 B1 | 5/2016 | Washburn et al. |
| 9,346,532 B1 | 5/2016 | Ratner |
| 9,424,752 B1 | 8/2016 | Bonawitz |
| 9,540,091 B1 | 1/2017 | MacCallum et al. |
| 9,561,858 B2 | 2/2017 | Leidich et al. |
| 9,694,910 B2 | 7/2017 | MacCallum et al. |
| 9,834,297 B2 | 12/2017 | Brookes |
| 2002/0096599 A1 | 7/2002 | McDermott |
| 2002/0179771 A1 | 12/2002 | Senepart |
| 2002/0190161 A1 | 12/2002 | Patel et al. |
| 2003/0020322 A1 | 1/2003 | Zaniboni |
| 2003/0040273 A1 | 2/2003 | Seligsohn et al. |
| 2003/0127560 A1 | 7/2003 | Liss |
| 2003/0197095 A1 | 10/2003 | Preston |
| 2003/0234320 A1 | 12/2003 | Colting |
| 2004/0089763 A1 | 5/2004 | Redmond |
| 2004/0135033 A1 | 7/2004 | Hung |
| 2004/0218397 A1 | 11/2004 | Luo |
| 2005/0121968 A1 | 6/2005 | McCaster, III et al. |
| 2005/0288114 A1 | 12/2005 | Meadows |
| 2006/0065777 A1 | 3/2006 | Walden et al. |
| 2006/0284006 A1 | 12/2006 | Chasman et al. |
| 2007/0164600 A1 | 7/2007 | Chiu |
| 2007/0272801 A1 | 11/2007 | Hilliard et al. |
| 2009/0045284 A1 | 2/2009 | Chu |
| 2009/0108135 A1 | 4/2009 | Shaw |
| 2009/0134277 A1 | 5/2009 | Kim et al. |
| 2009/0189015 A1 | 7/2009 | Alavi |
| 2009/0206196 A1 | 8/2009 | Parks et al. |
| 2009/0224094 A1 | 9/2009 | Lachenmeier |
| 2010/0163682 A1 | 7/2010 | Jameson |
| 2010/0257983 A1 | 10/2010 | Jordan et al. |
| 2011/0147513 A1 | 6/2011 | Surmont |
| 2011/0198437 A1 | 8/2011 | Brandon |
| 2011/0220764 A1 | 9/2011 | Suh |
| 2011/0233325 A1 | 9/2011 | Kramer |
| 2012/0049005 A1 | 3/2012 | Suh |
| 2012/0091261 A1 | 4/2012 | Lee |
| 2012/0133197 A1 | 5/2012 | Mengle et al. |
| 2012/0168565 A1 | 7/2012 | Berland |
| 2012/0228434 A1 | 9/2012 | Lopez Urdiales |
| 2012/0273620 A1 | 11/2012 | Culbreath |
| 2012/0312919 A1 | 12/2012 | Heppe |
| 2013/0037654 A1 | 2/2013 | Zhang et al. |
| 2013/0043341 A1 | 2/2013 | Tai et al. |
| 2013/0049440 A1 | 2/2013 | Morse et al. |
| 2013/0062458 A1 | 3/2013 | Shenhar |
| 2013/0177322 A1 | 7/2013 | DeVaul et al. |
| 2013/0238784 A1 | 9/2013 | Teller et al. |
| 2013/0303218 A1 | 11/2013 | Teller et al. |
| 2014/0014770 A1 | 1/2014 | Teller et al. |
| 2014/0155093 A1 | 6/2014 | Teller |
| 2014/0171075 A1 | 6/2014 | Teller |
| 2015/0024653 A1 | 1/2015 | Huebl |
| 2015/0061937 A1 | 3/2015 | Bonawitz et al. |
| 2015/0225091 A1 | 8/2015 | Ratner |
| 2015/0336653 A1 | 11/2015 | Anderson et al. |
| 2015/0360763 A1 | 12/2015 | Smith et al. |
| 2015/0367928 A1 | 12/2015 | Crites |
| 2016/0018823 A1 | 1/2016 | Longmier et al. |
| 2016/0052614 A1 | 2/2016 | Longmier et al. |
| 2016/0083068 A1 | 3/2016 | Crites |
| 2016/0090179 A1 | 3/2016 | Childress et al. |
| 2016/0096612 A1* | 4/2016 | Longmier ............ B64B 1/44 244/31 |
| 2016/0154085 A1 | 6/2016 | DeVaul et al. |
| 2016/0156405 A1 | 6/2016 | Teller et al. |
| 2016/0263815 A1 | 9/2016 | Roach et al. |
| 2016/0264248 A1 | 9/2016 | MacCallum et al. |
| 2016/0368202 A1 | 12/2016 | Crites |
| 2017/0129579 A1* | 5/2017 | de Jong ............ B64B 1/62 |
| 2017/0160741 A1 | 6/2017 | Knoblach et al. |
| 2017/0233054 A1 | 8/2017 | MacCallum et al. |
| 2017/0331177 A1 | 11/2017 | MacCallum et al. |
| 2017/0349291 A1 | 12/2017 | MacCallum et al. |

FOREIGN PATENT DOCUMENTS

| | | |
|---|---|---|
| CN | 202765296 | 3/2013 |
| CN | 102673770 | 3/2015 |
| CN | 204937453 | 1/2016 |
| DE | 223241 | 7/1909 |
| DE | 38 05 645 | 7/1988 |
| DE | 39 27 297 | 2/1991 |
| DE | 10 2008 035 028 | 1/2010 |
| EP | 0 401 891 | 12/1992 |
| EP | 3 268 279 | 1/2018 |
| FR | 2 320 229 | 3/1977 |
| FR | 2 724 909 | 3/1996 |
| FR | 2 834 966 | 7/2003 |
| GB | 191207587 | 9/1912 |
| GB | 2184699 | 7/1987 |
| GB | 2244962 | 12/1993 |
| JP | 2002-096798 | 4/2002 |
| RU | 2 028 962 | 2/1995 |
| RU | 2 112 709 | 6/1998 |
| RU | 2 186 003 | 7/2002 |
| WO | WO 1990/09830 | 9/1990 |
| WO | WO 1997/015992 | 5/1997 |
| WO | WO 2004/106156 | 12/2004 |
| WO | WO 2006/119056 | 11/2006 |
| WO | WO 2010/130043 | 11/2010 |
| WO | WO 2011/160172 | 12/2011 |
| WO | WO 2013/041820 | 3/2013 |
| WO | WO 2014/025622 | 2/2014 |
| WO | WO 2014/193711 | 12/2014 |
| WO | WO 2015/031165 | 3/2015 |
| WO | WO 2015/076899 | 5/2015 |
| WO | WO 2015/094534 | 6/2015 |
| WO | WO 2015/094941 | 6/2015 |
| WO | WO 2015/102813 | 7/2015 |
| WO | WO 2015/122988 | 8/2015 |
| WO | WO 2015/130414 | 9/2015 |
| WO | WO 2015/157237 | 10/2015 |
| WO | WO 2015/196216 | 12/2015 |
| WO | WO 2016/081345 | 5/2016 |
| WO | WO 2016/145130 | 9/2016 |
| WO | WO 2016/209762 | 12/2016 |
| WO | WO 2017/127746 | 7/2017 |
| WO | WO 2017/139283 | 8/2017 |

OTHER PUBLICATIONS

Aerospace-Technology.com: "World View Successfully Completes Test Flight for Commercial Balloon Flights," Aerospace-Technology. com, online article dated Oct. 27, 2015. http://www.aerospace-technology.com/news/newsworld-view-test-flights-commercial-balloon-flight-4702892.

Aljazeera America: "Space tourism company breaks record with high-altitude balloon flight", online article dated Jun. 25, 2014. http://america.aljazeera.com/articles/2014/6/25/balloonspace-tourism.html.

Benton, J. et al.: "On Development of Autonomous HAHO Parafoil System for Targeted Payload Return", AIAA Aerodynamic Decelerator Systems (ADS) Conference, Mar. 2013, in 26 pages.

(56) References Cited

OTHER PUBLICATIONS

Berger, E.: "Record-Breaking Balloon Flight", Outside Online, online article dated Jun. 25, 2014. http://www.outsideonline.com/1804196/record-breakingballoon-flight.

Bil, C.: "Lighter-Than-Air Stationary Observation Platforms", 15th Australian International Aerospace Congress (AIAC15), Feb. 2013, pp. 97-103.

Boyle, A.: "Heads Up, Strato-Tourists: World View Begins High-Flying Tests", NBC News, online article dated Jun. 24, 2014. http://www.nbcnews.com/science/space/heads-stratotourists-world-view-begins-high-flying-tests-n138986.

Boyle, A.: "World View Balloon Lofts NASA Experiments to Near-Space Heights," NBC News, online article dated Mar. 9, 2015. http://www.nbcnews.com/science/space/world-view-balloon-lofts-nasa-experiments-near-space-heights-n320216.

Browne, M.: "Balloon Teams Vie to be First Around World", The New York Times, published Jun. 7, 1994, in 6 pages.

Cherry, N. J. et al.: "Characteristics and Performance of Three Low-Cost Superpressure Balloon (Tetroon) Systems", Journal of Applied Meteorology, vol. 10, 1971, pp. 982-990.

Clausing, J.: "Arizona company successfully tests high-altitude balloon for space tourism", US News, online article dated Jun. 24, 2014. http://www.usnews.com/news/business/articles/2014/06/24/company-successfully-tests-space-tourism-balloon.

Coldiron, et al., "Crew Escape Systems 21002", https://www.nasa.gov/.../383443main_crew_escape_workbook.pdf, Jan. 17, 2005.

De Jong, M., Venus Altitude Cycling Balloon, Venus Lab and Technology Workshop, paper 4030, Apr. 7, 2015, in 1 page.

Denuder, M.: "Development of a Paraglide-Deployment System for a Base Jumping Robot", Bachelor-Thesis, Swiss Federal Institute of Technology Zurich, Jun. 2011, in 111 pages.

Epley, L.E: "A System Architecture for Long Duration Free Floating Flight for Military Applications", CIRRUS Aerospace Corporation, Aug. 31, 1990, in 65 pages.

Etherington, D.: "World View's 'stratollites' and new spaceport aim to change the business of space", TechCrunch, posted Feb. 23, 2017, in 9 pages. URL: https://techcrunch.com/2017/02/23/world-views-stratollites-and-new-spaceport-aim-to-change-the-business-of-space/.

Foust, J.: "World View tests scale model of its high-altitude balloon system", NewSpace Journal, online article dated Jun. 24, 2014. http://www.newspacejournal.com/2014/06/24/worldview-tests-scale-model-of-its-high-altitude-balloon-system/.

Gannon, M.: "World View Launches Test Balloon to Edge of Space, Breaks Record", Space.com, online article dated Jun. 24, 2014. http://www.space.com/26340-world-view-balloon-testflight-record.html.

Gorham, P.:"NASA long duration balloon program", Nov. 7, 2012, presented at SpacePart12—4th International Conference on Particle and Fundamental Physics in Space, CERN, Nov. 5-7, 2012, accessed Nov. 8, 2016. http://indico.cern.ch/event/197799/contributions/371922/.

Hanagud, A.V. et al.: "A Solar Pointing System for the Long Duration Balloon Missions", AIAA-97-1516, 1997, accessed on Nov. 8, 2016. http://arc.aiaa.org/doi/pdf/10.2514/6.1997-1516.

Haugen, J.: "After Successful Flight Test, World View Ready for Next Phase: The Stratospheric Tourism Company Is Setting Its Sights High," Popular Science, online article dated Oct. 26, 2015. http://www.popsci.com/world-view-completes-first.

Howell, E.: "World View Makes Record-Setting Parafoil Flight from Near Edge of Space," Space.com, online article dated Feb. 21, 2015. http://www.space.com/28626-world-view-parafoil-record-flight.html.

Howell, E.: "World View Parafoil Test Flight Touches Edge of Space," Discovery News, online article dated Feb. 23, 2015. http://www.seeker.com/world-view-parafoil-test-flight-touches-edge-of-space-1769541739.html#news.discovery.com.

Jones, J.: "Long-Life Stratospheric Balloon System With Altitude Control", NASA Tech Briefs, online article posted Jan. 1, 2002. http://www.techbriefs.com/component/content/article/ntb/tech-briefs/physical-sciences/2248.

Klotz, I.: "World View Prototype Balloon Reaches for Edge of Space", Seeker, online article dated Jun. 25, 2014. http://www.seeker.com/world-view-prototype-balloon-reaches-for-edge-of-space-1768745428.html#news.discovery.com.

Knapp, A.: "World View Has a Successful Scaled Test Flight of Its Balloon to Space", Forbes, online article dated Jun. 24, 2014. http://www.forbes.com/sites/alexknapp/2014/06/24/world-view-has-a-successful-scaled-test-flight-of-its-balloon-tospace/#4e726063f229.

Lachenmeier, T.T. : "Design of a Trans-Global Manned Balloon System With Relevance to Scientific Ballooning", American Institute of Aeronautics and Astronautics, Inc., DOI: 10.2514/6.1991-3687, Oct. 1991.

Larimer, S.: "Company takes test flight to the least-crowded tourism hot spot: space", The Washington Post, online article dated Jun. 27, 2014. http://www.washington.post.com/news/postnation/wp/2014/06/27/company-takes-test-flight-to-theleast-crowded-tourism-hot-spot-space/.

Lawler, R.: "Google exec sets a new record for highest-altitude jump (video)", Engadget, online article published Oct. 24, 2014. https://www.engadget.com/2014/10/24/google-exec-alan-eustace-stratex-high-altitude-jump/.

Logan, M.: "Flight Brings Us Closer to Balloon-Powered Space Tourism", online article dated Feb. 3, 2015. http://www.wired.com/2015/03/parafoil-world-view/.

Longhetto, A.: "Some Improvements in the Balanced Pilot Balloons Technique", Atmospheric Environment Pergamon Press, vol. 5, 1971, pp. 327-331.

Markoff, J.: "Parachutist's Record Fall: Over 25 Miles in 15 Minutes", The New York Times, online article published Oct. 24, 2014. http://www.nytimes.com/2014/10/25/science/alan-eustace-jumps-from-stratosphere-breaking-felix-baumgartners-world-record.html?_r=1.

Moon, M.: "World View Tests a Small Version of Its Balloon-powered Spacecraft," MSN News, online article dated Oct. 27, 2015. http://www.msn.com/en-us/news/technology/world-view-tests-a-small-version-of-its-balloon-powered-spacecraft/ar-BBmtkdA.

New Atlas: "Google exec sets new high-altitude skydiving world record", New Atlas, online article published Oct. 26, 2014. http://newatlas.com/alan-eustace-world-record-skydive-stratex/34423/pictures.

Nobuyuki, Yajima, et al: "Dual Balloon Systems", Scientific Ballooning: Technology and Applications of Exploration Balloons Floating in the Stratosphere and the Atmospheres of Other Planets. Springer Science & Business Media, Apr. 2009, pp. 48-52 (via Google Books). https://books.google.com.sg/books?id=_IEHI7Nh6yYC&lpg=PA51&dq=(super%20pressure%20and%20zero%20pressure%20balloon)%20(tandem%20OR%20buoyant)&pg=PR1#v=onepage&q=(super%20pressure%20and%20zero%20pressure%20balloon)%20(tandem%20OR%20buoyant)&f=false.

Noor, A. et al.: "Stratospheric Aircraft", Future Aeronautical and Space Systems. American Institute of Aeronautics and Astronautics, Inc., vol. 172, 1997, p. 241 (via Google Books). https://books.google.com.sg/books?id=uuR5yBwvhsQC&lpg=PA241&dq=(super%20pressure%20and%20zero%20pressure%20balloon)%20(tandem%20OR%20buoyant)&pg=PA241#v=onepage&q=(super%20pressure%20and%20zero%20pressure%20balloon)%20(tandem%20OR%20buoyant)&f=false.

NuancedAdmin: "Paragon Completes Record-Breaking Near-Space Dive Via High-Altitude Balloon", Paragon Space Development Corporation, press release dated Oct. 20, 2015.

O'Callaghan, J.: "Balloon Capsule That Will Take People to the Edge of Space Completes Test Flight," IFLSCIENCE!, online article dated Oct. 28, 2015. http://www.iflscience.com/space/balloon-will-take-people-edge-space-capsule-completes-test-flight/.

Ondish, A.: "Multi-stage pumps can deliver efficiency gains", Plant Engineering, Aug. 24, 2010, accessed Nov. 8, 2016. http://www.plantengineering.com/home/single-article/multi-stage-pumps-can-deliver-efficiency-gains-4623b966532d8cf9bba82d407aa82416.html. Photograph of a parafoil in high altitude flight (assumed to be prior art, but applicant reserves right to confirm actual date of photograph and to dispute status as prior art).

(56) References Cited

OTHER PUBLICATIONS

PR Newswire: "World View and Ball Aerospace Demonstrate Persistent Remote Sensing from Stratollite Platform", Yahoo Finance, posted Feb. 23, 2017, in 8 pages. URL: http://finance.yahoo.com/news/world-view-ball-aerospace-demonstrate-220000300.html.
Red Bull Stratos: "High Altitude Balloon", Red Bull Stratos, [date posted unknown], accessed online on Jul. 1, 2016. http://www.redbullstratos.com/technology/high-altitude-balloon/.
Saito, Y. et al.: "Properties of tandem balloons connected by extendable suspension wires", Advances in Space Research, vol. 45., 2010, pp. 482-489.
Saito, Y. et al: "Development of a tandem balloon system with a super-pressure balloon and a zero-pressure balloon I", JAXA Research and Development Report, Japan Aerospace Exploration Agency, JAXA-RR-11-008, Mar. 2012, in 16 pages.
Saito, Y. et al: "Development of a tandem balloon system with a super-pressure balloon and a zero-pressure balloon II", JAXA Research and Development Report, Japan Aerospace Exploration Agency, JAXA-RR-13-011, Mar. 2014, in 36 pages.
Smith, M.S. et al.: "Optimum Designs for Superpressure Balloons", Advances in Space Research, vol. 33, Iss. 10, Dec. 2004, in 9 pages.
Stratocat: "News Archive—Jun. 2012", StratoCat, page generated Aug. 2, 2015. http://stratocat.com.ar/news0612e.htm.
Wikipedia: "Sky anchor", Wikipedia, accessed May 21, 2016, in 1 page. https://en.wikipedia.org/wiki/Sky_anchor.
Wikipedia Commons: "File: Le premier parachute de Jacques Garnerin, ca. 1799.jpg", uploaded Aug. 12, 2010, in 3 pages. https://en.wikipedia.org/wiki/File:Le_premier_parachute_de_Jacques_Garnerin,_ca._1799.jpg.

Noor, A. et al.: "Stratospheric Aircraft", Future Aeronautical and Space Systems. American Institute of Aeronautics and Astronautics, Inc., vol. 172, 1997, p. 241 (via Google Books). https://books.google.com.sg/books?id=uuR5yBwvhsQC&lpg=PA241&dq=(super%20pressure%20and%20zero%20pressure%20balloon)%20(tandem%20OR%20buoyant)&pg=PA241#v=onepage&q=(super%20pressure%20and%20zero%20pressure%20balloon)%20(tandem%20OR%20buoyant)&f=false.
World View: "Landmark Space Dive Sets Stage for World View Space Flights", World View, press release dated Oct. 24, 2014.
World View: "Major World View Test Flight Readies the Company to Begin Full Scale Flight Testing for Human Private Spaceflights", World View, press release dated Oct. 26, 2015.
World View: "Oct. 24, 2015 Milestone 10% Scale Test Flight", YouTube, published Oct. 24, 2015 (footage of parafoil seen in video), video can be accessed at https://www.youtube.com/watch?v=1-PpJHKHAQc (last accessed: Jul. 13, 2016).
World View: "The Stratollite", YouTube, published Feb. 23, 2017, video can be accessed at https://www.youtube.com/watch?v=GFdXBQPuznU (last accessed Mar. 15, 2017).
World View: "World View Breaks World Record with Successful Test Flight for 2016 Journeys to Edge of Space", World View, press release dated Jun. 24, 2014.
World View: "World View Breaks World Record with Successful Test Flight", YouTube, published Jun. 23, 2014 (footage of parafoil in space seen in video), video can be accessed at https://www.youtube.com/watch?v=sdsVwN-ICX8 (last accessed: Jul. 13, 2016).
World View: "World View One Step Closer to Manned Near-Space Voyages with Record-Breaking Flight", World View, press release dated Feb. 20, 2015.

* cited by examiner

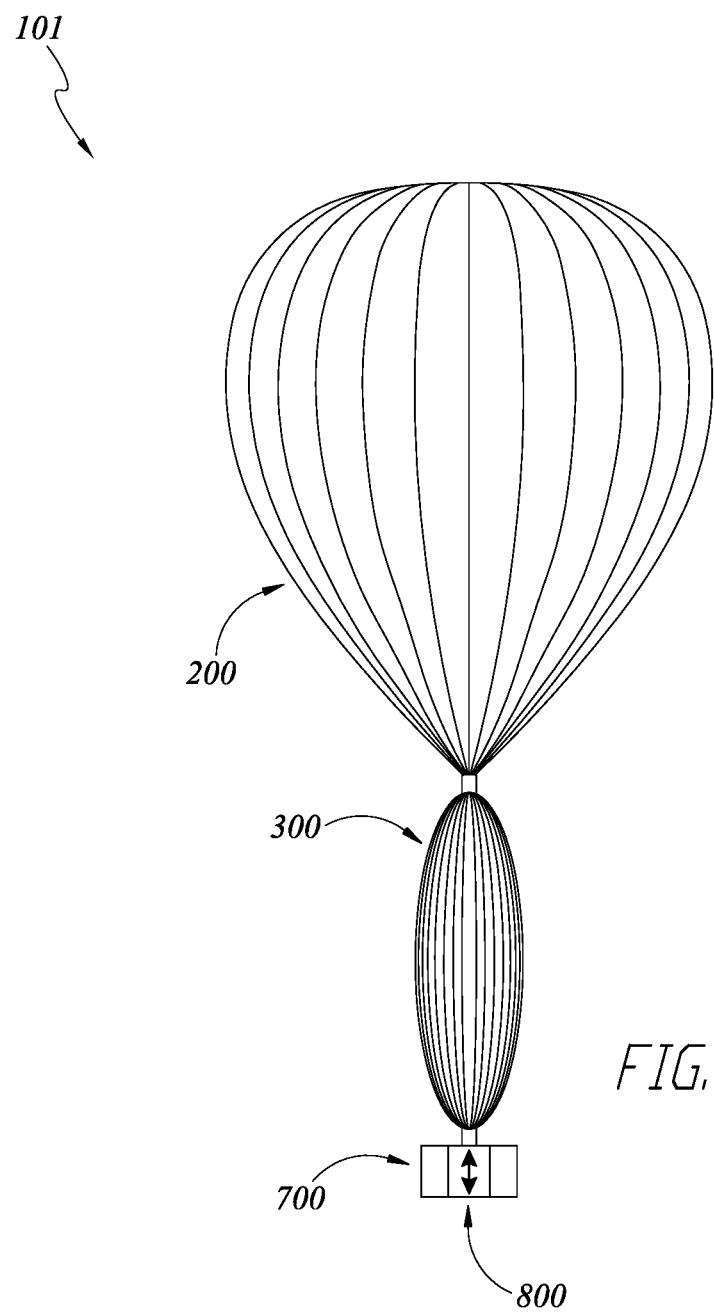

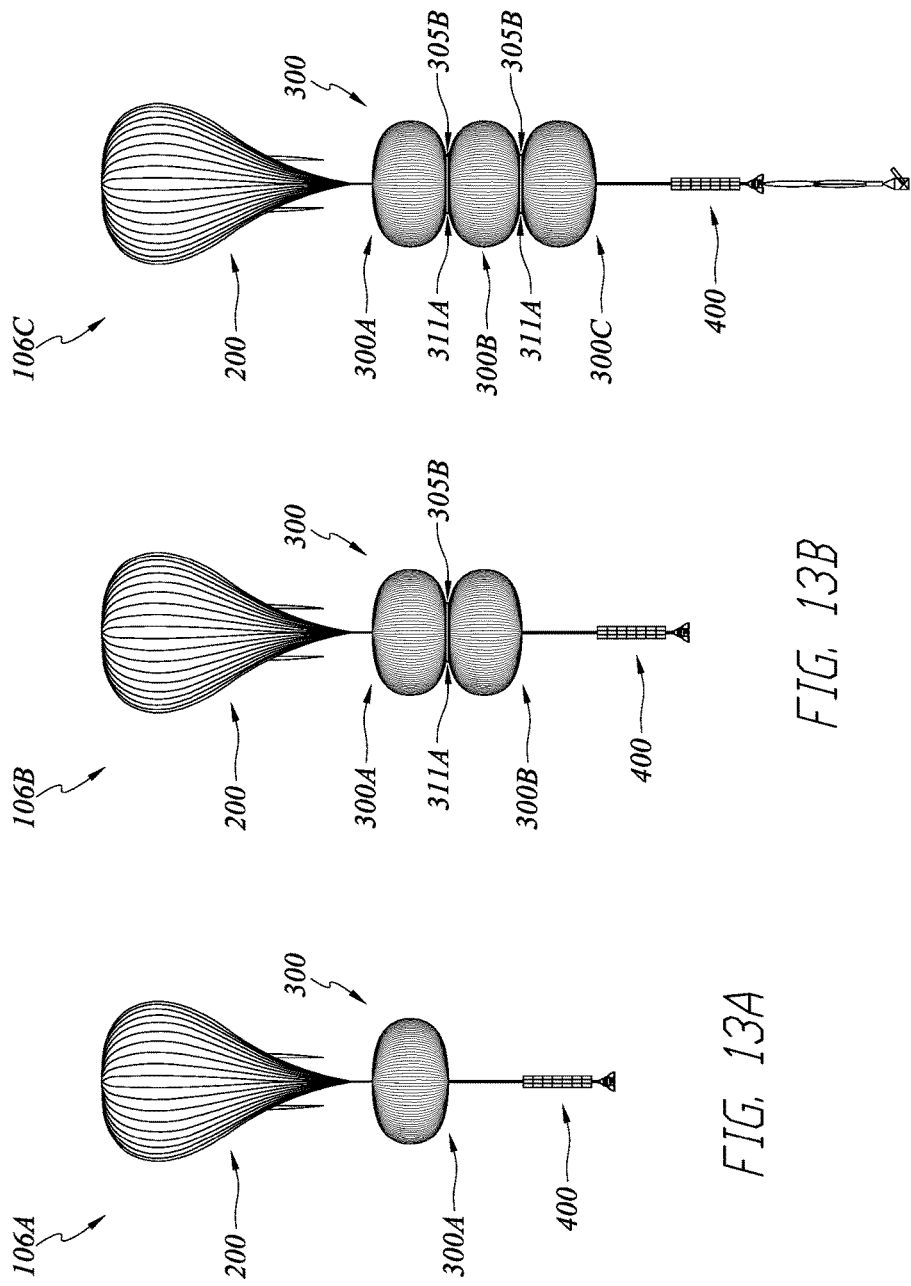

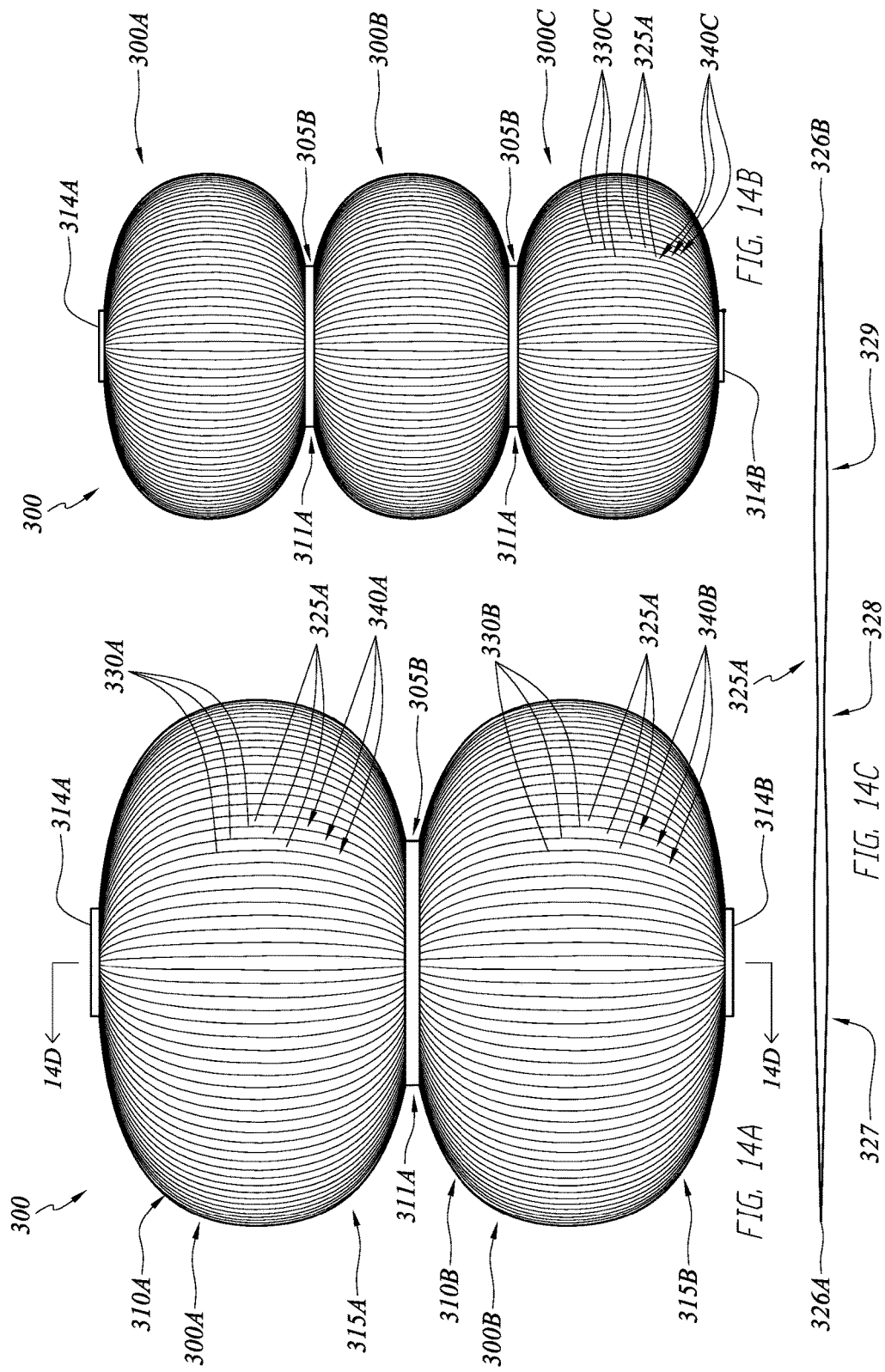

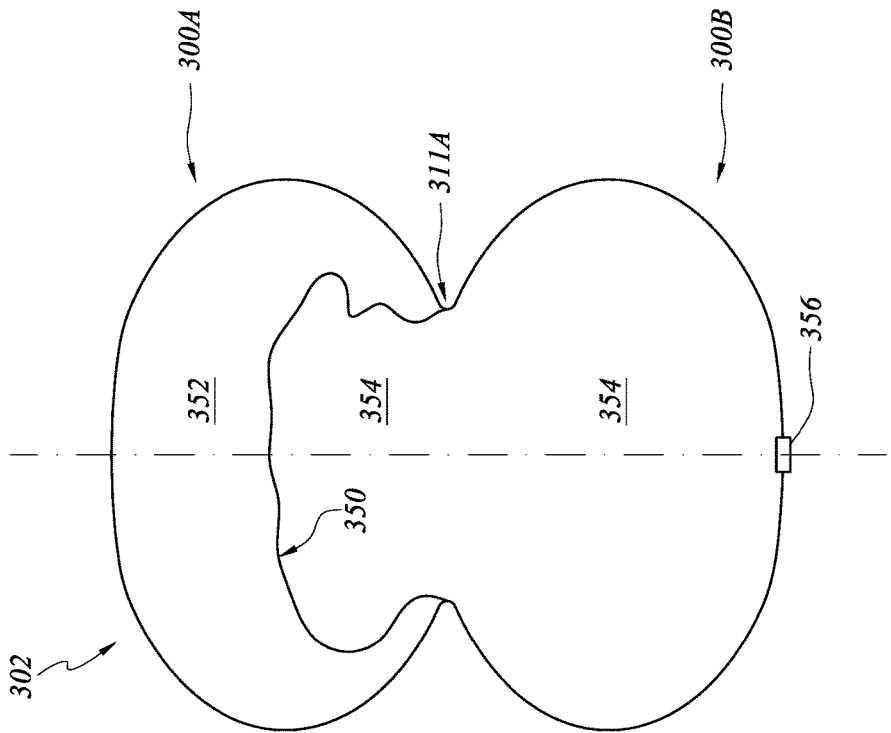
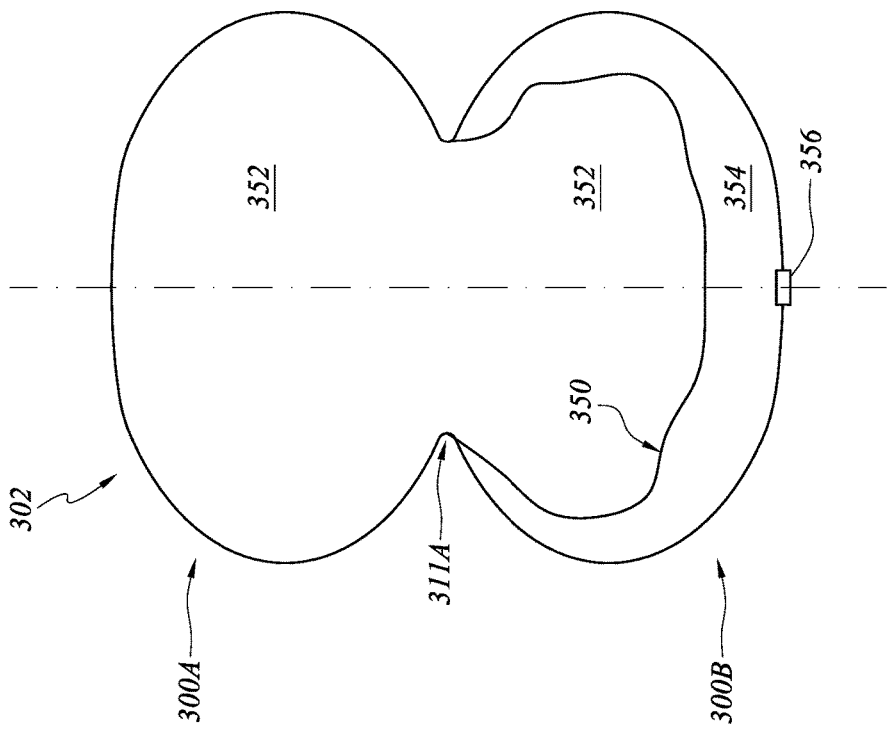
FIG. 15B
FIG. 15A

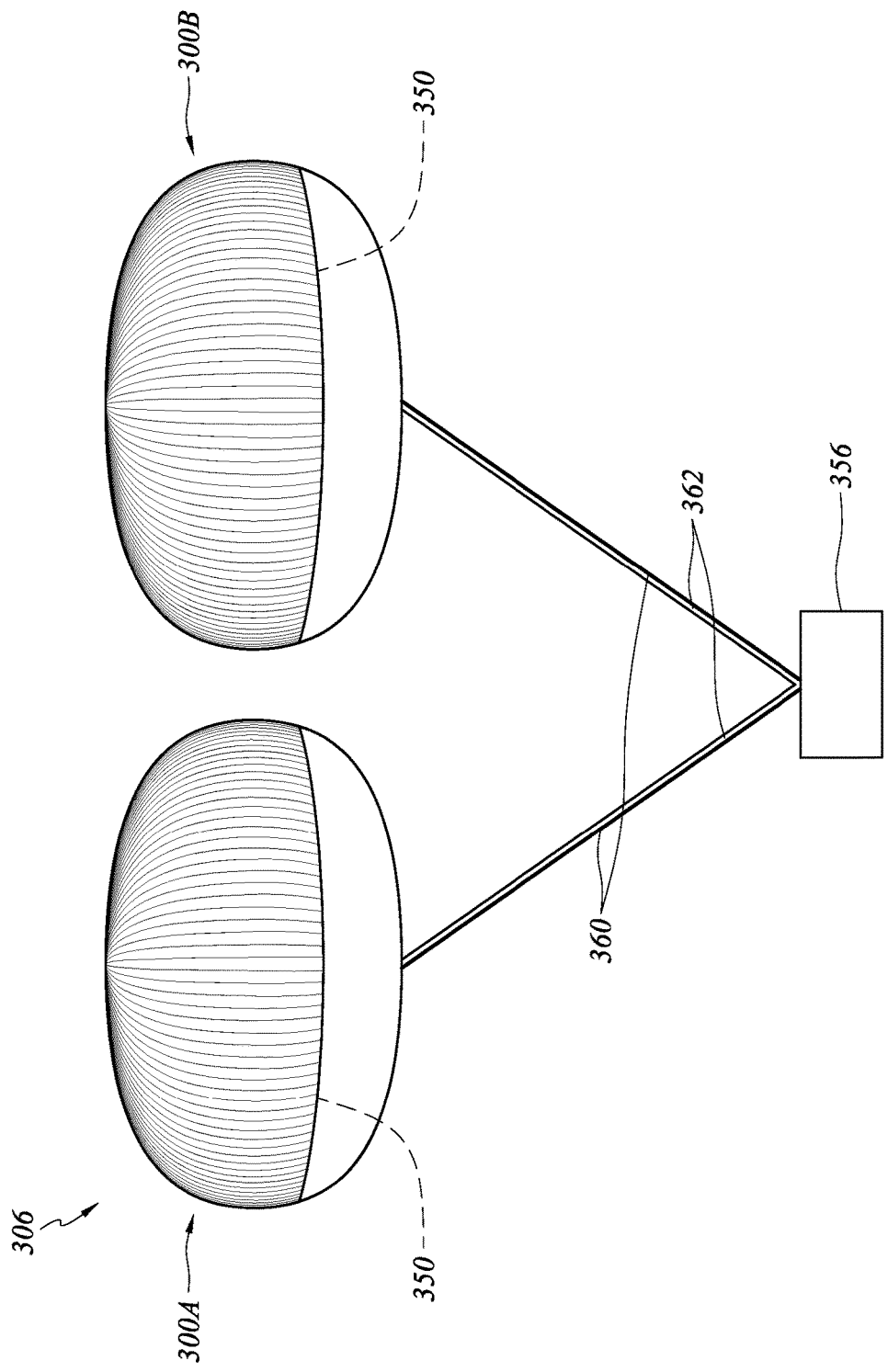

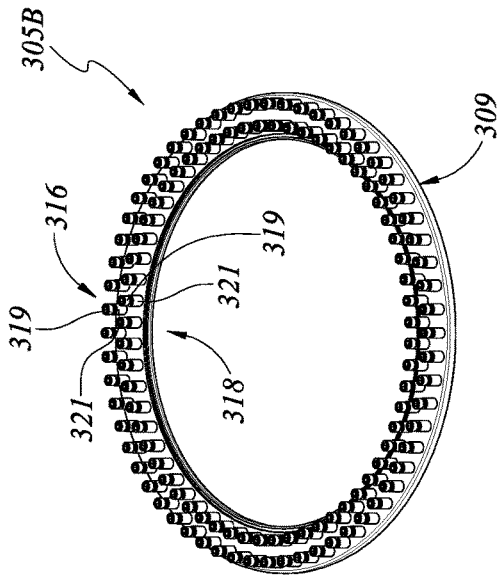
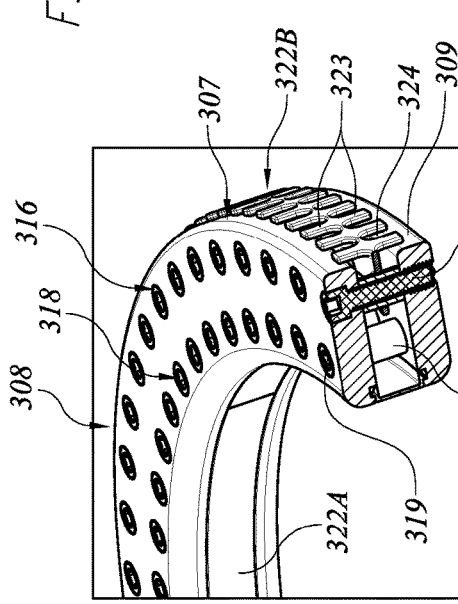
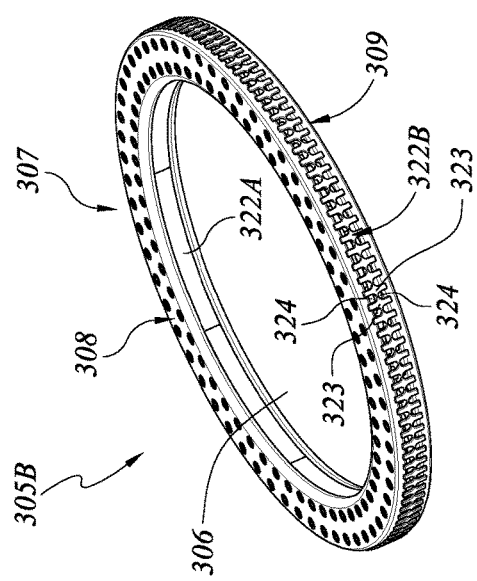
FIG. 18B
FIG. 18C
FIG. 18A

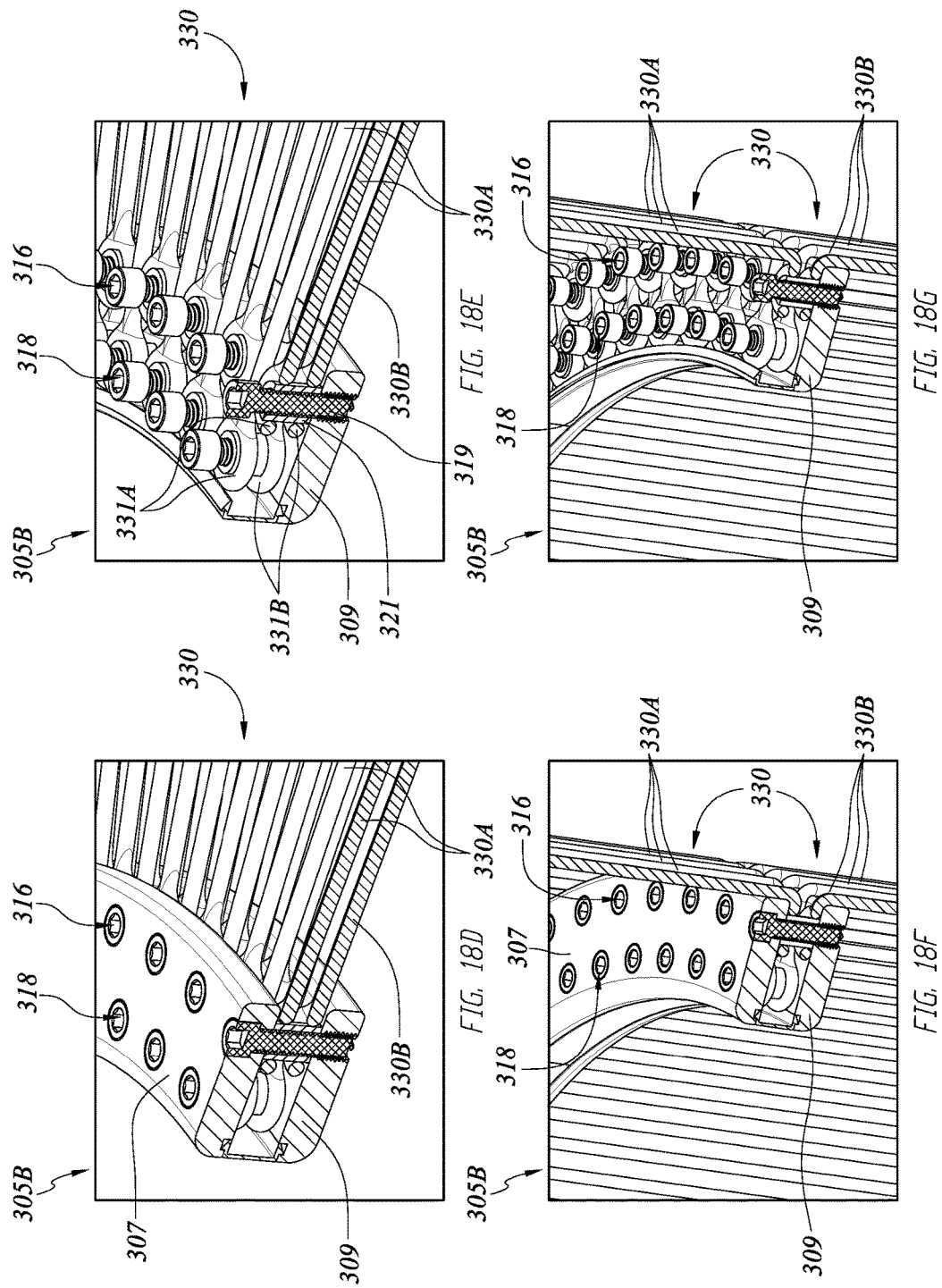

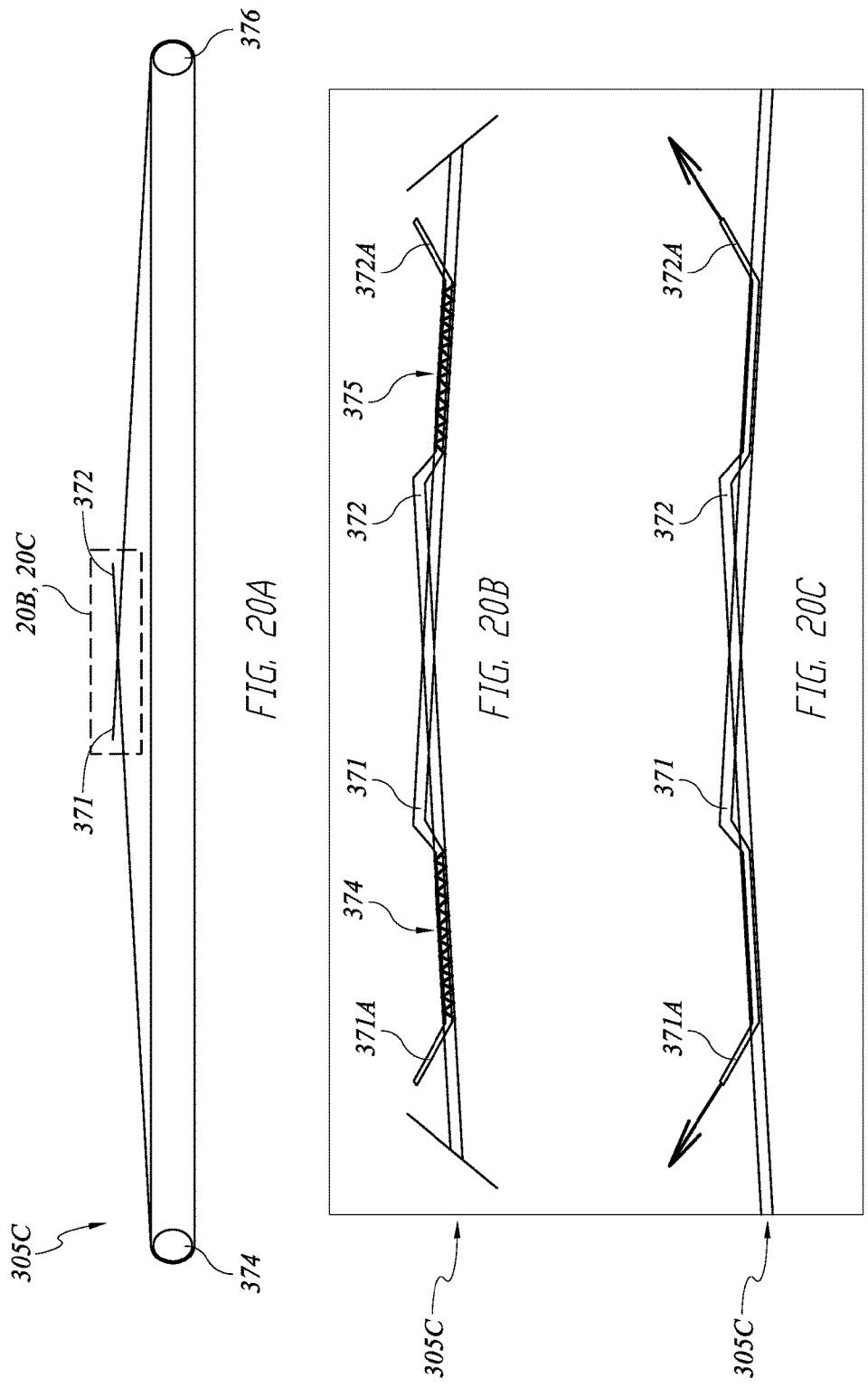

CONTINUOUS MULTI-CHAMBER SUPER PRESSURE BALLOON

INCORPORATION BY REFERENCE TO ANY RELATED APPLICATIONS

Any and all applications for which a foreign or domestic priority claim is identified in the Application Data Sheet as filed with the present application are hereby incorporated by reference under 37 CFR 1.57.

This application claims the benefit of priority to U.S. provisional patent application No. 62/443,945, entitled CONTINUOUS MULTI-CHAMBER SUPER PRESSURE PUMPKIN BALLOONS and filed Jan. 9, 2017, and to U.S. provisional patent application No. 62/574,135, entitled HIGH ALTITUDE BALLOON CONTROL SYSTEMS and filed Oct. 18, 2017, the disclosure of each of which is hereby incorporated by reference herein in its entirety for all purposes and forms a part of this specification.

BACKGROUND

Field

The technology relates generally to high altitude flight, in particular to systems and methods for lighter-than-air high altitude flight.

Description of the Related Art

High altitude flight, generally above about 50,000 feet, with lighter-than-air (LTA) systems is of interest for many applications, including communications, scientific research, meteorology, reconnaissance, tourism, and others. These and other applications impose strict requirements on the LTA system. LTA systems can include balloon systems in which a balloon envelope includes a lighter-than-air gas (e.g., helium or hydrogen).

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages over existing approaches to high altitude LTA flight.

Described herein are systems and devices for high altitude flight using lighter-than-air (LTA) systems. The LTA systems and methods relate to a platform having a tandem balloon system. A zero-pressure balloon (ZPB) is attached in tandem with a variable air super-pressure balloon (SPB) having multiple chambers. The ZPB provides lift for the system while the SPB provides a variable amount of ballast by pumping in or expelling out ambient air. By dividing the two functions among the two separate balloons, each balloon and its associated accessories are configured for the respective balloon's particular function, allowing achievement of advanced performance targets with the LTA.

The SPB may be a continuous multi-chamber SPB. "Continuous" envelope as used herein has its usual and ordinary meaning and includes without limitation an envelope that extends along a length without substantial interruption along that length. For example, the skin or envelope that forms the multi-chamber SPB may be continuous along the axial length of the envelope. The gores or other sections that form the envelope may extend through an inner opening of a fitting at a waist section of the envelope and continue upward and downward therefrom. The gores may be single monolithic pieces extending along the entire length, or the gores may be assembled with smaller gore pieces to form the large gore. These and other embodiments as described herein are included as "continuous" envelopes. The SPB may include two, three, four or more chambers. There may be more than one such multi-chamber SPB. The two or more chambers may have interior volumes that are fluidly connected. The interior volume may therefore be continuous from one chamber to another adjacent chamber. In some embodiments, the chambers may be fluidly separated from each other yet still all be formed by a continuous envelope, as described. Thus many variations may be implemented. A ring fitting or other structural element may provide structural support between each chamber. A plurality of tendons may extend upwardly and downwardly from the ring around respective upper and lower chambers to bias each of the SPB chambers to a pumpkin shape. A ZPB may provide lift for the system while the SPB uses a compressor to provide a variable amount of ballast air by pumping in or expelling out ambient air. In some embodiments, a multi-chamber SPB may provide lifting and descending functions, for example where the multi-chamber SPB includes a barrier defining a first compartment having lift gas and a second compartment having ballast air. Various advanced performance targets relating to ascent rate, descent rate, range and maximum altitude are achievable with various scaled versions of the basic design of the LTA system.

For instance, a compressor provides air to the SPB and can be configured for providing a sufficient rate and volume of air at particular high altitudes in which the LTA system will be flown. Such compressor designs allow for rapid descent, as well as high pressures within the SPB which allows for rapid venting and ascent, both of which can be performed at high altitudes. As further example, configurations of the SPB skin and accompanying tendons allow for a structurally efficient and stable SPB. For instance, the chambers of the SPB may be configured to assume a "pumpkin" shape during flight capable of withstanding very large internal pressures, while also providing stability to prevent issues such as deformation of the skin, including "S-clefting." These and other features of the LTA system provide the ability to both simultaneously achieve high altitude (e.g. at or above about 50,000 feet) and actively control altitude over a meaningful range (e.g. more than about 20,000 feet).

These and other features provide an LTA platform that can be scaled and configured simply for various missions and flight requirements. For instance, the basic design of the LTA system can be configured for higher altitude and/or heavy lift missions with a higher capacity multi-stage compressor, larger volume and/or more chambers of the SPB, and/or larger volume ZPB. As further example, the LTA system can be configured for lower altitude and/or smaller payload missions with a lighter weight system, for example with a single stage compressor, smaller volume and/or fewer chambers of the SPB, and/or smaller volume ZPB. These and other features of the LTA systems described herein allow for performing advanced maneuvers at high altitude with a scalable platform. Thus, further described herein are associated methods of navigation and control with these LTA systems.

In one aspect, a continuous multi-chamber super pressure balloon (SPB) is described. The continuous multi-chamber super pressure balloon comprises a continuous envelope and a fitting. The continuous envelope is configured to be inflated to form a plurality of two or more chambers. Each chamber comprises a maximum inflated width. The continuous envelope when inflated defines a waist. The waist has an inflated waist width located between each chamber that is less than the maximum inflated width of each chamber. The fitting is configured to be positioned around the waist.

The various aspects may have various embodiments. The plurality of two or more chambers may comprise a plurality of gores extending along an entire length of the continuous envelope. The continuous multi-chamber super pressure balloon may further comprise a compressor configured to pump air into the continuous envelope. The continuous multi-chamber super pressure balloon may further comprise a plurality of tendons configured to bias each chamber of the plurality of two or more chambers into a pumpkin shape when the continuous envelope is inflated. The continuous multi-chamber super pressure balloon may further comprise a barrier disposed inside the continuous envelope and fluidly separating a first fluid compartment from a second fluid compartment. The barrier may form a closed envelope that comprises the first fluid compartment.

In some embodiments, the continuous envelope may be further configured to be inflated to form the plurality of two or more chambers extending along a central axis, and the plurality of two or more chambers may comprise a first chamber defining a first interior volume and a second chamber defining a second interior volume. The first chamber may comprise an upper portion and a first maximum inflated width, and the second chamber may comprise a lower portion and a second maximum inflated width. The inflated waist width may be less than each of the first and second maximum inflated widths and be located axially between the first and second maximum inflated widths. The fitting may comprise a ring body extending circumferentially about the central axis and defining an opening therethrough along the axis. The fitting may be configured to be positioned around the waist with the continuous envelope extending through the opening of the fitting. The continuous multi-chamber super pressure balloon may further comprise a first plurality of tendons and a second plurality of tendons. The first plurality of tendons may be configured to extend from the fitting around the first chamber to the upper portion of the first chamber and to bias the first chamber into a first pumpkin shape when the continuous envelope is inflated. The second plurality of tendons may be configured to extend from the fitting around the second chamber to the lower portion of the second chamber and to bias the second chamber into a second pumpkin shape when the continuous envelope is inflated.

In some embodiments, the plurality of two or more chambers may further comprise a third chamber defining a third interior volume and having a third maximum inflated width and a lower portion. The inflated second and third chambers may define a second waist having an inflated second waist width that is less than each of the second and third maximum inflated widths, with the second waist width located axially between the second and third maximum inflated widths. The continuous multi-chamber super pressure balloon may further comprise a second fitting and a third plurality of tendons. The second fitting may comprise a second ring body extending circumferentially about the central axis and defining a second opening therethrough along the axis, with the second fitting configured to be positioned around the second waist with the continuous envelope extending through the second opening of the second fitting. The third plurality of tendons may be configured to extend from the second fitting around the third chamber to the lower portion of the third chamber and to bias the third chamber into a third pumpkin shape when the continuous envelope is inflated.

In some embodiments, the continuous multi-chamber super pressure balloon may further comprise a barrier forming a closed envelope disposed inside the continuous envelope and fluidly separating a first fluid compartment inside the closed envelope from a second fluid compartment outside the closed envelope.

In another aspect, a high altitude lighter-than-air balloon system is described. The high altitude lighter-than-air balloon system comprises a zero-pressure balloon and any of the continuous multi-chamber super pressure balloons described herein. The zero-pressure balloon is configured to receive therein a lighter-than-air gas to provide an upward lifting force to the balloon system. The continuous multi-chamber super pressure balloon is configured to couple with the zero-pressure balloon and to receive therein a variable amount of ambient air from a surrounding atmosphere to provide a variable downward force to the balloon system.

In another aspect, a continuous multi-chamber super pressure balloon is described. The continuous multi-chamber super pressure balloon comprises a continuous envelope, a circumferential constriction, and a plurality of tendons. The continuous envelope comprises a first section, a second section, and a third section. The first, second and third sections are configured to extend axially along a central axis with the third section located between the first and second sections. The third section has a smaller maximum inflated width than each of the first and second sections. The circumferential constriction is configured to extend around the continuous envelope between the first and second sections. The plurality of tendons are configured to extend from the circumferential constriction and around the continuous envelope to bias the first and second sections into respective first and second pumpkin shapes when the continuous envelope is inflated.

The various aspects may have various embodiments. The first section and the second section may comprise a plurality of gores extending from an upper portion of the first section to a lower portion of the second section. The continuous multi-chamber super pressure balloon may further comprise a compressor configured to pump air into the continuous envelope. The continuous multi-chamber super pressure balloon may further comprise a barrier disposed inside the continuous envelope and fluidly separating a first fluid compartment from a second fluid compartment. The barrier may form a closed envelope that comprises the first fluid compartment.

In some embodiments, the continuous envelope may further comprise one or more additional sections having a smaller maximum inflated width than sections adjacent to the one or more additional sections, and the super pressure balloon may further comprise one or more second circumferential constrictions with the plurality of tendons comprising a first plurality of tendons, a second plurality of tendons, and one or more third plurality of tendons. The one or more second circumferential constrictions may each be configured to extend around the continuous envelope at a respective one of the one or more additional sections. The first plurality of tendons may be configured to extend from the circumferential constriction around the first section to bias the first section into a first pumpkin shape when the continuous envelope is inflated. The second plurality of tendons may be configured to extend between the circumferential constriction and the second circumferential constriction and around the second section to bias the second section into a second pumpkin shape when the continuous envelope is inflated. The one or more third plurality of tendons may each be configured to extend from a respective one of the one or more second circumferential constrictions around a respective one of the sections adjacent to the one or more additional sections to bias the respective one of the sections adjacent to the one or more additional sections into respective pumpkin shapes when the continuous envelope is inflated.

In some embodiments, the continuous multi-chamber super pressure balloon may further comprise a barrier forming a closed envelope disposed inside the continuous envelope and fluidly separating a first fluid compartment inside the closed envelope from a second fluid compartment outside the closed envelope. The first section may comprise a first chamber, the second section may comprise a second chamber, and the third section may comprise a waist.

In another aspect, a method of adjusting an altitude of a high altitude balloon system comprising a continuous multi-chamber super pressure balloon (SPB) is described. The method comprises decreasing the altitude and increasing the altitude. Decreasing the altitude comprises causing air to enter a first section of a continuous envelope of the multi-chamber SPB, and causing air to enter a second section of the continuous envelope, where the first and second sections each have a larger width than a third section of the continuous envelope that is located between the first and second sections. Increasing the altitude comprises causing air to exit the first section, and causing air to exit the second section. In some embodiments, causing air to enter the second section comprises flowing air from the first section to the second section.

In another aspect, a multi-chamber super pressure balloon (SPB) is described. The multi-chamber SPB comprises a continuous envelope, a fitting, a first plurality of tendons and a second plurality of tendons. The continuous envelope is configured to be inflated to form a plurality of chambers extending along a central axis, the plurality of chambers comprising a first chamber defining a first interior volume and a second chamber defining a second interior volume. The first chamber comprises a top and a first maximum inflated width, and the second chamber comprises a bottom and a second maximum inflated width. The inflated continuous envelope defines a waist having an inflated waist width that is less than each of the first and second maximum inflated widths, the waist width located axially between the first and second maximum inflated widths. The fitting comprises a ring body extending circumferentially about the central axis and defines an opening therethrough along the axis. The fitting is configured to be positioned around the waist with the continuous envelope extending through the opening of the fitting. The first plurality of tendons is configured to extend from the fitting around the first chamber to the top of the first chamber and to bias the first chamber into a first pumpkin shape when the continuous envelope is inflated. The second plurality of tendons is configured to extend from the fitting around the second chamber to the bottom of the second chamber and to bias the second chamber into a second pumpkin shape when the continuous envelope is inflated.

The various aspects may have various embodiments. The first chamber and the second chamber may comprise a plurality of gores extending from the top of the first chamber to the bottom of the second chamber. The multi-chamber super pressure balloon may further comprise a compressor configured to pump air into the continuous envelope. The first interior volume may be in fluid communication with the second interior volume. The multi-chamber super pressure balloon may further comprise a barrier disposed inside the continuous envelope and fluidly separating a first fluid compartment from a second fluid compartment. The barrier may form a closed envelope that comprises the first fluid compartment.

In some embodiments, the multi-chamber super pressure balloon may further comprise a third chamber, a second fitting and a third plurality of tendons. The plurality of chambers may comprise the third chamber defining a third interior volume and having a third maximum inflated width and a bottom. The inflated second and third chambers may define a second waist having an inflated second waist width that is less than each of the second and third maximum inflated widths, with the second waist width located axially between the second and third maximum inflated widths. The second fitting may comprise a second ring body extending circumferentially about the central axis and defining a second opening therethrough along the axis. The second fitting may be configured to be positioned around the second waist with the continuous envelope extending through the second opening of the second fitting. The third plurality of tendons may be configured to extend from the second fitting around the third chamber to the bottom of the third chamber and to bias the third chamber into a third pumpkin shape when the continuous envelope is inflated. The multi-chamber super pressure balloon may further comprise a barrier forming a closed envelope disposed inside the continuous envelope and fluidly separating a first fluid compartment inside the closed envelope from a second fluid compartment outside the closed envelope.

In another aspect, a super pressure balloon is described. The multi-chamber super pressure balloon comprises a continuous envelope, a circumferential constriction and a plurality of tendons. The continuous envelope comprises a first section, a second section, and a third section. The first, second and third sections are configured to extend axially along a central axis with the third section located between the first and second sections, the third section having a smaller maximum inflated width than each of the first and second sections. The circumferential constriction is configured to extend around the continuous envelope between the first and second sections. The plurality of tendons is configured to extend from the circumferential constriction and around the continuous envelope to bias the first and second sections into respective first and second pumpkin shapes when the continuous envelope is inflated.

The various aspects may have various embodiments. The first section and the second section may comprise a plurality of gores extending from a top of the first section to a bottom of the second section. The super pressure balloon may further comprise a compressor configured to pump air into the continuous envelope. The first section may be in fluid communication with the second section. The super pressure balloon may further comprise a barrier disposed inside the continuous envelope and fluidly separating a first fluid compartment from a second fluid compartment. The barrier may form a closed envelope that comprises the first fluid compartment.

In some embodiments, the super pressure balloon may further comprise a third section, a second circumferential constriction, and a first, second and third plurality of tendons. The continuous envelope may further comprise the third section. The second circumferential constriction may be configured to extend around the continuous envelope between the second and third sections. The plurality of tendons may comprise the first, second and third plurality of tendons. The first plurality of tendons may be configured to extend from the circumferential constriction around the first section to bias the first section into a first pumpkin shape when the continuous envelope is inflated. The second plurality of tendons may be configured to extend between the circumferential constriction and the second circumferential constriction and around the second section to bias the second section into a second pumpkin shape when the continuous envelope is inflated. The third plurality of tendons may be configured to extend from the second circumferential constriction around the third section to bias the third section into a third pumpkin shape when the continuous envelope is inflated. The super pressure balloon may further comprise a barrier forming a closed envelope disposed inside the continuous envelope and fluidly separating a first fluid compartment inside the closed envelope from a second fluid compartment outside the closed envelope. The first section may comprise a first chamber, the second section may comprise a second chamber, and the third section may comprise a waist.

In another aspect, a high altitude lighter-than-air balloon system is described. The high altitude lighter-than-air balloon system comprises a zero-pressure balloon and a multi-chamber super pressure balloon. The zero-pressure balloon is configured to receive therein a lighter-than-air gas to provide an upward lifting force to the balloon system. The multi-chamber super pressure balloon is configured to couple with the zero-pressure balloon and to receive therein a variable amount of ambient air from a surrounding atmosphere to provide a variable downward force to the balloon system. The multi-chamber super pressure balloon comprises a continuous envelope comprising a first chamber and a second chamber, a fitting configured to extend around the continuous envelope between the first and second chambers, and a plurality of tendons configured to extend from the fitting and around the continuous envelope to bias the first and second chambers into respective first and second pumpkin shapes when the continuous envelope is inflated.

In another aspect, a method of adjusting an altitude of a high altitude balloon system comprising a multi-chamber super pressure balloon (SPB) is described. The method comprises decreasing the altitude and increasing the altitude. Decreasing the altitude comprises causing air to enter a first section of a continuous envelope of the multi-chamber SPB, and causing air to enter a second section of the continuous envelope, wherein the first and second sections each have a larger width than a third section of the continuous envelope that is located between the first and second sections. Increasing the comprises causing air to exit the first section, and causing air to exit the second section. In some embodiments, causing air to enter the second section comprises flowing air from the first section to the second section.

In another aspect, a method of flying a high altitude balloon system is described. The method comprises causing the high altitude balloon system to be positioned at an altitude greater than zero feet above ground. The high altitude balloon system comprises a multi-chamber super pressure balloon comprising a continuous envelope, a fitting and a plurality of tendons. The continuous envelope comprises a first chamber and a second chamber. The fitting is configured to extend around the continuous envelope between the first and second chambers. The plurality of tendons is configured to extend from the fitting and around the continuous envelope to bias the first and second chambers into respective first and second pumpkin shapes when the continuous envelope is inflated. In some embodiments of the method, the first chamber and the second chamber comprise a plurality of gores extending from a top of the first chamber to a bottom of the second chamber. In some embodiments of the method, the high altitude balloon system further comprises a zero-pressure balloon coupled with the multi-chamber super-pressure balloon.

In another aspect, a regenerative air ballast system for lighter than air (LTA) flight systems is described. The regenerative air ballast system comprises a first super pressure balloon (SPB) chamber and a second SPB chamber fluidly connected with the first SPB chamber. The second SPB chamber comprising a flexible barrier therein that separates a first interior portion of the second SPB chamber from a second interior portion of the second SPB chamber. The first interior portion of the second SPB chamber is configured to receive pressurized atmospheric air and the second interior portion of the second SPB chamber is in fluid communication with the first SPB chamber. The first SPB chamber is configured to receive a lighter than air lift gas.

The various aspects may have various embodiments. The regenerative air ballast system may further comprise a compressor in fluid connection with the first interior portion of the second SPB chamber and configured to provide the pressurized atmospheric air to the first portion. The first and second SBP chambers may be pumpkin balloon chambers. The flexible barrier may be configured to move in response to receiving the pressurized atmospheric air into the first portion, thereby increasing the volume of the first interior portion. The flexible barrier may be configured to expand in response to receiving the pressurized atmospheric air into the first portion. The flexible barrier may be configured to expand to conform to the first interior portion of the second SPB chamber. The flexible barrier may be configured to expand to conform to the first interior portion of the second SPB chamber to further compress the lift gas in the fluidly connected first SPB chamber, thus reducing the effectiveness of the lift gas and assisting the increase in density and thus descent of the entire vehicle. The regenerative air ballast system may further comprise an interconnect fluidly connecting the first and second SPB chambers. The first and second SBP chambers may form a first continuous multi-chambered super pressure balloon. The regenerative air ballast system may further comprise a second continuous multi-chambered super pressure balloon encapsulating the first continuous multi-chambered super pressure balloon while maintaining fluid connection of lift gas between the first and second SPB. The regenerative air ballast system may further comprise a third SPB chamber fluidly connected with the first SPB. The regenerative air ballast system may further comprise coaxial gas connections between the first and second SPB chambers and between the second and third SPB chambers.

In another aspect, a regenerative air ballast system for lighter than air (LTA) flight systems is described. The regenerative air ballast system comprises a first super pressure balloon (SPB) chamber fluidly coupled with a compressor, and a second SPB chamber fluidly coupled with the compressor. Each of the first and second SPB chambers includes a flexible barrier therein separating a first interior portion from a second interior portion, the first interior portions configured to receive pressurized atmospheric air and the second interior portions configured to receive a lighter than air lift gas.

The various aspects may have various embodiments. The regenerative air ballast system may further comprise a third SPB chamber fluidly coupled to the compressor, the third SPB chamber including a flexible barrier therein separating a first interior portion from a second interior portion, the first interior portions configured to receive pressurized atmospheric air and the second interior portions configured to receive a lighter than air lift gas. The regenerative air ballast system may further comprise the compressor. The regenerative air ballast system may further comprise a support structure configured to couple the compressor to each of the SPB chambers.

In another aspect, a multichambered balloon system is described. The multichambered balloon system comprises a plurality of continuous chambers in fluid communication and configured to receive ambient air, and a lift gas bag disposed internally to the plurality of continuous chambers and configured to receive a lighter than air lift gas. The multichambered balloon system may further comprise a compressor configured to pump ambient air into the plurality of continuous chambers. A number of the plurality of chambers may be two, three, four, five, six, or more.

In another aspect, a balloon system is described. The balloon system comprises a plurality of ballonets, each of the plurality of ballonets fluidly connected to a single compressor.

In another aspect, a continuous multi-chamber super pressure (SP) balloon is described. The continuous multi-chamber super pressure (SP) balloon comprises a continuous envelope forming a plurality of pumpkin-shaped tanks, the plurality of pumpkin-shaped tanks comprising a first tank and a second tank, where the continuous envelope comprises a circumferential constriction between the first tank and the second tank.

In some embodiments, the first tank and the second tank may comprise a plurality of gores and a plurality of tendons. The circumferential constriction may comprise a rope ring. The rope ring may comprise an ultra-high molecular weight polyethylene rope. The rope ring may comprise a multi-turn configuration. The circumferential constriction may comprise a heat-sealed portion of the continuous envelope. The continuous envelope may have an interior volume, the SP balloon further comprising a bladder separator disposed in the interior volume between the first tank and the second tank. The SP balloon may further comprise a compressor configured to pump gas into the continuous envelope. The plurality of pumpkin-shaped tanks further may comprise a third tank adjacent the second tank, and the continuous envelope may comprise a second circumferential constriction between the second tank and the third tank.

In another aspect, a method of constructing a multi-chamber super pressure (SP) balloon is described. The method comprises providing a continuous envelope to be formed into a plurality of tanks, wrapping one or more turns of rope around a portion of the continuous envelope under nominal tension to reduce slack strain, bowing out a splice link from the wrapped turns of rope, making a splice with an isolation tension, pulling on ends of the rope to tighten the splice to provide a double-tensioned configuration, and sewing the splice while in the double-tensioned configuration In another aspect, a lighter-than-air (LTA) high altitude balloon system is described. The LTA system includes a zero-pressure balloon (ZPB), a super-pressure balloon (SPB), a centrifugal compressor, an adjustable valve, a sensor, a control system and a plurality of tendons. The ZPB is configured to receive therein an LTA gas to provide an upward lifting force to the balloon system. The super-pressure balloon (SPB) has an outer skin and is configured to couple with the ZPB. The outer skin defines an interior volume configured to receive therein a variable amount of ambient air from a surrounding atmosphere to provide a variable downward force to the balloon system. The centrifugal compressor is in fluid communication with the ambient air and with the interior volume of the SPB. The centrifugal compressor is configured to compress the ambient air and pump the compressed ambient air into the interior volume of the SPB to increase the downward force to the balloon system. The adjustable valve is in fluid communication with the ambient air and with the interior volume of the SPB. The valve is configured to be adjusted to release the compressed ambient air from the interior volume of the SPB to the surrounding atmosphere to decrease the downward force to the balloon system. The sensor is coupled with the balloon system and configured to detect an environmental attribute. The control system is in communicating connection with the sensor, with the centrifugal compressor, and with the adjustable valve. The control system is configured to control the centrifugal compressor and the adjustable valve based at least on the detected environmental attribute to control the amount of compressed air inside the SPB to control an altitude of the balloon system. The plurality of tendons is coupled with the SPB and extends along an exterior of the outer skin of the SPB. The plurality of tendons is configured to bias the SPB into a pumpkin-like shape at least when a first pressure inside the SPB is greater than a second pressure of the surrounding atmosphere.

In some embodiments of the balloon system, the centrifugal compressor comprises two or more stages. The centrifugal compressor may be configured to provide at least 500 liters of the ambient air per second to the interior volume of the SPB at altitudes above 50,000 feet. The centrifugal compressor may be configured to provide the ambient air to the interior volume of the SPB such that a resulting descent rate of the balloon system is at least 10,000 feet per hour at altitudes above 50,000 feet. The resulting descent rate of the balloon system may be at least 20,000 feet per hour.

In some embodiments of the balloon system, the adjustable valve is configured to be adjusted to release the pumped-in ambient air from the interior volume of the SPB to the surrounding atmosphere such that a resulting ascent rate of the balloon system is at least 10,000 feet per hour at altitudes above 50,000 feet. The resulting ascent rate of the balloon system may be at least 20,000 feet per hour.

In some embodiments of the balloon system, the centrifugal compressor comprises two or more stages and is configured to provide at least 500 liters of the ambient air per second to the interior volume of the SPB such that a resulting descent rate of the balloon system is at least 10,000 feet per hour at altitudes above 50,000 feet, and the adjustable valve is configured to be adjusted to release the pumped-in ambient air from the interior volume of the SPB to the surrounding atmosphere such that a resulting ascent rate of the balloon system is at least 10,000 feet per hour at altitudes above 50,000 feet.

In some embodiments of the high altitude balloon, the SPB comprises two or more SPB compartments connected in series. The SPB may include two, three, four or more SPB compartments. The SPB compartments may be connected in series and/or in parallel.

In some embodiments, the balloon system further comprises a payload support, an elongated ladder assembly, and an air hose. The payload support is coupled with the SPB and is configured to support a payload. The elongated ladder assembly couples the payload support with the SPB such that the payload support is located below the SPB when the balloon system is in flight. The air hose is fluidly coupled with the centrifugal compressor, and the centrifugal compressor is mounted with the payload support and is fluidly coupled with the interior volume of the SPB via the air hose. The air hose extends along and is supported at least in part by the elongated ladder assembly.

In some embodiments, the payload support comprises a tetrahedral frame coupled with the SPB. In some embodiments, the payload support comprises a tetrahedral frame coupled with the SPB and configured to support a payload.

In some embodiments, the balloon system further comprises a parafoil system coupled with the payload support and releasably coupled with the elongated ladder assembly in a stowed configuration, the parafoil system configured to release from the elongated ladder assembly and to deploy into a deployed flight configuration to controllably descend with the payload support to a landing site.

In some embodiments, the balloon system further comprises a solar array that includes one or more solar panels coupled with the elongated ladder assembly, wherein the elongated ladder assembly has a length based at least in part on avoiding shading from the balloon system during daylight in order to provide sunlight to the one or more solar panels.

In some embodiments, the balloon system further comprises a gimbal rotatably coupling the ZPB with the SPB, the gimbal configured to rotate the SPB relative to the ZPB, where the SPB and the solar array are rigidly coupled with the elongated ladder assembly such that rotation of the SPB with the gimbal rotates the elongated ladder assembly and the solar array to a desired orientation.

In some embodiments, the balloon system further comprises one or more release lines and a tear line. The one or more release lines couple upper and lower separable portions of the gimbal. The one or more release lines extend near a hot wire configured to be heated and thereby burn the one or more release lines. Burning the one or more release lines separates the upper and lower portions of the gimbal. The tear line is coupled with the ZPB and with the lower portion of the gimbal. The tear line is configured to at least partially remove one or more gores of the ZPB due to separation and falling away of the lower portion of the gimbal from the ZPB.

In another aspect, a lighter-than-air (LTA) high altitude balloon system is described. The balloon system comprises a zero-pressure balloon (ZPB), a super-pressure balloon (SPB), a multi-stage centrifugal compressor and an adjustable valve. The ZPB is configured to receive therein an LTA gas to provide an upward lifting force to the balloon system. The super-pressure balloon (SPB) is configured to couple with the ZPB and to receive therein ambient air to provide a downward force to the balloon system. The multi-stage centrifugal compressor is configured to pump the ambient air into the SPB to increase the downward force to the balloon system. The multi-stage centrifugal compressor is further configured to pump the ambient air into the SPB such that a resulting descent rate of the balloon system is at least 10,000 feet per hour at altitudes above 50,000 feet. In some embodiments, the multi-stage centrifugal compressor is thus configured for altitudes above about 70,000 feet. The adjustable valve is configured to release the pumped-in ambient air from the SPB to decrease the downward force to the balloon system. The adjustable valve is configured to release the pumped-in ambient air from the SPB such that a resulting ascent rate of the balloon system is at least 10,000 feet per hour at altitudes above 50,000 feet. In some embodiments, the adjustable valve is thus configured for altitudes above about 70,000 feet. In some embodiments, the SPB is pumpkin-shaped at least when a first pressure inside the SPB is greater than a second pressure of a surrounding atmosphere In another aspect, a method of controlling a lighter-than-air (LTA) high altitude balloon system through a troposphere, tropopause and stratosphere is disclosed. The balloon system comprises a zero-pressure balloon (ZPB) coupled with a super-pressure balloon (SPB), a compressor fluidly coupled with the SPB and configured to pump ambient air into the SPB, and an adjustable valve fluidly coupled with the SPB and configured to release the pumped-in ambient air from the SPB. The method comprises determining a first range of latitude and longitude coordinates corresponding to a first portion of the tropopause having a first plurality of altitudes corresponding respectively to a first plurality of wind directions within the tropopause. The method further comprises controllably releasing, with the adjustable valve, the ambient air from the SPB to ascend the balloon system from the determined first range of latitude and longitude coordinates within the troposphere and through the tropopause to the stratosphere, where the balloon system travels along a first helical trajectory through the tropopause due to the first plurality of wind directions at the first plurality of altitudes within the tropopause, where the balloon system ascends at a plurality of ascent rates through the tropopause, and where at least one of the plurality of ascent rates is at least 10,000 feet per hour. The method further comprises determining a second range of latitude and longitude coordinates corresponding to a second portion of the tropopause having a second plurality of altitudes corresponding respectively to a second plurality of wind directions within the tropopause. The method further comprises controllably pumping, with the compressor, the ambient air into the SPB to descend the balloon system from the determined second range of latitude and longitude coordinates within the stratosphere and through the tropopause to the troposphere, where the balloon system travels along a second helical trajectory through the tropopause due to the second plurality of wind directions at the second plurality of altitudes within the tropopause, where the balloon system descends at a plurality of descent rates through the tropopause, and where at least one of the plurality of descent rates is at least 10,000 feet per hour.

In some embodiments of the method of controlling the balloon system, at least one of the coordinates of the first range of latitude and longitude coordinates is not within the second range of latitude and longitude coordinates.

In some embodiments, the method further comprises travelling in a generally horizontal first direction through the troposphere to one of the coordinates of the determined first range of latitude and longitude coordinates before controllably releasing the ambient air to ascend the balloon system through the tropopause and into the stratosphere. In some embodiments, the method further comprises travelling in a generally horizontal second direction through the stratosphere to one of the coordinates of the determined second range of latitude and longitude coordinates after ascending to the stratosphere and before controllably pumping in the ambient air to descend the balloon system through the tropopause and into the troposphere. In some embodiments, the first direction is different from the second direction.

In some embodiments, the method further comprises maintaining the balloon system within a persistence envelope comprising portions of the troposphere, tropopause and stratosphere. Maintaining the balloon system within the persistence envelope comprises cyclically repeating the following: travelling, from a starting position within the troposphere corresponding to one of the coordinates of the second range of latitude and longitude coordinates, along the generally horizontal first direction through the troposphere to a first location of the troposphere corresponding to one of the coordinates of the first range of latitude and longitude coordinates; ascending from the first location of the troposphere through the tropopause along the first helical trajectory to a second location within the stratosphere; travelling along the generally horizontal second direction from the second location of the stratosphere to a third location of the stratosphere corresponding to one of the coordinates of the second range of latitude and longitude coordinates; and descending from the third location of the stratosphere through the tropopause along the second helical trajectory to an ending position within the troposphere corresponding to one of the coordinates of the second range of latitude and longitude coordinates.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIGS. 9A and 9B are side views of another embodiment of an LTA system for high altitude flight having a ZPB, an SPB and a compressor shown at, respectively, relatively lower and higher altitudes.

FIG. 13A is a side view of an embodiment of an LTA system with an SPB having a single SPB chamber.

FIG. 13B is a side view of an embodiment of an LTA system with a continuous two-chambered SPB having first and second SPB chambers arranged axially and with a waist fitting.

FIG. 13C is a side view of an embodiment of an LTA system with a continuous three-chambered SPB having first, second and third SPB chambers arranged axially and with two waist fittings.

FIG. 14A is a side view of the two-chambered SPB of FIG. 13B and having apex and nadir fittings.

FIG. 14B is a side view of the three-chambered SPB of FIG. 13C and having apex and nadir fittings.

FIG. 14C is an embodiment of a gore, shown in a flat configuration, that may be used with the continuous two-chambered SPB of FIG. 13A.

FIGS. 15A and 15B are cross-section views of an embodiment of a continuous two-chambered SPB having two internal air compartments separated by a bladder and shown, respectively, with the bladder in a first and second configuration.

FIGS. 16A-16B are side views of embodiments of respectively a laterally-arranged multi-chamber SPB and a multi-chamber SPB with interspersed compressors.

FIG. 18A is a perspective view of an embodiment of a waist fitting that may be used with the various multi-chamber SPB's described herein.

FIG. 18B depicts the waist fitting of FIG. 18A with a portion removed for clarity.

FIG. 18C is a cross-section view of the waist fitting of FIG. 18A.

FIG. 18D is a cross-section view of the waist fitting of FIG. 18A shown with radially extending tendons 330.

FIG. 18E is a cross-section view of the waist fitting of FIG. 18A, with a portion removed for clarity, and shown with radially extending tendons.

FIG. 18F is a cross-section view of the waist fitting of FIG. 18A shown with axially extending tendons.

FIG. 18G is a cross-section view of the waist fitting, with a portion removed for clarity, and shown with axially extending tendons.

FIGS. 20A-20C depict schematics of embodiments of a system and method for constructing a rope ring waist fitting.

DETAILED DESCRIPTION

Figure 1:
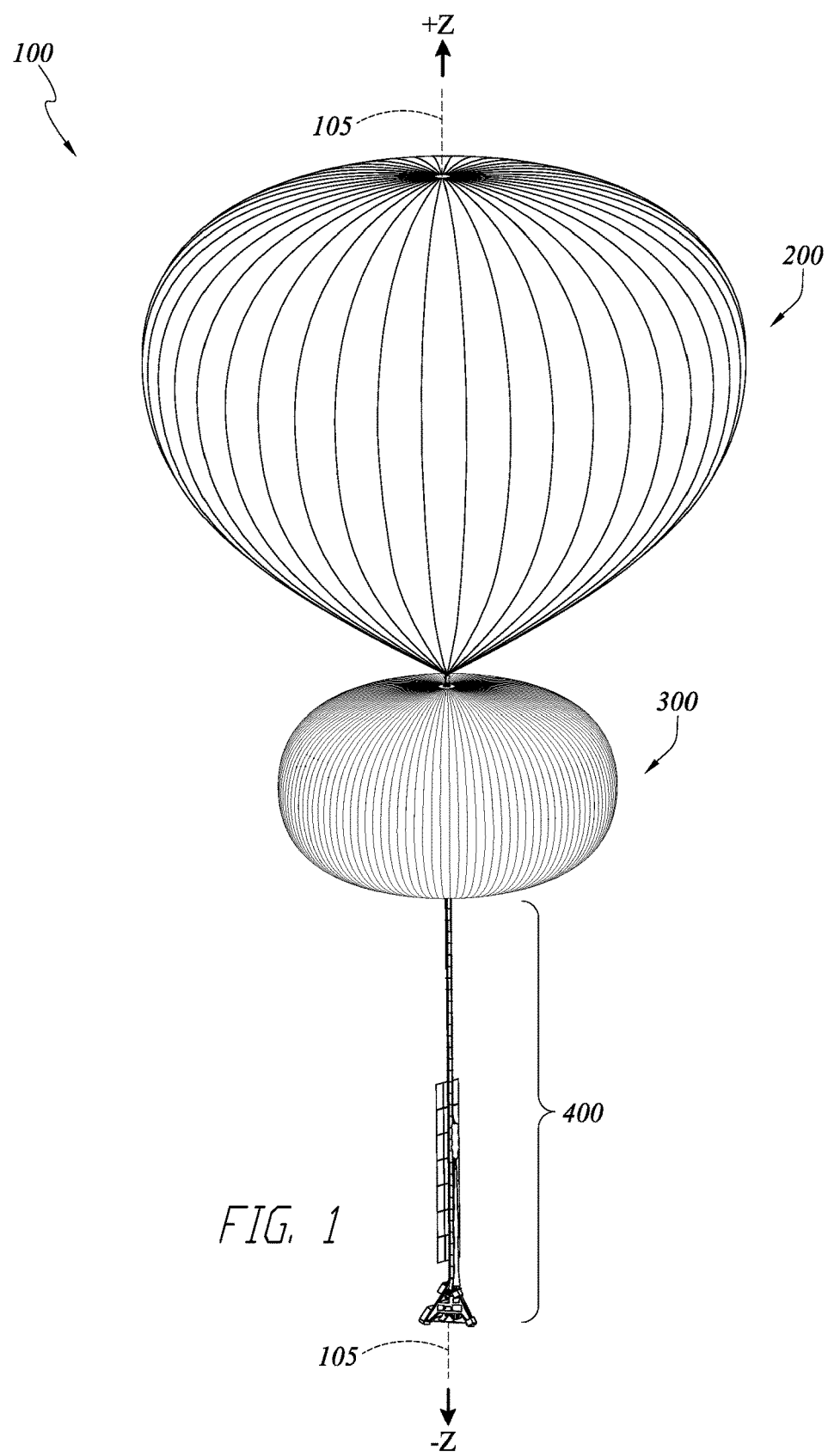
FIG. 1 is a perspective view of an embodiment of a lighter-than-air (LTA) system for high altitude flight including a zero-pressure balloon (ZPB), a super-pressure balloon (SPB) and a stratocraft having a payload, a parafoil descent system and supporting subsystems.

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein.

One possible limiting factor for lighter-than-air (LTA) systems is the inability to effectively control the trajectory while in flight. For instance, some applications require the ability to ascend and descend at fast rates, to ascend and descend over large altitude ranges, to maintain station-keeping envelopes for extended periods of time, to maintain constellation coverage, etc. However, existing LTA systems do not provide simple and inexpensive solutions to achieve these and other advanced performance targets. There is, therefore, a need for such LTA systems and methods. Embodiments of the present disclosure address these and/or other challenges.

Described herein are systems and devices for high altitude flight using LTA systems having tandem balloons. A zero-pressure balloon (ZPB) that provides lift is attached in tandem with one or more variable air ballast super-pressure balloons (SPB). The SPB provides a controlled and variable air ballast supply and emission (i.e. two-way ballast control) from ambient air in the surrounding atmosphere. A compressor, with sufficient air volume flow rate capabilities, provides sufficient ambient air to the SPB even at low densities in high altitudes for rapid descent or altitude maintenance. A controllable valve is sized and controlled for sufficient air release from the SPB for rapid ascent or altitude maintenance. These and other features of the LTA system allow for performance of advanced navigation and altitude control techniques. The LTA systems described herein are more agile, require less power and weigh less than existing balloon system solutions for similar mission requirements. The LTA system thus allows for performance of advanced maneuvers at high altitude, allowing for a multitude of high altitude LTA system uses—and with a single, scalable platform. Described herein are some embodiments of the LTA system and of some example methods of using the system, including rapid ascent/descent and station-keeping to maintain a persistence envelope at high altitudes. Thus, the LTA system has various other embodiments and is capable of many other uses, even if not explicitly described herein.

As used herein, "high altitude" refers to altitudes that are in the stratosphere (above 35,000 feet), and includes without limitation altitudes in the troposphere, the tropopause, and the stratosphere of Earth's atmosphere. The altitude range for "high altitude", for example in terms of kilometers or miles, will vary depending on the latitude and longitude. In some locations, high altitude will include a range of about 30,000 feet to about 120,000 feet or 130,000 feet. The exact altitude of flight desired depends on the wind distribution and the trajectory one is seeking. High altitude can also refer to altitudes of non-Earth atmospheres on other planets with atmospheres that may not fall within the given altitude range on Earth. Further, description herein of a system as "high altitude" is not meant to exclude flight of that system through lower altitudes, for example during takeoff from ground and ascent to higher altitudes or descent and landing on the ground.

A. LTA System

FIG. 1 is a perspective view of an embodiment of a lighter-than-air (LTA) system 100 for high altitude flight. For reference, a longitudinal axis 105 is indicated. The longitudinal axis 105 is a reference axis for describing the system 100. Directions described as "outer," "outward," and the like, are referring to a direction at least partially away from such longitudinal axes, while directions described as "inner," "inward," and the like, are referring to a direction at least partially toward such longitudinal axes.

For reference, a +Z direction is indicated that is opposite in direction to that of gravity, and a −Z direction is indicated that is opposite in direction to the +Z direction. For the sake of description, directions described as "upper," "above," and the like, are referring to a direction at least partially in the +Z direction, and directions described as "lower," "below," and the like, are referring to a direction at least partially in the −Z direction. The +Z direction is the general direction the system 100 travels when ascending, while the −Z direction is the general direction the system 100 travels when descending. The direction of ascent and descent of the system 100 may not be aligned with, respectively, the +Z and −Z directions. For example, the system 100 may travel at an angle with respect to the +Z and −Z directions. Further, the longitudinal axis 105 may or may not align with the +/−Z directions and/or with the direction of travel of the system 100.

The LTA system 100 is shown in flight. Various features of the system 100 may change configuration, for example shape, geometry or dimensions, depending on the phase of a mission (e.g. takeoff, flight, landing). Thus, the depiction of the system 100 in any one configuration is not meant to limit the disclosure to that particular configuration. Further, the basic design of the LTA system 100 may be adapted, for example scaled, modularized, etc. for different mission requirements. The LTA system 100 can be modularized, for example with multiple SPB's 300 such as in tandem pneumatically connected to each other, as further described. The description herein is primarily of a very high altitude and/or heavy payload lifting version of the LTA system 100, unless otherwise stated. Therefore, other configurations, of the basic platform for the particular LTA system 100 described herein, are within the scope of this disclosure even if not explicitly described.

The LTA system 100 includes a zero-pressure balloon (ZPB) 200, a super-pressure balloon (SPB) 300 and a stratocraft 400. The SPB 300 may be a single chamber as shown or may include multiple chambers, as further described herein. The ZPB 200, SPB 300 and the stratocraft 400 are shown coupled together. In some phases of flight, the ZPB 200, SPB 300 and the stratocraft 400 are not coupled together. For example, portions of the stratocraft 400 may release from the LTA system 100, such as during descent of a payload and descent system. As further example, the ZPB 200, SPB 300 and/or the stratocraft 400 may separate from each other after flight termination.

The ZPB 200 is a lifting balloon. The primary function of the ZPB 200 is to provide lift to the LTA system 100. A lighter-than-air (LTA) gas is provided inside the ZPB 200 in an amount at launch sufficient for the LTA system 100 to take off. The ZPB 200 will initially be under-inflated but with sufficient lifting capacity in a collapsed configuration at launch from ground, and will expand as the LTA system 100 ascends to higher altitudes with lower pressure air.

The ZPB 200 is a "zero-pressure" type of balloon. A "zero-pressure balloon" contains an LTA gas therein for providing lift to the LTA system 100. The ZPB 200 may be filled with helium or hydrogen. A "zero-pressure balloon" is normally open to the atmosphere via hanging or attached ducts to prevent over-pressurization. If flying alone as a single ZPB 200, the ZPB 200 would be susceptible to the cyclic increase and decrease in altitude caused by the constant balloon envelope volume change due to heating and cooling, and therefore expansion and contraction of the lift gas inside the ZPB 200 throughout the Earth's diurnal cycle. This constant altitude change leads to the loss of lift gas over time as the heating of the lift envelope during the day cycle causes the lift gas to expand until the maximum float altitude is reached and the LTA gas is vented out of the opening in the ZPB 200. During the night cycle, the lift gas contracts, causing the ZPB 200 envelop to contract and lose buoyancy. For this reason the LTA system 100 controls the natural changes of buoyancy as well having the ability to bias the buoyancy even more than simply neutralizing the natural changes in order to achieve controlled altitude changes. Particular embodiments and other aspects of the ZPB 200 are described in further detail herein, for example with respect to FIG. 2.

The ZPB 200 supports the SPB 300. As shown, the SPB 300 is supported underneath the ZPB 200. The ZPB 200 may support the SPB 300 either directly or indirectly, for example via a rotatable actuator, as described herein. Particular embodiments of rotatable connections between the ZPB 200 and SPB 300 are described in further detail herein, for example with respect to FIGS. 4A-4B.

The SPB 300 is a variable air ballast balloon. The primary function of the SPB 300 is to provide a variable amount of ballast to the LTA system 100. Ballast is taken into the SPB 300 in the form of compressed air to provide a greater downward force to the LTA system 100. Ballast is ejected from the SPB 300 to provide a smaller downward force to the LTA system 100. The ballast is provided from the ambient atmospheric air, for instance by a compressor, as described in further detail herein, for example with respect to FIGS. 6-7. To achieve neutral buoyancy the air ballast can be set at some fraction of the SPB 300 maximum pressure capability. This allows biasing in both a positive (greater air ballast) and negative direction (less air ballast) which leads to a descent speed or ascent speed respectively. In some embodiments, the LTA system 100 includes only one SPB 300 or one SPB 300 with a single chamber. However, the LTA system 100 can include multiple SPB's 300 or a single SPB 300 having multiple chambers, for example, two, three, four or more SPB's 300 and/or chambers, as further described herein, for example with respect to FIGS. 9C-9E.

The SPB 300 is a "super-pressure" type of balloon. A "super-pressure balloon" is completely enclosed and operates at a positive internal pressure in comparison to the external atmosphere. Pressure control enables regulating the mass of air in the SPB 300, and therefore the overall buoyancy of the LTA system 100. This buoyancy regulation enables altitude control of the LTA system 100. The SPB 300 may take in more air to apply more of a ballast force, for example to descend, or to compensate for an expanding ZPB 200 that is producing more lift, as described. Conversely, the SPB 300 may release air to apply less of a ballast force, for example to ascend, or to compensate for a contracting ZPB 200 that is producing less lift, as described. Particular embodiments and other aspects of the SPB 300 are described in further detail herein, for example with respect to FIGS. 3A-3B.

The SPB 300 supports the stratocraft 400. As shown, the stratocraft 400 is coupled with the SPB 300 beneath the SPB 300. The stratocraft 400 may be directly or indirectly connected with the SPB 300. In some embodiments, there are various intermediate structures and/or systems between the SPB 300 and the stratocraft 400, such as structural connectors, release mechanisms, other structures or systems, or combinations thereof.

The stratocraft 400 includes one or more systems related to various mission objectives. The stratocraft 400 may include the payload for a particular mission. The stratocraft 400 may include various subsystems, such as power, control, communications, air intake, air release, payload descent, etc., for supporting a mission. Particular embodiments of the stratocraft 400 are described in further detail herein, for example with respect to FIGS. 5A-5B. Some embodiments of particular payloads, supporting payload structures, air intake/release subsystems, and payload descent subsystems, are described in further detail herein, for example with respect to FIGS. 6-8.

B. Zero Pressure Balloon

Figure 2:
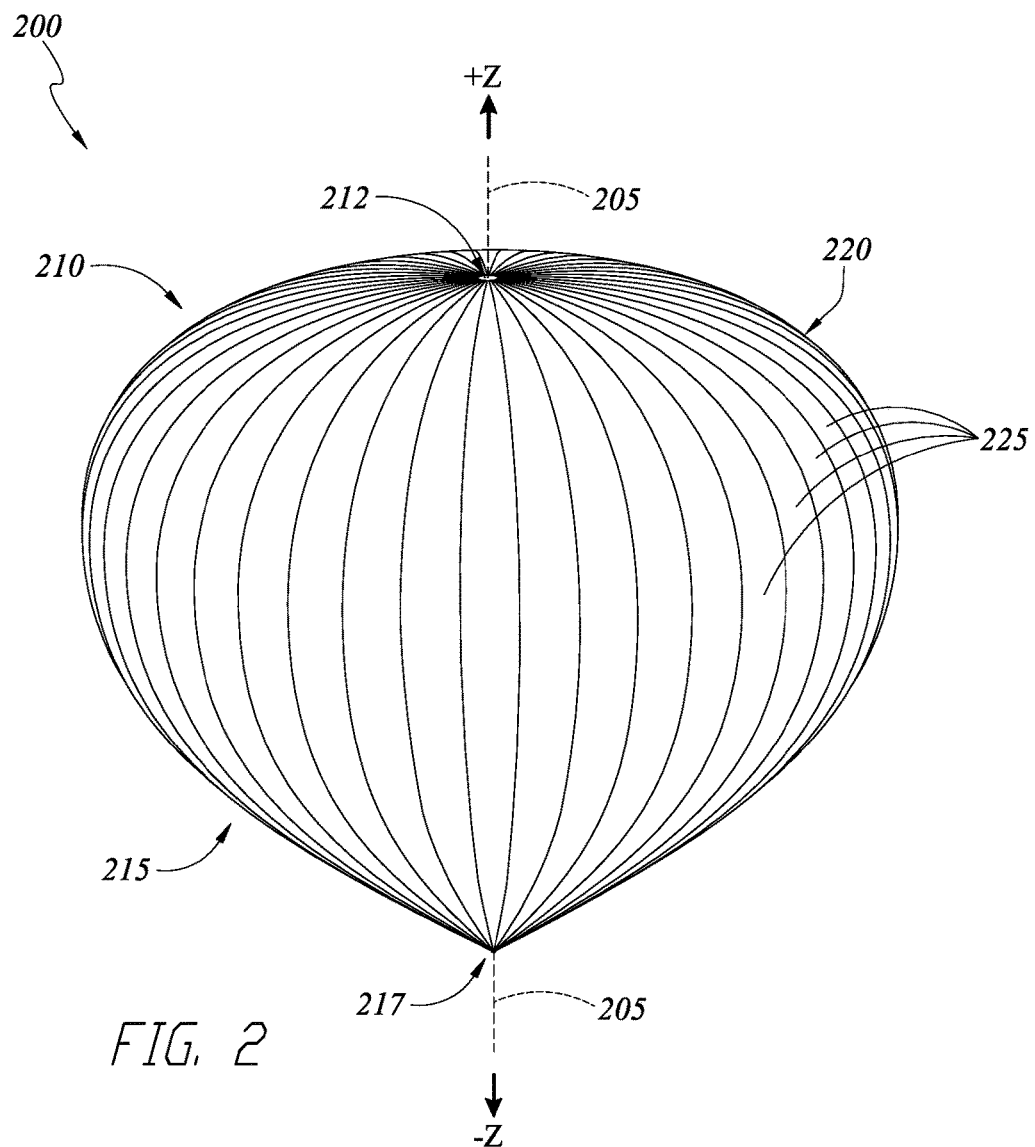
FIG. 2 is a perspective view of the ZPB of FIG. 1.

FIG. 2 is a perspective view of the ZPB 200. ZPB 200 provides a lift force in the +Z direction, as indicated. For reference, a geometric longitudinal axis 205 of the ZPB 200 is indicated. The longitudinal axis 205 may or may not align with the +Z direction, depending on the phase of flight, environmental conditions, etc. Further, the ZPB 200 may not cause the LTA system 100 to travel exactly in the +Z direction. Thus, while the lift force is in the +Z direction, the LTA system 100 may not travel in that same direction. In some embodiments, the LTA system 100 ascends in a direction that is at an angle to the +Z direction.

The ZPB 200 includes an upper portion 210 having a top 212 and a lower portion 215 having a bottom 217. The upper portion 210 refers to a part of the ZPB 200 that is above the lower portion 215. The upper and lower portions 210, 215 may be the upper and lower halves of the ZPB 200. The upper and lower portions 210, 212 may be symmetric about the longitudinal axis 205, for example when the ZPB 200 is fully inflated at its maximum volume altitude, such as in higher altitudes with less dense surrounding atmosphere. The dimensions of the ZPB 200 when upright and fully inflated may be about 100 feet wide and about 95 feet high. The ZPB 200 may have a range of widths from about 75 feet or less to about 370 feet or more. The ZPB 200 may have a range of heights from about 70 feet or less to about 310 feet or more.

The ZPB 200 includes a skin 220. The skin 220 forms the upper and lower portions 210, 215 of the ZPB 200, or sections thereof. The skin 220 is assembled to form the outer body of the ZPB 200. The skin 220 may be about 0.0008 inches thick. Various versions of the ZPB 200 may have a range of thicknesses of the skin 220 from about 0.00025 inches or less to about 0.0015 inches or more thick. The skin 220 may have a generally uniform thickness over most or all of the ZPB 200. In some embodiments, the thickness of the skin 220 may vary depending on the location of the skin 220 about the ZPB 200. The basic skin is known as the "shell", and if extra thickness is required for structurally containing the lift bubble at launch, those extra layers are known as "caps". Caps are usually some fraction of the gore length covering the top of the shell and usually are no longer than 50% of the gore length, although this changes depending on the design altitude.

The skin 220 defines one or more interior compartments of the ZPB 220 for receiving an LTA. In some embodiments, the ZPB 200 is configured to receive therein an LTA gas to provide an upward lifting force to the LTA system 100. The ZPB 200 may include about 500,000 cubic feet of maximum internal volume. Various versions of the ZPB 200 may include a range from about 250,000 cubic feet or less to about 30,000,000 cubic feet or more of maximum internal volume. The ZPB 200 may include sufficient lift gas to lift the gross weight of the vehicle plus additional "free lift" which can range from 5% of the gross weight to about 25% of the gross weight depending on the application. The volume of the launch "bubble" is a fraction of the maximum design volume and usually ranges from 1/20 to 1/200 of design volume depending on design altitude.

The skin 220 may be formed from a variety of materials. In some embodiments, the skin 220 is formed from plastic, polymer, thin films, other materials, or combinations thereof. The skin 220 may be made from multiple components. As shown, the skin 220 includes gores 225. The skin 220 may be configured with gores 225, other suitable approaches, or combinations thereof. The gores 225 are elongated sections of balloon material. The gores 225 may extend to the top 212 and/or to the bottom 217. In some embodiments, the gores 225 do not extend to the top 212 and/or to the bottom 217. For example, the skin 220 may be formed of gores 225, with endcaps surrounding upper and lower ends of the gores 225 at the top 212 and/or bottom 217. In some embodiments, the bottom 217 of the ZPB 200 is open and the lower ends of the gores 225 extend to or near the opening formed at the bottom 217.

The ZPB 200 changes configuration (shape, size, etc.) during flight as the lift gas volume expands and contracts. The skin 220 or portions thereof may change configuration due to launch requirements, variable air pressure, changes in volume of LTA, release of payload and descent systems, flight termination, etc.

C. Super Pressure Balloon

Figure 3A:
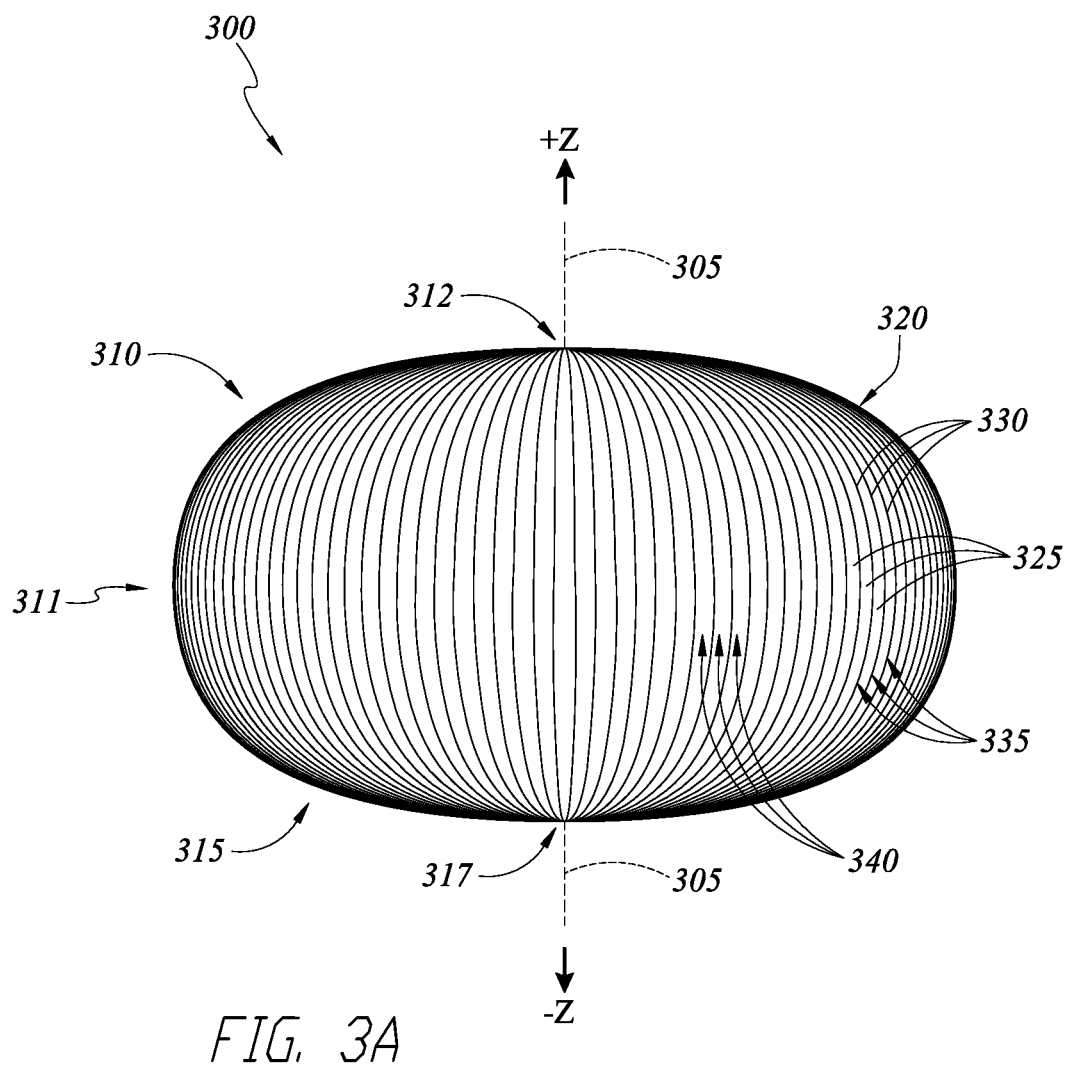
FIGS. 3A and 3B are, respectively, side and top views of the SPB of FIG. 1.
Figure 3B:
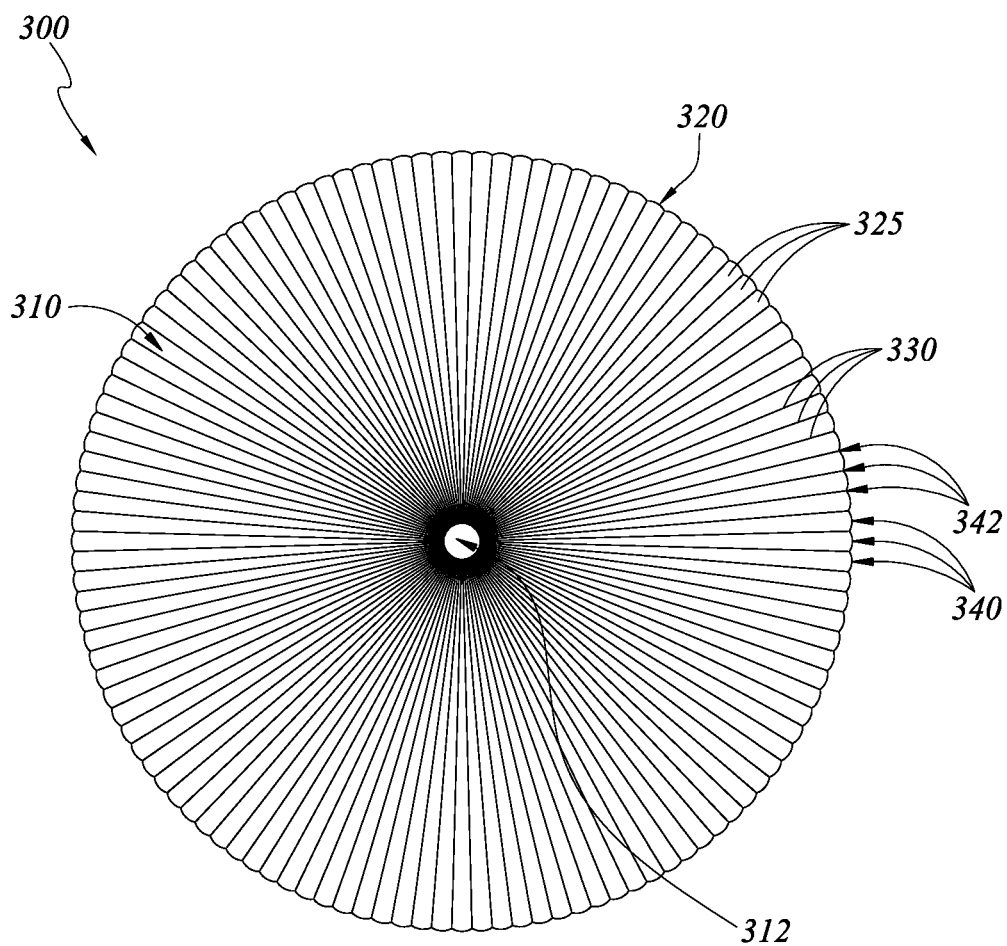

FIGS. 3A and 3B are, respectively, side and top views of the SPB 300. The SPB 300 provides a downward ballast force in the −Z direction, as indicated. For reference, a geometric longitudinal axis 305 of the SPB 300 is indicated. The longitudinal axis 305 may or may not align with the −Z direction, depending on the phase of flight, environmental conditions, etc. Further, the SPB 300 may not cause the LTA system 100 to travel exactly in the −Z direction. Thus, while the downward force is in the −Z direction, the LTA system 100 may not travel in that same direction. In some embodiments, the LTA system 100 descends in a direction that is at an angle to the −Z direction, which may be mostly due to wind. In some embodiments, the force due to lift from the ZPB 200 is greater than the combined downward force due to gravity exerted by the entire LTA system 100, including the weight of the ZPB 200, the weight of the SPB 300, the weight of the stratocraft 400, etc. such that the LTA system 100 ascends in a direction that is at least partially in the +Z direction. In some embodiments, the force due to lift from the ZPB 200 is less than the combined downward force due to gravity exerted by the entire LTA system 100, including the weight of the ZPB 200, the weight of the SPB 300, the weight of the stratocraft 400, etc. such that the LTA system 100 descends in a direction that is at least partially in the −Z direction.

The SPB 300 includes an upper portion 310 having a top 312 and a lower portion 315 having a bottom 317. The upper portion 310 refers to a part of the SPB 300 that is above the lower portion 315. The upper and lower portions 310, 315 may be the upper and lower halves of the SPB 300. The upper and lower portions 310, 312 may not be separate parts, but may be portions of the same continuous skin of the SPB 300 used for description herein. The upper and lower portions 310, 312 may be symmetric about the longitudinal axis 305, for example when the SPB 300 is fully inflated when pressurized, which may be in higher altitudes with less dense atmosphere. The axis 305 of the SPB 300 may align with and/or be parallel to the axis 205 of the ZPB 200. In some embodiments, the axis 305 of the SPB 300 may not align with and/or not be parallel to the axis 205 of the ZPB 200. In some embodiments, the axis 305 of the SPB 300 may align with and/or be parallel to the axis 205 of the ZPB 200 during some phases of a flight, and the axis 305 of the SPB 300 may not align with and/or not be parallel to the axis 205 of the ZPB 200 during other phases of a flight.

The maximum dimensions of the SPB 300, for example when fully inflated, may be about 56 feet wide in diameter and about 35 feet long in height. The SPB 300 may have a range of maximum diameters from about 10 feet or less to about 500 feet or more. The SPB 300 may have a range of maximum lengths from about 5 feet or less to about 300 feet or more.

The SPB 300 includes a skin 320. The skin 320 forms the upper and lower portions 310, 315 of the SPB 300, or sections thereof. The skin 320 is assembled to form the outer body of the SPB 300. The skin 320 may be about 0.004 inches thick. Various versions of the SPB 300 may have a range of thicknesses of the skin 220 from about 0.0015 inches to about 0.008 inches thick. The skin 320 has a generally uniform thickness over most or all of the SPB 300. In some embodiments, the thickness of the skin 320 may not be uniform and may vary depending on the location of the skin 320 about the SPB 300.

The skin 320 defines one or more interior compartments of the SPB 300 for receiving and storing ambient air. In some embodiments, the outer skin 320 defines an interior volume of the SPB 300 configured to receive therein a variable amount of ambient air from a surrounding atmosphere to provide a variable downward force to the LTA system 100. The SPB 300 may have a maximum internal volume of about 64,000 cubic feet. Various versions of the SPB 300 may include a range from about 32,000 cubic feet or less to about 90,000 cubic feet or more of maximum internal volume.

The skin 320 may be formed from a variety of materials. In some embodiments, the skin 320 is formed from plastic, polymer, thin films, other materials, or combinations thereof. The skin 320 may be made from multiple components. As shown, the skin 320 includes gores 325. The skin 320 may be configured with gores 325, other suitable approaches, or combinations thereof. The gores 325 are elongated sections of balloon material. The gores 325 may extend to the top 312 and/or to the bottom 217. In some embodiments, the gores 325 do not extend to the top 312 and/or to the bottom 317. For example, the skin 320 may be formed of gores 325, with endcaps surrounding upper and lower ends of the gores 325 at the top 312 and bottom 317.

The SPB 300 includes multiple tendons 330. The tendons 330 are elongated flexible members. The tendons 330 may be axially-stiff, transverse-flexible rope-like members. The tendons 330 may be formed of fiber, composites, plastic, polymer, metals, other materials, or combinations thereof. The tendons 330 may have a denier of about 61,000. The tendons 330 may have range of deniers from about 10,000 to about 200,000. The tendons 330 may have a thickness of about 0.125 inch. The tendons 330 may have a thickness of 0.125 inch. The tendons 330 may have range of thicknesses from about 0.05 inches or less to about 0.5 inches or more. The tendons 330 may include covers or sheaths, either partially or entirely. The tendons 330 extend along the outside of the skin 320. The tendons 330 may extend from or near the top 312 to or near the bottom 317 of the SPB 300. The tendons 330 are meridionally configured, extending meridionally along the SPB 300. The tendons 330 may be separate from each other. In some embodiments, some or all of the tendons 330 may be coupled together. In some embodiments, some or all of the tendons 330 may form one continuous, long tendon. In some embodiments, the LTA system 100 includes a plurality of the tendons 330 coupled with the SPB 300 and extending along an exterior of the outer skin 320 of the SPB 300 and configured to bias the SPB 300 into a pumpkin-like shape at least when the SPB 300 is pressurized relative to the surrounding atmosphere, for instance when a first pressure inside the SPB 300 is greater than a second pressure of the surrounding atmosphere.

The SPB 300 may include tape 335. The tape 335 may be an adhesive material. The tape 335 may couple sections of the skin 320, such as the gores 325, together. The tape 335 may extend along edges of the gores 325. The tape 325 may extend underneath or generally near the tendons 330. In some embodiments, a segment of tape 325 extends underneath a corresponding segment of tendon 335. The tape 335 may extend to or near the top 312 and/or to or near the bottom 317 of the SPB 300.

The SPB 300 changes configuration (shape, size, etc.) during flight. The skin 320, tendons 330, and/or tape 335, or portions thereof, may change configuration due to launch requirements, variable air pressure, changes in volume of LTA, release of payload and descent systems, flight termination, pressurization with a compressor, etc. In some embodiments, the SPB 300 may be configured to take a particular shape during flight, such as a "pumpkin" shape or other shapes, as described herein.

The SPB 300 is shown with bulges 340. The bulges 340 are portions of the skin 320 that are located farther outward than adjacent portions of the skin 320. For example, the bulges 340 may be curved portions of the gores 325 that are located farther radially from the longitudinal axis 305 than adjacent portions of longitudinal edges of the gores 325. The bulges 340 may refer to portions of the skin 320 that are located farther outward than adjacent tendons 330 and/or tape 335. The bulges 340 may assist with forming part of the pumpkin shape of the SPB 300. This is a natural structural result of pressurizing the film while in a meridionally-reinforced multi-gore configuration.

The SPB 300 may be configured based on maximization of a performance ratio R defined by $R=[\Delta P \times V]/M$. Here, "$\Delta P$" is the differential pressure between the internal pressure of the SPB 300 and the ambient pressure of the immediately surrounding atmosphere, "V" is the maximum internal volume of the SPB 300 when assuming an inflated shape, and "M" is the gross mass of the LTA system 100 structure (e.g. the total mass of the ZPB 200, the SPB 300, the stratocraft 400, and other structural features of the LTA system 100, but not including the mass of any internal air or lift gas in the various balloons). In some embodiments, $\Delta P$ is about 3500 Pa. In some embodiments, $\Delta P$ is 3500 Pa, 5000 Pa, 7500 Pa, 10,000 Pa, or 12,000 Pa. Depending on the embodiment, $\Delta P$ may be within a range from about 750 Pa or less to about 12,000 Pa or more. In some embodiments, V is as described above regarding the internal volume of the SPB 300. In some embodiments, M is about 600 kilograms. Depending on the embodiment, M may be within a range from about 125 kilograms or less to about 2,000 kilograms or more.

The performance ratio R may be maximized with various configurations of the system 100. For example, the "Pumpkin" configuration of the SPB 300, as further described herein, allows for a large "$\Delta P$" and "V" with a smaller "M," which increases the ratio "R." As further example, an efficient intake and release of air allows for quickly filling the large "V" to perform the advanced maneuvers and missions. Features for achieving such efficient intake and release of air are described in further detail herein, for example with respect to FIGS. 6-7.

The SPB 300 may be in a "pumpkin" shape. The pumpkin shape may include the multiple bulges 340, a flattened top 312, a flattened bottom 317, and/or non-circular lateral cross-sections of the skin 320 (i.e. cross-sections of the skin 320 taken along a plane that includes the longitudinal axis 350). The skin 320 and accessories such as the tendons 330, tape 335, etc. may be designed to achieve the pumpkin configuration.

The SPB 300 may be designed to withstand large internal pressures while also providing structural stability at such large pressures. As further discussed herein, larger internal pressures of the SPB 300 allow for performing advanced maneuvers and achieving advanced mission goals with the system 100. However, large internal pressures of the SPB 300 may cause problems with structural integrity, stability, etc. For instance, "S-clefting" is a serious global geometric shape instability to which pumpkin-shaped balloons are susceptible. S-clefting can result in the skin 320 locally buckling and bunching together along a continuous curve from top to bottom, resulting in the general shape of an "S" on the balloon's surface. S-clefting may be caused by an excess of skin 320 material in the equatorial region, for example in the middle portion 311. The pumpkin shape may contribute to such concentration of material, for instance by having a well-rounded bulge-lobe angle. To imagine what is meant by bulge angle, consider a circle. Draw a line from a point on the circle to the center, then back out to another point on the circle not too far away from the first point. The angle of the "V" that was just drawn is the bulge angle, and the arc between the two points represents the shape of the gore bulge, or lobe. The reason to have the well-rounded bulge 340 (small bulge radii) is that it lowers the hoop stress in the skin 320 which allows for higher differential pressures in the SPB 300 without reaching the burst point. For instance, the pressure loads may be more efficiently transferred to the tendons 330, which may extend along the valleys 342 between the bulges 340. This beneficial stress-lowering effect however has a limit where too much material leads to the s-cleft instability.

The S-cleft depends in part on the number of gores 325 and the flatness of the bulges 340. "Flat" here refers to a smaller radial distance between the outermost and innermost portions of a given bulge 340 (smaller bulge angle). Flatter bulges 340 reduce the concentration of material around the balloon's middle portion 311 thus reducing the S-cleft susceptibility, but they also increase the hoop stress thus reducing the internal pressure capability. Further, a greater number of gores 325 reduces the load per tendon, but increases the S-cleft susceptibility. Thus, the number of gores 325, the flatness of the bulges 340, and the overall "pumpkin" shape are configured so the SPB 300 can withstand a high internal pressure while preventing structural instabilities such as S-clefting. The skin thickness, the design differential pressure, the arc angle of the gore bulges ("bulge angle"), strength and stiffness of the tendons, and the number of gores (and therefore number of tendons) have to be carefully balanced in the design process to not exceed the strength of the structural elements and to not have global shape instabilities called "s-clefts".

D. Rotatable Actuator

Figure 4A:
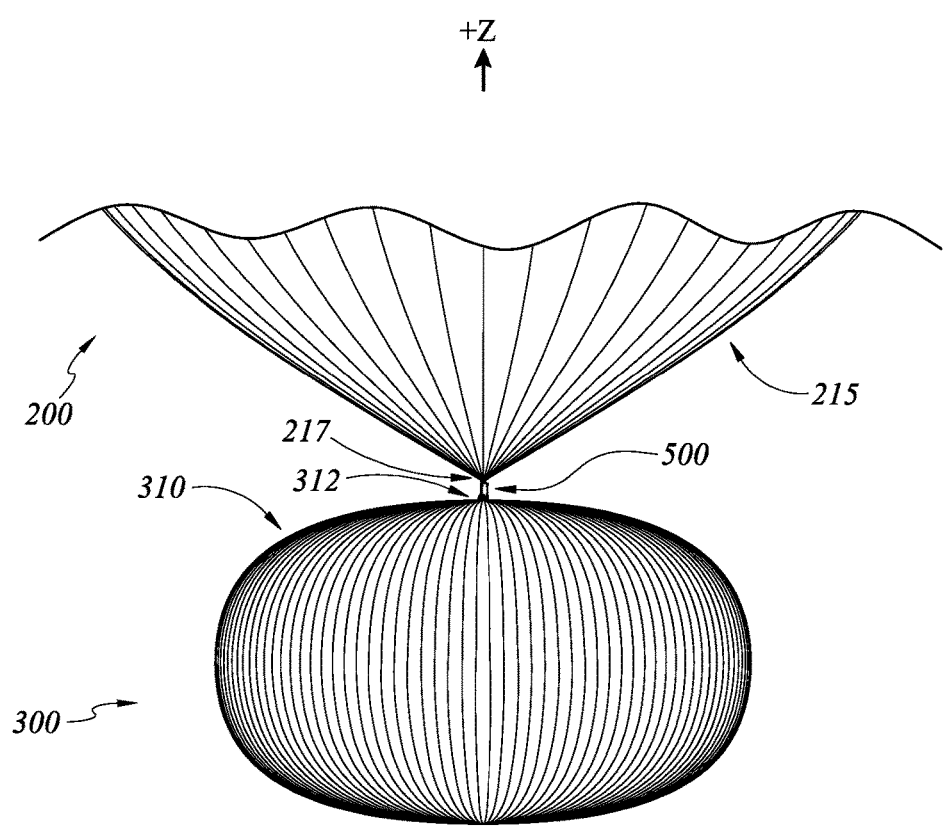
FIGS. 4A and 4B are, respectively, side and top perspective views of an embodiment of a gimbal that may be used with the LTA system of FIG. 1.
Figure 4B:
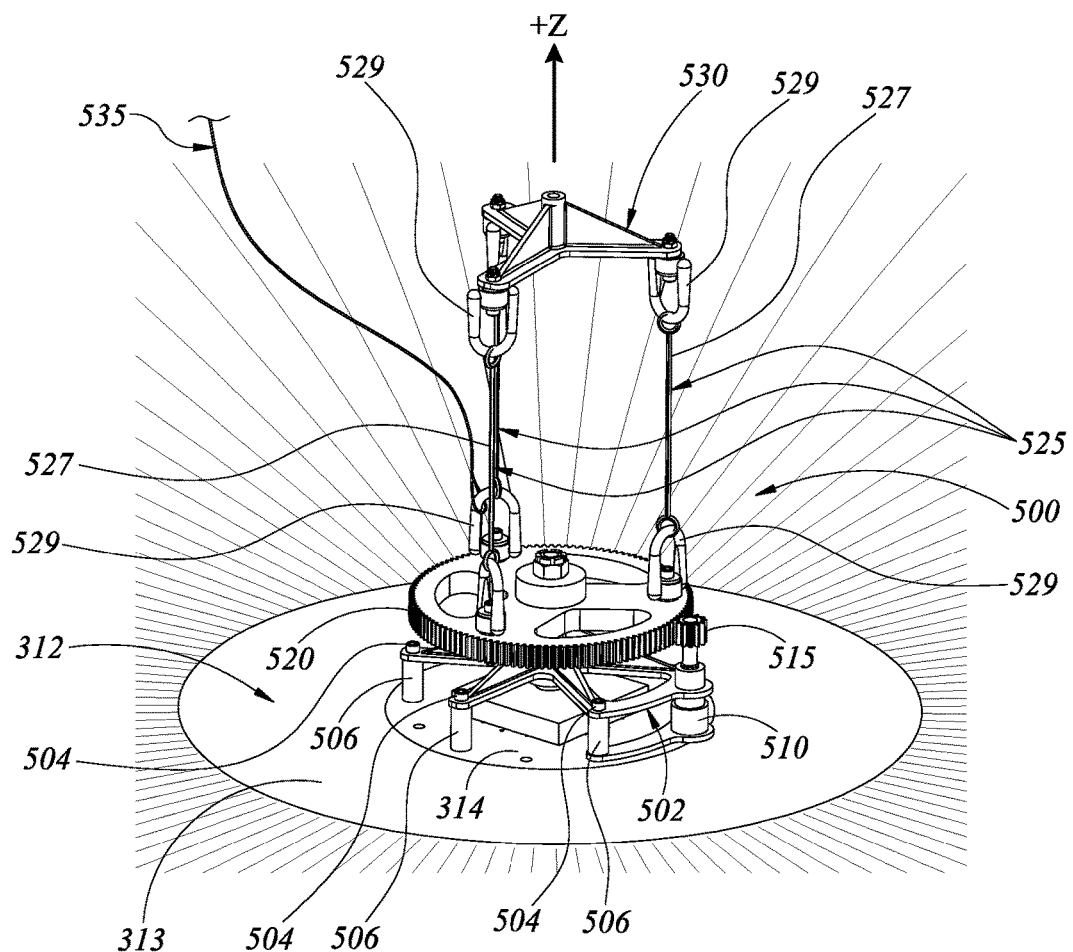

FIGS. 4A and 4B are perspective views of an embodiment of a gimbal 500 that may be used with the LTA system 100. The ZPB 200 and SPB 300 may be coupled together directly or indirectly, as mentioned. As shown in FIG. 4A, the ZPB 200 and SPB 300 are coupled together indirectly via the gimbal 500. The gimbal 500 is coupled, for example structurally attached, with the bottom 217 of the ZPB 200 and the top 312 of the SPB 300. The gimbal 500 provides for rotation of the SPB 300 relative to the ZPB 200 about the longitudinal axis 105. In some embodiments, the gimbal 500 may provide for rotation about an axis that is not aligned and/or parallel to the longitudinal axis 105. Further, the gimbal 500 may be a rotatable actuator configured for rotation about more than one axis.

The gimbal 500 may be coupled with various features of the respective balloons. As shown in FIG. 4B, the gimbal includes a lower bracket 502 attached to a plate 314 of the SPB 300. The top 312 of the SPB 300 includes the plate 314 attached to an apex of the SPB 300. The apex 313 may be a portion of the skin 320 at the top 312 of the SPB 300. The plate 314 is a structural fitting attached to the apex 313. The lower bracket 502 of the gimbal 500 is attached to the plate 314 via fasteners 504, such as bolts. Other suitable connectors, in addition or alternatively to fasteners 504, may be used. The gimbal 500 may also include standoffs 506. The standoffs 506 are structural separators that provide spacing between the gimbal (e.g. the lower bracket 502) and the SPB 300 (e.g. the plate 314). There may be a series of the fasteners 504 and/or the standoffs 506 in various locations.

The gimbal 500 may include a motor 510. The motor 510 causes movement of portions of the gimbal 500. The motor 510 may be a variety of different suitable motion actuators. In some embodiments, the motor 510 is an electric, combustion, or other type of motor. The motor 510 may output rotation at a speed of about 5 rpm. Depending on the embodiment, the motor 510 may output rotation within a range of about 1 rpm or less to about 20 rpm or more. The motor 510 may be reversible. For instance, the motor 510 may be configured to cause movement in a first direction and in a second direction that is opposite the first direction. In some embodiments, the motor 510 can rotate clockwise as well as counterclockwise.

The gimbal 500 further includes a first gear 515. The first gear 515 is rotated by the motor 510. The first gear 515 may be rotatably mounted on an end of an axle of the motor 510. The gimbal 500 further includes a second gear 520. The second gear 515 is rotatably coupled with the lower bracket 502. The second gear 520 is in mechanical communication with the first gear 515, such that rotation of the first gear 515 causes rotation of the second gear 520. The second gear 520 may have a larger diameter than the first gear 515. The first and second gears 510, 520 may be circular as shown. The first and second gears 510, 520 may be formed from various suitable materials, such as metals, other materials, or combinations thereof.

The gimbal 500 may include one or more connectors 525. As shown, there may be three connectors 525. The connectors 525 are structural connections. As shown, the each connector 525 may have an elongated member 527 with attachments 529 on upper and lower ends of the connector 525. The elongated member 527 may have a cylindrical cross-section. The attachments 529 on the lower end of the connector 525 connect with the second gear 520. Rotation of the second gear 520 moves the connectors 525 along a corresponding circular path. The attachments 529 on the upper end of the connectors 525 connect with an upper bracket 530. The upper bracket 530 is a structural attachment, and may be formed from a variety of suitable materials, including metals, other materials, or combinations thereof. The upper bracket 530 couples with the ZPB 200. For example, the upper bracket 530 may be structurally attached, directly or indirectly, to the bottom 217 of the ZPB 200, using fasteners, etc.

The connectors 525 may assist with dynamic stability of the system 100. For example, the ZPB 200, SPB 300 or other parts of the system 100 (e.g. the stratocraft 400) may be more susceptible to, or subject to, a disturbance, such as a wind gust, weather, or other environmental factors. The connectors 525 may assist with compensating for any resulting movement of the SPB 300 relative to the ZPB 200. The connectors 525 may provide such flexibility in any direction, including axially in the +/−Z direction, at an angle to the +/−Z direction, etc.

The connectors 525 may assist with lateral stiffness of the system 100 by providing a flexible or moveable connection between the ZPB 200 and the SPB 300. In some embodiments, the connectors 525 or portions thereof may be formed from flexible materials, such as metals, composites, other suitable materials, or combinations thereof. In some embodiments, the member 527 of each connector 525 is formed from such flexible materials. In some embodiments, the connectors 525 may have flexible attachments with the gimbal 500 and/or the ZPB 200 allowing for some movement. For instance, the attachments 529 may allow for rotation of the attachments 529 relative to the upper bracket 530 and/or second gear 520 about particular axes, for example about axes not aligned with the axis of rotation of the gimbal 500. As further example, the members 527 may be rotatably coupled with the corresponding attachments 529 for that connector 525. This may allow for relative rotation between the members 527 and the attachments 529. These and other features may assist with isolating undesirable relative movement between the ZPB 200 and the SPB 300, while allowing for desirable rotation of the SPB 300, as described herein.

Rotation of the gimbal 500 causes relative rotation between the ZPB 200 and the SPB 300. Rotation of the SPB 300 may be desirable for pointing a solar array 630, as further described herein, for example with respect to FIGS. 5A-5B. For example, the gimbal 500 may be configured to rotate the SPB 300 relative to the ZPB 200, wherein the SPB and the solar array 630 are rigidly coupled with an elongated ladder assembly 610 such that rotation of the SPB 300 with the gimbal 500 rotates the elongated ladder assembly 610 and the solar array 630 to a desired orientation. In some embodiments, the gimbal 500 has sufficient torsional stiffness and control authority to point the payload support 700 (e.g., via rotation of the SPB 300 that is coupled with the payload support 700) in a desired direction and maintain that directional pointing despite natural or induced atmospheric disturbances to or flows over the LTA system 100.

In some embodiments, both the ZPB 200 and the SPB 300 rotate upon actuation of the gimbal 500. The ZPB 200 and the SPB 300 may rotate in opposite directions upon actuation of the gimbal 500. In some embodiments, the gimbal 500 may be rigidly coupled with both the ZPB 200 and the SPB 300 such that rotation of the gimbal 500 is transmitted to both the ZPB 200 and the SPB 300. The couplings between the gimbal 500 and the ZPB 200 and the SPB 300 may allow for rotation about the longitudinal axis 105. In some embodiments, the gimbal 500 may include the flexible connectors 525 and/or rotatable connections between the members 527 and attachments 529, as described above, for dynamic stability but still allow for rotation about the longitudinal axis 105.

The gimbal 500 may cause relative rotation of the ZPB 200 and the SPB 300 at various speeds. In some embodiments, the gimbal 500 causes relative rotation of the ZPB 200 and the SPB 300 at a speed of about 24 degrees per second. Depending on the embodiment, the gimbal 500 may cause relative rotation of the ZPB 200 and the SPB 300 within a range of speeds from about 1 degree per second or less to about 96 degrees per second or more.

The gimbal 500 may prevent or mitigate rotation of the SPB 300 relative to the ZPB 200. For example, the gimbal 500 may be locked so that no rotation is transmitted. In some embodiments, the first gear 515 may be locked such that the second gear 520, which is in mechanical communication with the first gear 515, is also prevented from moving. As further example, the gimbal 500 may be locked and automatically unlock upon application of a threshold force. In some embodiments, the motor 510 may allow for rotation if a rotational force is transmitted to the first gear 515. For instance, disturbances to the system 100 may cause the ZPB 200 to rotate relative to the SPB 300. If such disturbances transmit large rotational forces to the gimbal 500, the gimbal 500 may allow for such rotations to prevent structural failure to the gimbal 500. For example, the motor 510 may be locked but allow for rotation of the first gear 515 upon application of a threshold rotational force, which may prevent damage to the first or second gears 515, 520, or to other components of the system 100.

The gimbal 500 may include a tear line 535. The tear line 535 comprises a rope, wire or other structural connector that connects the gimbal 500, or portions thereof, to one or more gores of the ZPB 200. One end of the tear line 535 may be connected to one of the attachments 529 and the opposite end of the tear line 535 may be connected to the ZPB 200, such as one of the gores 225 at or near the upper portion 210 of the ZPB 200. The tear line 535 may facilitate "goring" of the ZPB 200 for flight termination, as described herein. For example, at the end of a mission, the gimbal 500 and SPB 300 may detach from the ZPB 200, and the falling gimbal 500 and SPB 300 may cause the tear line 535 to rip one or more of the gores 225, and/or other portions of the skin 220, from the ZPB 200. By tearing the gores 225, the lift gas of the ZPB 200 will escape to the atmosphere, causing the ZPB 200 to fall to ground. Further details of the tear line 535 are described herein, for example with respect to FIGS. 4C and 4D.

Figure 4C:
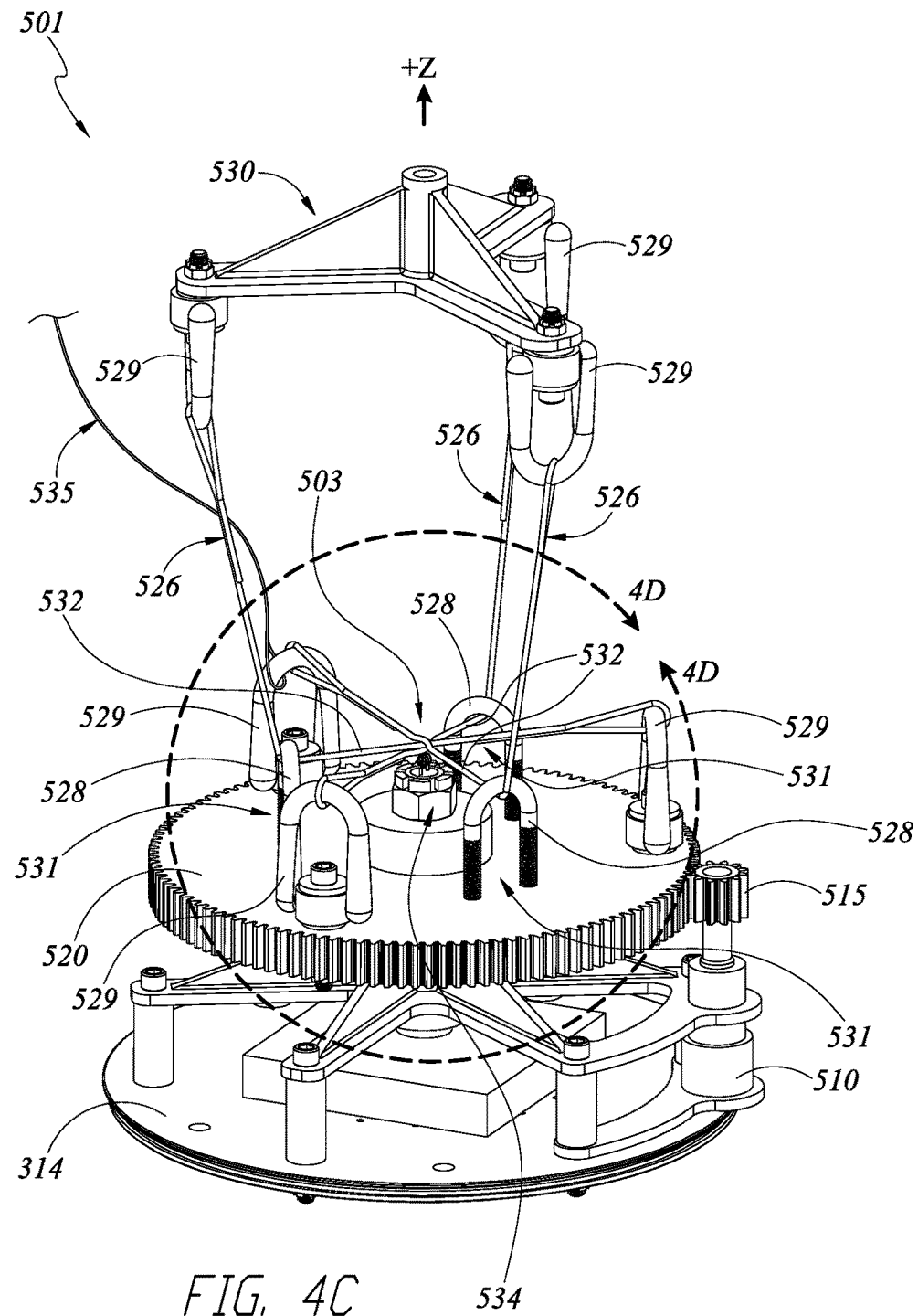
FIGS. 4C and 4D are top perspective views of another embodiment of a gimbal having a release mechanism that may be used with the LTA system of FIG. 1.
Figure 4D:
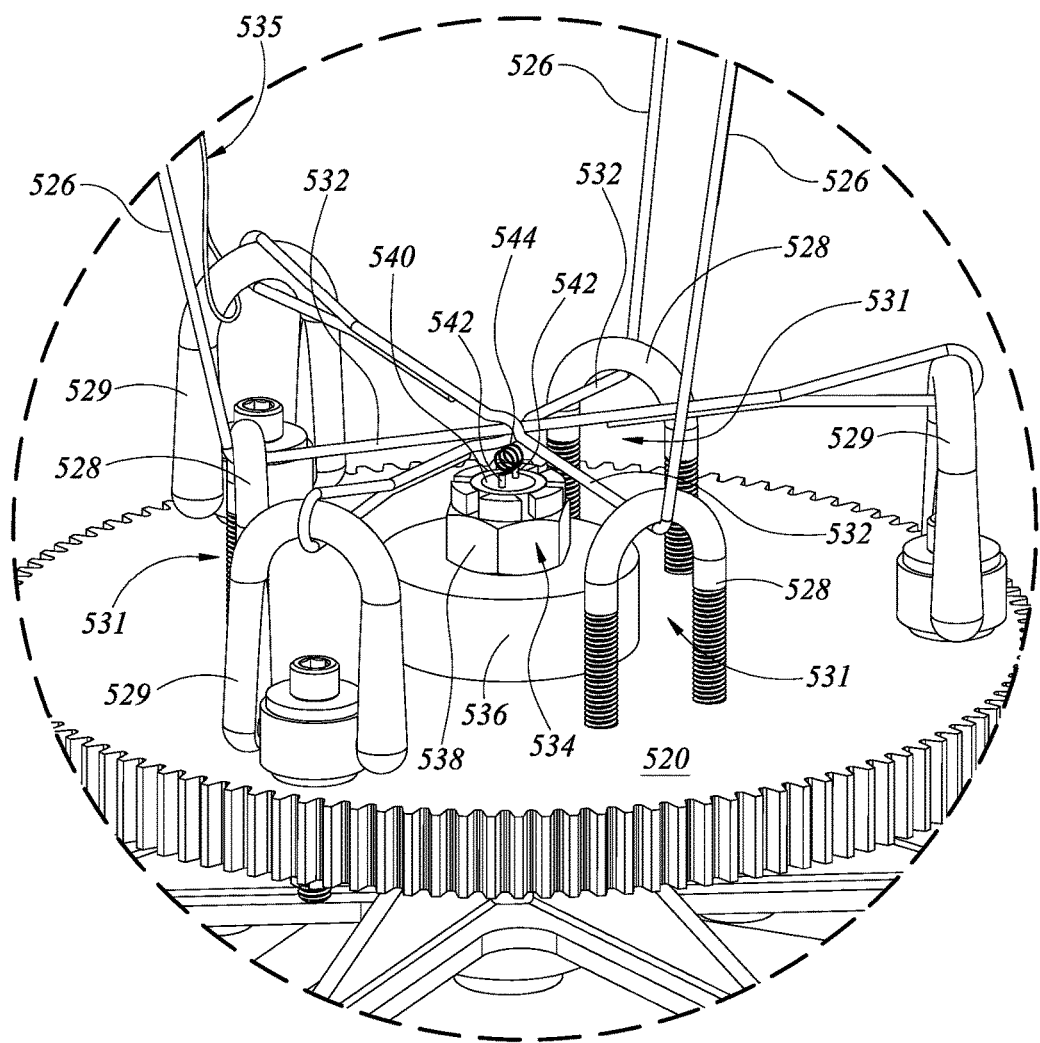

FIGS. 4C and 4D are top perspective views of another embodiment of a gimbal 501 that may be used with the LTA system 100. The gimbal 501 may have all or some of the same or similar features and/or functionalities as the gimbal 500, and vice versa. Thus, for example, the gimbal 501 may couple the ZPB 200 to the SPB 300, provide for rotation of the SPB 300 relative to the ZPB 200, etc. Further, the gimbal 501 includes a release mechanism 503. The release mechanism 503 provides for separation of the SPB 300 from the ZPB 200 in flight, for example at high altitudes. The release mechanism 503 may provide for the gimbal 501, or portions thereof, to release from the ZPB 200. In some embodiments, the gimbal 501, or portions thereof, may be attached to the SPB 300 after actuation of the release mechanism 503. The release mechanism 503 may also provide for termination of flight of the ZPB 200 and/or SPB 300, for example by goring the ZPB 200, as described herein.

The release mechanism 503 includes one or more release lines 526. As shown, there are three release lines 526. There may be fewer or more than three release lines 526, for example one, two, four, five, six, seven, eight, nine, ten or more release lines 526. Each release line 526 is a burn wire. The release lines 526 will split into two or more portions upon application of sufficient heat. The release lines 526 may be formed from a variety of materials, including fabrics, metals, alloys, composites, fibers, nichrome, other suitable materials, or combinations thereof. The size of the release lines 526, for example thickness, may be chosen based on a variety of parameters, including mass of the LTA system 100 or portions thereof, the amount of heat to be applied to the release lines 526, environmental conditions during flight and upon actuation of the release mechanism 503, etc.

The release lines 526 couple together upper and lower portions of the gimbal 501. As shown, the release lines 526 couple together the upper bracket 530 and the second gear 520. The release lines 526 may couple together other portions of the gimbal 501. In some embodiments, the release lines 526 may couple together other portions of the LTA system 100, such as portions of the gimbal 501 and the ZPB 200 or SPB 300. The release lines 526 releasably couple together the various portions. The release lines 526 may thus provide for release or separation of the various portions of the LTA system 100 coupled together, for example by burning and separating of the release lines 526. As shown, the release lines 526 provide for release of the upper portion of the gimbal 501, including among other things the upper bracket 530, from the lower portion of the gimbal 501, including among other things the second gear 520.

The release lines 526 may thus attach opposing portions of the gimbal 501. The release lines 526 attach to the attachments 529 at the upper portion of the gimbal 501. The release lines 526 extend from these upper attachments downward to respective guides 528. The guides 528 are attached to the second gear 520. The guides 528 may be attached to other structures, such as an intermediate attachment between the second gear 520 and the guides 528. The guides 528 are shown as U-bolts fixedly attached to the second gear 520. The guides 528 define openings 531 through the guides 528. The openings 531 are spaces of the guides 528 through which the release lines 526 extend. The release lines 526 may wrap over and through the guides 528. The release lines 526 may wrap over the guides 528 once, as shown. In some embodiments, the release lines 526 may wrap around the guides 528 one or more times before extending away from the guides 528. The guides 528 and openings 531 thereof provide for a smooth, rounded surface over or around which the release lines 526 wrap. The rounded portions of the guides 5289 may be sized to reduce stress, wear, etc. on the release lines 526. The release lines 526 extend from the guides 528 to opposing lower attachments 529 of the gimbal 501. The lower attachments 529 are attached to the second gear 520 opposite the respective guide 528. The release lines 526 are fixedly attached to the lower attachments 529. As shown, the release lines 526 approach and exit the guides 528 at slightly more than a ninety degree angle. The release lines 526 may be oriented in a variety of other orientations. The release lines 526 extend from a respective guide 528 and over a separator assembly 534.

The release lines 526 may include burn portions 532 that extend over the separator assembly 534. The burn portions 532 are portions of the release lines 526 that separate upon application of heat from the separator assembly 534. The burn portions 532 may be one or more regions of the release lines 526. The burn portions 532 may include the material that separates upon application of heat. The entire release line 526 may be made of the same material as the burn portion 532. In some embodiments, the burn portion 532 may be made of different material as the remaining portions of the release line 526. For example, the burn portion 532 may include a burnable material while the remainder of the release line 526 may not be burnable. The burn portion 532 may extend from a respective guide 528 to an opposing lower attachment 529. The burn portion 532 may be a smaller portion that only is adjacent the separator assembly 534.

A close up view of the separator assembly 534 is shown in FIG. 4D. The separator assembly 534 provides for separation of the release lines 526. The separator assembly 534 may separate the burn portions 532 of the release lines 526 that extend from the guides 528 to opposing lower attachments 529. The release lines 526 may extend over the separator assembly 534 as shown. In some embodiments, the release lines 526 may extend through, around, in, under, etc. the separator assembly 534.

The separator assembly 534 is mounted on a protrusion 536. The protrusion is part of the second gear 520. The protrusion 536 may be a separate part from the second gear 520 that is attached to the second gear 520. The protrusion 536 supports the separator assembly 534. The separator assembly 534 includes a nut castle 538. The nut castle 538 is mounted on the protrusion 536. The nut castle 538 may releasably attach to the protrusion 536. In some embodiments, the nut castle 538 threadingly engages with, for example screws into, the protrusion 536 and/or other portions of the second gear 520. The nut castle 538 provides for securement of various features of the separator assembly 534. The nut castle 538 may provide for extension therethrough of various electrical wires, heating elements, burn mechanisms, etc. The separator assembly 534 may rotate with the SPB 300. For example, the separator assembly may be attached to the SPB 300 such that rotation of the SPB 300 will rotate the separator assembly 534. The separator assembly 534 may therefore rotate relative to the release lines 526. Rotation of the separator assembly 534 may distribute thermal energy, for example from a hot wire 544 as further described, over a wider portion of the burn portions 523 of the release lines 526.

The separator assembly 534 includes a hot wire plug 540. The hot wire plug 540 is secured by the nut castle 538. The hot wire plug 540 may be threadingly engaged with the nut castle 540 or otherwise suitably secured with the nut castle 538. The hot wire plug 540 is connected with an electrical current source, for example a battery, to provide electric current to one or more hot wire engagements 542. The battery may be local to the gimbal 501. In some embodiments, the battery may be located with other portions of the LTA system 100, for example with the payload support 700, and having wires extending from the payload support 700 along the ladder assembly 610 and around or through the SPB 300. The hot wire engagements 542 couple with the hot wire plug 540. The hot wire engagements 542 when connected with the hot wire plug 540 are in electrical communication with the electrical current source.

The hot wire engagements 542 are electrically connected to the hot wire 544. The hot wire 544 thus receives electric current from the electric current source. The hot wire 544 heats up upon receipt of electric current therethrough. The hot wire 544 may be formed from a variety of suitable materials, such as metals, alloys, fibers, high electrical resistance materials, other suitable materials, or combinations thereof. The hot wire 544 may extend from a first hot wire engagement 542 to a second hot wire engagement 542. Current may flow from the first hot wire engagement 542, through the hot wire 544 and to the second hot wire engagement 542. The hot wire 544 extends in a coil shape as shown. In some embodiments, the hot wire 544 may have other shapes besides a coil. The hot wire 544 forms the coil between the hot wire engagements 542. The coil formed by the hot wire 544 may include multiple loops as shown. In some embodiments, the coil formed by the hot wire 544 may only be one loop. The coil may be various sizes, for example various diameters and lengths, depending, for example, on the size of the burn portions 532 of the release lines 526, on the proximity of the hot wire 544 to the burn portions 532, on the amount of current applied to the hot wire 544, on the amount of heat generated by the hot wire 544, etc. The coil formed by the hot wire 544 is shown as generally horizontal. In some embodiments, the coil formed by the hot wire 544 may be at other orientations, for example angled, vertical, etc. In some embodiments, there may be multiple coils formed by the hot wire 544.

The hot wire 544 heats up and transfers heat to the release lines 526. The hot wire 544 transfers heat to adjacent and/or contacting portions of the release lines 526. The hot wire 544 transfers heat to the burn portions 532 of the release lines 532. The transferred heat causes the burn portions 532 to burn and thereby separate. The burn portions 532 may be positioned adjacent to the hot wire 544. As shown, the burn portions 532 extend over the hot wire 544. The burn portions 532 may extend through, around, under, etc., the hot wire 544. In some embodiments, the burn portions 532 may extend through the coil formed by the hot wire 544. In some embodiments, the burn portions 532 may partially extend adjacent to the hot wire 544 and partially extend through the coil formed by the hot wire 544. In some embodiments, the burn portions 532 may contact the hot wire 544. The hot wire 544 includes a single burn region, e.g. the coil, that causes multiple burn portions 532 of the release lines 526 to separate. In some embodiments, there may be multiple burn regions, for example multiple coils, that cause multiple burn portions 532 of the release lines 526 to separate. Thus, the configuration shown is merely one example and many other suitable configurations may be implemented.

The separator assembly 534 or portions thereof may rotate with the SPB 300. Rotation of the separator assembly 534 may distribute thermal energy over a wider part of the burn portions 532. For example, the burn portions 532 may extend over the coiled hot wire 544 and rotation of the hot wire 544 relative to the burn portions 532 will cause thermal communication with multiple sections of the burn portions 532 as the hot wire 544 rotates underneath those sections. The hot wire 544 may rotate relative to the burn portions 532 because the burn portions 532 are coupled with the upper portion of the gimbal 500 that can rotate relative to the bottom portion of the gimbal 500 that includes the separator assembly 534. The separator assembly 534 may be connected to the SPB 300 via a shaft or other member so that rotation of the SPB 300 relative to the ZPB 200 also rotates the separator assembly 534 relative to the ZPB 200.

The release assembly 534 thus includes a "burn" type release mechanism. In some embodiments, other release mechanisms may be implemented. In addition or alternatively to the burn type release mechanism, the release assembly 534 may include, for example, cutters that cut the release lines 526, separation nut mechanisms that separate portions of a nut in a nut and bolt assembly, actuated release members that actuate upon command to release the release lines 526, etc. Thus, the particular configuration for the release assembly 534 described in detail herein is merely one example, and many other types of release assemblies 534 may be implemented with the LTA system 100.

The actuation of the release assembly 534 causes separation of the ZPB 200 and the SPB 300. In addition, actuation of the release assembly 534 may also cause termination of the flight of the ZPB 200 and/or SPB 300. In some embodiments, termination of the flight of the ZPB 200 is initiated by "goring." Goring refers to at least partial removal of at least one of the gores 225 of the ZPB 200. One or more of the gores 225 may be torn from the remaining portions of the skin 220 of the ZPB 200. The gores 225 may be torn from the upper portion 210, for example from the top 212, of the ZPB 200.

The gimbal 501 includes the tear line 535. There may be multiple tear lines 535. In some embodiments, the gimbal 501 may not include any tear line 535. The tear line 535 of the gimbal 501 may be similar to the tear line 535 as described above with respect to the gimbal 500. The tearing of gores 225 may be accomplished by the tear line 335. The tear line 535 is able to remain attached to the gimbal 501 after actuation of the release assembly 534. Actuation of the release assembly 534 causes the SPB 300 and portions of the gimbal 501 attached thereto to fall away from ZPB 200. A lower end of the tear line 535 is attached to a lower portion of the gimbal 501, e.g. to the attachment 529 as shown. An upper end of the tear line 535 on an opposite end may be attached to one or more of the gores 225 of the ZPB 200 at various locations, for example at or near the upper portion 210 of the ZPB 200. The upper end of the tear line 535 may be connected to seams between adjacent gores 225, to tape between the gores 225, to the upper ends of the gores 225, to skin 220 portions of the gores 225, to other locations, or combinations thereof. When the SPB 300 with a portion of the gimbal 501 falls away from the ZPB 200, the tear line 535 tears out the corresponding one or more gores 225 from the ZPB 200, causing destruction of the ZPB 200 and terminating the flight.

In some embodiments, in addition or alternatively to connection with the gimbal 501, the lower end of the one or more tear lines 535 may extend and connect to other components of the LTA system 100. In some embodiments, the tear line 535 may extend from the gores 225 to the SPB 300. For example, the release assembly 534 may cause the SPB 300 to separate from the ZPB 200, and the weight of the now-separated SPB 300 may pull on the tear lines, causing the gores 225 to rip away from the ZPB 200. In some embodiments, the tear lines extend from the gores 225 to the stratocraft 400. For example, the release assembly 534 may cause the SPB 300 to separate from the ZPB 200, and the weight of the now-separated stratocraft 400 may pull on the tear line 535, causing the gores 225 to rip away from the ZPB 200. By causing the gores 225 to rip away from the remaining portions of the skin 220 of the ZPB 200, the lift gas inside the ZPB 200 is allowed to escape. The decrease in lift gas causes the ZPB 200 to lose lift, and the weight of the ZPB 200 cause a net downward force on the ZPB 200, causing the ZPB 200 to fall to the ground.

Various embodiments of the gimbal 501 may include all electrical connections, wires, controls, etc. routed to and from only the SPB 300 side of the gimbal 501. This may allow electrical power and control to come from the payload support 700 or components thereof. It is also a significant mass and complexity benefit not to have electrical connections and wiring routed from both the top and the bottom sides of the gimbal 501. For example, with the gimbal 501 electrically connected on only the SPB 300 side, actuation of the release assembly 534 would not require an electrical disconnect from the ZPB 200 side of the gimbal 501, and it would reduce or eliminate the need for any electrical components associated with the gimbal 501 to be in or on the ZPB 200. In some embodiments, this one-sided arrangement could be reversed such that all electrical power and control signals, etc. are routed to the ZPB 200 side of the gimbal 501. In some embodiments, the various one-side electrical configurations may be implemented with the gimbal 500.

The various embodiments of the gimbal, including the gimbal 500 and 501, and the various components thereof, may be electronically controlled. As further described herein, a control system 1000 may electronically control the gimbal 500 and the various components thereof.

E. Stratocraft

Figure 5A:
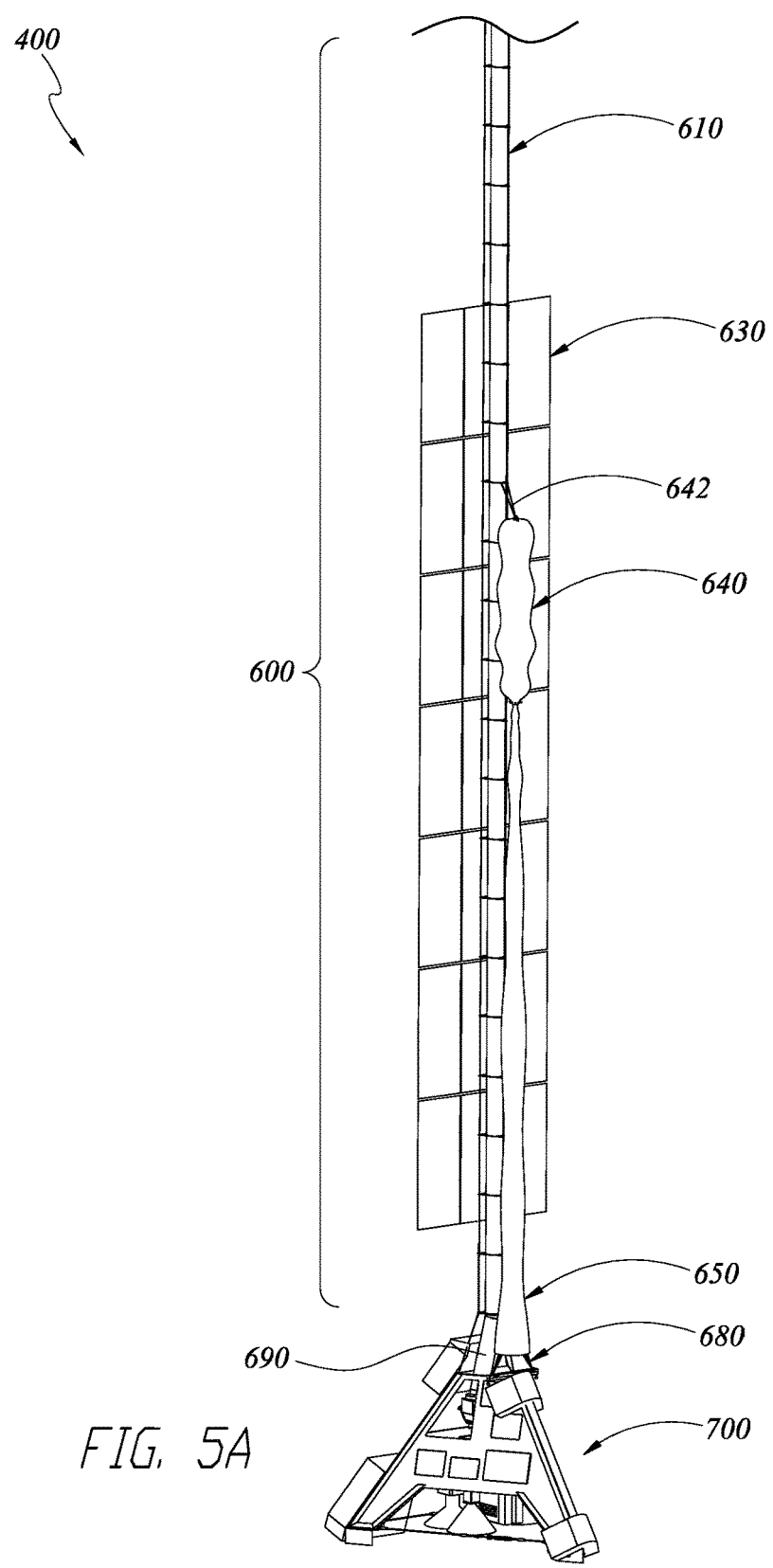
FIGS. 5A and 5B are, respectively, perspective and side views of the stratocraft of FIG. 1 including embodiments of an upper craft having a stowed parafoil and a payload support.
Figure 5B:
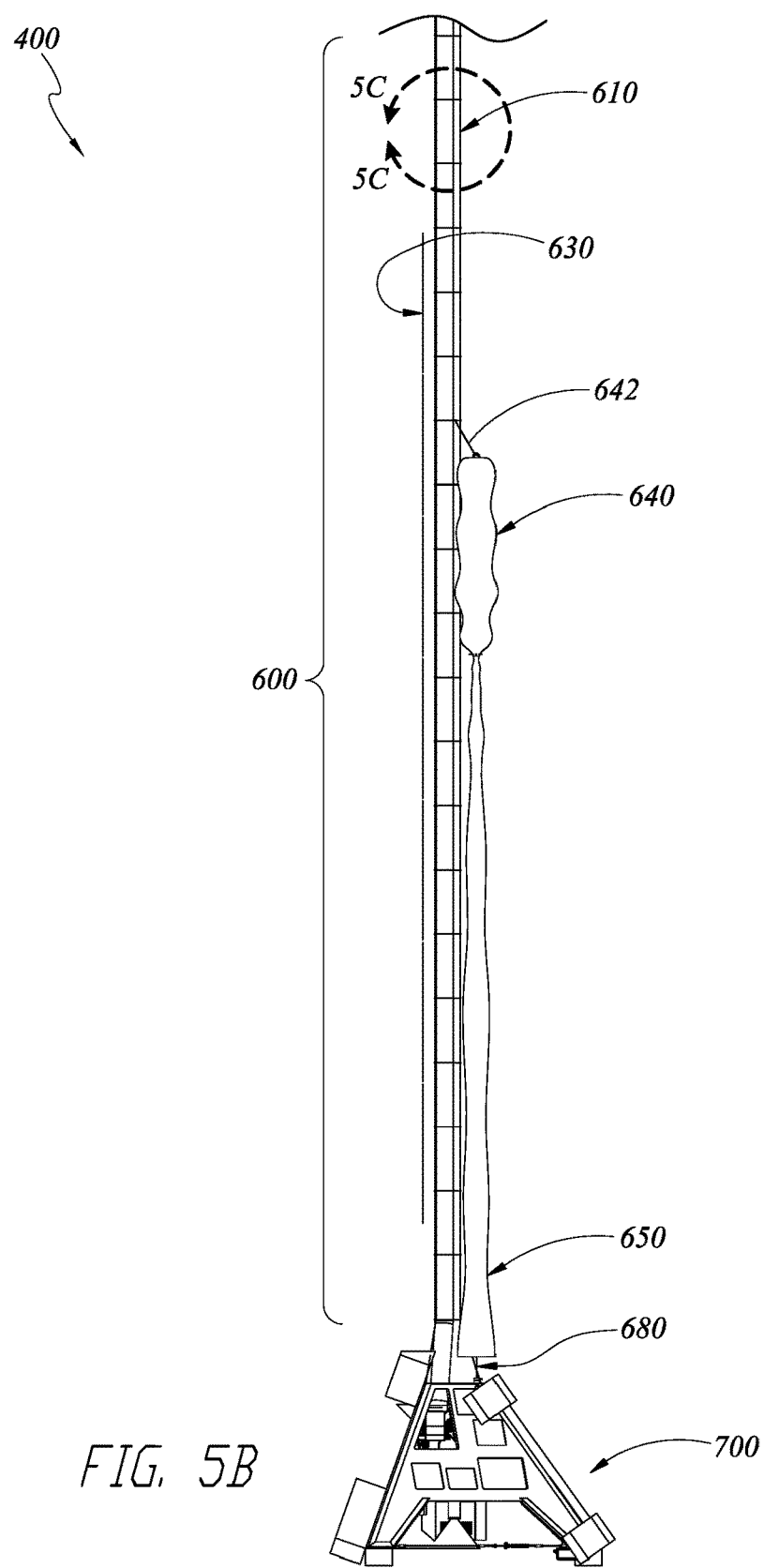

FIGS. 5A and 5B are, respectively, perspective and side views of an embodiment of the stratocraft 400. The stratocraft 400 includes various features for supporting mission objectives of the system 100, such as a payload and supporting subsystems. The stratocraft 400 includes embodiments of an upper craft 600 and a payload support 700. The upper craft 600 is coupled with the SPB 300. The upper craft 600 may be coupled with the bottom 317 of the SPB 300. The upper craft 600 may be rigidly coupled with the SPB 300. In some embodiments, the connection between the upper craft 600 and the SPB 300 may have the same or similar features and/or functionalities as the various connections between the SPB 300 and the ZPB 200.

The upper craft 600 includes a ladder assembly 610. The ladder assembly 610 is an elongated, structural connector that couples the payload support 700 with the SPB 300. The ladder assembly 610 may couple directly or indirectly with the SPB 300. The ladder assembly 610 may couple the payload support 700 with the SPB 300 such that the payload support 700 is located below the SPB 300 when the LTA system 100 is in flight. The ladder assembly 610 may be coupled with the SPB 300 such that rotation of the SPB 300 will rotate the ladder assembly 610. The ladder assembly 610 may couple with and/or support other features, as described herein. The ladder assembly 610 includes one or more wires for structurally supporting the payload support 700, as described in further detail herein, for example with respect to FIG. 5C. The ladder assembly 610 also includes an air hose 690, which is a conduit fluidly connecting the SPB 300 with the compressor assembly 800. In some embodiments, the ladder assembly 610 and the air hose 690 are the same components, although they may be separate components, as described herein. The ladder assembly 610 may have a length based at least in part on avoiding shading from the LTA system 100 during daylight, for example in order to provide sunlight to a solar array 630. Such shading may be due to the SPB 300 and/or ZPB 200 located above the stratocraft 400.

The stratocraft 400 includes the solar array 630. The solar array 630 may be part of the upper craft 600, as shown. The solar array 630 includes one or more solar panels configured to receive sunlight for conversion to electrical energy. The solar array 630 is generally planar. In some embodiments, the solar array 630 may be curved or otherwise flexible. A variety of suitable solar array 630 types may be used, including solar panels with cell efficiencies of about 23%, low cost per watt, without light-induced degradation, a low temperature coefficient, and/or having low light and broad spectral response. Solar panels of the solar array 630 also include features to address large temperature variations due to the very hot and very cold extremes of the high altitude environment The solar array 630 is coupled with the ladder assembly 610. The one or more solar panels of the solar array 630 may be located along the length of the ladder assembly 610. The solar array 630 may be directly or indirectly coupled with the ladder assembly 610. The solar array 630 is coupled with the ladder assembly 610 such that rotation of the ladder assembly 610 will rotate the solar array 630. The solar array 630 may be rotated to point at the sun for maximum solar energy conversion, as described herein. The solar array 630 rotates about the longitudinal axis 105 for azimuth adjustments. In some embodiments, the solar array 630 may rotate about multiple axes, for example, for azimuth and elevation adjustments.

The stratocraft 400 includes a bag 640. The bag 640 may be part of the upper craft 600. The bag 640 is used to contain features of a parafoil 680, as described herein. The bag 640 may be a parachute bag or similar receptacle for containing the parafoil 680 features and allowing release therefrom. The bag 640 may be formed from a variety of materials, including fabric, other materials, or combinations thereof. The bag 640 is coupled with the ladder assembly 610. As shown, the bag 640 is connected to the ladder assembly 610 by a cord 642. The bag 640 may be directly attached to the ladder assembly 610. In some embodiments, the bag 640 may be releasably coupled with the ladder assembly 610.

The stratocraft 400 includes a cover 650. The cover 650 may be part of the upper craft 600. The cover 650 is used to contain features of a parafoil 680, as described herein. The cover 650 may be an elongated tube-like fabric for containing the parafoil 680 features and allowing release therefrom. The cover 650 may be formed from a variety of materials, including fabric, other materials, or combinations thereof. The cover 650 is coupled with the bag 640. The cover 650 may be directly attached to the bag 640. The cover 650 and bag 640 may be part of the same, continuous sleeve for housing various portions of the parafoil 680. For instance, the bag 640 may contain the bunched up canopy portion of the parafoil 680 while the cover 680 contains the lines of the parafoil. The cover 650 has an opening at the lower end for receiving the parafoil 680 inside the cover 650.

The stratocraft 400 includes the parafoil 680. The parafoil 680 may be part of the upper craft 600. The parafoil 680 is only partially shown in FIGS. 5A and 5B because it is stowed inside the cover 650 and bag 640. The parafoil 680 may be stowed during flight and then deploy to a deployed flight configuration, as described herein for example with respect to FIG. 8. The parafoil 680 may be coupled with the ladder assembly 610, for example, via the cover 650 and bag 640.

The parafoil 680 provides a descent system for the payload support 700. The parafoil 680 is initially coupled with the payload support 700 and restrained during flight. The parafoil 680 is then released from the upper craft 600, for example from the ladder assembly 610, the bag 640 and/or the cover 650, at high altitude and controllably descends to a landing site on the ground with the payload support 700. Upon release, the parafoil 680 may slide out of the bag 640 and cover 650 and deploy automatically. Some example embodiments of parafoil technology that may be used for the parafoil 680 are described, for example, in U.S. patent application Ser. No. 15/065,828, filed Mar. 9, 2016, titled Rigidized Assisted Opening System for High Altitude Parafoils, the entire disclosure of which is incorporated herein by reference for all purposes.

In some embodiments, the LTA system 100 includes a descent system in addition or alternative to the parafoil 680. For instance, the LTA system 100 may, in addition or alternative to the parafoil 680, include one or more parachutes, one or more drogue parachutes, other decelerators, or combinations thereof. The various descent systems may have some or all of the same or similar features and/or functionalities as described herein with respect to the parafoil 680. Thus, the various descent systems that may be incorporated in the LTA system 100 may have one or more release mechanisms, etc. In some embodiments, the LTA system 100 includes one or more of the descent systems described, for example, in U.S. patent application Ser. No. 14/188,581, filed Feb. 24, 2014, and titled NEAR-SPACE OPERATIONS, the entire disclosure of which is incorporated by reference herein for al purposes. In some embodiments, the LTA system 100 does not include any descent system.

The stratocraft 400 includes the air hose 690. The air hose 690 may be part of the upper craft 600 and/or the payload support 700. The air hose 690 is a hollow conduit providing for the movement of air therein. An inner cavity thus extends along at least a portion of the ladder assembly 610 through the air hose 690. In some embodiments, the ladder assembly 610 is hollow from the upper end to the lower end. The air hose 690 is formed from a generally flexible material, although in some embodiments it may be partially or entirely rigid. The air hose 690 may be formed from a variety of suitable materials, including fabrics, fibers, metals, composites, other materials, or combinations thereof. The air hose 690 may be connected to the SPB 300, for example the bottom 317, in a variety of suitable manners, including directly attached with fasteners, indirectly attached with brackets, etc. The air hose 690 may be releasably coupled with the payload support 700, such that release of the payload support 700 from the upper craft 600 allows for release of the air hose 690 from the payload support 700.

The air hose 690 fluidly connects the SPB 300 with features for air intake and release at or near the payload support 700. Ambient air from the surrounding atmosphere may therefore be received at or near the payload support 700 and transmitted via the air hose 690 to the SPB 300. The air hose 690 may be fluidly coupled with a compressor 810 as described herein, where the compressor 810 is mounted with a payload support 700 and the compressor 810 is fluidly coupled with the interior volume of the SPB 300 via the air hose 690. Air from inside the SPB 300 may be released through the air hose 690 back to the surrounding atmosphere.

Figure 5C:
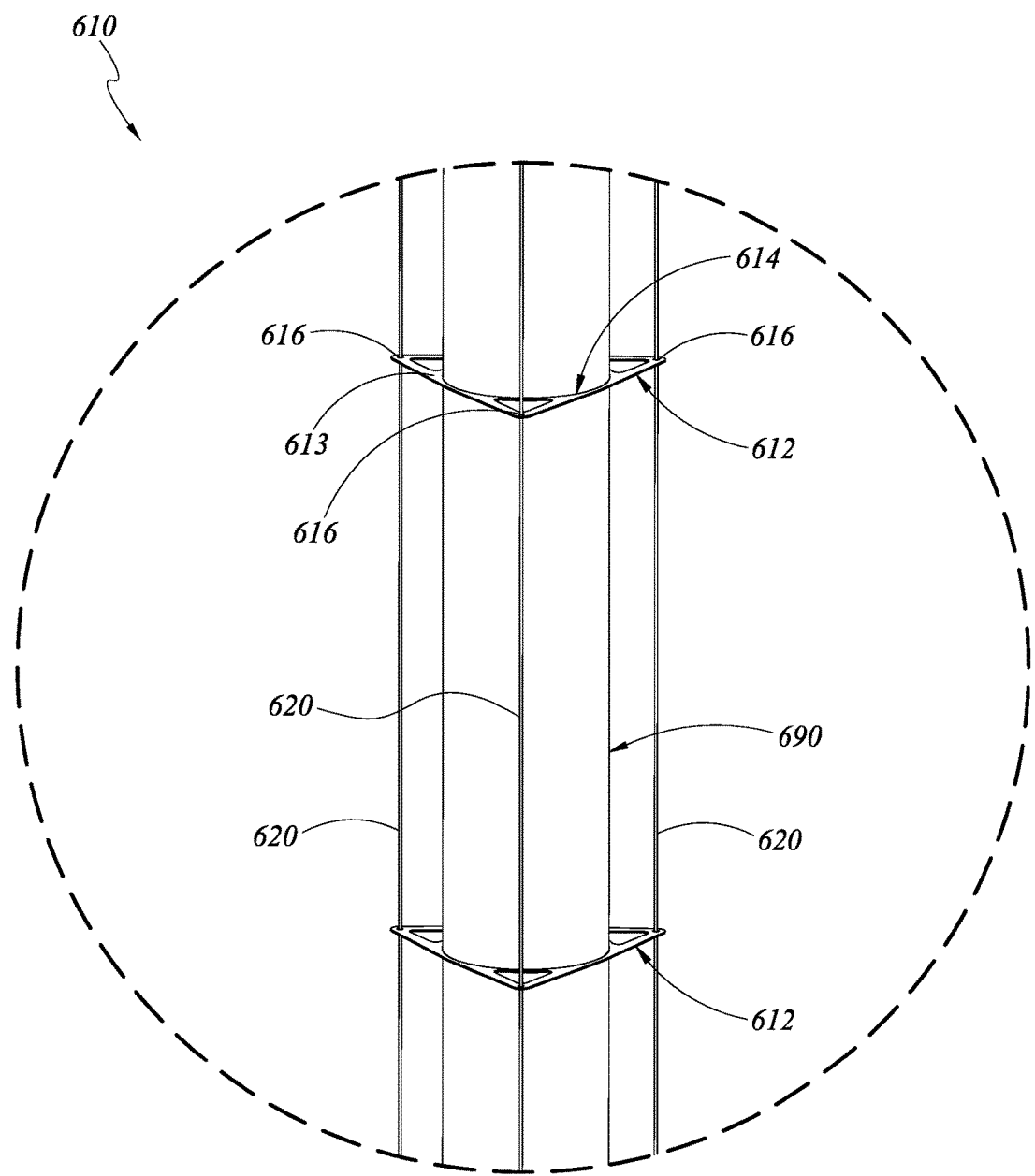
FIG. 5C is a close up view of a portion of a ladder assembly configured to couple the payload support with the SPB such that the payload support is located below the SPB when the balloon system is in flight.

FIG. 5C is a close up view of a portion of the ladder assembly 610. The ladder assembly 610 includes one or more rungs 612. There are two rungs 612 visible in the figure. The ladder assembly 610 may include five, ten, twenty, thirty, fifty, one hundred, or other lesser, in between or greater amounts of rungs 612. The rungs 612 are structural supports located along the length of the ladder assembly 610. The rungs 612 may be generally evenly spaced along the length of the ladder assembly 610 from the payload support 700 to the SPB 300.

The rungs 612 include a body 613. The body 613 may be formed from a variety of suitable materials, including metals, composites, plastics, other suitable materials, or combinations thereof. The body 613 may be partially or entirely rigid, or partially or entirely flexible. The body 613 forms a generally triangular shape. In some embodiments, the body 613 may form a variety of shapes, including rounded, circular, square, rectangular, other polygonal shapes, other suitable shapes, or combinations thereof. The body 613 is generally flat.

The body 613 of each rung 612 forms an opening 614 generally though the center of the rung 612, The opening 614 is configured, for example sized, to receive therein the air hose 690. The air hose 690 extends through the series of rungs 612 through the openings 614. The openings 614 may be sized to provide for an interference fit with the air hose 690. The openings 614 may be sized to provide for a loose with the air hose 690. air hose 690 extends along the length of the ladder assembly 610. The ladder assembly 610 may at least partially support the air hose 690, for example via the rungs 612. In some embodiments, the air hose 690 is supported at various locations along the ladder assembly 610 by the rungs 612. In some embodiments, the air hose 690 may extend partially or completely along the outside of the ladder assembly 610.

The rungs 612 include one or more guide openings 616. As shown, each rung 612 includes three guide openings 616. The guide openings 616 are located at or near the edges of the body 613. As shown, the guide openings 616 are located at the vertices of the triangular-shaped rungs 612. The guide openings 616 define spaces configured to receive therein a ladder rope 620.

The ladder assembly 610 includes one or more ladder ropes 620. As shown in FIG. 5C, the ladder assembly 610 includes three ladder ropes 620. In some embodiments, the ladder assembly 610 may include less than or more than three ladder ropes 620. The ladder ropes 620 are structural connectors that connect the payload support 700 with the SPB 300. The ladder ropes 620 may be formed from a variety of suitable materials, including composites, fibers, metals, plastics, other suitable materials, or combinations thereof. The ladder ropes 620 may secure the rungs 612 in place. For example, clips, knots, or other features of the ladder ropes 620 may be incorporated at desired spacings to secure the rungs 612 at corresponding desired spacings. The ladder ropes 620 may be releasably connected with the payload support 700, as described herein. The ladder ropes 620 may couple with the SPB 300 directly or indirectly, for example via structural connectors located at the bottom 317 of the SPB 300, or otherwise with the lower portion of the SPB 300. In some embodiments, the ladder ropes 620 may extend all the way to the ZPB 200, for example for connection to the top of the gores 225 for goring the ZPB 200 upon flight termination, as described herein.

The rungs 612 may couple other features with the ladder assembly 610. The rungs 612 may connect the solar array 630, the cord 642, the bag 640, the cover 650, the parafoil 680, and/or other features with the ladder assembly 610.

F. Payload Support

Figure 6:
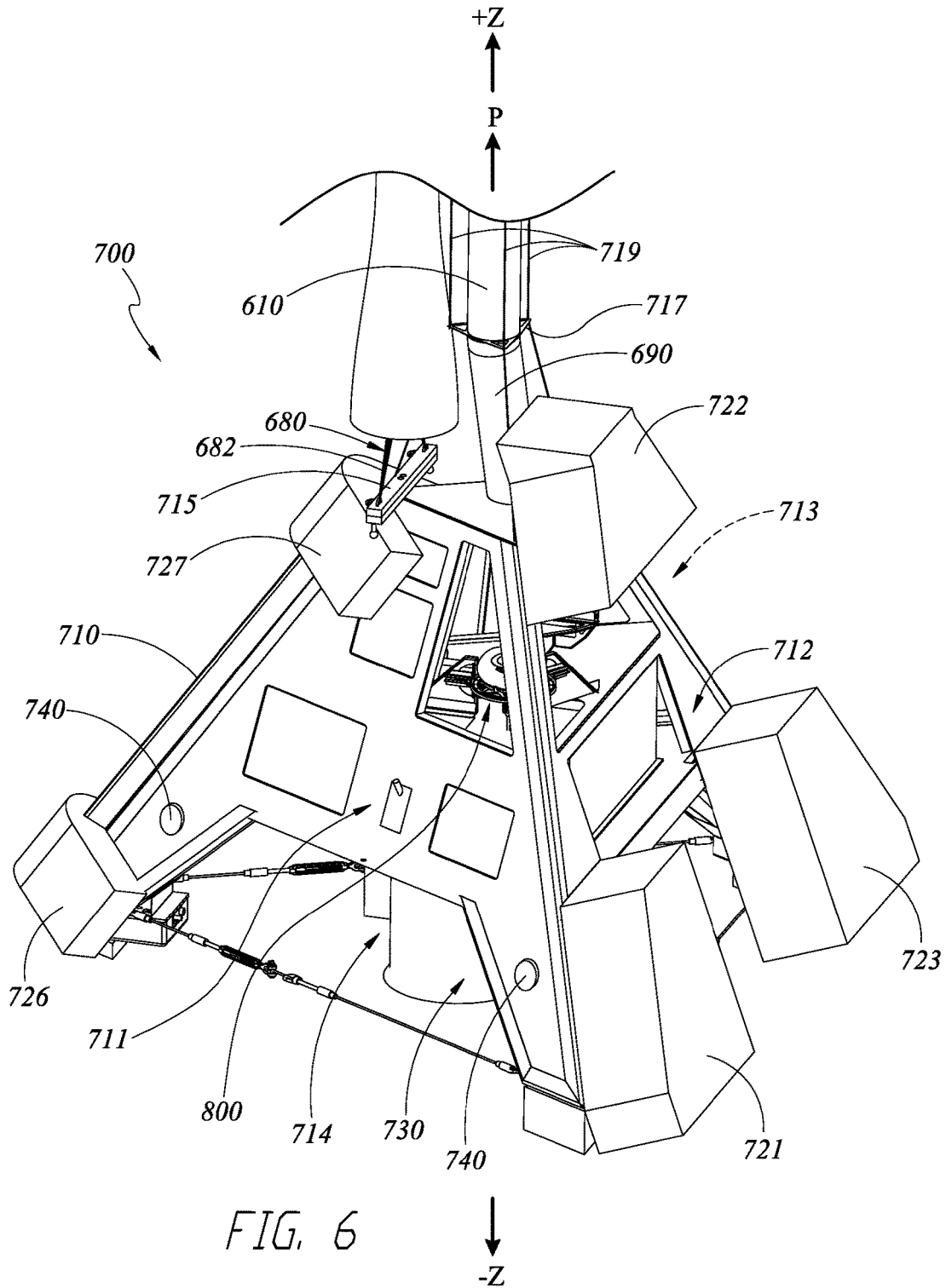
FIG. 6 is a top perspective view of the payload support of FIGS. 5A-5B including a compressor assembly.

FIG. 6 is a top perspective view of an embodiment of the payload support 700. The payload support 700 provides structural support to a payload 730 and other subsystems. The payload 730 may be a variety of different systems, including but not limited to instruments and passenger space capsules, as further described herein. Thus, while the particular embodiment shown is related to a particular payload 730 and payload support 700 with particular configurations, the disclosure is not limited to only these features and configurations. A variety of other payloads and support structures and configurations may be used with the system 100. For reference, a direction P is indicated. The direction P is a geometric reference direction that is "fixed" to the payload support 700 frame of reference, such that the direction P points in different directions as the payload support 700 rotates.

The payload support 700 includes a frame 710. The frame 710 is a rigid structure providing support and stability to various features of the system 100. The frame 100 may be formed from a variety of suitable materials, including metals, composites, other materials, or combinations thereof. The frame 710 may have a variety of configurations. As shown, the frame 710 is in the shape of a tetrahedron. The frame 710 thus has three side faces 711, 712, 713. Only side faces 711 and 712 are visible in FIG. 6, with side face 713 located on the backside of the payload support 700 as oriented in the figure. A lower face 714 is located on the lower end of the payload support 700 and partially in between the three side faces 711, 712, 713. The lower face 714 may be entirely or substantially open. The lower face 714 may include the payload 730, as described herein. The faces 711, 712, 713 may be planar as shown, or have other contours, and be located generally in between side members of the frame 710. The tetrahedral frame 710 forms an apex at the intersection of the frame 710 members that points in the direction P, which is away from the lower face 714. As shown, the direction P may align with the +Z direction. In some embodiments, the direction P may not align with the +Z direction.

The payload support 700 is releasably coupled with the upper craft 600. The payload support 700 is attached during flight to the upper craft 600, such as to the ladder ropes 620. The payload support 700 is then released for descent back to ground with the parafoil 680 and payload 730.

The payload support 700 is coupled with the upper craft 600 via a flaring bracket 715, parafoil lines 682, and release lines 719. Upper ends of the release lines 719 are attached to the upper craft 600 and lower ends of the release lines 719 are releasably attached to the payload support 700. Upon release of the lower ends of the release lines 719 from the payload support 700, an increased downward force is then applied to the flaring bracket 715, due to the loss of support from the release lines 719, ultimately causing the flaring bracket 715 to separate from the payload support 700 and re-orient the payload support 700.

In some embodiments, the increased force due to release of the release lines 719 causes the payload support 700 along with the attached parafoil 680 to fall from the upper craft 600. The parafoil 680 thus slides out of the cover 650 and bag 640. After the parafoil 680 exits the cover 650 and bag 640, the parafoil 680 deploys into flight configuration. Upon deploying into flight configuration, a force due to deceleration is transmitted to the flaring bracket 715. The flaring bracket 715 is held down by a cord that breaks at a threshold force. The force due to deceleration exceeds this threshold force and breaks the cord, causing the flaring bracket 715 to separate from the payload support 700. The detachment or separation of the flaring bracket 715 thus causes the payload support 700 to re-orient, as described below.

In some embodiments, the increased force due to release of the release lines 719 alone causes the flaring bracket 715 to release. In this case, the flaring bracket 715 has separated before the payload support 700 has significantly fallen from the upper craft 600 and before the parafoil 682 has slid out of the cover 650. The flaring bracket 715 thus separates from the frame 710 as the payload support 700 falls away from the upper craft 600. As the payload support 700 falls away, the parafoil 680, which is attached to the payload support 700 via the parafoil lines 682, is pulled out of the cover 650 and bag 640. After the parafoil 680 exits the cover 650 and bag 640, the parafoil 680 deploys into flight configuration. Further, the parafoil lines 682 are attached at locations of the payload support 700 such that the payload support 700 re-orients upon release of the flaring bracket 715, as described below.

Lower ends of the parafoil lines 682 are connected at locations of the frame 710 such that the payload support 700 re-orients, e.g. rotates, upon release from the upper craft 600. In some embodiments, the parafoil lines 682 are connected with the lower face 714, such as with a supporting bracket of the lower face 714. As shown, the flaring bracket 715 is coupled with lines 682 of the parafoil 680. The release lines 719 also releasably couple the payload support 700 with the upper craft 600. As shown, three release lines 719 extend through a guide 717 and up along the ladder assembly 610. The release lines 719 may be released from the payload support 700.

The payload support 700 includes landing pads 721, 722, 723. The landing pads 721, 722, 723 are structural absorbers configured to absorb impact upon landing. As shown, there are three landing pads 721, 722, 723 located in corners of the first side face 712. In some embodiments, there may be less than or greater than three landing pads and/or in a variety of locations. The landing pads 721, 722, 723 may be crushable structures that collapse upon landing to attenuate forces due to landing, for example to protect the payload and other systems. The payload support 700 also includes bumpers 726, 727 on a frame 710 member located opposite the side face 712 and the landing pads 721, 722, 723. The bumpers 726, 727 provide extra protection for the frame 710, for example in the event of rollover upon landing.

The payload support 700 includes the payload 730. The payload 730 is coupled with the payload support 700, for example structurally attached. The payload 730 may be coupled with the payload support 700 so that it is dynamically and/or vibrationally isolated from the payload support 700 to attenuate force transmission from the payload support 700 to the payload 730. The payload 730 is located generally at or near the lower face 714 of the payload support 700. The payload 730 may therefore be facing toward ground while the system 100 is in flight. The payload 730 may be considered "nadir-pointing," for example the payload 730 may have a field of view that points generally toward the ground. The payload 730 may be or have a variety of suitable systems, sensors, computing capabilities, etc. In some embodiments, the payload 730 is an instrument, for example an optical instrument. In some embodiments, the payload 730 is a sensor or sensor suite, for example infrared, visual or thermal sensors. The payload 730 may be other types of systems, or combinations thereof. The payload 730 may weigh about 200 pounds. Depending on the embodiments, the payload 730 may be within a range of weights from about 30 pounds or less to about 500 pounds or more.

The LTA system 100 includes one or more sensors 740. As shown, the payload support 700 includes one or more sensors 740. The sensors 740 are coupled with the frame 710. The sensors 740 may be in a variety of different locations of the payload support 700. The sensors 740 may be located or otherwise associated with the payload 730, a compressor assembly 800, and/or other subsystems or components of the payload support 700.

The sensors 740 are devices for detecting various parameters and providing a corresponding output indicative of those parameters. The sensors 740 may be coupled with the LTA system 100 and configured to detect an environmental parameter or attribute. The parameters detected may be related to various events, changes, properties, etc. Such parameters may be related to the LTA system 100 or components thereof, and/or to the surrounding environment (e.g. atmosphere). The sensors 740 may be a variety of different types of sensors. The sensors 740 may be pressure sensors (such as transducers) for detecting the ambient pressure, which may be used for, among other things, determining altitude. The sensors 740 may be temperature sensors for detecting ambient temperature, which may be used for among other things, determining air flow rates or intended pressures for the SPB 300. The sensors 740 may be accelerometers and/or gyroscopes, which may be used for among other things determining position, velocity and acceleration of the LTA system 100 or various components thereof. The sensors 740 may be sun sensors, which may be used for among other things pointing the solar array 630 toward the sun. These are just some examples, and the sensors 740 may be many other different types of sensors and based on many other sensing principles, including light sensors, infrared sensors, thermocouples, potentiometers, magnetic field sensors, gravitational sensors, humidity sensors, moisture sensors, vibration sensors, electrical field sensors, sound sensors, forces sensors, strain gages, piezoelectric sensors, resistive sensors, micro-electro-mechanical sensors (MEMS), ultrasonic sensors, humidity sensors, gas sensors, chemical sensors, flow sensors, other sensors, or combinations thereof.

Besides the payload support 700, the sensors 740 may in addition or alternatively be included with various other components of the LTA system 100, for example with the ZPB 200, the SPB 300, the gimbal 500, the upper craft 600, the solar array 630, the parafoil 680, the payload 730, the various release mechanisms, other features of the system 100, or combinations thereof. In some embodiments, one or more sensors 740 are located or otherwise associated with the ZPB 200 and/or the SPB 300. For example, the ZPB 200 and/or the SPB 300 may include pressure sensors for detecting internal pressures, flow sensors for detecting the flow of air into and/or out of the balloons, temperature sensors for detecting the temperature inside and/or outside of the balloons or of the balloon materials, accelerometers and/or gyroscopes for detecting the acceleration and/or velocity of the balloons, position sensors for detecting the positions of the balloons or of various components or portions of the balloons, etc.

The payload support 700 includes a compressor assembly 800. The compressor assembly 800 is coupled with the payload support 700. The compressor assembly 800 is shown mounted within the payload support 700. The compressor assembly 800 may be coupled with the payload support in a variety of suitable ways, including indirectly attached via brackets or other structures, directly attached to the frame 710, other suitable attachment means, or combinations thereof. The compressor assembly 800 provides for moving ambient air from the surrounding atmosphere into the SPB 300, and for moving air contained inside the SPB 300 back to the surrounding atmosphere, as described herein. The compressor assembly 800 is therefore fluidly coupled with ambient air in the surrounding atmosphere and fluidly coupled with the interior of the SPB 300. The compressor assembly 800 is coupled with the SPB 300 via the air hose 690. As shown, the air hose 690 extends upward from the compressor assembly 800 and through the ladder assembly 610. This is merely one of a number of suitable configurations. For instance, the air hose 690 may extend in different directions from the compressor assembly 800, may extend along the outside of the ladder assembly 610, etc.

G. Compressor and Valve

Figure 7A:
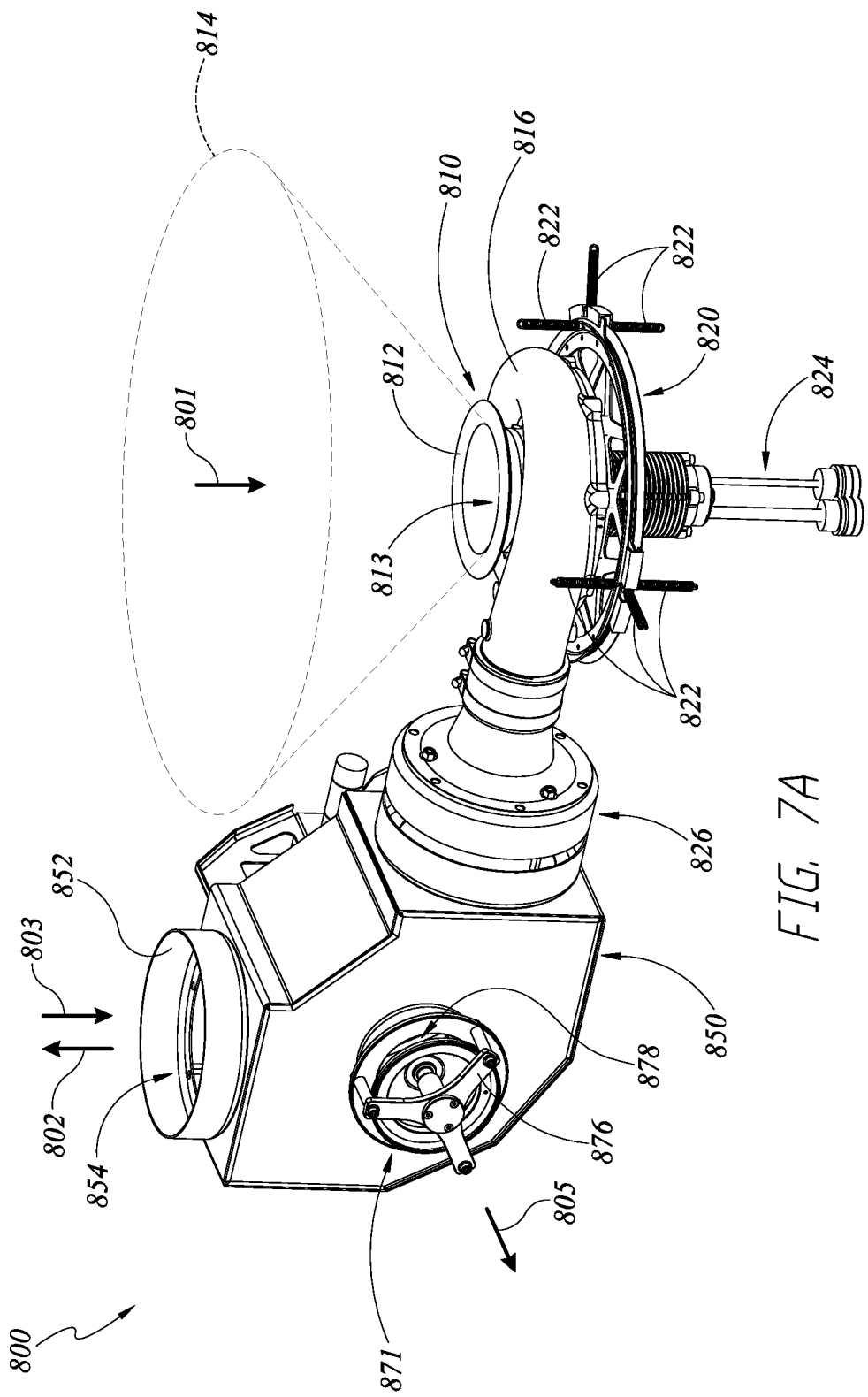
FIGS. 7A and 7B are perspective views of the compressor assembly of FIG. 6 shown in isolation from the payload support.
Figure 7B:
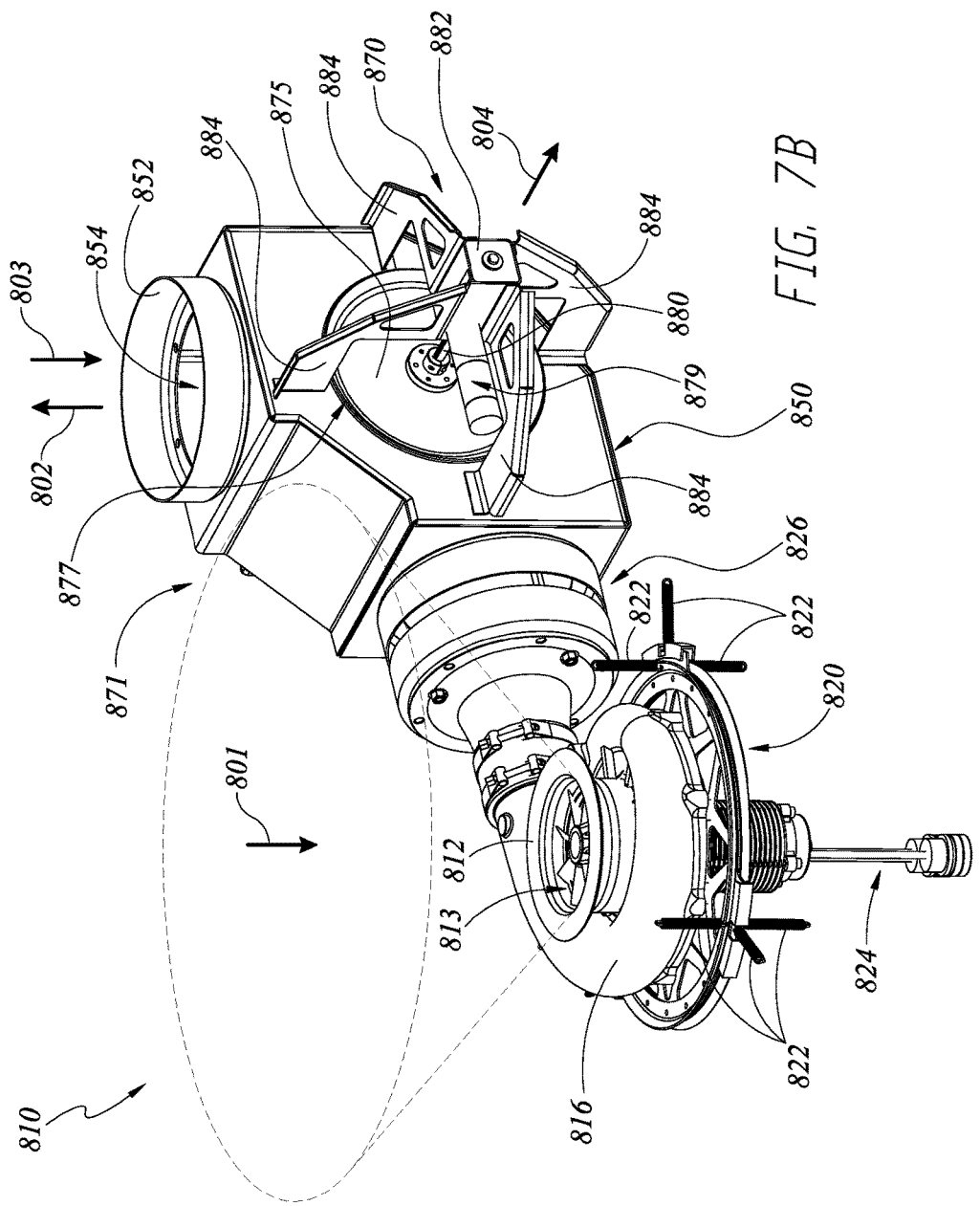

FIGS. 7A and 7B are perspective views of the compressor assembly 800. For clarity, the compressor assembly 800 in FIGS. 7A and 7B is shown in isolation from other features of the LTA system 100. The air hose 690 and payload support 700, among other features, are therefore not shown in FIGS. 7A and 7B. FIG. 7A shows a first side perspective view of the compressor assembly 800, and FIG. 7B shows an opposite side perspective view of the compressor assembly 800.

The compressor assembly 800 causes ambient air from the surrounding atmosphere to enter the compressor assembly 800. The ambient air entering the compressor assembly 800 flows into the compressor assembly 800 generally in the direction 801. Air inside the compressor assembly 800 can flow out of the compressor assembly 800 and generally in the direction 802. The air flowing out of the compressor assembly 800 in the direction 802 flows toward the SPB 300 to provide more air inside the SPB 300. Air from inside the SPB 300 can flow back into the compressor assembly 800 in the general direction 803 to provide less air inside the SPB 300. Air from inside the compressor assembly 800 can also flow out of the compressor assembly 800 in the general direction 804 and/or 805. The air flowing out of the compressor assembly 800 in the directions 804 and 805 flows back into the surrounding atmosphere, for example to vent air from the SPB 300. The compressor assembly 800 is controllable to cause the air to flow in the directions 801, 802, 803, 804, 805 as described herein. It is understood that the directions 801, 802, 803, 804, 805 are illustrative only, and that the air may flow along different flow lines that are still generally in the directions 801, 802, 803, 804, 805.

The compressor assembly 800 includes a compressor 810. The compressor 810 causes ambient air from the surrounding atmosphere to enter the compressor assembly 800. The compressor 810 is in fluid communication with the ambient air and with the interior volume of the SPB 300 and is configured to compress the ambient air and pump the compressed air into the interior volume of the SPB 300 to increase the downward force to the LTA system 100. The increased downward force to the LTA system 100 is due to compressing the air internal to the SPB 300, thus making the compressed air density greater than the surrounding ambient air.

The compressor 810 is a mechanical device that increases the pressure of the air taken in from the surrounding atmosphere and transports it toward the SPB 300. The particular compressor 810 type may depend on the particular mission. For higher altitude and/or heavy payload lifting missions, the compressor 810 is a centrifugal compressor, that may include an inlet, impeller, diffuser, and collector.

The centrifugal version of the compressor 810 uses a rotating impeller to force the ambient air to the impeller, thus increasing the velocity of the gas. The diffuser then converts the velocity energy to pressure energy. The centrifugal version of the compressor 810 may include multiple stages. In some embodiments, the compressor 810 is a two stage, centrifugal compressor, which is improved or optimal for higher pressure ratios at high altitude and/or for heavy payload lifting missions. The two stage, centrifugal version of the compressor 810 may produce about 4000 watts (W) or about 6 horsepower (hp), have a compression ratio of greater than about 3:1, and/or achieve differential pressures of about 0.5 pounds per square inch (PSI). In some embodiments, the centrifugal version of the compressor 810 comprises two or more stages, and is configured to provide at least 500 liters of the ambient air per second to the interior volume of the SPB at altitudes above 50,000 feet, above about 70,000 feet, and/or other high altitudes. The centrifugal compressor may be configured to provide the ambient air to the interior volume of the SPB 300 such that a resulting descent rate of the LTA system 100 is at least 10,000 feet per hour at altitudes above about 50,000 feet, above about 70,000 feet, and/or other high altitudes. The resulting descent rate of the LTA system 100 may be at least 20,000 feet per hour at altitudes above about 50,000 feet, above about 70,000 feet, and/or other high altitudes. The compressor 810 may provide a flow rate of about 500 liters per second (lps) at altitudes above about 50,000 feet, above about 70,000 feet, and/or other high altitudes. Depending on the embodiment, the compressor 810 may provide a flow rate within a range of flow rates from about 350 lps or less to about 1000 lps or more at altitudes above about 50,000 feet, above about 70,000 feet, and/or other high altitudes.

The compressor assembly 800 includes an air intake 812. The air intake 812 provides a structural feature through which the ambient air in the surrounding atmosphere enters the compressor assembly 800. The air intake 812 is designed to provide for high flow rate of air, depending on the required air intake of the LTA system 100. The air intake 812 defines an opening 813. The air entering the air intake 812 flows through the opening 813, in the general direction 801. The air entering the opening 813 of the air intake 812 may flow from an envelope 814. As shown, the envelope 814 is conical. The conical shape of the envelop 814 ensures laminar flow through the air intake 812 and to the impeller. In some embodiments, the envelope 814 may have other shapes. The envelope 814 is generally free of obstructions to allow for generally unobstructed air flow into the opening 813 of the air intake 812. As shown, the opening 813 is a circular space defined by the air intake 812. In some embodiments, the opening 813 may have other suitable shapes. The opening 813 may be an open space largely free of other structures. In some embodiments, the opening 813 and/or air intake 812 may include filters, vents, channels, other structures, or combinations thereof.

The compressor assembly includes a volute 816 fluidly coupled with the opening 813. The volute 816 provides a conduit through which ambient air that enters the opening 813 is transported to other locations. The volute 816 is a conduit through which the impeller of the compressor 810 delivers the compressed air to the rest of the compressor assembly 800. The volute 816 may include the impeller therein.

The compressor assembly 800 includes a mount 820. The mount 820 supports the compressor assembly 800. The mount 820 is coupled with the payload support 700. The mount 820 may be directly or indirectly attached to the payload support 700. As shown, the compressor assembly 800 includes multiple springs 822. The springs 822 couple the mount 820 with the payload support 700, either directly or indirectly. The springs 822 are elastic structures, and may be coil springs, extension springs, compressive springs, other suitable springs, or combinations thereof. The mount 820 and springs 822 structurally (e.g. dynamically, vibrationally, etc.) isolate the compressor 810 from the payload support 700, and vice versa. Vibrations and other movements of the compressor assembly 800, for instance due to the rotational velocity of the impeller of the compressor 810, are attenuated so that such disturbances are not entirely transmitted to the payload support 700. For example, vibrations due to operation of the compressor 810 are attenuated to mitigate or prevent disturbances from such vibrations affecting the operation of the payload 730, such as an optical instrument. The compressor 810 is electrically connected to a speed controller via an electrical connection 824. The electrical connection 824 is in electrical communication with the control system 100 for control of the compressor 810. The compressor assembly 800 also includes an outlet 826. The outlet 826 couples the volute 816 with a manifold 850. The outlet 826 is configured to couple the volute 816 of the compressor 810 to the air manifold 850.

The compressor assembly 800 includes the manifold 850. The manifold 850 is a structural channel providing for air flow through the manifold 850. The manifold 850 fluidly coupled various features of the compressor assembly 800. The manifold 850 is fluidly coupled with the compressor 810 via the volute 816 and outlet 826. The manifold 850 is also fluidly coupled with the SPB 300 and the surrounding atmosphere. The manifold 850 thus provides for air movement between the compressor 810, the SPB 300 and the surrounding atmosphere. For example, air may flow from the compressor 810 and into the manifold 850 and then from the manifold 850 and into the SPB 300. As further example, air may flow from the SPB 300 and into the manifold 850 and then from the manifold 850 and into the surrounding atmosphere. The air inside the manifold 850 may flow into the surrounding atmosphere via a controlled valve 870 and/or emergency valve 871, as described herein. In some embodiments, the air inside the manifold 850 may flow into the surrounding atmosphere back through the compressor 810. For example, the compressor 810 may allow for reversible air flow. In some embodiments, the compressor 810 may passively allow for reversible air flow. In some embodiments, the compressor 810 may actively allow for reversible air flow, for example by actively causing air to exit the compressor 810, which may be out through the opening 813 of the intake 812.

The compressor assembly 800 includes a hose coupling 852 having an opening 854. The hose coupling 852 may define the opening 854. The hose coupling 852 provides for a fluid connection through the opening 854 with the SPB 300, which may be via the air hose 690. The hose coupling 852 may therefore couple with the air hose 690 to allow for air flow from the manifold 850, through the opening 854, through the air hose 690 and into the SPB 300. The compressor 810 causes the air to enter the manifold 850 and flow through the air hose 690 to pressurize the SPB 300.

The compressor assembly 800 includes the controllable valve 870, as best seen in FIG. 7B. The valve 870 is a device for controllably allowing air flow from the compressor assembly 800. In some embodiments, the compressor assembly 800 may include two valves: the controllable valve 870 that is actively controllable to achieve the desired vent rate of air from the SPB 300, and the emergency valve 871 being a passive emergency pressure relief valve designed to prevent the SPB 300 from being over pressurized thus protecting the SPB 300.

The controllable valve 870 regulates, directs or controls the flow of air by opening, closing, or partially obstructing various passageways. The air from inside the SPB 300 is fluidly connected to the manifold 850 such that opening the valve 870 allows for air to flow from the SPB 300 and into the surrounding atmosphere due to a higher pressure inside the SPB 300 relative to the surrounding atmosphere. In some embodiments, the valve 870 is adjustable, in fluid communication with the ambient air and with the interior volume of the SPB 300, and is configured to be adjusted to release the pumped-in ambient air from the interior volume of the SPB 300 to the surrounding atmosphere to decrease the downward force to the LTA system 100. In some embodiments, the valve 870 is adjustable and is configured to be adjusted to release the pumped-in ambient air from the interior volume of the SPB 300 to the surrounding atmosphere such that a resulting ascent rate of the LTA system 100 is at least 10,000 feet per hour at altitudes above about 50,000 feet, above about 70,000 feet, and/or other high altitudes. The resulting ascent rate of the balloon system may be at least 20,000 feet per hour at altitudes above about 50,000 feet, above about 70,000 feet, and/or other high altitudes.

As shown, the valve 870 includes a plate 875 that can be selectively moved to create an opening 877. The opening 877 is a passageway that fluidly connects the manifold 850 with the surrounding atmosphere. Air can thus flow from the manifold 850 and through the opening 877 into the surrounding atmosphere. The air flow may be passive such that air will flow from the manifold 850 and into the surrounding atmosphere when the pressure of the air inside the manifold 850 is greater than the pressure in the surrounding atmosphere. In some embodiments, the valve 870 may be passive, active or combinations thereof. The valve 870 may be one-way, such that air may only flow in one direction through the valve 870. In some embodiments, the valve 870 may only allow for air flow from inside the manifold 850 and into the surrounding atmosphere, which may be in the general direction 805. The plate 875 can be moved to close the valve 870 and thus seal the opening 877 to prevent air flow through the valve 870.

The plate 875 is moved by an actuator 879 via a rod 880. The actuator 879 can actuate, e.g. rotate, translate, preform other movements, or preform combinations thereof, to move the rod 880 and thus the plate 875. The actuator 879 is controllably actuated via electrical communication from the control system 1000 and/or from a ground station or satellite. The actuator 879 may cause the plate 875 to move be predetermined amounts. The actuator 879 may cause the plate 875 to move by various amounts to control the venting rate of air. In some embodiments, the valve 870 includes an air flow rate sensor such that movement of the plate 875 via the actuator is controlled based on a desired air flow rate. The actuator or portions thereof may be coupled with and/or enclosed in a housing 882. The housing 882 is supported by four supports 884. The supports 884 are connected to the manifold 850.

This is one of many suitable configurations of the valve 870, and other suitable configurations may be implemented that allow for selective opening and closing of the valve 870. Further, the valve 870 may be or include a number of types of valves, components, other devices, structures, mechanisms, etc., for preventing and allowing air flow, including but not limited to vents, hydraulic valves, pneumatic valves, manual valves, solenoid valves, motors, bonnets, plugs, balls, ports, handles, actuators, discs, seats, stems, gaskets, springs, trims, or combinations thereof. In some embodiments, there may be more than one controllable valve 870. In some embodiments, the valve 870 may be part of the compressor 810, for instance where the compressor 810 allows for air flow into the surrounding atmosphere.

The valve 870 allows for air to flow from the SPB 300 and into the surrounding atmosphere. Air from the SPB 300 is in fluid connection with the manifold 850 such that opening the valve causes air to flow from the SPB 300, through the manifold 850, and through the valve 870 into the surrounding atmosphere. The rate of air flow out of the SPB 300 may be controlled by controlling the valve 870. The control of the air flow rate though the valve 870 may be passive such that controllably opening the valve 870 determines the air flow rate out of the SPB 300. For example, the valve 870 may be completely opened for maximum air flow rate out of the SPB 300. The valve 870 may be partially opened for less than maximum air flow rate out of the SPB 300. The valve 870 may actively control air flow, for example with a fan, such that controllably actuating the valve 870, for example controllably actuating the fan, actively controls the air flow rate out of the SPB 300.

The compressor assembly 800 includes the emergency valve 871. The valve 871 is an emergency pressure relief valve for allowing air flow from the compressor assembly 800, for example in the event of an over pressurization of the SPB 300. The valve 871 regulates, directs or controls the flow of air by opening, closing, or partially obstructing various passageways. In some embodiments, the valve 871 is adjustable, in fluid communication with the ambient air and with the interior volume of the SPB 300, and is configured to be automatically adjusted to release the pumped-in ambient air from the interior volume of the SPB 300 if internal pressures are too high.

As shown, the valve 871 includes a plug 876 that can be selectively moved to create an opening 878. The opening 878 is a passageway that fluidly connects the manifold 850 with the surrounding atmosphere. Air can thus flow from the manifold 850 and through the opening 878 into the surrounding atmosphere. The air flow may be passive such that air will flow from the manifold 850 and into the surrounding atmosphere when the pressure of the air inside the manifold 850 is greater than the pressure in the surrounding atmosphere. In some embodiments, the valve 871 may be passive, active or combinations thereof. The valve 871 may be one-way, such that air may only flow in one direction through the valve 871. In some embodiments, the valve 871 may only allow for air flow from inside the manifold 850 and into the surrounding atmosphere, which may be in the general direction 805. The plug 876 can be moved to close the valve 871 and thus seal the opening 878 to prevent air flow through the valve 871. This is one of many suitable configurations of the valve 871, and other suitable configurations may be implemented such as those described with respect to the controllable valve 870.

The valve 871 allows for air to flow from the SPB 300 and into the surrounding atmosphere automatically when pressures inside the SPB 300 are too high. Air from the SPB 300 is in fluid connection with the manifold 850 such that opening the valve causes air to flow from the SPB 300, through the manifold 850, and through the valve 871 into the surrounding atmosphere. The valve 871 may be in electrical communication with a sensor via the control system 100. For example, a sensor inside the SPB 300 may detect an internal pressure of air inside the SPB 300 and if this pressure satisfies a pressure threshold then the control system 1000 may trigger the valve 871 to open. In some embodiments, in such situations the controllable valve 870 may also be triggered to open, for example where the vent rate of the emergency valve 871 is inadequate for a given internal pressure of the SPB 300. In some embodiments, the emergency valve 871 may be used in lieu of the controllable valve 870 for descent, for example where the controllable valve 870 is malfunctioning or otherwise not providing the desired descent rate. In some embodiments, the emergency valve 871 may be used in addition to the controllable valve 870, for example where a faster vent and descent rate is desired than is obtainable with only the controllable valve 870. Further, there may be more than one emergency valve 871.

The payload support 700 may further include a variety of subsystems to support the mission. In some embodiments, the payload support 700 may include communications, electrical, power, thermal, avionics, telemetry, guidance navigation and control (GNC), release, termination, and/or other subsystems, or combinations thereof.

The payload support 700 and the various components and subsystems thereof may be electronically controlled. As further described herein, the control system 1000 may electronically control the payload support 700 and the various components thereof, such as the compressor assembly 800, the payload 730, the parafoil 680, the various release mechanisms, the various subsystems, etc. The control system 1000 may electronically control the compressor assembly 800 and the various components thereof. As further described herein, in some embodiments, the compressor 810 is controlled for controllably providing air to the SPB 300, for example to descend in altitude or to maintain an altitude. In some embodiments, the compressor 810 is controlled for controllably releasing air from the SPB 300, for example to ascend in altitude or to maintain an altitude.

H. Descent System

Figure 8:
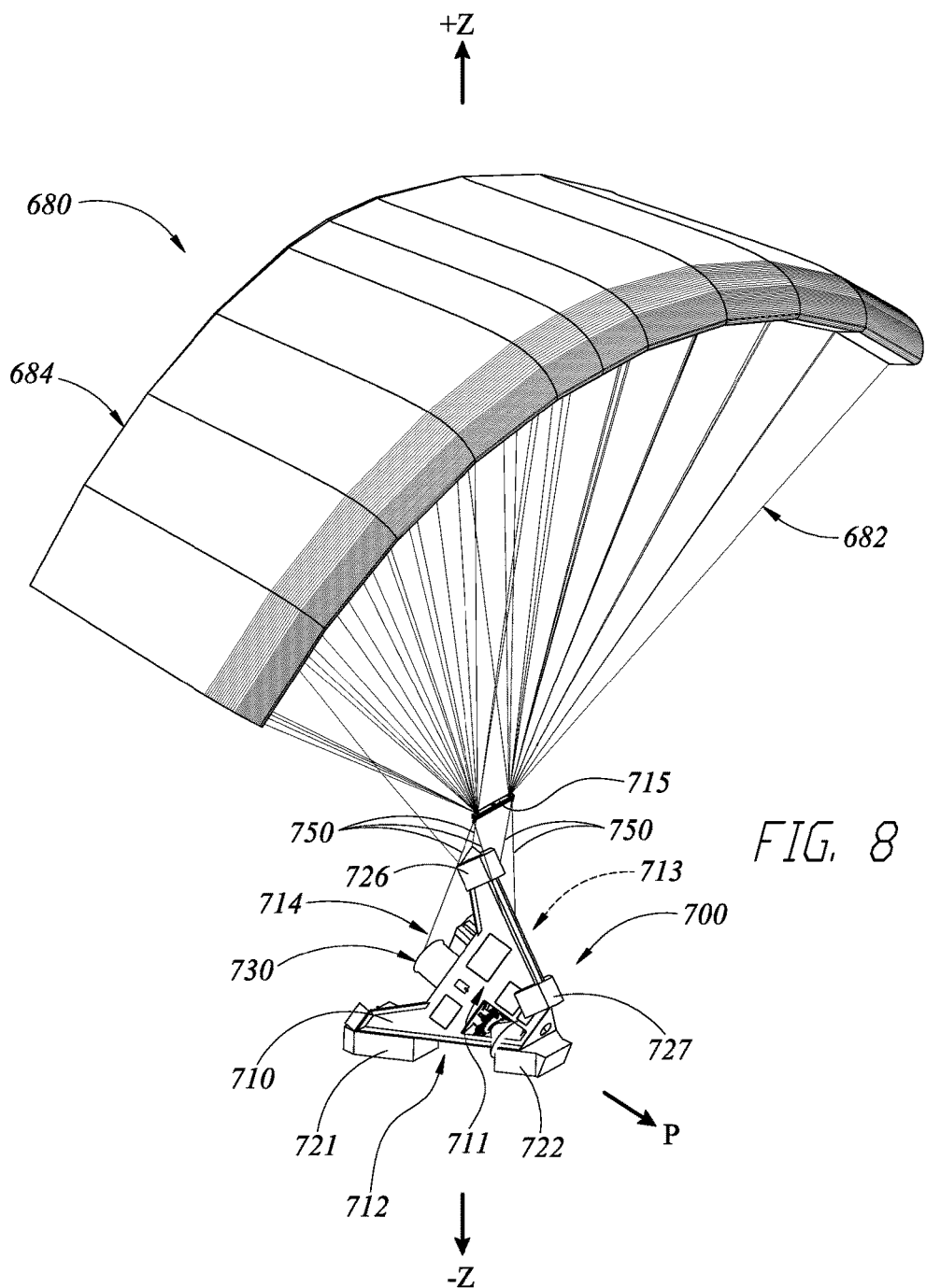
FIG. 8 is a perspective view of the parafoil system of FIGS. 5A and 5B separated from the LTA system and in a deployed flight configuration with the payload support.

FIG. 8 is a perspective view of the parafoil 680. The parafoil 680 is shown separated from the LTA system 100 and in a deployed flight configuration with the payload support 700. As described herein, the parafoil 680 separates from the upper craft 600 and deploys in the flight configuration to descend to ground with the payload support 700. In some embodiments, the parafoil 680 may be configured to deploy into the flight configuration before separating from the rest of the LTA system 100. Thus, the descriptions of particular configurations of the parafoil 680, and of particular deployment and flight procedures of the parafoil 680, are not meant to limit the scope of the LTA system 100 and related methods to only those particular configurations and procedures.

The parafoil 680 includes a canopy 684. The canopy 684 is shown in the deployed, flight configuration. The canopy 684 is at least partially a soft structure that provides lift to the parafoil 680. The canopy 684 may have more rigid features, such as stiffeners, local attachments, etc. The deployed canopy 684 is generally shaped like a bent wing, with a cross-sectional geometry approximating an airfoil shape. The canopy 684 may have openings allowing for air to flow through and into the canopy 684. Such air flow may assist with achieving and/or maintaining the deployed shape of the canopy 684. The canopy 684 is capable of being stowed in a collapsed configuration and of deploying into the flight configuration. The stowed canopy 684 is stored within the bag 640 and/or within the cover 650 of the stratocraft 400. As discussed, the parafoil 680 may be released from the upper craft 600, for example from the bag 640 and/or cover 650. The canopy 684 may be released from the bag 640 and/or cover 650 upon deployment of the parafoil 680.

The parafoil 680 includes one or more lines 682. The lines 682 couple the canopy 684 with the payload support 700. As shown, there are multiple lines 682 attaching the canopy 684 to the flaring bracket 715 of the payload support 700. The flaring bracket 715 is shown in a detached configuration, where the flaring bracket 715 has detached from the payload support 700. The lines 682 may couple the flaring bracket 715 to various locations of the canopy 684, including the front, back, center, one or more sides, other locations, or combinations thereof, of the canopy 684. The lines 682 transmit a lifting force from the canopy 684 to the payload support 700. The lines 682 may be formed of a variety of suitable materials, including fiber, composite, metallic, other materials, or combinations thereof.

The lines 682 may be rigid or rigidized to assist with the deployment process of the parafoil 680. The lines 682 may extend through a rigid sleeve such as a composite tube, or have a rigid rod inserted into them in order to prevent entanglement during deployment and to assist in the opening of the canopy 684 at high altitudes where air densities are low. In some embodiments, some or all of the lines 682 may be rigidized. For example, some of the lines 682 may include relatively stiffer covers around the lines. Such stiff covers of the lines 682 may assist with deployment of the lines 682 and/or with mitigating or preventing entanglement of the lines 682. In some embodiments, the parafoil 680 includes one or more rigidized assist opening members. For example, the parafoil 680 may include flexible rods that connect the payload support 700 to the canopy 684. The flexible rods may store potential energy in a flexed, stowed state and use that energy to assist with releasing and deploying the canopy 684 into flight configuration. Such flexible rods may be in addition or alternatively to the stiffened lines 682. These are merely some examples of the multitude of configurations for parafoil 680. Further details of some of these and other configurations for the parafoil 680 are described, for example, in U.S. patent application Ser. No. 15/065,828, filed Mar. 9, 2016, titled Rigidized Assisted Opening System for High Altitude Parafoils, the entire disclosure of which is incorporated herein by reference for all purposes.

The parafoil 680 is shown in flight attached to the payload support 700. As mentioned, the LTA system 100 may re-orient the payload support 700 in flight relative to its orientation when coupled with the upper craft 600. The payload support 700 is thus shown in FIG. 8 re-oriented relative to the orientation shown in FIG. 6. In particular, in FIG. 8 the direction P is now at an angle with respect to the +Z direction. The payload support 700 has thus rotated about ninety degrees. The lower face 714 is no longer facing in the −Z direction. The side face 712 is now facing generally in the −Z direction. By not facing the lower face 714 in the −Z direction, the payload 730 which is generally located along the lower face 714 is further protected for landing. For instance, the payload support 700 will land on the −Z pointing side face 712 and not on the side-facing lower face 714. Thus, the lower face 714 can be used to point the payload 730 toward ground during flight but then rotate to land on a different face and protect the payload 730. Further, the landing pads 721, 722, 723 are now facing in the −Z direction and can thus absorb most or all of the impact upon landing. In addition, the bumpers 726, 727 provide for further protection, for example if the payload support 700 rolls over forward upon landing. The side face 713 is on the back of the payload support 700 as oriented, and is thus not visible. This is merely one example of the orientation that the payload support 700 may assume after being re-oriented, and other orientations may be implemented.

The payload support 700 may re-orient using one or more line extensions 750. The line extensions 750 are extensions of the parafoil lines 682. Some or all of the line extensions 750 may be separate lines coupled with the flaring bracket 715 and/or with the parafoil lines 682. Some or all of the line extensions 750 and corresponding parafoil lines 682 may be part of one, continuous line. The line extensions 750 are attached to the payload support 700 in particular locations to cause the payload support 700 to re-orient upon release from the upper craft 600. As shown, the line extensions 750 are coupled with frame 710, for example near the bumper 727, and generally in the P direction. Other line extensions 750 are coupled with the lower face 714, for example with the payload 730 or other components. The flaring bracket 715 is located generally above the bumper 726.

I. Other LTA System Configurations

Figure 9B:
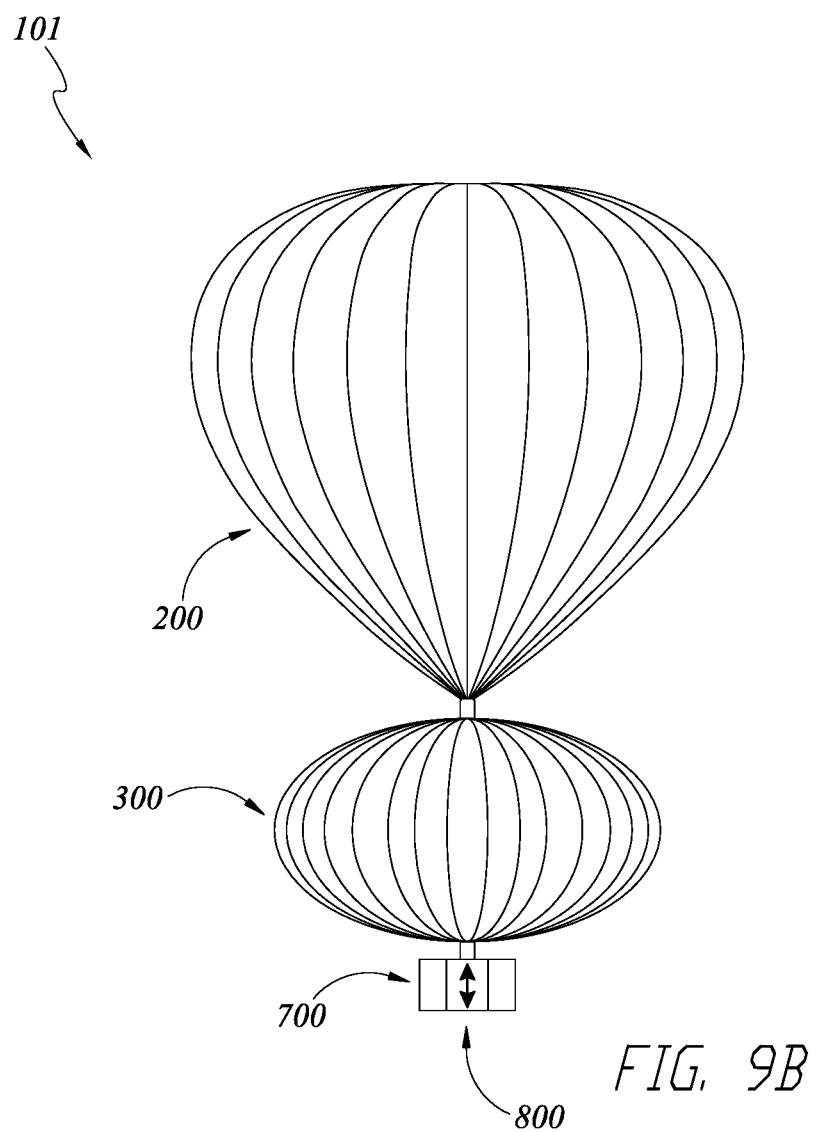

FIGS. 9A-9E depict alternate embodiments of the LTA system 100. FIGS. 9A and 9B are side views of another embodiment of an LTA system 101. The LTA system 101 may have some of the same or similar features and/or functionalities as the LTA system 100, and vice versa. The LTA system 101 shown in FIG. 9A is at a different point in time than the LTA system 101 shown in FIG. 9B.

The LTA system 101 is shown in flight. The LTA system 101 includes the ZPB 200 coupled in tandem above the SPB 300. The LTA system 101 has an underinflated ZPB 200 and SPB 300 in FIG. 9A relative to FIG. 9B. By "underinflated"

it is meant the ZPB 200 and SPB 300 are not inflated at or near maximum capacity. The ZPB 200 and SPB 300 are inflated more in FIG. 9B relative to FIG. 9A. Thus, the ZPB 200 and SPB 300 are relatively contracted in FIG. 9A and relatively expanded in FIG. 9B. The LTA system 101 may have the configuration shown in FIG. 9A during takeoff or at relatively lower altitudes. The LTA system 101 may have the configuration shown in FIG. 9B at relatively higher altitudes. Thus, the ZPB 200 and SPB 300 may expand as the LTA system 101 climbs in altitude. For example, the ZPB 200 may expand as the LTA system 101 reaches altitude with lower ambient air pressure, such that the LTA gas inside the ZPB 200 causes the ZPB 200 to expand. As further example, the SPB 300 may have insufficient air inside to pressurize it, such that the SPB 300 expands as more air flows into the SPB 300 and contracts as air is released from the SPB 300. As further example, the ZPB 200 may lose LTA gas at high altitudes where the ZPB 200 has reached maximum volume and cannot expand any further but with rising temperatures causing the inside LTA gas to expand, thus causing trapped air and/or LTA gas to exit the ZPB 200, such as through one or more openings in the ZPB 200. These and other effects, or combinations thereof, may cause the varying configurations (shapes, sizes, etc.) of the ZPB 200 and SPB 300.

The LTA system 101 includes the payload support 700 coupled below the SPB 300. The LTA system 101 does not include an elongated connection, such as the ladder assembly 610, between the payload support 700 and the SPB 300. Thus, in some embodiments, the payload support 700 may be located closer to the SPB 30. The payload support 700 may be coupled directly underneath the SPB 300.

The LTA system 101 includes the compressor assembly 800. The compressor assembly 800 may be mounted with the payload support 700, as described herein. Thus, the compressor assembly 800 may be located closer to the SPB 300. The compressor assembly 800 may be coupled directly underneath the SPB 300. Further, the compressor assembly 800 need not be part of the payload support 700. In some embodiments, the compressor assembly 800 may be separate from the payload support 700. In some embodiments, the compressor assembly 800 is directly coupled with the SPB 300 and a variety of different payload supports 700 may be separately incorporated with the LTA system 101. This may allow, for example, a modular LTA system 100 or 101 having the advanced maneuver and mission capabilities described herein but that can also be used with a variety of different payloads and payload supports. For instance, the compressor assembly 800 may be coupled directly underneath the SPB 300 and be configured for a variety of different payload supports to be coupled underneath the compressor assembly 800. These are merely some examples, and other suitable configurations may be implemented.

Other embodiments of the LTA system 100 besides those described herein may be implemented without departing from the scope of this disclosure. In some embodiments, the LTA system 100 may include instruments, the compressor assembly 800, the parafoil 680, other descent systems besides the parafoil 680, additional payloads 730 and/or payload supports 700, an additional ballast hopper, and/or other systems, located above the SPB 300 and below the ZPB 200. Some exemplary configurations of such systems are described, for example, in U.S. provisional patent application No. 62/294,189, entitled VARIABLE ALTITUDE AIR BALLAST BALLOON SYSTEM and filed Feb. 11, 2016, the entire disclosure of which is incorporated by reference herein for all purposes.

Figure 9C:
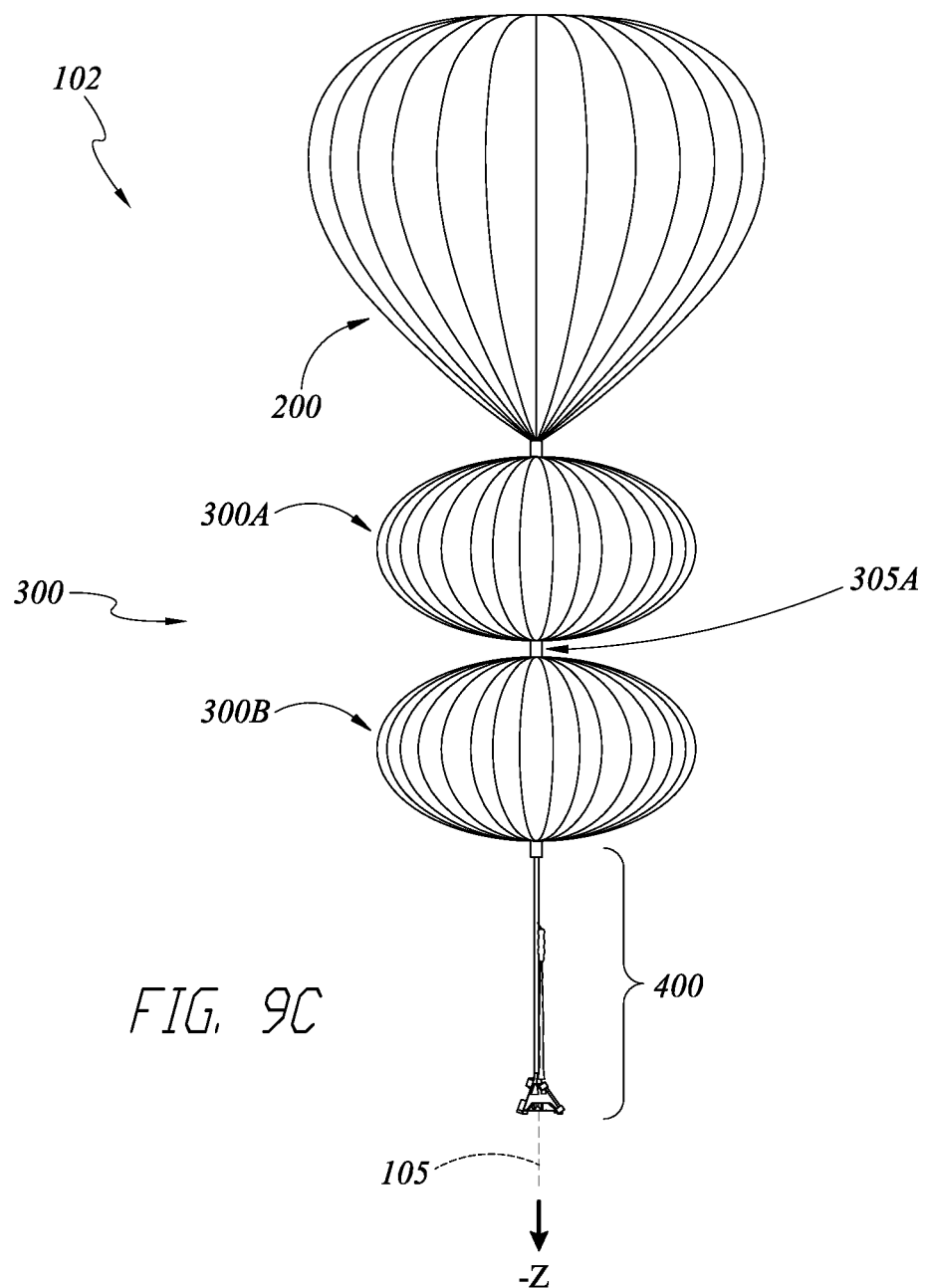
FIGS. 9C-9E are side views of other embodiments of LTA systems for high altitude flight having a ZPB and either multiple SPB's or an SPB comprising multiple compartments.
Figure 9D:
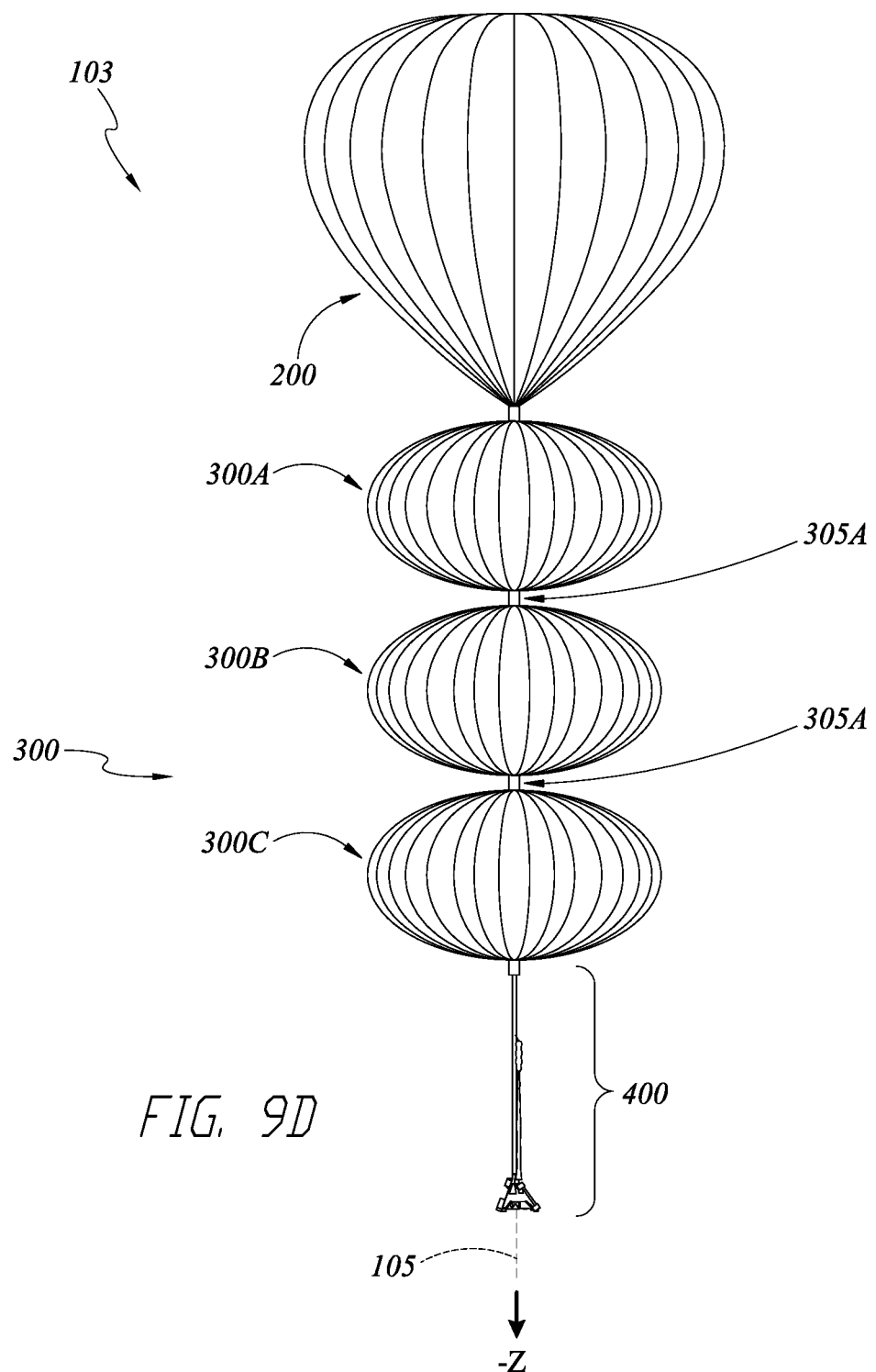
Figure 9E:
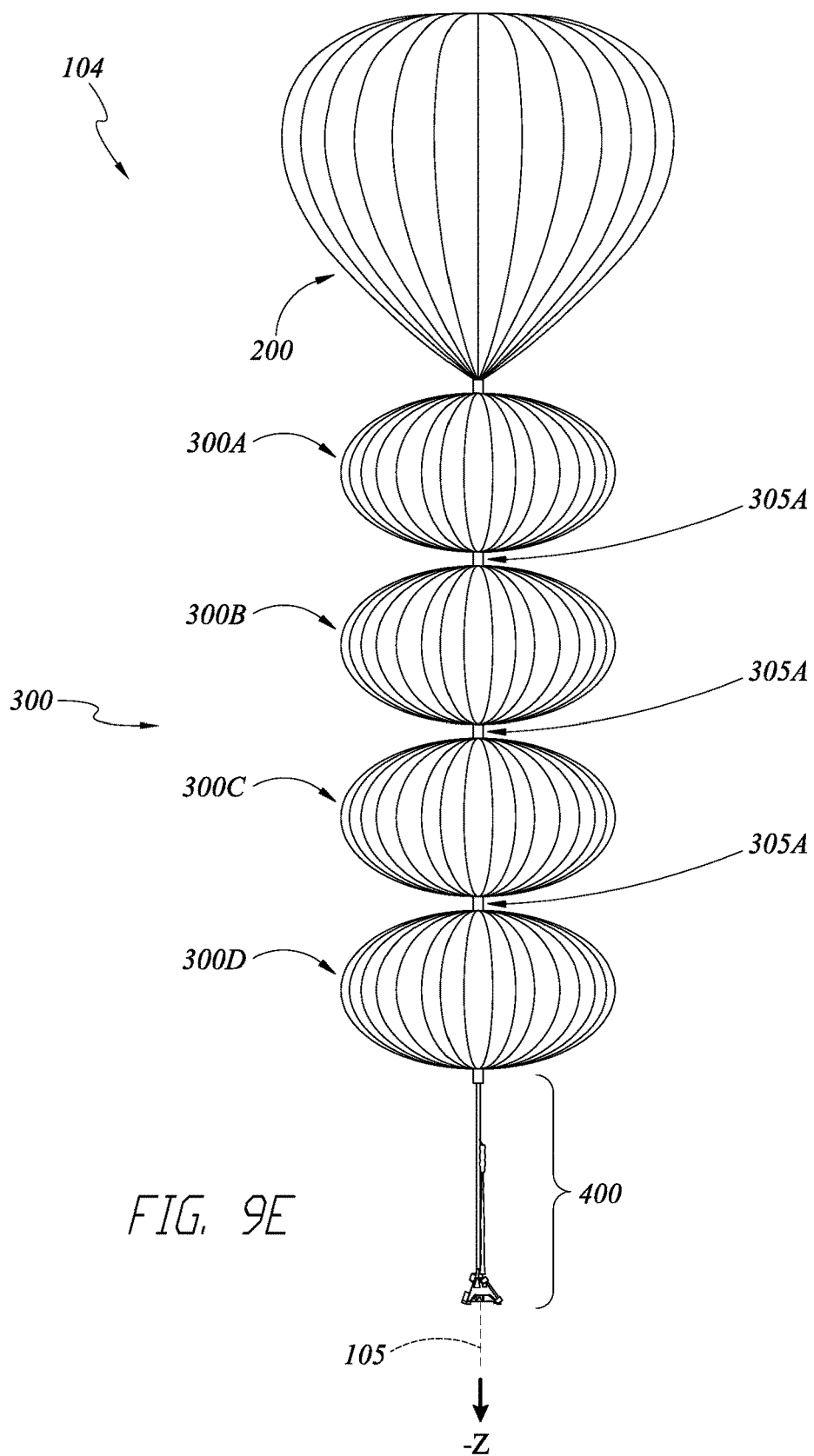

FIGS. 9C, 9D and 9E depict other embodiments of the LTA systems 100 including, respectively, LTA systems 102, 103 and 104, having multiple SPB's 300 and/or a single SPB 300 having multiple, SPB-shaped internal air compartments or chambers. Thus, the description of "multiple SPB's" is not meant to exclude the configuration where there are multiple SPB-shaped compartments or chambers for a single SPB 300, the compartments being the wide, balloon-shaped portions. By "SPB-shaped" it is meant that the shape is generally similar to that of the SPB 300 described herein, for example with respect to FIGS. 3A and 3B, but need not be the exact shape nor include all features thereof. FIG. 9C depicts an embodiment of an LTA system 102 having two SPB's 300. FIG. 9D depicts an embodiment of an LTA system 103 having three SPB's 300. FIG. 9E depicts an embodiment of an LTA system 103 having four SPB's 300. Some embodiments of the LTA systems may have more than four SPB's 300.

To reach design goals, for example with the performance ratio R described above, as the balloon system gets larger, using only a single pumpkin ballast balloon SPB 300 may not be desirable. For instance, for some missions there may be a strength limitation or a stability limitation with only a single SPB 300. An alternative is stacking the SPB's 300. This may not be as weight efficient as a single SPB 300, but a single SPB 300 may have structural or stability issues, such as S-clefting. Multiple smaller SPB's 300 may address these issues. Examples of LTA systems having two, three and four SPB's 300 are shown respectively in FIGS. 9C, 9D and 9E.

A possible advantage of a second or third or fourth or more SPB 300, or of a single SPB 300 with multiple compartments, in the system is the maximum diameter and thus volume of the SPB 300 is constrained by the hoop stress of the material it is made of. Thus, one possible way to increase ballast volume is to have multiple discrete SPBs in the system. In another embodiment, instead of each SPB being discrete (e.g., formed as separate units that are coupled (mechanically and/or fluidly) together), chambers of the SPB are interconnected through a constrained chamber and form a configuration having the visual appearance of a "sausage." Each sausage section then can attain maximum radius for hoop stress, with all chambers connected via the constriction between links. Such an LTA system may comprise a ZPB 200 plus one or more such sausage-configured SPBs 300.

The LTA systems with multiple SPB's 300, such as the LTA systems 102, 103, 104, may have any or all of the same or similar features and/or functionalities as the other LTA systems described herein, such as the LTA systems 100 or 101, and vice versa. The SPB's 300 may include one or more SPB's that form one large, fluidly connected volume that has the visual appearance of multiple SPB's (e.g., a "sausage" configuration). Thus, some or all of the SPB's 300 may be in fluid communication with each other. In some embodiments, the multiple SPB's 300 may not be in fluid communication with each other. For example, fittings 305A may be used. The fitting 305A may be one or more of rope rings, metal fittings, etc. that may separate the internal air compartments of each SPB 300. In some embodiments, such fittings 305A may allow for air to travel between the various compartments or chambers of the SPB 300, as further described herein, for example in the section titled "BALLOON FITTINGS." Each of the multiple SPB's 300 may be referred to as "SPB compartments" that make up the SPB 300. The SPB 300 may comprise two or more of the SPB compartments. The "compartments" refer to the enlarged portions of the SPB 300 having the general shape of the single SPB 300, for example as shown in FIG. 1. Thus, FIG. 9C shows two SPB compartments, FIG. 9D shows three SPB compartments, and FIG. 9E shows four SPB compartments. The SPB 300 may include the SPB compartments connected in series as shown in FIGS. 9C-9E. In some embodiments, the SPB compartments may be connected in series, in parallel, in other configurations, or combinations thereof. The two or more SPB compartments of the SPB 300 may or may not be in fluid communication with each other. In some embodiments, some of the SPB compartments of the SPB 300 may be in fluid communication with some of the other SPB compartments but not in fluid communication with other of the SPB compartments. The multiple SPB's 300 may be formed separately and then connected together. In some embodiments, the multiple SPB's 300 are formed from the same continuous skin and are either fluidly connected or are "tied off" from each other, either of which configuration may use the fitting 305A, which may be the rope rings, metal fittings, etc. There may be a single compressor assembly 800 that provides ambient air to all of the SPB's 300, for example with multiple air hoses 690 or with a single air hose 690 where the multiple SPB's 300 are fluidly connected. In some embodiments, each SPB 300 may have its own compressor assembly 800 or compressor 810, and/or its own valves 870 and/or 871. Thus, each SPB 300 may have its own discrete air intake and release assembly. These are merely some examples of the multiple SPB 300 embodiments of the LTA system and how they may be implemented, and others not explicitly described herein are within the scope of the disclosure. For example, five or more SPB's can be used, the multiple SPB's need not be configured in a single line (e.g., the system can include hardware from which at least some of the SPB's are coupled laterally relative to each other), etc. Further details of other embodiments and features for multi-chamber super pressure balloon configurations are provided herein, for example in section "N. CONTINUOUS MULTI-CHAMBER SUPER PRESSURE BALLOON."

J. Mission-Specific Platforms

The particular configuration of the LTA system 100 and the method of use can be based on the mission. The various missions may include, for example, lower altitude missions, higher altitude missions, station-keeping, meteorological purposes, heavy payload lifting, short duration missions, long duration missions, constellations, handoffs, racetrack, and others. For these and other missions, the LTA system 100 and/or the method of use of the LTA system 100 can be accordingly configured.

For example, the LTA system 100 can be configured for higher altitude and/or heavy payload lifting by including larger volume ZPB 200 and SPB 300 and/or the compressor 810 having a larger mass flow rate at less dense and lower pressure atmospheres. Thus, for higher altitude and/or heavy payload lifting, the LTA system 100 may have a multi-stage compressor 810, such as a two-stage compressor 810, a ZPB 200 having an internal volume of about 30,000 cubic meters, and a SPB 300 having a ballast capability of +/−100 kilograms. Further, the release valves 870 and/or 871 can be configured to allow for a faster mass flow rate, such as with a larger opening 877 and/or 878 and/or with multiples valves 870 and/or 871. Such a system may allow for reaching higher altitudes, larger latitudinal ranges, and doing so at faster speeds.

As another example, the LTA system 100 can be configured for lower altitude and/or lighter payload lifting by including smaller volume ZPB 200 and SPB 300 and/or the compressor 810 having a smaller mass flow rate. This may provide for a lower mass and less complex system. Thus, for lower altitude and/or lighter payload lifting, the LTA system 100 may have a single-stage compressor 801, a ZPB 200 having an internal volume of about 700 cubic meters, and a SPB 300 having a ballast capability of about +/−50 kilograms. Further, fewer and/or smaller release valves 870 can be used, also saving on mass and complexity. Such a system may allow for reaching lower altitudes and at less cost due to mass savings and less complexity with design of the LTA system 100.

K. Control System

Figure 10:
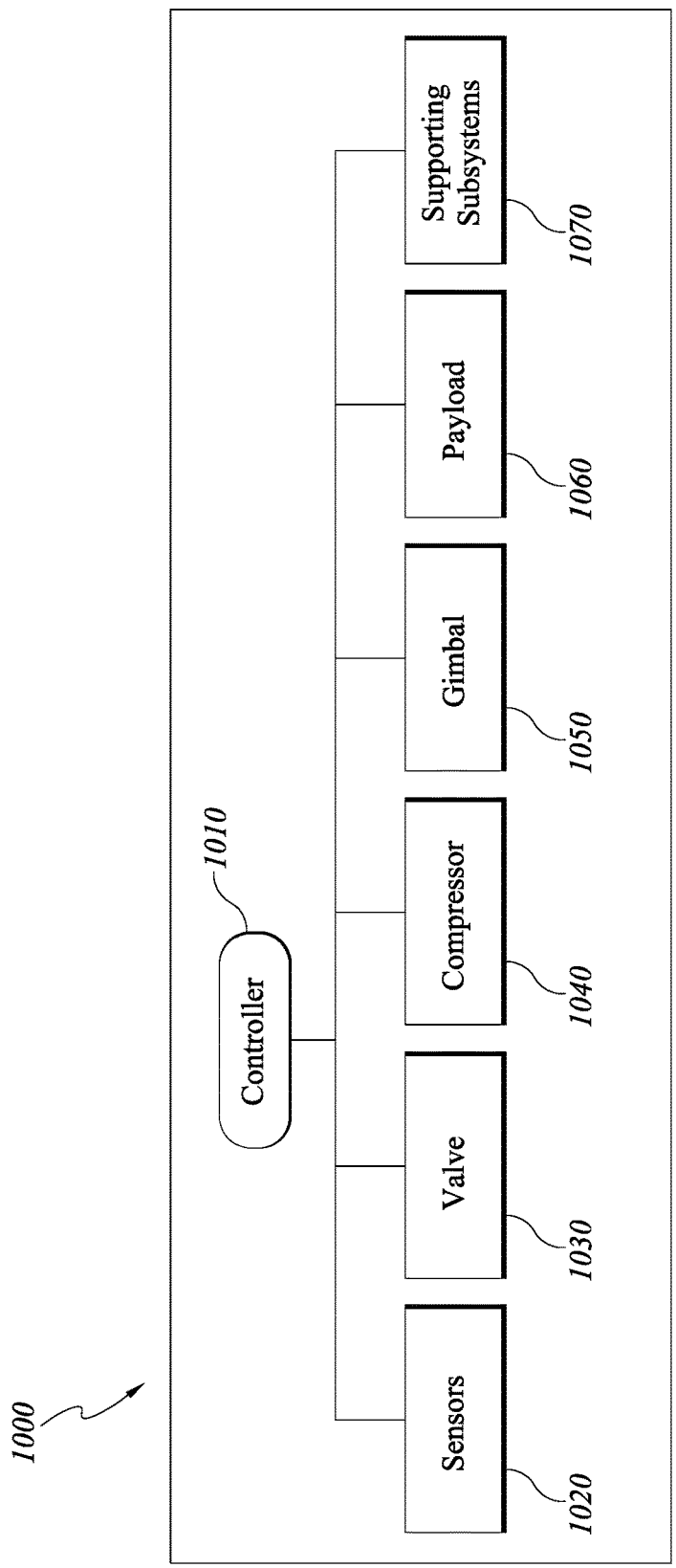
FIG. 10 is a schematic depicting an embodiment of a control system of the LTA system of FIG. 1 to control altitude and other parameters.

FIG. 10 is a schematic an embodiment of a control system 1000 that may be used with the various LTA systems described herein, for example the LTA system 100 and 101. In some embodiments, the control system 1000 is in communicating connection with the sensor 740, with the centrifugal compressor 810, and with the adjustable valve 740, and is configured to control the centrifugal compressor 810 and the adjustable valve 740 based at least on one or more detected environmental attributes to control the amount of ambient air inside the SPB 300 to control an altitude of the LTA system 100.

The control system 1000 includes a controller 1010 in communicating connection with various components. The communicating connections may be wired or wireless. The controller 1010 is an electronic controller. The controller 1010 is in communicating connection with one or more sensors 1020. The sensor 1020 may be the sensor 740 described herein. The sensor 1020 detects various parameters and provides corresponding output, for example data or information, that is communicated to the controller 1010. The controller 1010 receives the output from the sensor 1020 to determine various control operations.

The controller 1010 is in communicating connection with a valve 1030 and a compressor 1040. The valve 1030 and the compressor 1040 may be, respectively, the valve 870 and the compressor 810 described herein. The valve 1030 and compressor 1040 are shown as separate components. In some embodiments, the valve 1030 and compressor 1040 may be part of the same system, such as the compressor assembly 800 or part of a reversible compressor, as described herein. The controller 1010 controls the opening and closing of the valve 870 to cause more or less air to be released from the SPB 300. The controller 1010 controls the operation of the compressor 810 to cause more or less air to be provided to the SPB 300, for example by running the compressor at higher or lower speeds.

The controller 1010 may control the operation of the valve 1030 and/or compressor 1040 based on output of the one or more sensors 1020, and/or based on commands sent to the controller 1010 via a communications subsystem. For example, light sensors, pressure sensors, thermal sensors, and/or other sensors may detect daylight, ambient pressure, ambient temperature, and/or other parameters, that are analyzed by the controller 1010 to control the valve 1030 and/or compressor 1040. The controller 1010 may determine, based on data detected with the sensors 1020 and/or received communication signals, that a lower altitude is required. Thus, the controller 1010 may send a control signal to the compressor 1040 to cause the compressor 1040 to provide more air to the SPB 300 to cause the LTA system 100 to descend. Alternatively, the controller 1010 may determine, based on data detected with the sensors 1020 and/or received communication signals, that a higher altitude is required. Thus, the controller 1010 may send a control signal to the valve 1030 to cause the valve 1030 to release air from the SPB 300 to cause the LTA system 100 to ascend. Further, the controller 1010 may control, in the manner discussed, the rate of air intake or air release in order to control, respectively, the rate of descent or ascent of the LTA system 100.

The controller 1010 is in communicating connection with a gimbal 1050. The gimbal 1050 may be the gimbal 500 described herein. The controller 1010 controls actuation of the gimbal 1050, for example actuation of the motor 510 of the gimbal 500. The controller 1010 controls actuation of the gimbal 1050 to control relative rotation of the ZPB 200 and SPB 300, for example to point the solar array 630 is a particular direction. The controller 1010 may control actuation of the gimbal 1050 based on output of the sensor 1020, and/or based on commands sent to the controller 1010 via a communications subsystem. For instance, light detectors, timers, global positioning systems (GPS), LTA system locators that are separate from but which communicate with the LTA system 100, and/or other sensors 1020, may provide data output or communications to the controller 1010. The controller 1010 may determine, based on data detected with the sensors 1020 and/or received communication signals, that rotation of the solar array 630 is required. The controller 1010 may then send a signal to the gimbal 1050 to actuate a particular amount. For instance, the controller 1010 may send a control signal to the gimbal 500 to cause the motor 510 to operate at a particular speed and/or for a particular amount of time. In some embodiments, the data is detected with the sensors 1020, and/or the communication signals are received, continuously or at regular intervals, such as during daylight, and provided to the controller 1010 for continuous or interval control of the solar array 630. Such operations may allow, for example, for tracking of the sun with the solar array 630 for optimal energy conversion.

The controller 1010 is in communicating connection with a payload 1060 and supporting subsystems 1070. The payload 1060 may be the payload 730 described herein. The supporting subsystems 1070 may be the various subsystem described herein, for example communications subsystem, release mechanisms, etc. The controller 1010 controls various operations of the payload 1060 and supporting subsystems 1070, for example gathering data with an optical instrument, taking readings with various sensors of the subsystems, transmitting and receiving information to and from ground stations, satellites, other balloon systems, etc. The controller 1010 may control the payload 1060 and supporting subsystems 1070 based on output of the sensor 1020, and/or based on commands sent to the controller 1010 via a communications subsystem. For instance, the controller 1010 may send a control signal to the payload 730 to take a sample or reading with an optical instrument. As further example, the controller 1010 may receive a communication signal to release the payload support 700, and the controller 1010 may then send a control signal to one or more release mechanisms to cause the payload support 700 and parafoil 680 to separate from the upper craft 600.

L. Navigation and Control Methods

FIGS. 11-12 depict embodiments of various flight aspects, for example maneuvers, trajectories, speeds, etc., that may be performed with the various LTA systems described herein, for example with the LTA system 100 and 101. Only some example flight aspects of the LTA system 100 are described, and the LTA system 100 has other flight aspects even though not explicitly described. Although the flight aspects are described in the context of the LTA system 100, it is understood that these aspects apply equally to other LTA systems described herein, including the LTA system 101.

1. Ascent and Descent

Figure 11A:
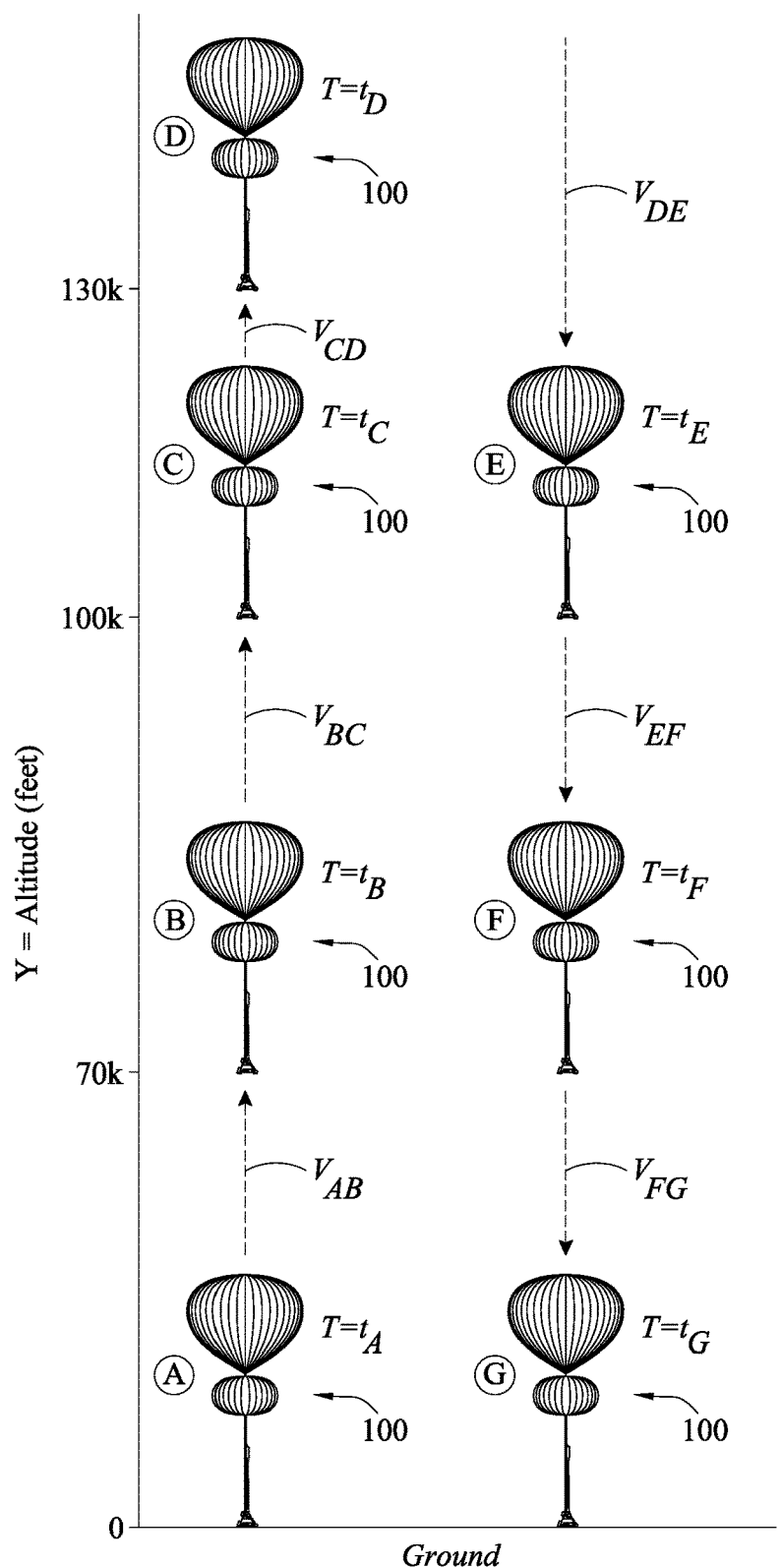
FIG. 11A is a schematic depicting embodiments of ascent and descent rates and flight ranges for the LTA of FIG. 1.

FIG. 11A is a schematic depicting embodiments of ascent rates, descent rates and flight ranges that the LTA system 100 is capable of achieving. These aspects are described with reference to various variables for the sake of description only. The aspects shown are approximations to generally show capability. The LTA system 100 is not limited by this example schematic. For instance, the LTA system 100 may ascend higher than 120,000 feet. As shown, the LTA system 100 begins at point A on the ground and ascends to point B at 50,000 feet ("50 k" feet), then ascends to point C at 100 k feet, and then ascends to point D at 120 k feet. The LTA system 100 then descends from point D at 120 k feet to point E at 100 k feet, then descends to point F at 50 k feet, and then descends back to ground at point G. The flight path shown from point A to point G and described herein is for illustrative purposes to show the various capabilities of the LTA system 100. The LTA system 100 may follow the flight path shown or other flight paths. In some embodiments, the LTA system begins at point A and ascends to point D, then cyclically descends and ascends to and from points D and E. In some embodiments, the LTA system begins at point A and ascends to point D, then cyclically descends and ascends to and from points D and F. In some embodiments, the LTA system begins at point A and ascends to point C, then cyclically descends and ascends to and from points C (or E) and B (or F). After a number of these or other cycles at high altitude, the LTA system 100 may release the payload support 700 with the parafoil 680 for controlled flight to ground, and the ZPB 200 and SPB 300 may terminate their flights and fall back to ground, either together or separately. Alternatively, after a number of these or other cycles at high altitude, the entire LTA system 100 may descend back to ground together, through point F to point G. Various sample capabilities of time of flight and speed of the LTA system 100 for the various ranges and altitudes shown in FIG. 11A are provided in Table 1.

TABLE 1

Sample capabilities of the LTA system for the various ranges and altitudes shown in FIG. 11A.

| Location | Altitude (feet) | Range (feet) | Time (hours) | Max Speed (feet/hour) |
| --- | --- | --- | --- | --- |
| A → B | 0 → 50k | +50k | $T_A \rightarrow T_B = 7.8$ | $V_{AB} = 19{,}200$ |
| B → C | 50k → 100k | +50k | $T_B \rightarrow T_C = 4.3$ | $V_{BC} = 21{,}600$ |
| C → D | 100k → 120k | +30k | $T_C \rightarrow T_D = 4$ | $V_{CD} = 5{,}000$ |
| D → E | 120k → 100k | −30k | $T_D \rightarrow T_E = 4$ | $V_{DE} = -5{,}000$ |
| E → F | 100k → 50k | −50k | $T_E \rightarrow T_F = 4.6$ | $V_{EF} = -13{,}200$ |
| F → G | 50k → 0 | −50k | $T_F \rightarrow T_G = 5.0$ | $V_{FG} = -30{,}000$ |

Figure 11B:
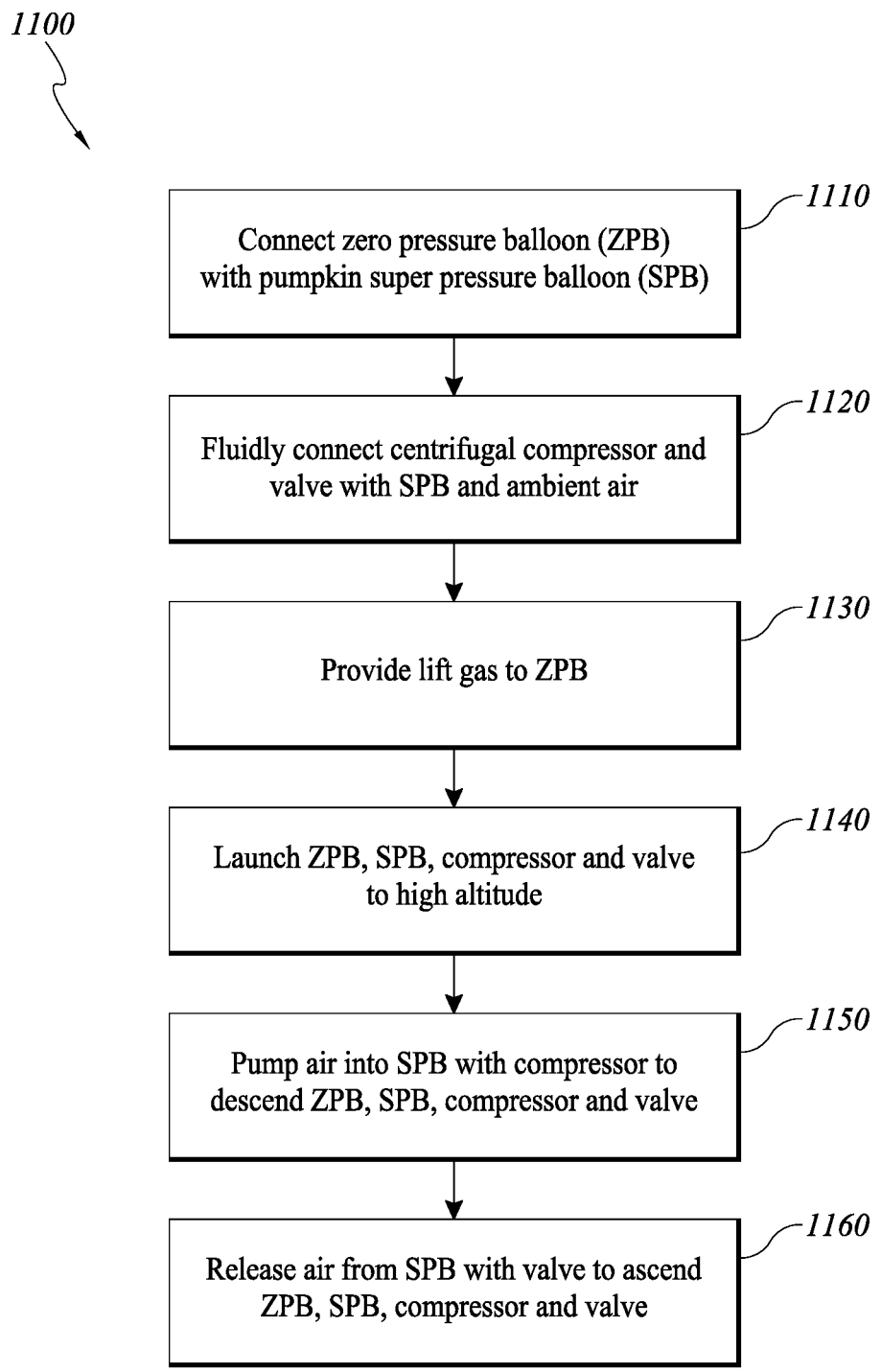
FIG. 11B is a flow chart showing an embodiment of a method for ascending and descending with the LTA system of FIG. 1.

FIG. 11B is a flow chart showing an embodiment of a method 1100 for ascending and descending with the LTA system 100. The method 1100 may be performed for example to achieve the ascent and descent rates and range described with respect to FIG. 11A. The method 1100 may be performed with the various LTA systems described herein, including the LTA systems 100 and 101, and other variations of those LTA systems.

As shown in FIG. 11B, the method 1100 begins with step 1110 wherein a ZPB is connected with a pumpkin-shaped SPB. Step 1110 may include the ZPB 200 being connected with the SPB 300 in its pumpkin shape or configured to be in its pumpkin shape. In step 1110 the ZPB 200 may be connected directly to the SPB 300, or they may be indirectly connected for example via the gimbal 500 or 501. In step 1110 the ZPB and SPB may be connected in an assembly facility, at the launch pad, or in other suitable locations.

The method 1100 then moves to step 1120 wherein a centrifugal compressor and valve are fluidly connected with the SPB and with the ambient air. Step 1120 may include the compressor assembly 800 and the valve 870 being connected with the SPB 300 via the air hose 690. Step 1120 may include the compressor assembly 800 and the valve 870 being connected with the SPB 300 via the air hose 690. The connections may be open such that air may flow freely or closed, for example where the valves 870 or 871 are closed when connected. Thus, "fluid" connection in step 1120 means capable of being in fluid connection. In step 1120 the centrifugal compressor and valve may be fluidly connected with the SPB and with the ambient air in an assembly facility, at the launch pad, or in other suitable locations.

The method 1100 then moves to step 1130 wherein lift gas is provided to the ZPB. Step 1130 may include LTA lift gas, such as helium or hydrogen, being provided to the ZPB 200. The LTA gas may be provided to the ZPB via hose or other suitable means. The various volumes and amounts of LTA gas described herein may be provided in step 1130.

The method 1100 then moves to step 1140 wherein the ZPB 200, SPB 300, compressor 810 and valve 870 are launched to high altitude. Step 1140 may include launching to high altitude the LTA system 100 including the ZPB 200, the SPB 300, the compressor 810 and the valve 870. Step 1140 includes the ZPB 200 with lift gas therein providing the lift to the various components. Step 1140 may include the ZPB 200 lifting the various components to the upper troposphere, the tropopause and/or the stratosphere.

The method 1100 then moves to step 1150 wherein air is pumped into the SPB 300 with the compressor 810 to descend the ZPB 200, SPB 300, compressor 810 and valve 870. Step 1150 may include the compressor 810 pumping air from the surrounding atmosphere at high altitude into the SPB 300 via the air hose 690. Step 1150 may include the LTA system 100 descending due to the increased mass of air in the SPB 300, as described herein. The LTA system 100 may descend in step 1150 as described for example with respect to FIG. 11A.

The method 1100 then moves to step 1160 wherein air is released from the SPB 300 with the valve 870 to ascend the ZPB 200, SPB 300, compressor 810 and valve 870. Step 1160 may include the valve 870 releasing air from the SPB 300 via the air hose 690 into the surrounding atmosphere at high altitude. Step 1160 may include the LTA system 100 ascending due to the decreased mass of air in the SPB 300, as described herein. The LTA system 100 may ascend in step 1150 as described for example with respect to FIG. 11A.

The method 1100 may be repeated in various manners. For example, multiple LTA systems 100 may be launched and flown as described in the method 1100. As further example, steps 1150 and 1160 may be repeated after performing steps 1110 to 1140. In some embodiments, some or all of the steps of the method 1100 may be performed, and the flight may be terminated, for example in the various manners described herein. For example, steps 1110 to 1140 may be performed and then steps 1150 and 1160 may be cyclically repeated multiple times, after which the LTA system 100 flight may be terminated as described.

The LTA system 100 can be used for a variety of different missions. The LTA system 100 can be used to remain airborne for longer durations, for example during stratospheric flights with sustained communications. The LTA system 100 can be used to maintain a fairly constant footprint on the ground, particularly in the case of observation and communications. The LTA system 100 thus enables altitude maintenance during diurnal variations in solar elevation as well as station-keeping for large portions of the year worldwide. Some embodiments of a station-keeping persistence envelope with active altitude control that may be performed with the LTA system 100 are described herein.

2. "Barber Pole" Station-Keeping

Figure 12A:
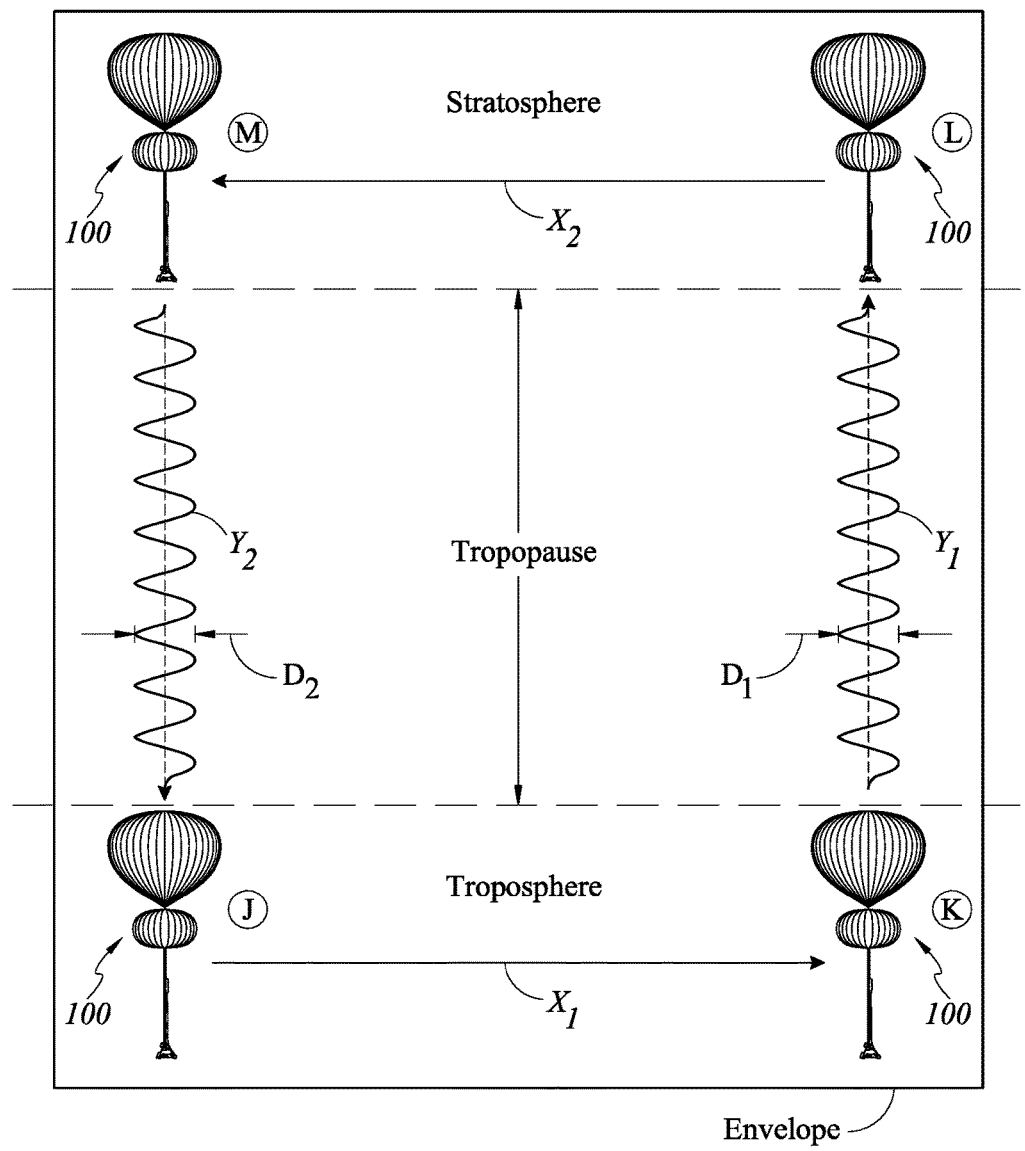
FIG. 12A is a schematic depicting an embodiment of a persistence envelope for high altitude station-keeping with the LTA system of FIG. 1.

FIG. 12A is a schematic depicting an embodiment of a persistence envelope for high altitude station-keeping with the LTA system 100. The envelope includes an upper portion of the troposphere, the tropopause, and the stratosphere. Boundaries between these layers of the upper atmosphere are indicated by the two dashed lines.

As shown in FIG. 12A, the LTA system 100 begins at point J in the upper troposphere. The LTA system 100 then travels from point J to point K along the path $X_1$. The LTA system 100 travels along the path $X_1$ due to the prevailing winds. Point K is approximately at the same altitude as point J. In some embodiments, point K may be at a different altitude than point J. The point K corresponds to latitude and longitude coordinates within a first range of latitude and longitude coordinates. The first range of latitude and longitude coordinates may correspond to favorable locations of the tropopause through which it is desirable for the LTA system 100 to ascend. At point K, the LTA system 100 ascends. The LTA system 100 ascends by releasing air, for example by controlling the valve 870 to release air from the SPB 300. The LTA system 100 may then ascend from the upper troposphere and into the tropopause.

The LTA system 100 ascends through the troposphere along the path $Y_1$. The path $Y_1$ is a helix or an approximate helix through the tropopause. Thus, the LTA system 100 ascends along a helical path, or "barber pole." The trajectory that the LTA system 100 travels is helical through the tropopause because of the first range of latitude and longitude coordinates correspond to a portion of the tropopause having varying wind directions at different altitudes. It should be noted that varying wind directions may be found in all parts of the atmosphere, and "riding on the barber pole" is not limited to operations only in the tropopause. The LTA system 100 can thus take advantage of varying wind directions anywhere within its altitude changing range. Thus, the description herein of the helical path with respect to particular portions of the atmosphere, such as the tropopause, is not meant to limit the use of the LTA system 100 in that manner to only those areas.

The wind directions in the tropopause, and/or in other portions of the atmosphere, angularly vary at varying altitude such that the LTA system 100 travels along the helical path. The path $Y_1$ has an approximate diameter $D_1$ as indicated. The diameter $D_1$ varies depending on the speed of the winds and the rate of ascent of the LTA system 100. The rate of ascent can be controlled based on the rate of release of air from the SPB 300. Thus, the diameter $D_1$ of the helical path $Y_1$ can be affected by controlling the rate of release of air from the SPB 300. For example, air may be released at a relatively slower rate such that the LTA system 100 ascends at a relatively slower rate. Thus, the LTA system 100 will spend more time in any one of the various layers of the tropopause having varying wind directions, and so the helical path $Y_1$ will have a larger diameter $D_1$. Conversely, for example, air may be released at a relatively faster rate such that the LTA system 100 ascends at a relatively faster rate. Thus, the LTA system 100 will spend less time in any one of the various layers of the tropopause (or any part of the atmosphere the LTA 100 system is operating) having varying wind directions, and so the ideally helical path $Y_1$ will have a smaller diameter $D_1$. By varying the speed of ascent or descent of the LTA system 100, these helical trajectories can be modified so that the flight stays within a desired range of latitude and longitude coordinates.

At point L, the LTA system 100 stops ascending. For example, the LTA system 100 may stop releasing air from the SPB 300. As further example, the LTA system 100 may have already stopped releasing air and the LTA system has now reached its maximum or equilibrium altitude. From point L, the LTA system travels along the path $X_2$ to point M. The path $X_2$ is in a different direction than that of the path $X_1$. In some embodiments, the path $X_2$ is in the opposite direction than that of the path $X_1$. The point M is at the same or similar altitude as the point L. In some embodiments, the point M may be at a different altitude than the point L.

The point M corresponds to latitude and longitude coordinates within a second range of latitude and longitude coordinates. The second range of latitude and longitude coordinates may correspond to favorable locations of the tropopause through which it is desirable for the LTA system 100 to descend. The second range of latitude and longitude coordinates may include all, some or none of the coordinates within the first range of latitude and longitude coordinates. For example, the first and second range of latitude and longitude coordinates may be identical. As further example, the first and second range of latitude and longitude coordinates may share some of the same coordinates, i.e. may be overlapping. As further example, the first and second range of latitude and longitude coordinates may not share any of the same coordinates, i.e. may be entirely separate and not overlap at all. At point L, the LTA system 100 descends. The LTA system 100 descends by moving air into the SPB 300, for example by controlling the compressor 810 to cause ambient air from the surrounding atmosphere to flow into the SPB 300. The LTA system 100 may then descend from the upper troposphere and into the tropopause.

The LTA system 100 descends through the troposphere along the path $Y_2$. The path $Y_2$ is a helix or an approximate helix through the tropopause. The path $Y_2$ travelled by the LTA system 100 is similar to the path $Y_1$ but in the opposite direction, and possibly at different latitudes and longitudes than the path $Y_1$. Thus, the LTA system 100 descends along a helical path $Y_2$, or "barber pole." The trajectory that the LTA system 100 travels is helical through the tropopause because the second range of latitude and longitude coordinates corresponds to a portion of the tropopause having varying wind directions at different altitudes. The wind directions angularly vary at varying altitude such that the LTA system 100 travels downward along the helical path $Y_2$. The path $Y_2$ has a diameter $D_2$ as indicated. The diameter $D_2$ varies depending on the speed of the winds and the rate of descent of the LTA system 100. The rate of descent can be controlled based on the rate air intake into the SPB 300. Thus, the diameter $D_2$ of the helical path $Y_2$ can be affected by controlling the rate of air intake into the SPB 300. For example, the compressor 810 may be operated at a relatively slower speed such that air is taken in at a relatively slower rate, so that the LTA system 100 descends at a relatively slower rate. Thus, the LTA system 100 will spend more time in any one of the various layers of the tropopause having varying wind directions, and so the helical path $Y_1$ will have a larger diameter $D_2$. Conversely, for example, air may be taken into the SPB 300 at a relatively faster rate such that the LTA system 100 descends at a relatively faster rate. Thus, the LTA system 100 will spend less time in any one of the various layers of the tropopause having varying wind directions, and so the helical path $Y_1$ will have a smaller diameter $D_2$.

After descending through the tropopause along the path $Y_2$ and into the upper troposphere, the LTA system 100 stops descending. For example, the LTA system 100 may stop descending by ceasing to take in more air into the SPB 300. As further example, the LTA system 100 may have already stopped taking in air into the SPB 300 and the LTA system 100 has now reached a minimum or equilibrium altitude. The LTA system may exit the tropopause and stop ascending in the upper troposphere after returning to point J, as shown. In some embodiments, the LTA system may exit the tropopause and stop ascending in the upper troposphere at a point other than at point J. For example, the LTA system 100 may stop ascending at a different altitude than point J. As further example, the LTA system 100 may stop ascending at a same altitude as point J but laterally at a different location, i.e. at different latitude and/or longitudinal coordinates. As another example, the LTA system may stop ascending at a different altitude and at a different lateral position than point J.

From point J, or from another point where the LTA system stops descending, the LTA system may travel laterally within the upper troposphere. As shown, the LTA system 100 may travel from point J along the path $X_1$ to point K. In some embodiments, the LTA system 100 may travel along a path different from the path $X_1$. In some embodiments, the LTA system 100 may travel from point J along a path to latitude and longitude coordinates that are different from point K but which are within the first range of latitude and longitude coordinates. In some embodiments, the LTA system 100 may travel from point J to a location that is not within the first range of latitude and longitude coordinates.

3. Altitude Control Coverage Patterns

A variety of different trajectories may be flown with the LTA system 100 to establish persistent coverage. This section presents three altitude control coverage patterns that can be used with the LTA system 100 to provide persistent coverage over an area of interest (AOI). These patterns are the Single Pass Coverage (SPC), Multiple Pass Orbital Coverage (MPOC), and the Station-Keep Coverage (SKC) flight patterns. To provide persistent coverage, these patterns may be used in combination. Prior to a mission, forecasting tools, wind scoring (see below), etc. may be used to establish the coverage patterns needed to meet persistence requirements and hence identify the launch locations and launch frequencies (i.e., constellation requirements). The trajectory simulations presented show four scenarios where SKC and MPOC coverage patterns are applicable. In all cases, the SPC flight pattern may be used, but may not be the most cost effective option.

The LTA system 100 offers a platform with direct line of sight (LOS) coverage of an area of interest (AOI) for extended durations. The LTA system 100 may have its trajectory altered so as to remain within direct LOS of the AOI. The LTA system 100 can accomplish this by ascending or descending to different altitudes that hold wind speeds and directions favorable to a return trajectory. A given mission will require direct LOS coverage for distinct periods of time separated by intervals with no coverage. Meeting this schedule of direct LOS coverage is defined as persistent coverage.

To establish persistent coverage over an AOI, the LTA system 100 provides ascent and descent rate capabilities over an altitude range that encompasses a variety of wind directions. Many factors go into determining the degree to which persistent coverage over a region is possible, as well as the methods and costs involved in doing so. The primary factors include the AOI 'regional' winds and the time of year of the operation. The proposed operating regime here is within the upper troposphere, the tropopause and the stratosphere. In the stratosphere, average wind patterns vary from month to month and from location to location. These and other features of the upper atmosphere are advantageously used by the LTA system 100.

Of particular significance to flight of the LTA system 100 at high altitudes is the characterization of wind speed and direction with location, altitude, and time of year. The general wind patterns based on altitude and time of year present an organizational structure. This organizational structure allows one to roughly establish the altitude change required to "station-keep" over any given place for any given month.

Our typical experience with winds is naturally tied to the troposphere, where regional conditions, and localized convection made possible by the tropospheric temperature gradient, create a chaotic wind environment. The altitude of the tropopause varies. It is approximately 15 km (~120 mb) in the equatorial region and 9 km (~300 mb) in the polar region. As we go higher into the atmosphere, the regional differences have less effect, and broader patterns emerge. Within the stratosphere, winds are generally driven by the global distribution of absorbed solar heat, and the Coriolis effect. Near the equator, upper winds almost always blow primarily out of the east, with increasing variability polewards. Winter at the given pole tends to result in very strong winds blowing out of the west (westerly), while a polar summer tends to result in slower, more varied, easterly winds. The change in direction, referred to as the 'turn-around', occurs twice a year, typically May and October.

The Single Pass Coverage (SPC) pattern is used with the LTA system 100 if no circulatory pattern exists in the region about the AOI. In this scenario, the LTA system 100 would be launched at a point upwind, allowed to float over the AOI, and then returned to the ground at a point downwind of the AOI. Multiple launch and recovery options are afforded by the use of the altitude control capabilities of the LTA system 100. Although this tactic can always be used, it is the most expensive option as multiple LTA systems 100 will need to be deployed to meet the mission persistence requirement.

The Multiple Pass Orbital Coverage (MPOC) pattern can be used with the LTA system 100 if a circulatory pattern exists in the region about the AOI that allows the LTA system 100 to return back over the AOI multiple times. The circulation does not need to be continuous in a single stratum, as the return trajectory can take place over multiple strata. The size of the loop and the persistence requirement will dictate the number of LTA systems 100 that must be flown. This option can greatly reduce hardware and operations cost for long duration missions.

The Station-keep Coverage (SKC) pattern can be used with the LTA system 100 when wind speeds over the AOI are low and the direction is variable. Under these favorable conditions, a balloon can loiter over an AOI for as long as the weather pattern supports it.

These different coverage patterns are necessary to accommodate the variability in local wind pattern from location to location and the time of year. In addition, long duration missions may occur across several weather patterns and thus require a combination of deployment tactics to meet persistence objectives. Opportunities to fly the MPOC and SKC coverage patterns improve when the winds are slow and varied. SPC may be preferably used when the winds are uniformly directional at all operational altitudes. The ability to change altitude can improve the chance for cost-efficient persistence coverage maneuvers if the wind vectors are favorable at the other altitudes. For instance, the wind pattern at the higher altitudes, e.g., 10 mb and 20 mb, do not differ much. The main difference between these two altitudes is in velocity magnitude. The probability of finding different wind directions improves when the operating range is extended down to 100 mb. These observations are based on averaged velocities and actual winds may offer greater opportunities.

A mission plan for the LTA system 100 would begin with a review of historic wind data to determine if altitude control balloon technology is applicable. The probability for having light and variable stratospheric winds varies by location and time of year but in general there exists a fairly high probability of station keeping winds world-wide throughout a large portion of the year. If the LTA system 100 is appropriate, the mission plan would then focus on the coverage patterns available to establish persistent coverage. The mission plan would be based on wind analyses of actual forecasted data and trajectory simulations performed in the weeks leading up to the mission, for the AOI and time of interest. The plan would be periodically revised with updated forecast data. It would be necessary to continue these revisions into the mission itself for long duration missions. LTA system 100 trajectory calculations would be based on actual forecasted wind data that resolve both spatial and temporal differences around the AOI.

Prior to doing trajectory simulations for the LTA system 100, the forecasted winds would be processed to determine if MPOC and SKC coverage patterns are feasible and if so to what extent. Computer analysis tools may be used to process historic data and forecast data to help identify and/or visualize the likely locations, times, and more importantly the altitudes by which MPOC and SKC patterns are possible, or if the mission must be accomplished with the SPC pattern. The software may analyze the raw radiosonde data using data analysis modules to determine the types of wind. The winds are characterized in 3 types: Type 0a, Type 1 and Type 2. Type 0a refers to light and highly variable winds spanning the compass within a defined region. Type 1 refers to balanced winds in both directions of zonal and meridional flow. Type 2 refers to stable, optimal zonal shear pattern winds.

The mission plan for the LTA system 100 would be finalized by performing trajectory simulations using actual forecasted wind data. These simulations would identify the coverage patterns (SPC, MPOC, and/or SKC), launch locations and timing, and approximate recovery locations and timing. The trajectory simulations employ a fourth-order Runge-Kutta integration scheme to calculate trajectory from acceleration and velocity. Wind speed and direction are linearly interpolated in time from one-time period to the next (6 hours apart), linearly in latitude and longitude, and using a continuously differentiable Akima spline in altitude. Balloon ascent and descent rates can either be assumed constant or determined through the solution of the complete set of LTA system 100 performance governing equations (force and heat balance equations). Ascent and descent commands can either be input manually (flight simulator mode) or using an auto-pilot control algorithm.

In cases where the operating altitude for the LTA system 100 over the AOI is prescribed due, for example, to specific sensor requirements, it may not be possible to use SKC even if wind conditions accommodated such an operation over the AOI. In these cases, SPC or MPOC will be used, however the principals of SKC become highly advantageous to the overall operation when the vehicle is not in the AOI. For example, the SKC wind patterns could greatly simplify SPC operations by allowing the LTA system 100 to be launched from a base or ship, navigate to the up-wind location for entering the AOI, and then ascend or descend to the over-flight operating altitude for the fly-over. Clearing the AOI, the LTA system 100 can then use the winds to maneuver within range of the landing site to potentially navigate around the AOI in an MPOC operation.

4. Wind Data Analyses

Identification of the various regions of the upper atmosphere having favorable wind conditions may be based on a variety of approaches. In some embodiments, the sensors 740 may provide data related to wind direction, temperatures, pressures, etc. that assist with determining the ideal wind conditions. In some embodiments, data from other LTA systems 100 already in flight may provide information regions with ideal wind conditions. For instance, multiple LTA systems 100 may be used in a constellation, and data gathered from each LTA system 100 may be analyzed to inform the other LTA systems 100 in the constellation of ideal wind condition locations. In some embodiments, data may be received from non-LTA system balloons that are in flight. In some embodiments, data may be received from meteorological instruments, such as from satellites or ground systems.

In some embodiments, these and/or other sources of data, in conjunction with the basic system design of the LTA system 100, may be used for achieving enhanced guidance, navigation and control (GNC) as compared to typical LTA systems. In some embodiments, such enhanced GNC is achieved by the combination of the advanced features of the LTA system 100 for rapid descent/ascent, along with analysis of a mission planning based on certain wind data. Such wind data may include data on the varying wind speeds and directions stratified within the troposphere, tropopause, and/or stratosphere. For example, at certain times of the year, and in certain locations that are less conducive to station-keeping operations, the LTA system 100 allows for constellation flight operations to maintain constant line of site with multiple tandem balloon system fly-overs. In some embodiments, this and/or other data is used to produce "wind scores" for GNC purposes.

The LTA system 100, for example the control system 1000, can analyze global winds at high altitudes, for example in the stratosphere, to determine optimal station-keeping navigation around the world and year round. The LTA system identifies long-term patterns from winds that are variable, shifting and unpredictable over the short term. In some embodiments, the LTA system 100 analyzes such data and determines over long periods that radiosonde data of winds may vary greatly only 12 hours apart in the same location, but that there are exploitable longer-term patterns that persist for days or weeks and are consistent from year to year.

The LTA system 100 and/or supporting systems such as ground stations analyzes the various data about winds and identifies corresponding GNC control algorithms and techniques for optimal flight. For instance, zonal winds (east/west) typically have a very consistent pattern over the course of a year. In many places, particularly latitudes between 20 and 60 degrees north and south, zonal winds blow predominantly in one direction at low altitudes, then cross over to the opposite direction in the lower stratosphere, then generally switch back to the original direction higher in the stratosphere. Equatorial and polar conditions can be less predictable.

Meridional winds are far more chaotic. However, some patterns are present, in two ranges. The upper range is characterized by predominantly north or south winds, with small pockets of the opposite direction interspersed unpredictably (in time and space) throughout. Within the lower range (from roughly 20 km down to the aviation restriction boundary) a condition of strong meridional wind, in one direction or another, is frequently present. Such winds may be identified that exist strongly within a particular altitude and do not change any further in the wind column downwards. The pattern may be that the winds blow north for a week, are neutral for a week, blow south for a week, and so forth. The LTA system 100 or related systems may identify or determine a signature, or fingerprint, that is fairly unique to each region based on analysis of the winds over longer periods, for instance over the course of a year. The LTA system 100 may determine that the zonal winds are fairly consistent and predictable, and the meridional winds are mostly chaotic in the upper range, with odd bands of periodic resonances (on the order of a week or so) present in the lower range. The LTA system 100, for example the control system 1000, may determine a navigational trajectory accordingly.

Trajectories for the LTA system 100 may be determined based on various wind scoring or rating approaches. One such approach is described here. Medium period wind patterns, currently defined as being significant for 12-60 hours, are particularly important when it comes to meridional navigation, since those winds shift so quickly and randomly. In this period, the GNC and related control algorithms of the LTA system 100 may analyze regions of air, not particular heights. In order to define these wind regions, the wind scoring algorithm starts with a simple weighted moving average over a set of vertical samples, which may be for example from nearby radiosonde flights, or from the LTA system 100 flight itself, such as sensors 740. The weighting may be a simple linear weight based on the distance from the center sample. Distances further than 500 meters may be ignored. A fixed window of nine samples may be used. Green regions (light and variable) are identified by having a weighted standard deviation greater than the magnitude of their mean, on both horizontal axes, across a span of altitudes. They are presently scored for their "quality" by scaling their mean winds by the ratio of their standard deviation to their mean, on each axis, and summing the two results. This emphasizes the primary importance of low mean wind magnitude, while secondarily taking into account wind turbulence, lower scores obviously making them better green regions. It is the absolute value of the mean that the algorithm is looking for, in this case. The algorithm rates these winds using a "green score," which may be determined as shown here:

$$\text{green score} = Z_{mean}\left(\frac{Z_{mean}}{Z_{std}}\right) + M_{mean}\left(\frac{M_{mean}}{M_{std}}\right),$$

$$Z_{std} > |Z_{mean}|, M_{std} > |M_{mean}|.$$

Green winds may be an optimal area to remain in for station-keeping, as it signifies a likelihood that that many wind directions can be found. Further, in this area the winds are consistently blowing at low speeds, which may be about five meters per second or less.

This is merely an example of how wind data may be analyzed and used by the LTA system 100. Other approaches may be implemented, including but not limited to those described, for example, in U.S. provisional patent application No. 62/294,204, entitled SEMI-AUTONOMOUS TRAJECTORY CONTROL FOR BALLOON FLIGHT and filed Feb. 11, 2016, the entire disclosure of which is incorporated by reference herein for all purposes. For instance, "yellow" and "blue" regions may be identified, as described therein, that omit the other horizontal axis in the calculation.

The GNC algorithm may comprise multiple layers. At the highest level, is the overall mission intent, be it station-keeping, or path control. Below that is the direction layer. The mission layer consists of an objective, and considers the present location of the balloon. The objectives can be to station-keep within a particular range, or to travel to a particular nearby location (within a few hundred kilometers; accuracy best if direction is primarily zonal). One example of a procedure is described below:

1. The mission for the LTA system 100 is planned, and long-term parameters may be set, based on observation of long-term trends. Tolerances of station keeping are specified by maximum range separately in zonal and meridional directions to accommodate the disparity in wind availability (typically much more zonal slack than meridional, as zonal position is easier to fix, and it's often necessary to drift off-center zonally in order to correct meridional position).

2. On-board system may maintain a set of wind observations, recording speed, direction, and timestamp. Some post-processing may need to be performed to clean the raw data. The sensors may be mounted to the balloon itself, and not to anything susceptible to oscillations internal to the payload support 700 and related systems. For semi-autonomous navigation of the LTA system 100 (e.g. not relying on transmitted data after launch), data store can be pre-populated with the most recent available radiosonde data.

3. Periodically, medium period zones (Green, Yellow, Blue, High, and Low) may be recalculated, based on newly gathered and binned data. The calculations are fairly simple, so should not impose too much processing load.

4. Station-keeping mission layer may proceed as follows:
  a. Initial height set to zonal floor, with no directional goal.
  b. Periodically query data store for wind availability. In North America, where/when station-keeping is possible, there will almost always be one rare wind (north or south). This is the priority wind. It will narrow the bounding box such that the system attempt to keep asymmetrically further in the direction in which the rare wind blows out of:
  c. Once target height is initially reached, if system is within horizontal bounds, preferentially drift upwards (during solar heating) or downwards (at night) towards calmest winds.
  d. If the system encounters a boundary on an axis, set main goal to the horizontal direction opposite that boundary. Prefer travel in the same vertical direction as the above case.
  e. Alter the request to the direction subsystem when direction goal changes. Direction goal is thus one of the four cardinal directions.
  f. Do not alter goal direction, until either reaching the opposite boundary, or, if out of bounds on both axes, switch priorities periodically (subject to hysteresis) to the direction furthest out of bounds.

Below that is the direction layer which has long period parameters. It must translate high-level direction goals into desired heights. It utilizes hard data to the extent it can, and shifts to heuristic data, where the hard data has expired, or where it is not available. A very simple heuristic is used to guide the balloon to the resulting altitude area, whereupon fine-tuning can be done by direct measurement. One example of the procedure is as described as follows:

1. Zonal Ceiling: Above this height, the zonal winds cross over a second time, and do not seem to change any further up, all the way to our altitude ceiling. The exact ceiling (and other floors/ceilings) can be updated in flight. May be set to 0, if unknown, in which case it is not considered.

2. Zonal Floor: Similar to Zonal Ceiling, below the zonal floor, zonal winds do not change significantly, all the way down to aviation restriction altitude (currently considered 45 k feet, or 13.7 km)

3. Zonal Wind Directions: specified as a simple set of positive or negative values indicating sign of zonal wind below the zonal floor, between the zonal floor and ceiling, and above the ceiling.

4. Meridional Floor: This is a "decision" altitude. If, on a downward excursion, the balloon has not encountered a strong (e.g., >5 m/s) meridional wind in the desired direction (i.e. not neutral, and not the opposite direction) then there's no point in traveling any further down in the pursuit of better meridional winds. The craft will have to make do with whatever north/south wind components are available above.

5. Wind Priority (optional): This can be automatically determined in flight, but is something that could be known prior to flight. East/West control is reliably present, or reliably absent. North or South may be available as well, depending on the conditions in the lower range. This leaves one direction always out, and often two. If only one wind direction is missing, it is considered the priority wind, and the system needs to spend as much time as possible in those winds, when it finds them, because they may be absent later. See description and figure above.

An objective of the algorithm may be described as follows:

1. Zonal control is cheap, where and when available. Meridional is generally fleeting.

2. Where a zonal crossover is available, green zones (ideally) or yellow zones (see zone section) as close as possible to the crossover, are the ideal place to hunt for zonal corrections, particularly if a corresponding green/yellow zone exists on the opposite side of the crossover, to toggle back and forth (avoiding excessive zonal deflection). This is because they are known to not have strong diagonal components, preventing deviation on the unintended axis.

3. By the same token, when primarily interested in large meridional corrections, blue zones of the appropriate sign are welcome. But blue zones are typically only on one side of the axis, so they are frequently of limited station-keeping use.

4. Generally, slower winds are always better for station-keeping, even if they aren't perfect, as they can be ridden for longer before requiring corrections.

The direction system attempts to maintain mission layer's direction, at the lowest possible speed. One embodiment is described here:

1. East/West goal: proceed to nearest green zone in the current direction of vertical travel. Failing that, the yellow zone with zonal winds of the appropriate direction. Failing that, the zonal boundary, stopping when the desired wind is reached in all cases. If not possible in the desired direction of travel, search in the opposite direction for all of the above. If for some reason it doesn't succeed, just go to the slowest wind region, wait some period of time, and try again.

2. North/South goal: If a North/South wind has been observed at meridional floor, and it matches what's needed, proceed directly to it. If it hasn't been observed for 72 hours, also proceed directly to it to observe it. Otherwise, the algorithm is the same as the East/West goal, except substituting "blue" for "yellow". Most likely, no good zones will be available, and the system will have to make do with what it finds, in the calmest possible regions of the wind column.

The height system translates the height request into an action for the ballast system of the compressor assembly 800 and the SPB 300 (add/remove/hold). It calculates the amount of air needed in the SPB 300 to balance out at the desired geopotential altitude, and runs the compressor 810 (or vents air ballast) until this is accomplished. When the predicted altitude is reached, additional fine-tuning may be performed, to fine-tune the direction. Wind navigation may take precedence over the mission-specified ideal altitude, in order to make the problem more tractable.

In some embodiments, various mission objectives require the LTA system 100 to maintain a presence within a particular segment or segments of the upper atmosphere. For example, the segment may be determined based on communications, line of sight, reconnaissance, or other requirements. Thus, the LTA system 100 may be required to maintain a presence in a given segment to achieve these or other objectives. The particular segment or segments may be bounded by one or more latitude and longitude coordinates, radii, and/or various altitudes. In some embodiments, the LTA system maintains a presence within such segments by use of the "barber pole" technique described above. The LTA system 100 may thus persist within the envelope shown in FIG. 12A using the various features described herein and travelling along the cyclical path described above. For instance, the valve 870 and compressor 810 may be controlled to achieve descent and ascent of the LTA system 100 at precise locations of the upper atmosphere to stay within the envelope of FIG. 12A for a prolonged period of time. In some embodiments, the LTA system 100 may cyclically travel along the same or approximately the same closed path shown in FIG. 12A. In some embodiments, the LTA system 100 may not cyclically repeat the path shown in FIG. 12A but still maintain a sufficient envelope. For example, a range of altitudes and latitude and longitude coordinates may be determined that will allow the LTA system 100 to achieve a mission objective. The LTA system 100 may then travel laterally in the upper troposphere and stratosphere along different paths for similar segments (paths $X_1$ or $X_2$) of the barber-pole cycle. Similarly, the LTA system 100 may ascend or descend through the tropopause along different paths for similar segments (paths $Y_1$ or $Y_2$) of the barber pole cycle.

The barber pole approach may be more efficient than merely ascending and descending continuously at the same or similar latitude and longitude. For instance, as mentioned, a mission objective may still be achieved despite a larger envelope in the lateral direction, which may be caused by the lateral travel of the barber pole approach, for example lateral travel along the paths $X_1$ and $X_2$. This in effect allows the ascent and decent systems to rest and not use power during the lateral segments. Thus, the LTA system 100 may maintain a sufficient envelope but with less expenditure of power for releasing or taking in air compared to other approaches. Further, identification of slow moving layers, for example by using the wind scoring techniques, may further allow for greater power savings due to slower movement in the lateral direction. Identification of slower wind layers within the tropopause may also be used for power savings, where ascent and descent rates can be slower, creating larger diameter helical paths but which are still within the desired envelope.

Figure 12B:
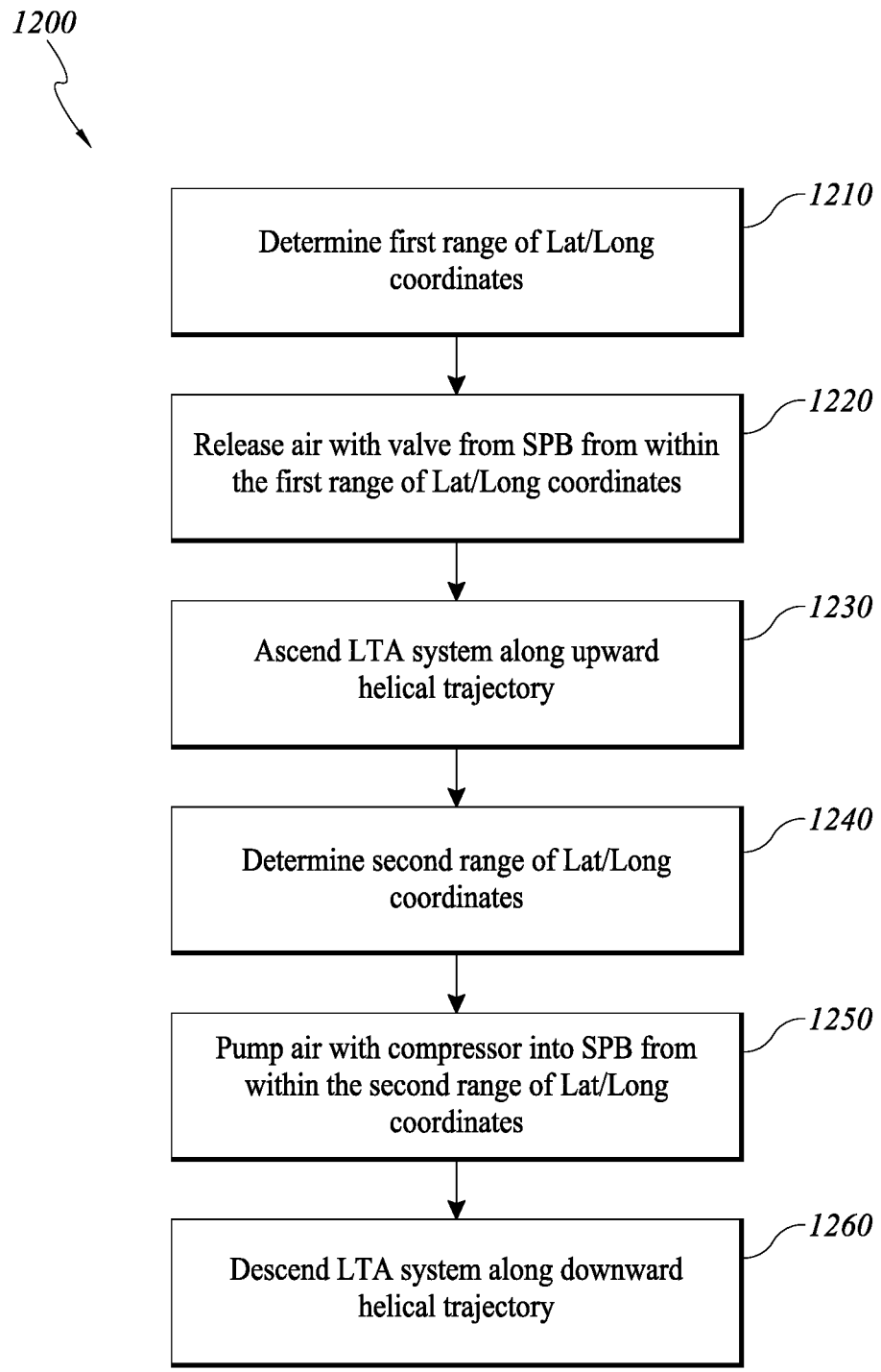
FIG. 12B is a flow chart showing an embodiment of a method for station-keeping with the LTA system of FIG. 1.

FIG. 12B is a flow chart showing an embodiment of a method 1200 for station-keeping with the LTA system 100. The method 1200 may be performed for example to achieve the persistence envelope described with respect to FIG. 12A. The method 1200 may be performed with the various LTA systems described herein, including the LTA systems 100 and 101, and other variations of those LTA systems.

As shown in FIG. 12B, the method 1200 begins with step 1210 wherein a first range of latitude and longitude coordinates are determined. Step 1210 may include determining a first range of latitude and longitude coordinates corresponding to a first portion of the tropopause having a first plurality of altitudes corresponding respectively to a first plurality of wind directions within the tropopause. Step 1210 may be performed by the control system 1000. In some embodiments, step 1210 is performed by onboard computers and/or sensors, such as the sensors 1010 and/or the supporting subsystems 1070. In some embodiments, step 1210 is performed by ground stations or other LTA systems and the coordinates are communicated to the LTA system 100. Step 1210 may involve identifying a range that includes the point K of FIG. 12A. In some embodiments, step 1210 may include moving the LTA system 100 within the first range of latitude and longitude coordinates. In some embodiments, step 1210 includes the LTA system 100 travelling in a generally horizontal first direction through the troposphere to one of the coordinates of the determined first range of latitude and longitude coordinates.

The method 1200 then moves to step 1220 wherein air is released with a valve from the SPB 300 from within the first range of latitude and longitude coordinates. Step 1220 may include release air from the SPB 300 with the valve 870 while the LTA system 100 is within the first range of latitude and longitude coordinates. Step 1220 may be performed in the upper troposphere or in the tropopause. In some embodiments, step 1220 includes controllably releasing, with the adjustable valve 870, the ambient air from the SPB 300 to ascend the LTA system 100 from the determined first range of latitude and longitude coordinates within the troposphere and through the tropopause to the stratosphere, wherein the LTA system 100 travels along a first helical trajectory through the tropopause due to the first plurality of wind directions at the first plurality of altitudes within the tropopause, wherein the LTA system 100 ascends at a plurality of ascent rates through the tropopause, and wherein at least one of the plurality of ascent rates is at least 10,000 feet per hour.

The method 1200 then moves to step 1230 wherein the LTA system ascends along an upward helical trajectory. Step 1230 includes the LTA system 100 ascending due to the release of air and the resulting lower mass of air ballast in the SPB 300. Step 1230 may include the LTA system 100 ascending along a helical trajectory through the tropopause. For example, in step 1230 the LTA system 100 may ascend along the path $Y_1$ and/or to the point L of FIG. 12A. Step 1230 may include the LTA system 100 ascending to the stratosphere.

The method 1200 then moves to step 1240 wherein a second range of latitude and longitude coordinates are determined. Step 1240 may include determining a second range of latitude and longitude coordinates corresponding to a second portion of the tropopause having a second plurality of altitudes corresponding respectively to a second plurality of wind directions within the tropopause. In step 1240 at least one of the coordinates of the first range of latitude and longitude coordinates may not be within the second range of latitude and longitude coordinates. Step 1240 may be performed by the control system 1000. In some embodiments, step 1240 is performed by onboard computers and/or sensors, such as the sensors 1010 and/or the supporting subsystems 1070. In some embodiments, step 1240 is performed by ground stations or other LTA systems and the coordinates are communicated to the LTA system 100. Step 1240 may involve identifying a range that includes the point M of FIG. 12A. In some embodiments, step 1240 may include moving the LTA system 100 within the second range of latitude and longitude coordinates. In some embodiments, step 1240 includes the LTA system 100 travelling in a generally horizontal second direction through the stratosphere to one of the coordinates of the determined second range of latitude and longitude coordinates. In some embodiments of step 1240, the second direction travelled is different from the first direction that may be travelled in step 1210.

The method 1200 then moves to step 1250 wherein air is pumped into the SPB 300 with a compressor 810 from within the second range of latitude and longitude coordinates. Step 1250 may include pumping air into the SPB 300 with the compressor 810 while the LTA system 100 is within the second range of latitude and longitude coordinates. Step 1250 may be performed in the upper troposphere or in the tropopause. In some embodiments, step 1250 includes controllably pumping, with the compressor 810, the ambient air into the SPB 300 to descend the LTA system 100 from the determined second range of latitude and longitude coordinates within the stratosphere and through the tropopause to the troposphere, wherein the LTA system 100 travels along a second helical trajectory through the tropopause due to the second plurality of wind directions at the second plurality of altitudes within the tropopause, and wherein the LTA system 100 descends at a plurality of descent rates through the tropopause, and wherein at least one of the plurality of descent rates is at least 10,000 feet per hour.

The method 1200 then moves to step 1260 wherein the LTA system descends along a downward helical trajectory. Step 1260 includes the LTA system 100 descending due to the pumping in of air and the resulting higher mass of air ballast in the SPB 300. Step 1260 may include the LTA system 100 descending along a helical trajectory through the tropopause. For example, in step 1260 the LTA system 100 may descend along the path $Y_2$ and/or to the point J of FIG. 12A. Step 1260 may include the LTA system 100 descending to the upper troposphere.

The method 1200 may be cyclically repeated in various manners. For example, multiple LTA systems 100 may be launched and flown as described in the method 1200. As further example, steps 1210 through 1260 may be repeated for maintaining the LTA system 100 within a persistence envelope, such as the envelope of FIG. 12A. In some embodiments, the method 1200 is cyclically repeated for maintaining the LTA system 100 within a persistence envelope comprising portions of the troposphere, tropopause and stratosphere, where maintaining the balloon system within the persistence envelope comprises cyclically repeating the following: i) the LTA system 100 travelling, from a starting position within the troposphere corresponding to one of the coordinates of the second range of latitude and longitude coordinates, along the generally horizontal first direction through the troposphere to a first location of the troposphere corresponding to one of the coordinates of the first range of latitude and longitude coordinates; ii) the LTA system 100 ascending from the first location of the troposphere through the tropopause along the first helical trajectory to a second location within the stratosphere; ii) the LTA system 100 travelling along the generally horizontal second direction from the second location of the stratosphere to a third location of the stratosphere corresponding to one of the coordinates of the second range of latitude and longitude coordinates; and iv) the LTA system 100 descending from the third location of the stratosphere through the tropopause along the second helical trajectory to an ending position within the troposphere corresponding to one of the coordinates of the second range of latitude and longitude coordinates.

M. Performance Simulations

The simulated performances of various embodiments of the LTA system 100 for various mission requirements were analyzed. For comparison, the same simulated performances of a "ballonet" balloon system were also analyzed. The "ballonet" system uses a super pressure balloon envelope for lift. The inside of the super pressure lifting balloon includes a second fully sealed balloon envelope, or ballonet. The ballonet is pressurized for descent and air is released form the ballonet for descent. The performance of the LTA system 100 in comparison to the ballonet system for three missions is described in this section.

1. 60,000-80,000 Feet

The first mission or simulation is a nominal altitude control range of 20,000 ft, operating between 60,000 ft and 80,000 ft. This range and altitude combination allows for access to a large variety of wind directions and speeds throughout much of the year. This type of variable wind access could allow for either a large degree of trajectory control or the possibility of station keeping over certain areas of the globe for as long as days, weeks, and in some cases even months.

To allow for initial system sizing a payload mass of 128.4 kg was assumed. This payload mass was determined by first sizing the LTA system 100 with a total ZPB 200 suspended weight capability of 250 kg. The SPB 300 envelope was sized with a maximum change in pressure ($\Delta P$) capability of 3500 Pa at a volume of 1200 $m^3$. The mass of this ballast envelope was determined to be 121.6 kg leaving the remaining 128.4 kg for the payload. This payload mass is assumed to include the mass of the compressor/vent system, the power system, the flight avionics, and the mission specific payload and instrumentation. The ballonet system does not require a tandem balloon so was sized to be able to lift the 128.4 kg payload to the maximum float altitude with a maximum super pressure capability of 1200 Pa. For this simulation the compressor 810 and power subsystem was assumed to be the same for both systems in order to remove it as a variable and to force a closed design for the ballonet system. Accordingly, it was sized to deliver a maximum discharge pressure of 3500 Pa at 350 liters/second at all the target altitudes. The vent architectures between the two systems, however, were sized differently to account for the large difference in the ballast balloon volumes. For the LTA system 100 architecture, a vent diameter of 50 mm was assumed and for the large ballonet architecture a vent diameter of 150 mm was assumed. Table 2 summarizes the two system designs used for simulation #1.

TABLE 2

Simulation #1 altitude control system parameters of LTA system 100 versus ballonet system.

| Parameter | LTA System 100 | Ballonet System |
|---|---|---|
| Mass of Helium at Launch (kg) | 58 | 98 |

TABLE 2-continued

Simulation #1 altitude control system parameters
of LTA system 100 versus ballonet system.

| Parameter | LTA System 100 | Ballonet System |
|---|---|---|
| Mass of Helium Vented (kg) | 5 | 0 |
| Volume of Lift Balloon (m3) | 15052 | 10033 |
| Mass of Lift Balloon (kg) | 77 | 432 |
| Mass of Ballast Balloon (kg) | 121.6 | 25 |
| Payload Mass (kg) | 128.4 | 128.4 |
| Total System Mass (kg) | 327 | 585.4 |

The flight simulation for this first simulation was run for 96 hours and had several different altitude inputs. Initially both systems were taken to their maximum float altitude of 80,000 ft., and then altitude change inputs were commanded as follows: Hour: 2, Altitude: 80,000 ft.; Hour: 21, Altitude: 60,000 ft.; Hour: 30, Altitude: 80,000 ft.; Hour: 48, Altitude: 60,000 ft.; and Hour: 55, Altitude: 80,000 ft.

For the LTA system 100, only a low amount of free lift (5%) is required for nominal flight operations. However 10% to 15% free lift may be required to penetrate the cold temperatures of the troposphere and ascend to the nominal float altitude. For the purposes of this simulation the excess lift gas is being dumped passively by allowing the balloon system to ascend early in the flight when solar heating causes the lift gas to expand the ZPB 200 envelope to its maximum design volume. Gas that expands beyond this volume is vented from the ZPB 200 by design. Because of its passive nature this is a conservative approach to venting the excess lift gas. However, in some embodiments, actively opening a valve located near the top of the ZPB 200 may also accomplish this task, thereby avoiding the early high altitude maneuver if required. The ballonet approach also requires 10% to 15% free lift for initial ascent, but all the lift gas is retained for nominal operation.

The performance summary for simulation #1 is shown in Table 3. Some conclusions that can be drawn from simulation #1 are that if the same compressor characteristics are assumed for both systems, the LTA system 100 architecture has more than double the descent rate of the ballonet system, while at the same time requiring less than half of the cumulative volume of atmospheric air to be pumped into the ballast tank, and therefore less than half of the total power usage. In addition, the same LTA system 100 configuration can cover a total altitude range of about 65,000 ft., which is more than double that of the ballonet system used in this simulation. The ballonet system, however, is more stable at a given altitude than is the LTA system 100 architecture, but also requires 68% more lift gas.

TABLE 3

Simulation #1 performance summary of LTA
system 100 versus ballonet system.

| Parameter | LTA System 100 | Ballonet System |
|---|---|---|
| Maximum Ascent Rate (fph) | 3300 | 3300 |
| Maximum Descent Rate (fph) | 5600 | 1700 |
| Altitude Stability (+/− ft.) | 450 | 50 |
| Compressor Volume Pumped (liters) | 9,200,000 | 19,200,000 |
| Compressor ON time (hrs.) | 7.3 | 15.2 |
| Energy (kW-h) | 7.3 | 15.2 |
| Max Altitude Range (Δft) | 65,000 | 30,000 |

In particular, the resulting analysis of simulation #1 showed that the LTA system 100 requires active control of the SPB 300 pressure over a wider range of differential pressures during operations than the ballonet system. This is required to both maintain altitude during solar fluctuations when the lift balloon increases and decreases in volume as well as to actively change altitude when commanded. Additionally, to perform the proscribed maneuvers the LTA system 100 requires a higher differential pressure than the ballonet system because of the significantly smaller size of its ballast tank. The LTA system 100 requires a maximum ΔP of 3500 Pa to perform rapid descents from 80,000 ft. down to 60,000 ft., however most of the operational time the system requires less than 3000 Pa for operation. The ballonet in contrast only requires a maximum ΔP of ~500 Pa to perform operations, however its operational response time is much, much slower because of the length of time necessary to transfer the amount of air required for altitude adjustment into or out of the ballast tank. In other words, for the descent maneuvers in particular, even though the ballast tank holds more pressure than is used, there is not enough time to add the additional ballast before the next ascent command is given. Ascent maneuvers also take place much more slowly with the ballonet system than the LTA system 100 because so much more ballast must be vented to enable ascent.

The resulting analysis of simulation #1 also showed that, even with the continuous, small SPB 300 pressure adjustments required for stable altitude retention, the LTA system 100 requires less than half of the overall air volume to be pumped, as compared to the ballonet system, over the duration of the mission (9.2 million vs 19.2 million liters). This was also with significantly improved ascent and descent rates for the LTA system 100. Less total pumped volume equates to less total 'pump-on' time of the compressor 810 and therefore less overall power required.

A final metric that can be pulled from the two designs compared in this simulation is the maximum total altitude changes the systems, as designed, are capable of performing. This was done by iterating the mission with lower and lower target altitudes until control authority was eventually lost. The LTA system 100 used for Simulation 1 is capable of descending in altitude to 20,000 ft. (total altitude change capability of ~65,000 ft) in comparison to the ballonet system which is only capable of descent to 50,000 ft. (total altitude change capability of ~30,000 ft). Because of the ballonet ballast tank total differential pressure limitation of 1200 Pa, the ballonet system loses control authority over the altitude much earlier than does the LTA system 100.

2. 85,000-95,000 Feet

The second mission or simulation was developed to look at altitude control system limitations for higher altitude use than that chosen for Simulation #1. Accordingly, a nominal range of 85,000 ft. to 95,000 ft. was chosen. The primary driver for this simulation was to determine any performance limitations when scaling the systems to allow for higher altitudes and larger payloads versus the performance examined at the more favorable altitudes for station keeping and trajectory control used in the first simulation. For the sake of comparability between simulations the same payload mass (128.4 kg) was used to size both systems for this simulation as was used in simulation #1. Additionally, the same power and compressor system, capable of delivering a maximum discharge pressure of 3500 Pa at 350 l/s, was used and the vent architectures were sized for each system as with the simulation #1. The ZPB 200 envelope of the LTA system 100 was sized to have maximum volume at 100,000 ft. to allow for the same high altitude excess free lift dump maneuver as was used early in the mission for simulation #1, however the same simulation #1 ballast tank parameters were retained (3500 Pa maximum differential pressure at 1200 m³). The challenge for the ballonet system was then to size it to be able to lift the 128.4 kg payload to the maximum float altitude. This required a significant increase in lift balloon size (from 10033 m³ to 43187 m³) while simultaneously keeping the overall mass as low as possible. This was done by reducing the material thickness as much as possible, however this also resulted in a reduction of the maximum differential pressure capability of the balloon from 1200 Pa to 900 Pa. Table 4 summarizes the two system designs used for simulation #2.

TABLE 4

Simulation #2 altitude control system parameters of LTA system 100 versus ballonet system.

| Parameter | LTA System 100 | Ballonet System |
|---|---|---|
| Mass of Helium at Launch (kg) | 70 | 132 |
| Mass of Helium Vented (kg) | 8 | 0 |
| Volume of Lift Balloon (m3) | 29562 | 43187 |
| Mass of Lift Balloon (kg) | 138 | 565 |
| Mass of Ballast Balloon (kg) | 121.6 | 65 |
| Payload Mass (kg) | 128.4 | 128.4 |
| Total Mass (kg) | 388 | 758.4 |

The flight simulation for simulation #2 was run for 96 hours, as with simulation #1, to compare the performance of both systems. Both systems were initially commanded to the maximum float altitude and then were commanded to follow a specific altitude profile as follows: Hour: 2, Altitude: 95,000 ft.; Hour: 21, Altitude: 85,000 ft.; Hour: 55, Altitude: 95,000 ft.; Hour: 72, Altitude: 85,000 ft.; Hour: 84, Altitude: 95,000 ft.

The performance summary for simulation #2 is shown in Table 5. For Simulation #2, again with the same compressor characteristics used for both systems, the LTA system 100 architecture demonstrated a much higher descent rate than the ballonet system and still required less total 'pump on' time and power usage. It must also be taken into account that the second altitude descent for the ballonet system was not fully completed in the time required, thus allowing for less 'on time' than the mission parameters nominally called for. Recall also that the design solution for the ballonet system used for this simulation represents a design solution that likely doesn't close because of its sheer size and complexity. Also, as noted in simulation #1, the stability of the ballonet system is greater than that of the LTA system 100 system, which is seen to become more unstable than observed at the lower altitude simulation. Further, note that an extensibility comparison to examine the maximum altitude change each system could achieve was not performed for this simulation, but is addressed in simulation #3 which uses the same general systems designs. This simulation #2 clearly demonstrates that the ballonet system cannot adequately control altitude at high operating altitudes. Attempts to increase the descent rate for the ballonet system causes the design solution to diverge—the super pressure balloon size of the ballonet system and structural requirements grow with the larger compressor and power system mass, leading to a larger super pressure balloon in the next iteration, and so on with increasing divergence in each iteration.

TABLE 5

Simulation #2 performance summary of LTA system 100 versus ballonet system.

| Parameter | LTA System 100 | Ballonet System |
|---|---|---|
| Maximum Ascent Rate (fph) | 5700 | 5600 |
| Maximum Descent Rate (fph) | 10000 | 600 |
| Altitude Stability (+/− ft.) | 150 | 50 |
| Compressor Volume Pumped (liters) | 32,600,000 | 34,500,000 |
| Compressor ON time (hrs.) | 25.9 | 27.4 |
| Energy (kW-h) | 25.9 | 27.4 |
| Max Altitude Range (Δft) | 75,000 | 17,500 |

In particular, the ballonet system is more stable at a given altitude than is the LTA system 100, however the ballonet system also requires much, much more time to respond to altitude adjustments. In particular, the maximum descent rate for the ballonet system was only about 600 ft./hr., whereas the maximum descent rate for the LTA system 100 was close to 10,000 ft./hr., or about 16.5 times faster. Further, the LTA system 100 once again utilized its maximum ΔP of 3500 Pa, however the ballonet system was only able to use 400 Pa of the 900 Pa limit because of the massive volume of the ballast tank in comparison to the volume flow rate of the compressor 810. Also, the LTA system 100 requires fewer total liters pumped (32,600,000 liters versus 34,500,000 liters), although at less of a difference than in simulation #1, but with significantly improved ascent and descent rates.

3. 85,000-95,000 Feet with Normalized Compressor

For simulations #1 and #2 above, a common compressor and power system was utilized in order to remove these as variables for the sake of comparison. However, the flow rate limitation of 350 liters/second limited the ascent and decent rate achievable by the ballonet system. Therefore, for simulation #3, the ballonet system from simulation #2 was altered to include a hypothetical 3,500 liter per second (lps) compressor (ignoring the volume, mass, and power requirements such a 10× system might have) in order to compare the LTA system 100 and ballonet system with more normalized or even performance characteristics. The original compressor assumptions were retained for the LTA system 100. Thus, the only change made between simulations #2 and #3 were to the assumed pump performance capabilities, and system parameters are the same as shown in Table 5.

The results showed that the 10× enhanced compressor system used for the ballonet system produced ascent and descent rates much closer to the LTA system 100 performance characteristics than simulations #1 and #2. However, as mentioned, the 10× compressor capability of the ballonet is unrealistic for practical implementation and is used for analysis only. With this enhancement came a substantially reduced 'pump on' time for the ballonet system, however it had to move ten times the air in that time period which still required more power than the same LTA system 100 architecture as simulations #1, #2 and #3. Further, once again the LTA system 100 was able to demonstrate a substantially larger overall altitude range than the equivalent ballonet system. However, the ballonet system was again superior in its ability to hold a stable altitude because of its constant overall volume.

In particular, for simulation #3 several conclusions can be drawn with regards to the use of the theoretical 3,500 lps pump system as part of the ballonet architecture. First, it performs extremely smoothly with altitude ascents and descents that rival the LTA system 100 architecture while maintaining altitude consistently through diurnal cycling, as was the intent of this exercise. Second, the ballast tank pressure only increases to 460 Pa. However, while the system performance is enhanced, it also requires more cumulative compressor air volume pumped over the course of the operational simulation than does the equivalent LTA system 100 system, which equates to more power required. This is true despite the fact that the actual "on" time for the ballonet pump is considerably less (3.1 hrs) than for the LTA system 100 architecture (25.9 hrs).

Further, the same extensibility exercise was performed with simulation #3 as was undertaken for simulation #1. For each system the altitude was iteratively decreased from the maximum float altitude until control authority was lost over the balloon and it was no longer able to function at the commanded altitude. The results showed that the LTA system 100 is capable of descending in altitude to 20,000 ft. for an overall maximum altitude change capability of about 75,000 ft. The ballonet system, in comparison, is only capable of descent to 77,500 feet, or a total altitude change of 17,500 ft. Below this altitude the ballonet system lift balloon begins to hit its maximum pressure capability and, in the simulation, lift gas is vented to prevent the balloon from bursting. With these observations it can be concluded that even with an unrealistically enhanced compressor and power system that would allow it to match the performance characteristics of the LTA system 100 architecture at altitudes between 85,000 ft. and 95,000 ft., the ballonet system can really only function reliably at or near the mission specific altitudes that allow for taking full advantage of variable winds for steering.

4. Summary of Simulations #1, #2 and #3

Simulation #2 provides the clearest demonstration of the system level impact of controlling altitude at higher altitudes. As operating altitude requirements are elevated into the 29 km (95,000 ft.) altitude range, it becomes more difficult (energetically and mechanically) to change altitude with a ballonet system because air density logarithmically decreases with altitude. This requires the ballonet compressor to pump larger volumes of lower density air in order to compress the lift gas as well as the ballast air into the one large super pressure balloon with an air ballonet. Sufficiently pressurizing the large ballonet balloon to get useful descent rates of about 2 km/h (109 feet per minute) also imparts hoop-stress structural loads on the large super pressure ballonet balloon that significantly exceed current designs and materials. Furthermore, once the ballonet system reaches the target operating altitude, it is trapped with no real ability to descend. Using the same compressor and power system, the LTA system 100 has an average descent rate of 3.05 km/h (167 feet per minute) whereas the ballonet system can only achieve 0.18 km/h (10 feet per minute).

Further, the use of a ballonet system for these missions is unrealistic as the design of a useful ballonet system operating at 29 km (95,000 ft.) does not close. Achieving a useful descent rate requires a compressor capable of 10× the flow rate used in the example above. Such a large compressor and power system for the ballonet system causes the super pressure balloon volume to grow dramatically at the high altitude, which drives up the compressor and power system mass as well as the hoop-stress in the super pressure balloon, further causing the design to diverge. By only actively compressing ballast air in a small separate balloon, as in the SPB 300 of the LTA system 100, the compressor 810 and power system mass readily closes for the LTA system 100 altitude control system.

Based on the comparative simulations performed in this study the LTA system 100 altitude control system is superior in three important metrics used to rate the performance of the two systems: Ascent/Descent Rate, Altitude Range and Power Consumption. However, because of its constant volume architecture, the ballonet system has the advantage in altitude stability.

In particular, the ascent/descent advantage goes to the LTA system 100 architecture because it is a lower mass system and therefore requires a comparatively smaller ballast tank, i.e. the SPB 300, than the ballonet system. With existing, state of the art compressor technology the SPB 300 of the LTA system 100 can simply be pressurized at a faster rate. As simulation #3 demonstrated, even with the ballonet system having a compressor flow rate at ten times that of the LTA system 100 compressor 810, the ascent and descent rates of the ballonet system were still less than the LTA system 100 architecture.

The altitude range advantage also goes to the LTA system 100 architecture because it has a lower overall system mass and is therefore more greatly affected by the ballast in the SPB 300. The SPB 300 volume is also not structurally tied to the ZPB 200 lifting balloon and can therefore be designed to any volume necessary to accomplish mission parameters. On the other hand, because it is so structurally tied to the mechanical properties of its super pressure lift balloon, the ballonet system can only accept so much volume increase before it challenges the structural integrity of the lift balloon envelope. The ballonet system architecture does not close for useful altitude control rates operating near the 29 km (95,000 ft.) altitude range.

Further, because the SPB 300 of the LTA system 100 can pressurize and depressurize much more quickly than the ballonet ballast tank, the LTA system 100 architecture also has the advantage in terms of overall power usage for the same mission parameters at lower altitudes.

However, the results also showed that the LTA system 100 architecture does fall short of the ballonet system performance in terms of altitude stability. Because the ZPB 200 required for the LTA system 100 architecture changes volume in response to the ever changing solar heating cycle, the pressure of the SPB 300 must be continually adjusted in order to hold altitude. In contrast, the ballonet system for lift uses a super pressure balloon, which is not subjected to volume change due to solar heating and cooling. Even with the constant, small compressor inputs required by the LTA system 100 for altitude stability, however, it has been shown that the LTA system 100 architecture requires less power than the ballonet approach. However, due to the wind analyses performed it was determined that the stability of the LTA system 100 system met the requirements of the system to remain within a particular wind layer.

N. Continuous Multi-Chamber Super Pressure Balloon

The various LTA systems and other features described herein may use one or more of various embodiments of a multi-chamber super pressure balloon (SPB). The multi-chamber SPB may be a continuous multi-chamber SPB, as further described. Such balloon systems are sometimes referred to as Variable Altitude Air Ballast Balloon Systems (VAABBS). Some example embodiments have been described above, for example, with respect to FIGS. 9C-9E. Described herein are further non-limiting examples of designs, systems and methods for multi-chamber SPB's, such as configurations, methods for constructing and using multi-chamber SPB's, and other features.

The various embodiments of the multi-chamber SPB described herein may be used with any of the systems, devices or methods shown in and/or described with respect to FIGS. 1-12B, and vice versa. For example, various embodiments of the multi-chamber SPB may be used with the LTA systems 100, 101, 102, 103 or 104, and vice versa.

Figure 13D:
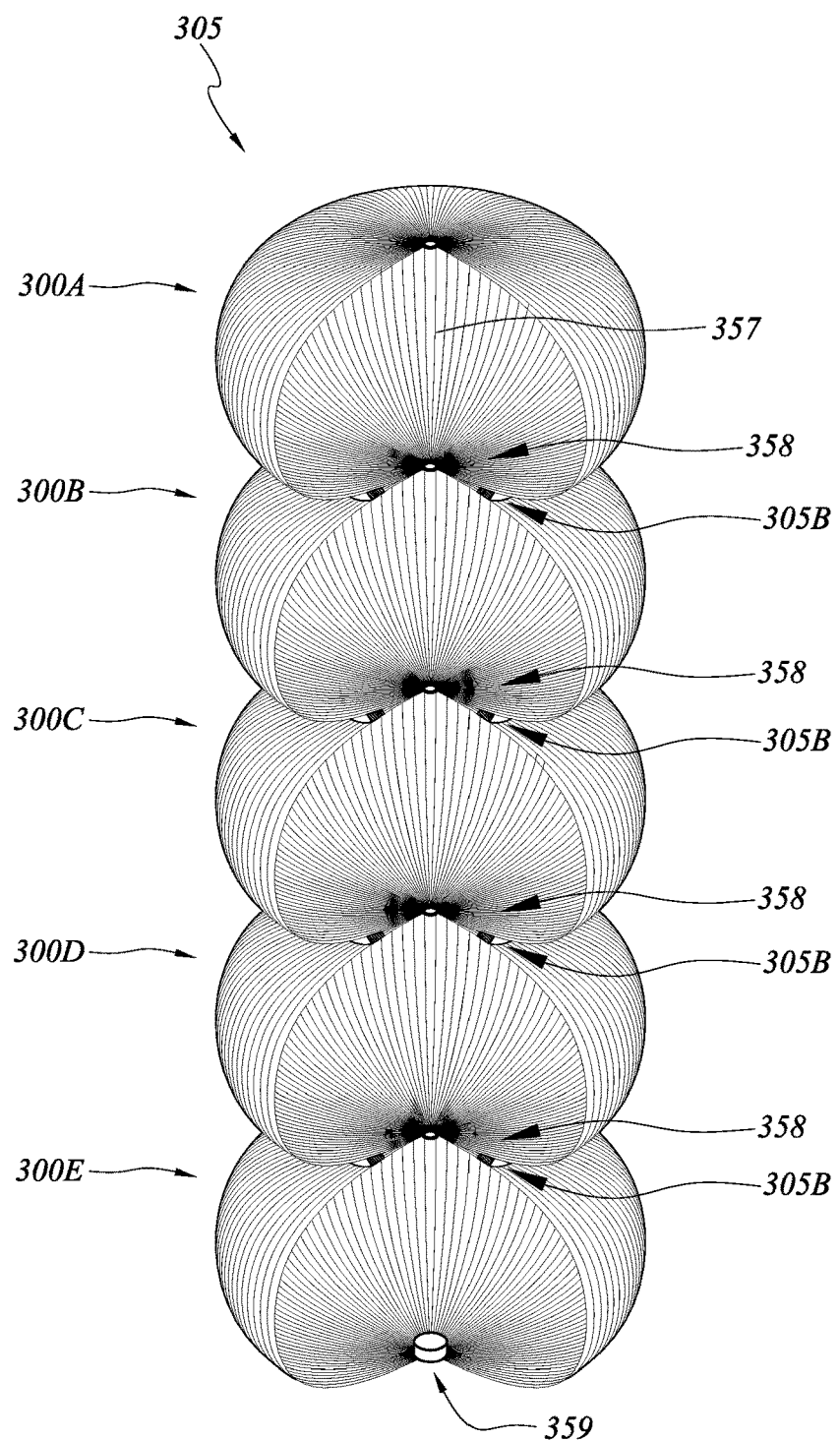
FIG. 13D is a partially broken perspective view of an embodiment of a continuous five-chambered SPB having first, second, third, fourth and fifth SPB chambers arranged axially and with four waist fittings.

FIGS. 13A-13C depict LTA systems having an SPB 300 with one or more chambers. FIG. 13D depicts an SPB 305 having five chambers, which may be used with an LTA system or by itself. These are example applications of continuous multi-chamber SPB's, which may be pumpkin-shaped as shown, air ballast tanks for the Variable Altitude Air Ballast Balloon System (VAABBS) with the Zero Pressure balloon (ZPB) 200 providing lift and a payload supported below the SPB 300. The payload for the LTA systems 106A, 106B, 106C may be part of the stratocraft 400, as described above.

A multi-chamber SPB 300 may scale optimized pressure vessels, such as super pressure (SP) vessels, to effect desired changes in altitude of LTA systems across a large range of altitudes. The following embodiments or examples show various arrangements, features, etc. of some embodiments of the multi-chamber SPB 300. Some examples show SPB chambers 300A, 300B, 300C fluidly connected to each other establishing large volumes in which a Differential Pressure (DP) can be achieved through pumping ambient or stored air with a compressor. Multi stage compressors, such as those described herein, may also be utilized to achieve higher DP.

The multi-chamber SPB may include various advantageous features. For example, waist fittings, inner bladders, skin film additives protecting against Ultra Violet radiation, high density light weight batteries, and other features may be implemented. These and other advantageous features may be used in the various multi-chamber SPB's described herein to achieve superior results. For instance, various new demands of stratospheric capable platforms, in general a multitude of Balloon Control Methods and stratospheric balloon configurations, are feasible. The following describes some embodiments and discusses some of the relative merits of each, including for example in the areas of flight performance, launch methods and manufacturing.

In some embodiments, multiple chambers of an SPB 300 may be used instead of attempting to build a single larger SPB that may be limited by limits of materials and technology. A "chamber" may refer to a single compartment of a continuous multi-chamber SPB. "Chamber" may also refer to a single SPB fluidly separated from one or more other SPB's. Multi-chamber SPB's may allow for more easily staying within the limits of the various materials due to the smaller size of each chamber relative to an equivalent larger, single chamber SPB. Two or more chambers may allow for a fixed performance that scales linearly as chambers are added. Multi-chamber SPB's may carry lift gas (e.g. Helium or Hydrogen), a mix of lift gas and ballast gas (e.g. air), or just ballast gas, as further described. A multi-chamber SPB may be paired with a lift gas-filled Zero Pressure Balloon (ZPB) that can be separate from or fluidly connected with the SPB.

FIG. 13A is a side view of an embodiment of an LTA system 106A with an SPB 300 having a single SPB chamber 300A. FIG. 13B is a side view of an embodiment of an LTA system 106B with a two-chambered SPB 300 having a first SPB chamber 300A and a second SPB chamber 300B. FIG. 13C is a side view of an embodiment of an LTA system 106C with a three-chambered SPB 300 having a first SPB chamber 300A, a second SPB chamber 300B, and a third SPB chamber 300C. In some embodiments, the SPB 300 may have four, five, six, seven, eight, nine, ten or more chambers.

The SPB chambers 300A, 300B, 300C may have the same or similar features and/or functionalities as other SPB's and/or chambers described herein, for example shown in and described with respect to FIGS. 1, 3A-4B, and 9A-12B, and vice versa. The chambers 300A, 300B and/or 300C may be aligned axially as shown, which may be referred to as a "tandem" configuration. In some embodiments, one or more chambers may be configured laterally, as further described. The chambers may be formed from continuous gores, as further described. For example, the SPB chambers 300A and 300B in FIG. 13B may be formed from continuous gores that extend from an upper portion, for example a top or apex of chamber 300A, to a lower portion, for example a bottom or nadir, of chamber 300B. For example, the SPB chambers 300A, 300B and 300C in FIG. 13C may be formed from continuous gores that extend from an apex of chamber 300A to a nadir of chamber 300C. More than three chambers may be formed in this manner. Further, the multi-chamber SPB 300 may be supplied with ambient air via one or more compressors, such as the compressor 810 and/or compressor assembly 810 described herein. The compressor(s) may be located with the payload support 700, as described herein, and be fluidly connected with one or more of the chambers of the SPB 300.

In some embodiments, the chambers 300A, 300B and/or 300C may be modular such that one or more chambers may be added to and/or removed from an existing LTA system. For example, the SPB chamber 300B may be added to the LTA system 106A to form the LTA system 106B. For example, the SPB chamber 300C may be added to the LTA system 106B to form the LTA system 106C. More modular chambers may be added in this manner. In some embodiments, chambers may be manufactured with connector fittings configured to attach to other connector fittings in order to modularly stack the chambers. For example, "middle" chambers, chambers not located on the top or bottom ends of the multi-chamber SPB, may be outfitted with top and bottom connector fittings configured to attach to an adjacent connector fitting. "End" chambers, on the top and/or bottom end of the multi-chamber SPB, may be outfitted with one end having a connector fitting and the opposite end having an end fitting. Thus, two end chambers and one or more middle chambers may be assembled as needed for a particular mission. The end chambers may be flipped around to serve as top or bottom chambers as needed. In some embodiments, male connector fittings threadingly engage with female connector fittings. In some embodiments, connector fittings are connected together with fasteners, seals, etc.

The SPB 300 may include one or more rings or waist fittings 305B. The waist fitting 305B may be located at or near a waist 311A (see, for example, FIG. 14D) of the SPB 300. The waist 311A may be a portion of the gores 325A, skin and/or other features of the SPB 300 that is located between two adjacent chambers of the SPB 300. As shown in FIG. 13B, the waist 311A may be located between the SPB chamber 300A and the chamber 300B. There may be multiple waists 311A for a single SPB 300. As shown in FIG. 13C, a first waist 311A may be located between the SPB chamber 300A and the chamber 300B, and a second waist 311A may be located between the SPB chamber 300B and the chamber 300C. The waist 311A may be a location of minimum width of the SPB 300. The waist 311A may have a diameter that is smaller than the diameter of adjacent portions of the SPB 300. The waist 311A may be a "thinner" portion or portions of the SPB 300. The waist 311A is described in further detail herein, for example with respect to FIG. 14D.

The waist fitting 305B may have the same or similar features and or functionalities as the fittings described herein, for example the fitting 305A and/or the various fittings described in the section "BALLOON FITTINGS", and vice versa. The fitting 305B may be a structural element circumferentially surrounding the waist of the SPB 300 to provide structural support and allow fluid to flow between the various chambers 300A, 300B and/or 300C, as further described. The fitting 305B may be a circumferential constriction of the SPB. The fitting 305B may include a ring body extending circumferentially about a central axis and defining an opening therethrough along the axis, the fitting configured to be positioned around the waist 311A with the continuous envelope (e.g. gores 325A, etc.) extending through the opening of the fitting 305B.

Such multi-chamber SPB's 300 as in LTA system 106B and 106C may facilitate achievement of advanced performance targets. For example, to reach design goals such as with the VAABBS, described for example in U.S. Pat. No. 9,540,091, titled "HIGH ALTITUDE BALLOON SYSTEMS AND METHODS" and issued Jan. 10, 2017, the entirety of which is incorporated herein by reference, as the system gets larger there may not be a singular pumpkin ballast balloon that achieves the desired performance targets without either reaching a strength limitation or a stability limitation (e.g., s-clefting). When that limitation is reached, one design choice is to turn to stacking (or otherwise arranging) multiple pumpkin balloons or balloon sections such as chambers. A single size pumpkin may structurally deform, for example by s-clefting, whereas the smaller chamber design prevents or at least mitigates the risk of such deformations, failures, etc. A continuous multi-chamber design and construction method may be efficient mass-wise and for manufacturing, among other advantages.

The two-chamber SPB 300 of LTA system 106B may allow for a heavier payload that fits in the stratocraft 400, or instead it may allow the LTA system 106B to be more responsive in its altitude changing performance. The three-chamber SPB 300 of LTA system 106C (which may still use the same compressor as the 2-chamber version) may permit configuration for a larger payload carried by the stratocraft 400.

In some embodiments, there may be four or more chambers. For example, FIG. 13D is a perspective view of an embodiment of a five-chambered SPB 305. The SPB 305 may include the same or similar features and/or functionalities as other SPB's described herein, and vice versa. The SPB 305 may include first through fifth chambers 300A, 300B, 300C, 300D, and 300E. The chambers 300A, 300B, 300C, 300D, and 300E may include the same or similar features and/or functionalities as other chambers described herein, and vice versa. In some embodiments, the SPB 305 may include fewer or greater than five chambers. The chambers may be positioned axially. Waist fittings 305B may be included at the waist portions of the SPB 305 located between adjacent chambers, for example between chamber 300A and 300B, etc. As shown, there are four waist sections each having the waist fitting 305B. There may be a base 359, which may be an end fitting as described herein. In some embodiments, there may be one or more interface fittings 358 at upper or lower portions of one or more of the chambers. The chambers may be individual, fluidly separate and distinct pumpkins joined at common interface fittings 358. In some embodiments, some or all of the chambers may be fluidly connected. An interior volume 357 may extend throughout the length of the SPB 305 into each chamber. The volume 357 may instead be a separate compartment within each chamber. Gores 325A may extend along one or more of the chambers. The gores 325A may extend along an entire length of the SPB 305, such as from the first chamber 300A to the fifth chamber 300E. The gores 325A may be formed of smaller length subunits that form the larger gores 325A.

The various embodiments of the SPB's having multiple chambers may include chambers with a variety of sizes, shapes and configurations. For instance, there may be many smaller-sized chambers attached together, in series, parallel, other configurations, or combinations thereof. For example, there may be two, three, four, five, six, seven, eight, nine, ten, eleven, twelve, thirteen, fourteen, fifteen, sixteen, seventeen, eighteen, nineteen, twenty, thirty, fifty, one hundred, or any other number of chambers. For example, the chambers may have maximum widths when inflated in the range from about two feet to about two hundred feet, from about five feet to about one hundred fifty feet, from about ten feet to about one hundred feet, from about fifteen feet to about seventy five feet, from about twenty feet to about fifty feet, or other ranges or sizes.

In some embodiments, multiple chambers may be provided with pressurized air via a single compressor inlet or valve in one or more of the chambers. In some embodiments, a tube may extend from the compressor through each of the chambers, for example axially through the chambers. The tube may have openings at or near each chamber to provide pressurized air directly to each chamber. In some embodiments, each chamber or groups of multiple chambers may be fluidly separated from one or more other chambers, for example to mitigate the risk of puncture or otherwise failure of one or more of the chambers to perform its function as securing pressurized air therein. For example, a tube may extend from a compressor to each chamber and have ports along the tube to provide pressurized air to one or more chambers. The tube ports may include valves. The chambers may include valves located between adjacent chambers to control the movement of pressurized air between the chambers. For example, if one chamber is punctured or otherwise fails, that chamber, or a group of chambers including that chamber, may be sealed off from the other chambers to isolate the malfunction and allow the other chambers to successfully operate. The chamber or group of chambers may be sealed off with valves, with fluidly separated chambers such as with a barrier, etc. The valves or barriers may be located at one or more waists formed by the multiple chambers.

In some embodiments, the multi-chamber SPB 300 may include one or more sections that provide a "sausage-like" configuration to the SPB at least when inflated. The SPB 300 may include a continuous envelope, e.g. formed from gores 325A and/or other features. The continuous envelope may be "continuous" as described herein, for example extending substantially uninterrupted along its length. The continuous envelope may include a first section such as the first chamber 300A, a second section such as the second chamber 300B, and a third section such as the waist 311A. The first, second and third sections may be configured to extend axially along a central axis with the third section located between the first and second sections, and the third section having a smaller maximum inflated width than each of the first and second sections. A circumferential constriction such as the waist fitting 305B may be included that is configured to extend around the continuous envelope between the first and second sections. A plurality of tendons 330A, 300B may be configured to extend from the circumferential constriction and around the continuous envelope to bias the first and second sections into respective first and second pumpkin shapes when the continuous envelope is inflated. In some embodiments, there may be four or more wider sections, two or more thinner sections, two or more constrictions, etc.

The sections, e.g. the chambers 300A, 300B, 300C, may have various geometries. An aspect ratio of one or more of the sections may be defined as the ratio of the maximum width to maximum height of the section when inflated. The aspect ratio may be from about 0.25 to about ten, from about 0.5 to about five, from about one to about four, from about two to about three, about one, about two, about three, about four, about five, one, two, three, four, five, or any other smaller or larger range or amount. Thus the particular shapes and configurations for the multi-chamber SPB's shown and described in detail herein are examples only, and many other geometries may be implemented that are within the scope of the description.

FIG. 14A is a side view of the two-chambered SPB 300 of the LTA system 106B. FIG. 14B is a side view of the three-chambered SPB 300 of the LTA system 106C. FIG. 14C is an embodiment of a gore 325A, shown in a flat configuration, from the two-chambered SPB 300 of the LTA system 106B.

As shown in FIG. 14A, the SPB chamber 300A may include an upper portion 310A and a lower portion 315A. The SPB chamber 300B may include an upper portion 310B and a lower portion 315B. The upper portions 310A, 310B and lower portions 315A, 315B may have the same features and/or functionalities as respectively the upper portion 310 and lower portion 315 described herein. The SPB 300 may include a plurality of tendons 330A and 300B, gores 325A, and bulges 340A and 340B. The tendons 330A and 300B, gores 325A, and bulges 340A and 340B may have the same or similar features and/or functionalities as other tendons, gores and bulges described herein, such as respectively the tendons 300, gores 325, and bulges 340, and vice versa.

The gores 325A may extend downward from the upper portion 310A. For example, the gores 325A may extend downward from an apex of the SPB chamber 300A. The gores 325A may extend downward from an apex fitting 314A. The gores 325A may extend continuously from the upper portion 310A of the first SPB chamber 300A to the lower portion 315B of the second SPB chamber 300B. For example, the gores 325A may extend to a nadir fitting 314B. The gores 325A may extend from the upper portion 310A, through the fitting 305B at the waist 311A, and to the lower portion 315B. It is understood that "extending from" is not meant to imply a direction but rather that the gores 325A extend between and/or to the aforementioned locations.

The tendons 330A may extend downward from the upper portion 310A. The tendons 330A may extend downward from an apex of the SPB chamber 300A. The tendons 330A may extend downward from an apex fitting 314A. The tendons 300A may extend to the lower portion 315A. The tendons 300A may extend to the waist fitting 305B located at the waist of the SPB 300. The tendons 330A may terminate at the fitting 305B. In some embodiments, one, some or all of the tendons 300A may continue downward from the fitting 305B to the SPB chamber 300B, for example to the lower portion 315B, nadir, and/or nadir fitting 314B of the SPB chamber 300B.

The tendons 330B may extend upward from the lower portion 315B. The tendons 330B may extend upward from the nadir of the SPB chamber 300B. The tendons 330B may extend upward from the nadir fitting 314B. The tendons 300B may extend to the upper portion 310B. The tendons 300B may extend to the waist fitting 305B located at the waist of the SPB 300. The tendons 330B may terminate at the fitting 305B. In some embodiments, one, some or all of the tendons 300B may continue upward from the fitting 305B to the SPB chamber 300A, for example to the upper portion 310A, to the apex of the chamber 300A, and/or to the apex fitting 314A. As shown, the tendons 330A extend between the apex fitting 314A and the fitting 305B, and the tendons 330B extend between the nadir fitting 314B and the fitting 305B.

The fittings 314A and 314B may be located respectively on the top and bottom of the multi-chambered SPB. The apex fitting 314A and/or the nadir fitting 314B may have the same or similar features and/or functionalities as other fittings described herein, such as the apex 313 described herein for example with respect to FIG. 4B-4C, and/or the interface 1700 or fitting assembly 1801, 1802 described herein for example with respect to FIGS. 19A-19E.

The waist fitting 305B may be located between the chamber 300A and 300B. An example single chamber SPB may have an inflated volume of 1,803 cubic meters and have the same maximum tendon tension load of 1,520 lbs at 3,500 Pascal differential pressure (DP). For an equivalent multi-chamber SPB 300, an efficient example for the performance figure of merit R=(DP×Volume/Gross mass) may be with a fitting 305B having a radius of 4.0 meters or about 4.0 meters.

The width of the waist of the multi-chamber SPB 300 may be referred to as a junction diameter. The junction diameter between the two (or more) merged chambers is a variable that can be experimented with until the performance ratio R={Differential Pressure×Tank Volume/Gross dry mass} is maximized or otherwise optimized. In some cases, the performance ratio is maximized when the junction diameter is from about 35-55%, from about 40-50%, at about 46%, or 46% of the maximum chamber diameter. The fitting 305B experiences a large tensile force. In some embodiments, the fitting 305B experiences about 54,530 lbs of tensile force. In some embodiments, the fitting 305B may be a rope ring that is sized for Dyneema (ultra-high molecular weight polyethylene) rope that is about 4,596,000 denier (~1" diameter rope, 12.8 kg). This may be the equivalent of using 29×3/16" diameter Dyneema cords.

In some embodiments, the waist fitting 305B is a structural fitting, such as a structural ring or rings. Such fitting may take advantage of the continuous gores 325A to use a modified end fitting in place of for example, a rope ring or rope belt, to constrain the junction or waist between the chambers. The radius of a structural fitting 305B may be considerably smaller than that which would be applicable using the rope ring or rope belt method. Such structural fitting 305B may constrain the junction of the super pressure pumpkin balloons at the point where the "hour glass" shape is created by closely tailoring gores. Furthermore the structural fitting 305B would be retained in place using the tendons 330A, 330B from the upper and lower chambers 300A, 300B. This example configuration can also be constructed as a single structure by heat sealing the gore pattern continuously at the juncture where the fitting 305B would constrict the shape, producing an hour-glass shaped gore pattern.

As shown in FIG. 14B, the SPB 300 includes the plurality of tendons 330A and 300B as well as tendons 300C, the gores 325A, and the bulges 340A and 340B as well as bulges 340C. The tendons 330C and bulges 340C may be used on the chamber 300C. The tendons 330C and bulges 340C may have the same or similar features and/or functionalities as other tendons and bulges described herein, such as respectively the tendons 300, 330A, 330B and the bulges 340, 340A, 340B, and vice versa.

The tendons 330C may extend upward from the nadir of the SPB chamber 300C. The tendons 330C may extend upward from the nadir fitting 314C which in the three-chambered SPB 300 is located on the nadir of the chamber 300C. The tendons 300C may extend from the nadir of the chamber 300C to the waist fitting 305B located at the lower waist of the SPB 300. The tendons 330C may terminate at the fitting 305B. In some embodiments, one, some or all of the tendons 300C may continue upward from the fitting 305B to the upper fitting 305B and/or to the apex of the chamber 300A, for example to the apex fitting 314A. As shown, the tendons 330A extend over the chamber 300A between the apex fitting 314A and the upper fitting 305B, the tendons 330B extend over the chamber 300B between the upper fitting 305B and the lower fitting 305B, and the tendons 330C extend over the chamber 300C between the lower fitting 305B and the nadir fitting 314B. The various tendons 330A, 330B, 330C of the two- and three-chambered SPB's 300 bias the skin of the respective chambers into a pumpkin shape, as described herein.

As shown in FIG. 14C, the gore 325A from the two-chambered SPB 300 of FIG. 14A is shown in a flat configuration. The gore 325A has a first end 326A and extends to a second end 326B. The first end 325A may be located at or near an upper portion, such as the apex or top, of the chamber 300A when assembled with the multi-chambered SPB 300. The second end 325B may be located at or near a lower portion, such as the nadir or bottom, of the chamber 300B when the gore 325A is assembled with the multi-chambered SPB 300.

The gore 325A includes a first wide portion 327 on the same end as the first end 326A and a second wide portion 329 on the same end as the second end 326B. The first and second wide portions 327, 328 increase in width from their respective ends and then decrease in width toward a center portion 328. The center portion 328 may be a thinner portion of the gore 325A. When the gore 325A is assembled with the multi-chambered SPB 300, the center portion 328 may be located at or near the waist of the multi-chambered SPB 300, the first wide portion 327 may be located at the first chamber 300A, and the second wide portion 329 may be located at the second chamber 300B. The middle portion 328 may be located at or near the halfway point between the first and second ends 326A, 326B, for example with a multi-chambered SPB 300 that is symmetric or approximately symmetric about a plane that intersects the waist and/or the waist fitting 305B (e.g. horizontal as oriented in the figure and at the waist fitting 305B).

In some embodiments, the middle portion 328 may not be located at or near the halfway point between the first and second ends 326A, 326B, for example with a multi-chambered SPB 300 that lacks the symmetry as described. For example, the chamber 305B may be larger than the chamber 305A, or vice versa.

The gore 325A may be continuous from the first end 326A to the second end 326B to at least partially form a continuous envelope. "Continuous" as used here may refer to a single piece of material that forms the entire gore 325A, or it may refer to multiple pieces of material connected together to form the gore 325A. The gore 325A may extend continuously from the lower portion, such as the nadir or bottom, of the SPB 300 for example from the nadir fitting 314B, to the upper portion, such as an apex or top, of the SPB 300 for example to the apex fitting 314B. The gore 325A, such as the center portion 328, may extend axially or generally axially at a location that is radially inward of the fitting 305B, such as through an inner opening defined by the fitting 305B. In some embodiments, the gores 325A may extend axially and through the fitting 305B. The gore 325A may extend from near the lower portion to the upper portion, such as when an annular piece and/or end fitting is used at the apex and nadir, as described herein.

The gores 325A may therefore form the chamber 300A and the chamber 300B. Multiple gores 325A may be assembled together, e.g. heat-sealed, such that adjacent edges of the first wide portions 327 are assembled together to form the chamber 300A, adjacent edges of the center portions 328 are assembled together to form the waist, and adjacent edges of the second wide portions 329 are assembled together to form the chamber 300B.

In some embodiments, the gore 325A may be separate portions that are connected to the waist fitting 305B and at the respective apex and nadir of the SPB 300. For example, the gore 325A may comprise first and second separate pieces that are connected at respective locations to form the chambers 300A, 300B.

The gore 325A may be used to form the two or three-chamber SPB 300 as well as SPB's with four or more chambers. A corresponding number of the wide portions 327, 329 and center portion(s) 328 may be incorporated for such multi-chamber SPB's. For example, a three-chamber SPB 300 may be formed with the gore 325A having three wide portions and a thinner center portion between the first and second wide portion and between the second and third wide portion. The three wide portions may form the chambers 300A, 300B, 300C and the two wide portions may form the two waists 311A Thus the design can be scaled to accommodate SPB's with three, four or more chambers.

The continuous gore 325A design provides many advantages. For example, it may eliminate the need for attachments of the gores between the chambers 300A, 300B, 300C. Space and weight may be saved to allow for use of the waist fitting 305B instead. The manufacturing may be easier as the continuous multi-chamber pumpkin SPB 300 is made as one assembly instead of multiple independent balloons that then have to be connected together for example with interface fittings. There may be a greater volume to mass ratio as compared to connecting independent pumpkins, for example maximizing or optimizing at a 46% neck as described. It may also allow for larger volumes for the air ballast tank, which may give better altitude performance, while avoiding structural deformations such as global shape instability, e.g. s-clefting.

Figure 14D:
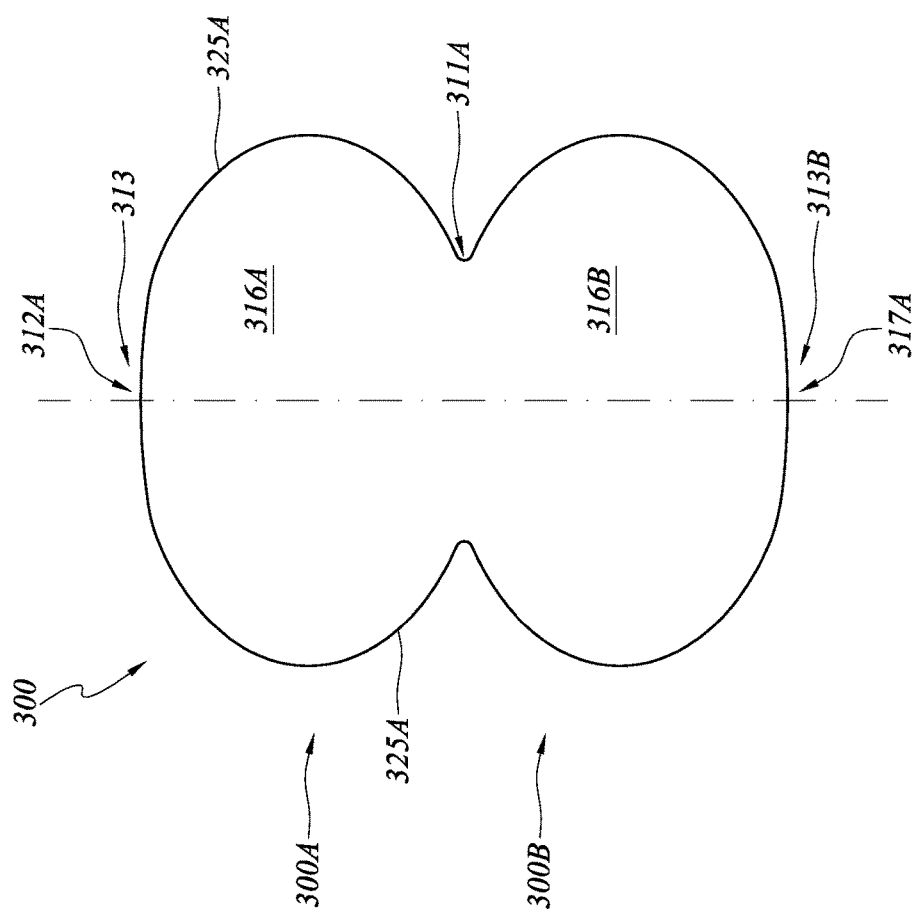
FIG. 14D is a cross-section view of the two-chambered SPB of FIG. 13A taken along the line 14D-14D as indicated in FIG. 14A.

FIG. 14D is a cross-section view of the two-chambered SPB 300 of the LTA system 106B taken along the lines 14D-14D as indicated in FIG. 14A. The apex and nadir fittings 314A, 314b are removed for clarity. An SPB 300 with three or more chambers may include the same or similar features and/or functionalities as described with respect to the cross-sectional view of the two-chambered SPB 300 of FIG. 14D.

As shown in FIG. 14D, the SPB 300 has a waist 311A. The various waists described herein for multi-chamber SPB's may have the same or similar features and/or functionalities as the waist 311A, and vice versa. The waist 311A is located between the upper chamber 300A and the lower chamber 300B. The waist 311A may be located halfway or about halfway axially between a top 312A and a bottom 317A of the SPB 300, and/or between an apex 313 and a nadir 313B of the SPB 300. In some embodiments, the waist 311A may be located more or less than halfway between the top 312A and the bottom 317A of the SPB 300 and/or more or less than halfway between the apex 313 and the nadir 313B of the SPB 300. The top 312A and the bottom 317A may have the same or similar features and/or functionalities as respectively the top 312 and the bottom 317 described herein, and vice versa. The apex 313 may be as described herein, for example with respect to FIG. 4B. The nadir 313B may have the same or similar features and/or functionalities as respectively the nadir described herein, for example with respect to FIG. 3A, and vice versa.

The waist 311A may be formed by the gores 325A that form the chambers 300A, 300B. The waist 311A may be a location of minimum width, e.g. diameter, of the SPB 300. The waist 311A may inflate to have an inflated waist width that is smaller than the maximum inflated widths of one or more, or each, of the adjacent two chambers 300A, 300B. The inflated waist width may be a minimum width of the portion of the continuous envelope that includes the waist 311A. The widths of the chambers and waist(s) 311A may be measured approximately horizontal as oriented in FIG. 14D. The widths of the chambers and waist(s) 311A may be measured perpendicularly to the central axis of the system, such as the axis 105 (see, e.g., FIGS. 9C-9E). These maximum widths may be located approximately halfway along an axial length of the respective chamber or waist, or in other locations. The waist 311A may be an inflection point of the envelope formed by the gores 325A. For example, along an axial direction, the envelope at the waist 311A may extend radially inward toward the central axis and then extend radially outward away from the axis. The waist 311A may form a sharp or rounded inner projection of the SPB 300. The waist 311A may have a number of other configurations, such as circular, rounded, segmented, other shapes, or combinations thereof.

The waist 311A may include adjacent portions of the upper and lower chambers 300A, 300B. In some embodiments, the waist 311A may be reinforced, for example with additional gore material, fabric, thicker skin section, fittings, protective coatings or materials, other suitable features, or combinations thereof. In some embodiments, the waist 311A may include such features to accommodate receiving the waist fitting 305B thereon. The waist fitting 305B may be placed over the end of the uninflated or partially inflated SPB 300 and be located at the waist 311A of the SPB 300. The SPB 300 may then be fully or more inflated to secure the waist fitting 305B at the waist 311A. The waist 311A may or may not contact an inner side of the fitting 305B. The waist 311A may contact upper and lower portions of the fitting 305B, for example where the upper and lower chambers 305A, 305B extend over the fitting 305B and contact it on upper and lower sides of the fitting 305B. The fitting 305B provides a structural support and reinforcement for the SPB 300 by receiving and supporting the outward forces of the balloon skin envelope due to inflation of the SPB 300.

The SPB 300 includes a first interior volume 316A inside the first chamber 300A. The SPB includes a second interior volume 316B inside the second chamber 300B. The volumes 316A, 316B may be interior spaces configured to receive air and/or other gases therein. The volumes 316A, 316B may be in fluid communication with each other, such that fluid for example air may freely travel between the volumes 316A, 316B. The volumes 316A, 316B may be fluidly connected between the waist 311A. This area may be open as shown. Thus volumes 316A and 316B may be portions or areas of the same single large interior volume of the SPB 300. In some embodiments, the volumes 316A, 316B may be connected by a fluid connection such as a conduit etc. at this location, as further described herein for example with respect to FIGS. 15D-15E. In some embodiments, the volumes 316A, 316B may be fluidly separated for example with a barrier or valve cutoff in a fluid connection, as further described.

Figure 15C:
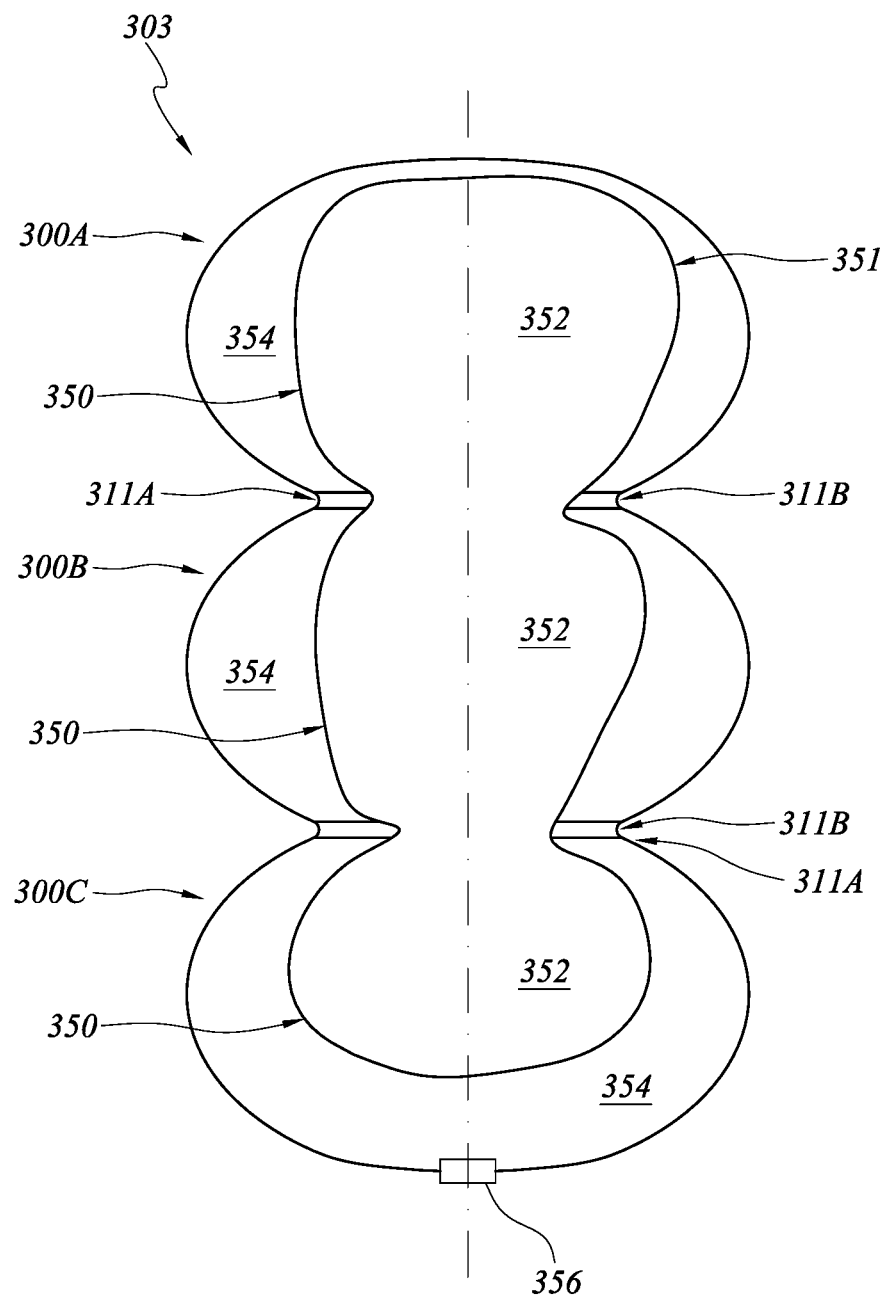
FIG. 15C is a cross-section view of an embodiment of a continuous three-chambered SPB 300 having two internal air compartments separated by a bladder.
Figures 15D, 15E:
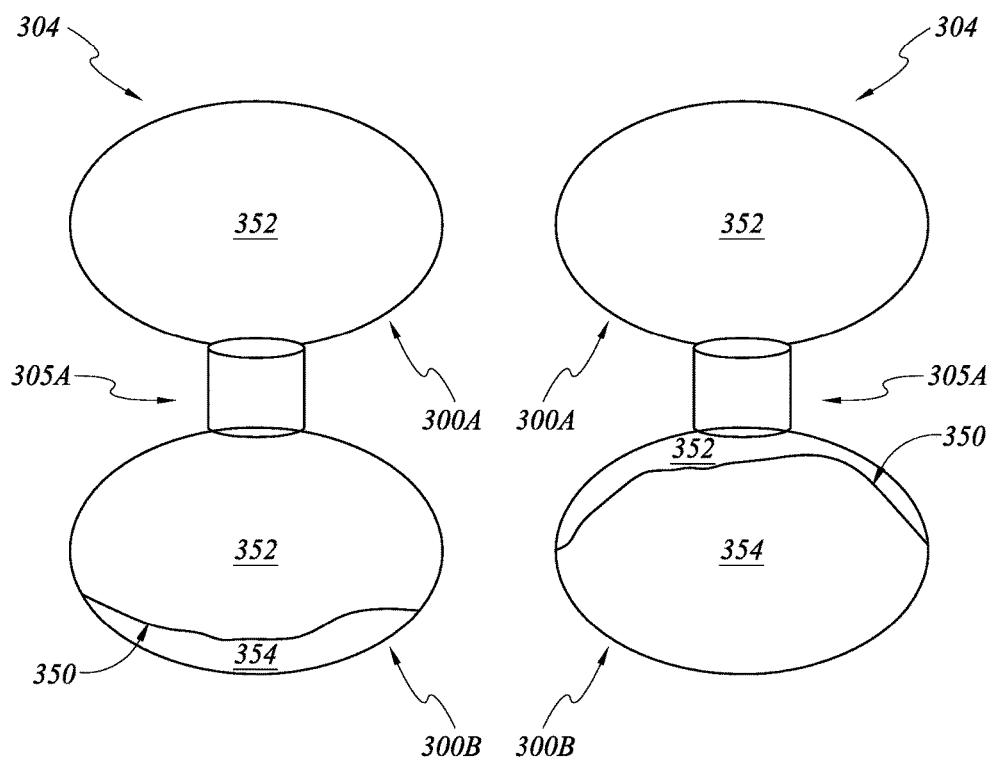
FIGS. 15D and 15E are cross-section views of an embodiment of a continuous two-chambered SPB having two internal air compartments separated by a bladder and shown, respectively, with the bladder in a first and second configuration.

FIGS. 15A-15E depict various embodiments of multi-chamber SPB's having various embodiments of a barrier. FIGS. 15A and 15B are cross-section views of an embodiment of a two-chambered SPB 300 having a barrier 350 shown in two different configurations. FIG. 15C is a cross-section view of an embodiment of a three-chambered SPB 300 having a barrier 351. FIGS. 15D and 15E are cross-section views of an embodiment of a two-chambered SPB 304 having the barrier 350.

The various configurations with the barrier 350 may be used as a regenerative air ballast system. The system and related methods may include a continuous multi-chambered SPB with the barrier 350 forming an internal air ballast bladder. In some embodiments, there are may be multiple, e.g. two, super pressure ballonets utilizing a single compressor. The systems and methods described herein allow for greater air ballast mass achieved without violating the largest possible diameter (and thus hoop stress of mass optimized balloon material) of an SPB ballonet.

In some embodiments, the high altitude balloon systems can include a single envelope with a "sausage" configuration and venting to adjust air pressure for buoyancy. The balloon can also be a series of ballonets (balloons with internal bladders that fluidly couple to ambient air) arranged in a constellation. This may allow a higher differential pressure to be realized for the given volume without incurring the s-cleft global shape instability. Some embodiments may also include a blimp or ballonet configuration. In this configuration a flexible bladder or barrier may freely expand and contract with changes in pressure.

As shown in FIGS. 15A and 15B, the SPB 302 may include the chambers 300A and 300B with the waist 311A. The SPB 302 may include the same or similar features and/or functionalities as the other SPB's described herein, such as the SPB 300, 301, etc., and vice versa. The SPB 302 includes the barrier 350. The barrier 350 may be a flexible inner separator located within the SPB 302. The barrier 350 may be elastic. In some embodiments, the barrier 350 may stretchable to accommodate higher pressures. With increasing pressure, the barrier 350 may expand or stretch, and then with decreasing pressure the barrier 350 may contract. The barrier 350 may be formed from the same or similar materials as the skin of the SPB 302. The barrier 350 may be formed from different materials as the skin of the SPB 302. The barrier 350 may connect at or approximately at an inner side of the waist 311A, as shown. The barrier 350 may connect circumferentially around the inner side of the waist 311. In some embodiments, the barrier 350 may connect in other places, such as within one or both of the chambers 300A, 300B. The barrier 350 may be a flat or generally flat material configured to conform to the surfaces to which it is to be attached within the SPB 302. In some embodiments, the barrier 350 is formed with gores or other portions to cause the barrier 350 to take the general shape of a bag. The barrier 350 may be flexible such that changing pressures on either side of the barrier 350, or a pressure differential, will cause the barrier to change configurations. The barrier 350 may be an open configuration as shown, such as a layer. The barrier 350 may include one or more layers. There may be one or more barriers 350. In some embodiments, the barrier 350 may form a closed shape, as further described herein.

The barrier 350 provides a fluid barrier within the SPB 302. The barrier 350 thus prevents or reduces the flow of fluid such as air through the barrier 350. The barrier 350 may be sealingly connected along the edge to the inner surface of the SPB 302 and therefore separate the inner volume of the SPB 302 into two fluidly separate inner compartments. As shown, the barrier 350 may separate the SPB 302 into a first compartment 352 and a second compartment 354. The compartments 352, 354 may be fluidly separated by the barrier 350. The first compartment 352 may include compressed lift gas. The second compartment 354 may include compressed ballast air.

The SPB 302 may take in or expel external ambient air to add or remove ballast air. A compressor 356 may be used to provide or remove air to the SPB 302. The compressor 356 may be similar to the compressors described herein. The compressor 356 may be located at or near the lower end of the SPB 302 as shown. In some embodiments, the compressor 356 may be included with the stratocraft 400 as described herein and be fluidly connected with the compartment 354 via a hose or tube. The compressor 356 may provide pressurized air into the compartment 354. The increasing pressure in the compartment 354 may cause the barrier 350 to move upward as oriented. The SPB 302 is shown in a first configuration in FIG. 15A and a second configuration in FIG. 15B. The barrier 350 may be in a loose configuration in FIG. 15A, and be biased toward the configuration of FIG. 15B due to the intake of pressurized air into the compartment 354.

FIG. 15B shows the barrier 350 located within the chamber 300A. The compartment 354 may be pressurized to cause the barrier 350 to take this or other configurations. The pressure of ballast air in the compartment 354 may exceed the pressure of the lift gas within the compartment 352. This may accumulate ballast in the form of compressed atmospheric gases. Such mass accumulation increases system density and contributes to descent of the LTA system.

The barrier 350 in turn expands and by doing so decreases the volume of the compartment 352 in which lift gases reside. The change in volume of the compartment 352 of the structure results in pressurization of the lift gas removing part of its capacity to provide free lift to the entire system. The overall effect of the compressor 356 acting on atmospheric gases and pressurizing the compartment 354 is to affect a mass change of the entire system which results in a commanded descent.

The air may be vented out from the compartment 354 to release ballast air, causing the pressure within the compartment 354 to drop and causing the barrier 350 to move downward as oriented. The overall volume of the SPB 302 will remain the same, but the volumes of the compartments 352, 354 may change as the barrier moves. The air may be vented out of the compartment 354, as described herein.

The barrier 350 may be incorporated with multi-chamber SPB's having three or more chambers. For example, the compartment 352 or 254 may be expanded by adding an additional chamber on the top or bottom as desired. In some embodiments, the two-chamber SPB 302 may be duplicated such that there are four chambers, For example, a first SPB 302 may be stacked on top of a second SPB 302, where the first and second SPB's 302 would be fluidly separated from each other but have the internal barrier within each, as described. A hose or tube could extend to the upper SPB 302. Thus, the configurations shown are merely some examples of the possibilities with these features, and many others not explicitly described herein are within the scope of this disclosure.

FIG. 15C depicts a cross-section of an embodiment of a three-chamber SPB 303. The three-chamber SPB 300 of FIG. 14B may be modified into the super pressure blimp three-chamber SPB 303. As shown in FIG. 15C, the barrier 350 may extend within the three chambers 300A, 300B, 300C to define an inner compartment 352 and an outer compartment 354. The inner compartment 352 may include compressed lift gas. The inner compartment 352 may be a closed compartment, for example a continuous and sealed off bag formed by the barrier 350. Thus, the barrier 350 in this embodiment may be a closed volume. There may be a valve to allow for receiving lift gas inside the compartment 352 and then sealing the internal volume. The compartment 352 may reside within the outer compartment 354. The outer compartment 354 may include compressed air as described above, for example from compressor 356.

The barrier or barriers 350 may form a closed envelope 351. The envelope 351 may be located inside the outer continuous envelope that is formed by the gores 325A. The envelope 351 may define and separate the inner compartment 352 from the outer compartment 354. The envelope 351 may extend between one or more chambers, e.g. the envelope 351 may occupy space within the chamber 300A, 300B and/or 300C. The envelope 351 may extend continuously between chambers. In some embodiments, the envelope 351 may be formed of discrete and/or separate compartments, for example with fluidly separated compartments located within a respective chamber. The envelope 351 may have the same or similar features and/or functionalities as the barrier or barriers 350 described herein, and vice versa.

There may be one or more gas connections 311B between adjacent chambers 300A, 300B and chambers 300B, 300C. The connection 311B may be coaxial. The connection 311B may allow for fluid to travel between adjacent chambers within the outer compartment 354 and outside of the barrier 350. The connections 311B may protrude radially inwardly at or near the waists to provide a structural attachment for the barrier 350 and/or to provide for fluid passage between the chambers within the compartment 354. In some embodiments, the connections 311B may not be included. In some embodiments, lift gas bag restraints may be used to reduce or prevent "corking-up." The restraints may for example prevent the barrier 350 containing the compressed lift gas from corking-up the air passage between adjacent chambers and within the compartment 354 by form-fitting on the upper surface of each chamber 300B, 300C. In some embodiments, a two-chamber SPB may use this type of internal "peanut" or closed volume formed by the barrier 350.

The SPB 302 or 303, whether two-, three- or more-chambered, may have some or all of the following features: a continuous multi-chamber super pressure balloon of "n" chambers; chamber with an internal bladder that is fluidly connected to all "n" chambers; chambers that are fluidly connected to one or more compressors; where multiple discrete iterations are connected in series (multiple multi-chamber SPB's chained together); a zero-pressure lift balloon is uppermost in the stack; and chambers oriented vertically, horizontally, or combination of horizontal and vertical.

In some embodiments, there may be lift gas within all of the chambers, such as SPB 303. The SPB 302 or 303, whether two-, three- or more-chambered, may have some or all of the following features: a Zero Pressure Balloon (ZPB) fluidly connected to "n" vertically or axially oriented SPB's; one or more compressors and/or valves act to compress lift gas from the ZPB and store in the SPB chambers effecting a change in density of the system and thus a change in altitude; the arrangement of SPB chambers may have a compressor between the ZPB and the SPB and/or between each SPB chamber; one or more SPB's may also be attached fluidly to a separate compressor to provide additional changes in vehicle density.

In some embodiments, various ballonet systems may include the same or similar features and/or functionalities as described with respect to FIG. 15C. This embodiment may be described as a "peanut within a peanut." Another example embodiment includes the continuous multi-chambered (CMC) Super Pressure Blimp described in FIGS. 15A and 15B.

The continuous multi-chambered super pressure design may allow for high volumes and thus a greater mass of compressed air to serve as ballast. By placing another continuous multi-chambered super pressure balloon around the first while maintaining the fluid connection of lift gas between chambers, the advantages of the systems described herein may be achieved with a reduced flight train. This may be of advantage, for example, where rapid deployment is required or launch area is constrained such as from a ship at sea.

The embodiments with the barrier 350 may provide several advantages, including but not limited to: eliminates the end fittings between fluidly separated SPB tanks and instead uses the circular outer fitting 350B which saves mass; the manufacturing is easier as the continuous multi-chamber pumpkin is made as one assembly, not multiple independent balloons that then have to be connected with interface fittings; a greater volume to mass ratio as compared to connecting independent pumpkins, for example in some versions maximizing at a 46% neck but for manufacturing ease and little loss of efficiency can neck down to 18% in some versions; and allows larger volumes for the air ballast tank (which gives better altitude performance) while avoiding the global shape instability known as s-clefting.

FIGS. 15D and 15E are schematics showing an embodiment of a multi-chamber SPB 304 having two SPB chambers 300A, 300B which are shown as pumpkin SPB's, and used as a ballonet. In some embodiments, a stacked ballonet system may be incorporated. Two ballonet systems may be fluidly interconnected, as shown in FIGS. 15D and 15E. The lower chamber 300B has the flexible barrier 350 installed which fluidly separates a portion of the volume of chamber 300B from chamber 300A. The barrier 350 may be connected within the chamber 300B, for example along an inner surface of the skin or gores that form the chamber 300B. The barrier 350 may be connected at or near the middle portion of the chamber 300B as shown. In some embodiments, the barrier 350 may be connected at other locations within the chamber 300B.

The chambers 300A, 300B are fluidly connected by the fitting 305A between the two (e.g., the barrier 350 creates a ballonet in SPB 2). The fitting 305A may be the same or similar as described, for example, with respect to FIGS. 9C-9E, and may allow for fluid to travel between the chambers 300A, 300B within the compartment 352. The compartment 352 may include lift gas and may extend from within the chamber 300A, through the fitting 305A, to a portion of the chamber 300B located above the barrier 350.

There is gas in each chamber 300A, 300B. The chamber 300A holds a lighter than air (LTA) lift gas (e.g., helium and/or hydrogen), and chamber 300B below the demarking flexible barrier 350 contains air, which may be drawn in and pressurized by a compressor. Air is more dense than LTA lift gas, and by varying the amount of air below the barrier 350, the overall density of the entire balloon system can be varied, thereby providing the ability to vary the buoyancy of the balloon system and to provide altitude control.

FIG. 15E depicts the barrier 350 in a configuration with more pressure within the compartment 354 relative to the configuration of FIG. 15D. FIG. 15D shows the system in a state where lift gas has expanded to occupy substantially all or most available volume in the chambers 300A, 300B through the fitting 305A. The compartment 354 has not been pressurized. This configuration may represent the configuration required to ascend through the atmosphere and reach a point of equilibrium whereby ascent would cease and the system would attain a float altitude, for example above 70,000 ft.

In order to descend the vehicle, atmospheric gases pressurize the compartment 354 within the chamber 300B. The compartment 354 may be pressurized with a compressor, for example attached to the chamber 300B and fluidly connected to the compartment 354. The integrity of the chamber 300B may enable the density of atmospheric gases (air) within the compartment 354 to increase and thus change the buoyancy of the entire system effecting a descent of the entire system.

The flexible barrier 350 within the chamber 300B demarking the boundary between air and lift gas would expand, as shown in FIG. 15E. This may conform or nearly conform to the inner shape of the chamber 300B and further compress the lift gas in the fluidly connected chamber 300A. This may reduce the effectiveness of the lift gas and assist the increase in density and thus descent of the entire vehicle.

The various multi-chamber SPB's described herein may include one or more of the following features: a lift balloon (LB) anchored by a Super Pressure Ballonet Balloon (SPBB) such as those described with respect to FIGS. 15A-15E; a L/B anchored by one or more SPBB's; a compressor is fluidly connected to one or more of the SPB chambers; the L/B is a SPB, for example having compartmentalized lift gas therein; the L/B is a zero pressure balloon (ZPB) such as the ZPB 200; one or more lift balloons (ZP or SP) are anchored by one or more SP ballast balloons such as the SPB 300, 301 and/or one or more SPBB's such as the SPB 302, 303, 304 or 306; one or more of the balloons are connected to a flight train such as the stratocraft 400; and/or one or more balloons are fluidly connected to the compressor assembly 800 or compressor 810.

FIG. 16A is a side view of an embodiment of a two-chambered SPB 306. As shown in FIG. 16A, in some embodiments, a two-chamber arrangement may be incorporated in parallel. The two chambers 300A, 300B may be served by one compressor 356. This may include a rigid structure to separate the two chambers 300A, 300B. Two supports 360 may extend from the compressor 356 or a support structure thereof, with each support 360 respectively extending to the chamber 300A and 300B. Two fill tubes 362 may extend along each support 360 from the compressor 356 to each of the chambers 300A, 300B. In some embodiments, additional chambers may be added. For example, three or more chambers may be connected to the single compressor 356 with the support ladder 360 and compressor fill tube 362 extending to each chamber. There may be three, four, five, six, seven, eight, nine, ten or more chambers and corresponding number of supports 360 and fill tubes 362. As the number of chambers increases, one or more additional compressors 356 may be used. For example, there may be one compressor 356 for every two or three chambers.

The SPB 306 may include one or more of the barriers 350. As shown the chambers 300A, 300B may each include the barrier 350. The barrier 350 may be used within each chamber as described herein. Thus, in each chamber 300A, 300B, the compressed air may fill a lower compartment below the barrier 350 while lifting gas occupies the upper compartment above the barrier 350, etc. In some embodiments, the chambers 300A, 300B may not include the barrier 350 and may only provide a variable ballast function. In such embodiments, a lifting balloon such as the ZPB 200 may be included above the chambers 300A, 300B.

Figure 16B:
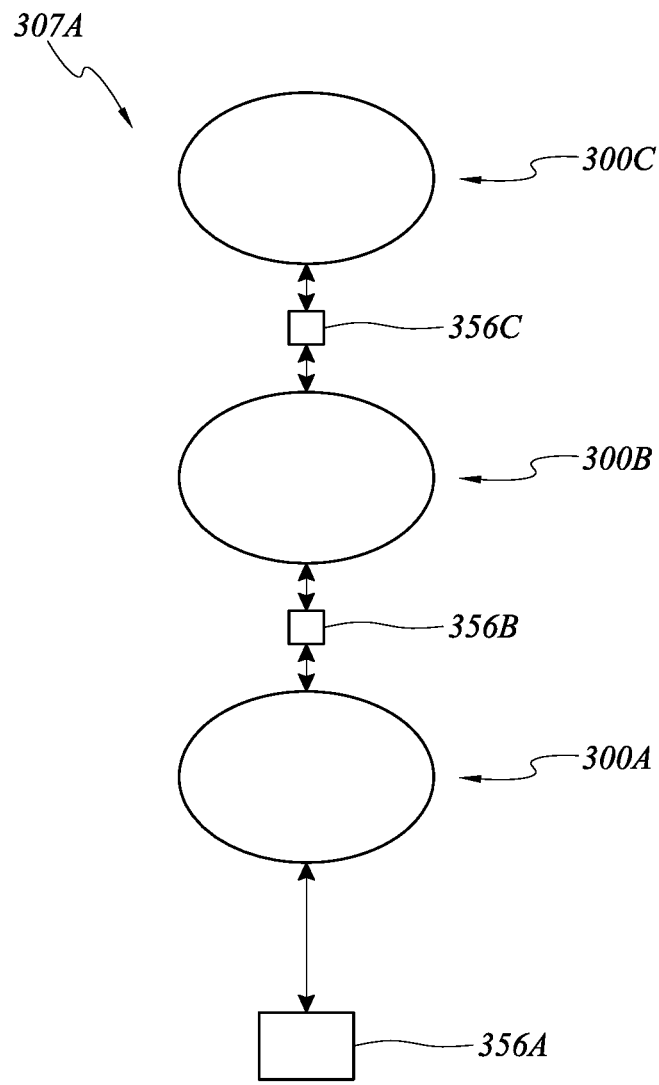

FIG. 16B is an embodiment of an SPB 303A. The SPB 303A may include three chambers 300A, 300B, 300C. The chamber 300A may be serviced by a compressor 356A. Further, adjacent chambers may be separated by a compressor. For example, the chambers 300A and 300B may be separated by a compressor 356B. The compressor 356B may service one or both of the chambers 300A and 300B. Similarly, the chambers 300B and 300B may be separated by a compressor 356B. The compressor 356B may service one or both of the chambers 300B and 300B. The SPB chambers 300A, 300B 300C may have the same or similar features and/or functionalities as the other chambers described herein. In some embodiments, there may be an arrangement of independent Super Pressure Ballonet Balloons (SPBB) Systems. There may be multiple SPBB's stacked vertically or arranged horizontally or combinations thereof. The SPBB may be arranged above and/or below a compressor. A ZPB may be used as a lift balloon.

Any of the various multi-chamber SPB's described herein may include one or more of the following features: multi-stage compressor(s); compressors with differing performance characteristics/stages, for example a compressor optimized for "low altitude", a compressor optimized for "medium altitude", and a compressor optimized for high altitude; fluidly connected SPB chambers.

In some embodiments, a first compressor (compressor 1) may pressurize all fluidly connected SPB chambers 300A, 300B, 300C, a second compressor (Compressor 2) may then take the accumulated air from the first SPB chamber and pressurize the SPB chambers above it (e.g. the second and third SPB chamber 300B, 300C) and a third compressor may take the further pressurized air from the second SPB chamber 300B and further pressurize the third SPB chamber 300C. This may increase the range of altitude control and allow for efficient descent from very high altitudes. The differential pressure achieved may be high enough to effect a change in buoyancy of the overall system.

Figures 17A, 17B:
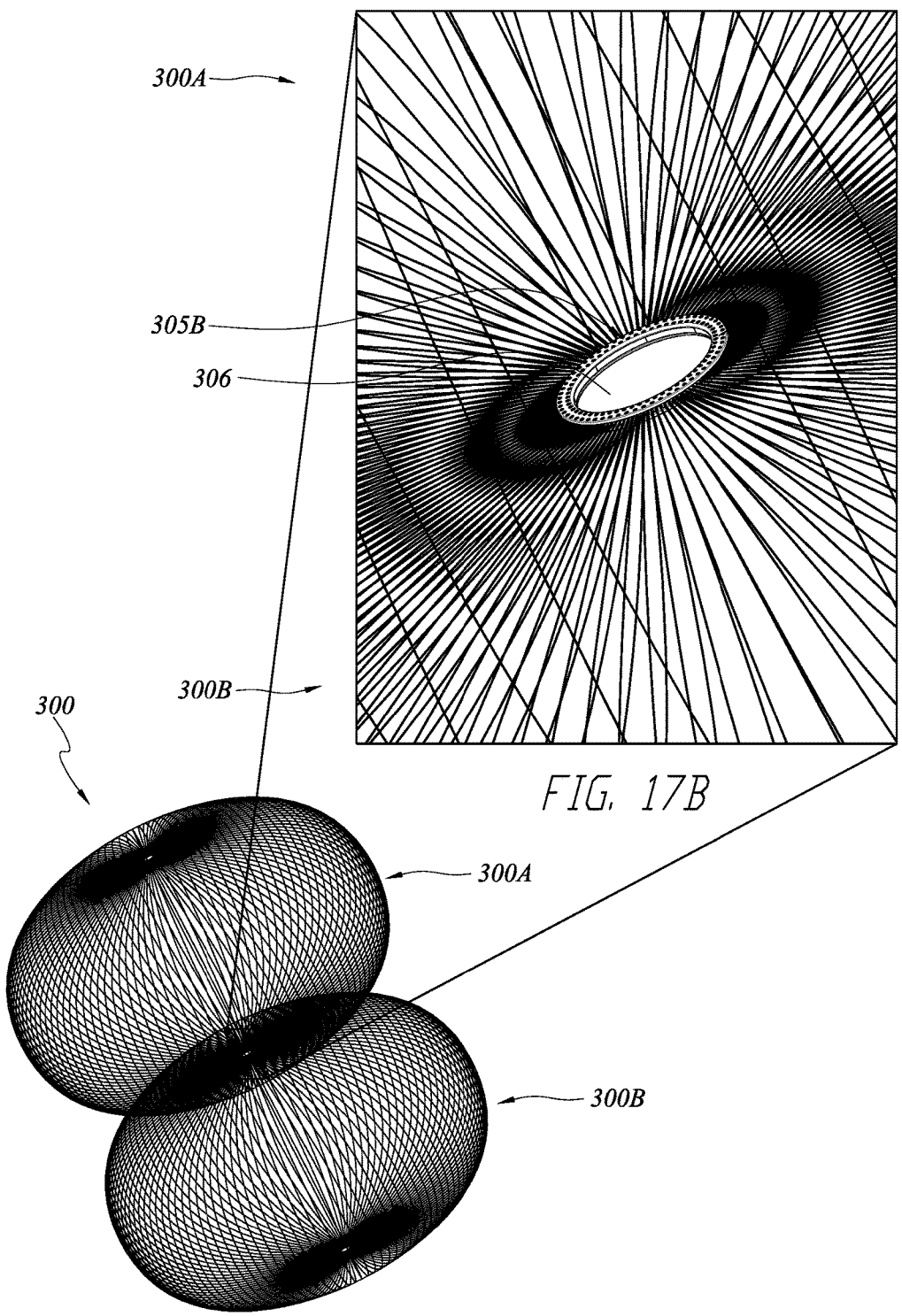
FIG. 17A is a wire frame view of an embodiment of a continuous two-chambered SPB having a waist fitting.
FIG. 17B is a detail view of the interior of the SPB of FIG. 17A at the waist and showing the waist fitting.

FIG. 17A is a wire frame view of the two-chambered SPB 300 having a waist fitting 305B. FIG. 17B is a detail view of the waist fitting 305B. The waist fitting 305B may have the same or similar features and/or functionalities as other waist fittings described herein, such as the waist fitting 305A, and vice versa. The waist fitting 305B may define or form an opening 306 therethrough. The opening 306 may extend through the middle of the waist fitting 305B, which may be a structural ring as further described herein. The opening 306 may allow fluid such as gas to traverse the boundary between the chambers 300A, 300B and flow between the chambers. The waist fitting 305B may be used with any of the multi-chamber SPB's described herein. Further detail of the waist fitting 305B is provided herein, for example in the section titled "BALLOON FITTINGS."

O. Balloon Fittings

Various fittings may be used with the various LTA systems described herein. Any of the fittings described in this section may be used with any of the systems, devices or methods shown in and/or described with respect to FIGS. 1-17B, and vice versa. For example, various embodiments of the fittings may be used with the LTA systems 100, 101, 102, 103 or 104, and vice versa. As further example, any of the "waist" fittings or end fittings described in this section may be used with the multi-chamber SPB's described herein, for example the multi-chamber SPB's 300, 301, 302, 303, 304, 305, 306, 307A.

FIGS. 18A-18G depict various views of an embodiment of the waist fitting 305B. The waist fitting 305B may be a solid junction fitting that constrains the narrowed tailored gores of multi-chamber SPB's to an "hour glass" configuration. An advantage of the waist fitting 305B include but are not limited to alignment of the fitting 305B using super pressure pumpkin balloon tendons. A similar attachment approach may be used at the end fittings to connect the tendons to the end fittings. The use of a similar technique as that used at fixing apex and nadir fittings on super pressure pumpkin balloons reduces complexity of construction for the multi-chamber SPB.

The multi-chamber SPB may be a continuous multi-chamber SPB with the fixed waist constructed using single long hour glass seams. This may reduce system mass by way of negating intermediate fittings from the system. Furthermore the continuous multi-chamber SPB with waist fitting may take advantage of existing manufacturing techniques used for single chamber SPB's, thus not requiring new and expensive manufacturing tools and techniques. The fitting 305B may provide an optimized hoop radius of the super pressure pumpkin balloon. With multiple fluidly connected chambers, the system is capable of storing considerable compressed atmospheric gas as ballast providing an extended vertical range of performance capability over systems with a single chamber SPB, including over a single chamber ballonet SPB.

FIG. 18A is a perspective view of an embodiment of the waist fitting 305B. The waist fitting 305B includes a body 307. The body 307 extends circumferentially about a central axis. The body 307 may define the opening 306 on a radially inner side of the body 307. The opening 306 may be empty as shown, or there may be one or more features located therein. The continuous envelope of the SPB may extend through the opening 306. In some embodiments, the SPB, such as the gores 325A, extend through the opening 306. The SPB, such as the gores 325A, may or may not attach to the fitting 305B. In some embodiments, portions of the SPB may extend through the opening 306 and portions of the SPB, for example local brackets, straps or other features, may attach to the fitting 305B. The fitting 305B may be supported by tendons, as described herein. The body 307 may be circular or approximately circular. In some embodiments, the body 307 may have other shapes, such as circular, non-circular, elliptical, oval, rounded, segmented, other suitable shapes, or combinations thereof. The body 307 may be formed from rigid or semi-rigid materials, including but not limited to metals, alloys, plastic, polymers, composites, fibers, other suitable materials, or combinations thereof. The body 307 may be configured to extend arcuately around the waist of a multi-chamber SPB, such as the waist 311A of the SPB 300 shown in FIG. 14D. The body 307 may be a single continuous part extending circumferentially about the axis. The body 307 may be surrounding an uninflated or under-inflated SPB 300 which is extended partially through the body 307 and is then inflated. In some embodiments, the body 307 may be multiple parts connected together. For example, the SPB 300 may be inflated and then a multi-part body 307 may be assembled together about the inflated waist 311A.

The fitting 305B may include an upper portion 308 and a lower portion 309. The portions 308, 309 may form part of the body 307. The portions 308, 309 may extend circumferentially along upper and lower sections of the fitting 305B about the central axis. The portions 308, 309 may be flat or generally sections.

An inner frame 322A may extend along a radially inner side of the body 307. The inner frame 322A may extend along inner edges of the upper and lower portions 308, 309 and be attached thereto. The inner frame 322A may provide a surface against which the waist 311A of the SPB may contact and press against. The inner frame 322A may be a solid surface as shown, or there may be openings, other shapes, etc.

An outer frame 322B may extend along outer edges of the upper and lower portions 308, 309 and be attached thereto. The outer frame 322B may include a series of tabs 323 connected and forming tendon openings 324. One or more tendons 324 may extend through the openings 324. The openings 324 may facilitate alignment and positioning of tendons, as further described. The outer frame 322B may be a single piece or multiple pieces attached together. The tabs 323 may be oriented vertically or generally vertically with horizontal sections therebetween to define upper and lower openings 324. The tabs 323 and/or openings 324 may extend circumferentially around part, most, or all of the fitting 305B.

FIG. 18B depicts the waist fitting 305B with the top portion 308 removed for clarity. The bottom portion 307 is shown having an outer row 316 and an inner row 318 of attachments 319. The rows 316, 318 may extend circumferentially along the body 307 with the attachments 319 protruding longitudinally between the upper and lower portions 308, 309. The attachments 319 may be fasteners secured for example threaded to the upper and/or lower portions 307, 309. One or more of the attachments 319 may include a bushing 321 surrounding the attachment 319. The bushing 321 may rotate about the attachment 319 to provide a rotatable interface about the attachment 319 to reduce friction and wear on the tendons and attachments 319, as further described. The attachments 319 in each row 316, 318 may be staggered as shown. Each attachment 319 may have a clear path extending radially outward from the attachment 319 to allow for a corresponding tendon to extend radially outward from the attachment 319.

FIG. 18C is a cross-section view of the waist fitting 305B. As shown, the attachment 319 may extend from the upper portion 308 to the lower portion 309. The attachment may secure the portions 308, 309 together. Corresponding openings in the portions 308, 309 may receive the attachment 319 therethrough. The openings may be internally threaded to threadingly engage an externally threaded attachment 319. The bushing 321 may extend between opposing surfaces of the upper and lower portions 308, 309 such that it may rotate between the portions 308, 309.

FIGS. 18D-18G depict portions of the fitting 305B with tendons extending therefrom in various configurations. FIG. 18D is a cross-section view of the waist fitting 305B shown with radially extending tendons 330. FIG. 18E is a cross-section view of the waist fitting 305B, with a portion removed for clarity, shown with radially extending tendons 330. FIG. 18F is a cross-section view of the waist fitting 305B shown with axially extending tendons 330. FIG. 18G is a cross-section view of the waist fitting 305B, with a portion removed for clarity, shown with axially extending tendons 330.

The tendons 300 may have the same or similar features and/or functionalities as the other tendons described herein, such as the tendons 300 described with respect to FIGS. 3A-3B and the tendons 330A, 300B, 330C, and vice versa. The tendons 30 may include the upper tendons 330A and the lower tendons 330B. The upper tendons 330A may attach to the inner row 318 of attachments 319. In some embodiments, the upper tendons 330A may attach to the inner row 318 and/or outer row 316 of attachments 319. The upper tendons 330A may extend from the fitting 305B and along an outside of an SPB chamber located above the fitting 305B, such as the SPB chamber 300A shown in FIG. 14A. The upper tendons 330A are shown extending radially outward in FIGS. 18D and 18E and axially upward in FIGS. 18F and 18G. This is for illustrative purposes only to show that the tendons 330A may extend along a range of paths. When assembled with the SPB 300, the tendons 300A may extend upward at an angle to the horizontal and along the rounded outer surface the SPB chamber 300A.

The lower tendons 330B may attach to the outer row 316 of attachments 319. In some embodiments, the lower tendons 330B may attach to the outer row 316 and/or inner row 318 of attachments 319. The lower tendons 330B may extend from the fitting 305B and along an outside of an SPB chamber located below the fitting 305B, such as the SPB chamber 300B shown in FIG. 14A. The lower tendons 330B are shown extending radially outward in FIGS. 18D and 18E and axially downward in FIGS. 18F and 18G. This is for illustrative purposes only to show that the tendons 330B may extend along a range of paths. When assembled with the SPB 300, the tendons 300B may extend downward at an angle to the horizontal and along the rounded outer surface of the SPB chamber 300B.

The tendons 300 may be attached to a respective one of the attachments 319. The tendons 330 may have loops incorporated or formed into the ends of the tendons 330. The attachments 319 may be received through the openings defined by the loops. The tendons 330 may be have a variety of shapes at the end, such as circular, rounded, non-circular, segmented, other shapes, or combinations thereof. In some embodiments, the tendons 330 may include end fittings that are attached to the attachments 319. The tendons 330 may be secured about the bushing 321. The bushing 321 may rotate about the attachment 319. This may reduce wear on the tendon 330. For example if the tendon 330 is biased laterally, instead of rubbing on the attachment 319, the bushing 321 may rotate with the rotating end of the tendon 330. This may preserve the integrity of the attachment 319 and the tendon 330.

The tendons 330 may extend from the fitting 305B to respective end fittings of the SPB. The upper tendons 330A may extend to the apex fitting 314A and the lower tendons 330B may extend to the nadir fitting 314B, as shown in FIG. 14A. In some embodiments, the upper and/or lower tendons 330A, 300B may extend from the fitting 305B to another waist fitting 305B, such as shown in an described with respect to the three-chamber SPB 300 of FIG. 14B. The tendons 330 may terminate at the respective end or waist fitting. Further details of various end fittings that may be used are described herein, for example with respect to FIGS. 19A-19E.

The various multi-chamber SPB's described herein may include fittings and/or annulus pieces at the apex and/or nadir ends of the upper most and lowermost chambers of the SPB, such as the top 312A and/or bottom 317A of the multi-chambered SPB 300 of FIG. 14D. These fittings may hold the longitudinal tendons 330 in place, structurally accommodate the combined force of the tendons 330, create a gas-tight seal where all the balloon gores 325 collect at the upper and lower portions 310, 315 of the SPB 300, ensure that no longitudinal loads are carried by the balloon skin 320, evenly distribute meridional loads between each gore 325, carry the payload 730 and other flight loads, and evenly transmit payload 730 and flight loads into the balloon material. Although various embodiments of these fittings may be described with respect to a single chamber SPB, it is understood that the fittings can be used at the apex and/or nadir ends of the upper most and lowermost chambers of a continuous multi-chamber SPB.

Figure 19A:
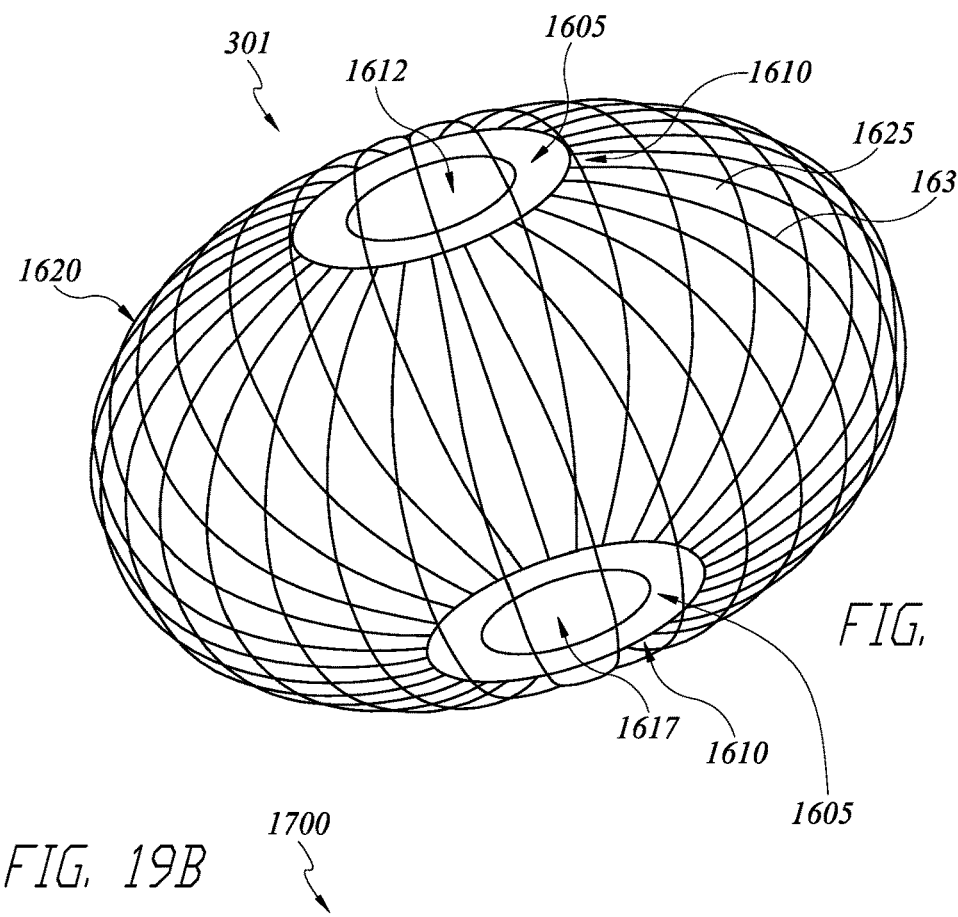
FIG. 19A is a perspective view of an embodiment of an SPB having annulus end pieces at the apex and nadir of the SPB.
Figure 19B:
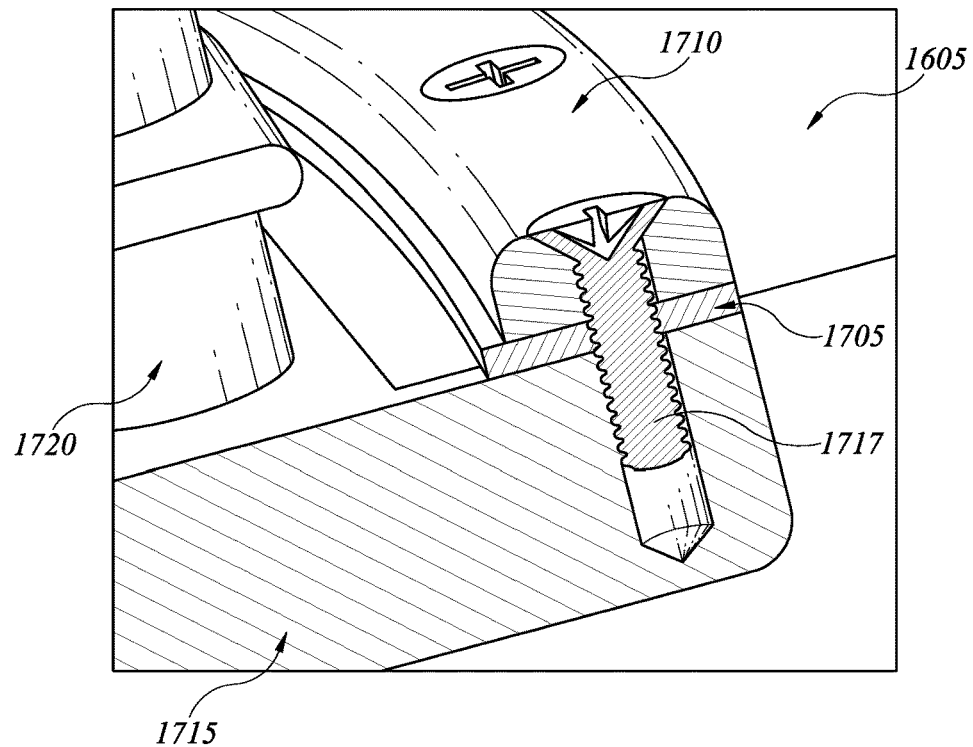
FIG. 19B is a perspective view of an embodiment of an end interface that may be used at the nadir and/or apex of the various SPB's described herein.
Figure 19C:
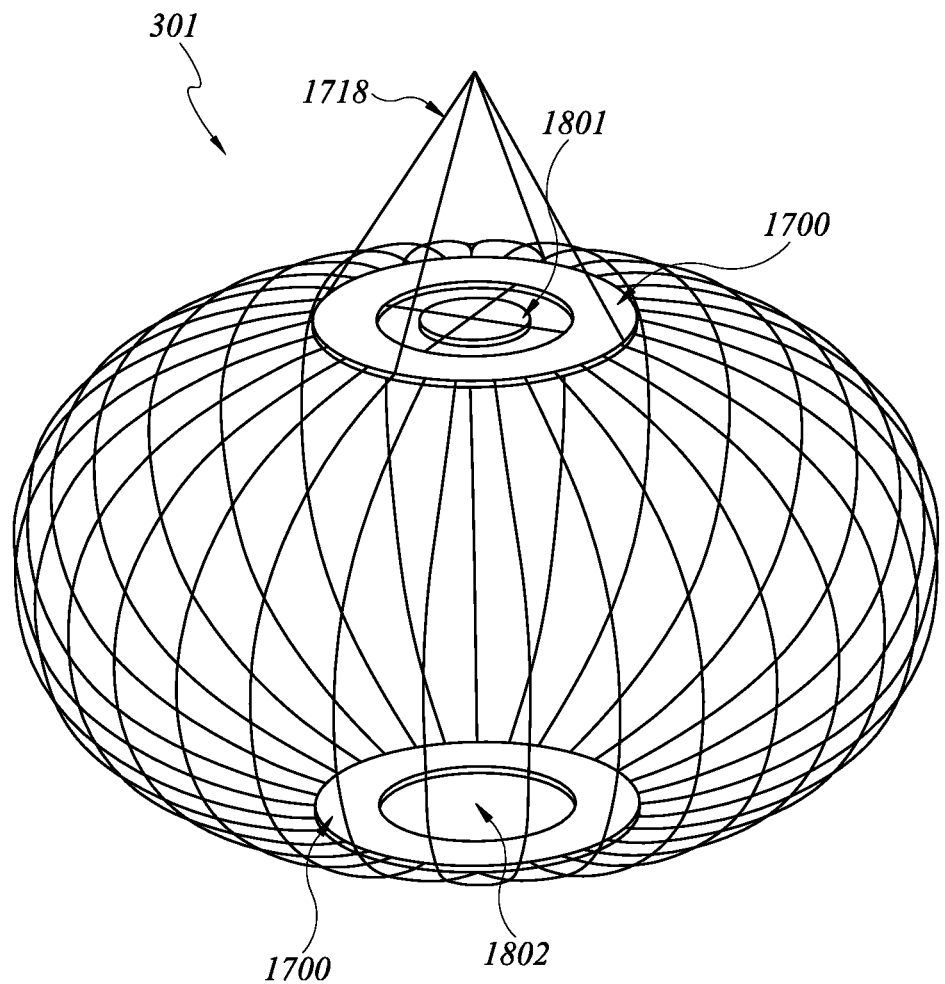
FIG. 19C is a perspective view of an SPB having the interface of FIG. 19B at the apex and nadir of the SPB.
Figure 19D:
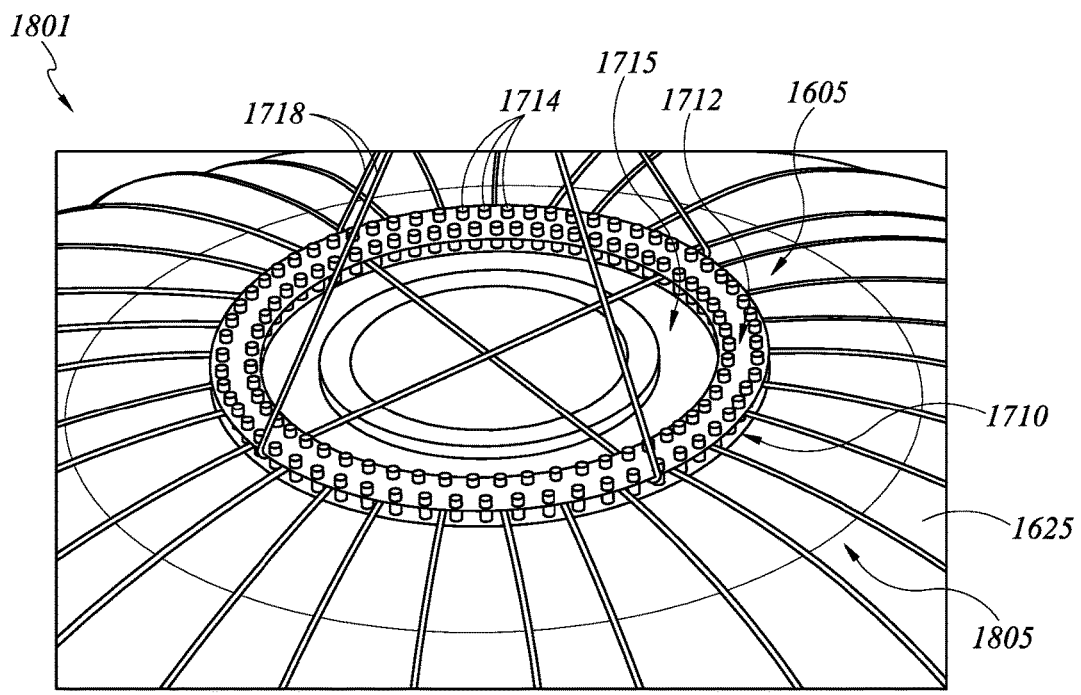
FIG. 19D shows an embodiment of a fitting assembly at an apex of the SPB.
Figure 19E:
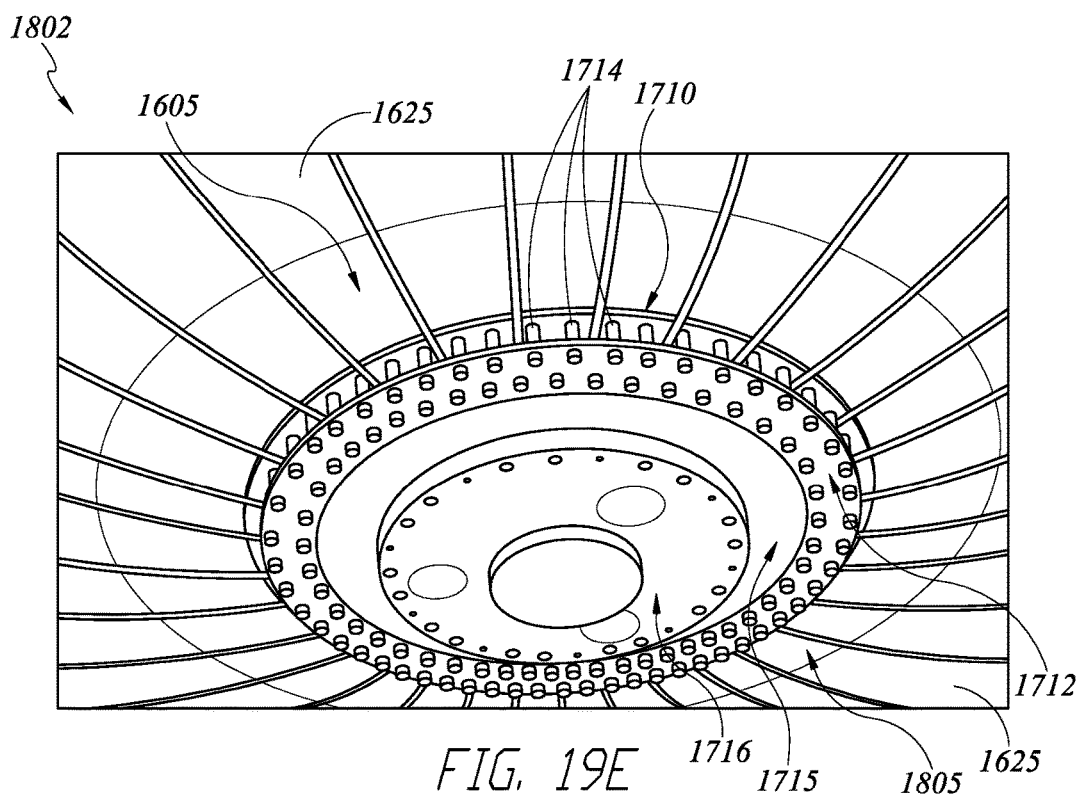
FIG. 19E shows an embodiment of a fitting assembly at a nadir of the SPB.

FIG. 19A is a perspective view of an embodiment of an SPB 301 having annulus end pieces 1605 at the apex and nadir of the SPB 301. FIG. 19B is a perspective view of an embodiment of an end interface 1700 that may be used at the nadir and/or apex of the various SPB's described herein. FIG. 19C is a perspective view of the SPB 301 having the interface 1700 at the apex and nadir of the SPB 301. FIG. 19D shows an embodiment of a fitting assembly 1801 at an apex of the SPB. FIG. 19E shows an embodiment of a fitting assembly 1801 at a nadir of the SPB. The features described with respect to FIGS. 19A-19E may be incorporated with any of the multi-chamber SPB's described herein.

Referring to FIG. 19A, the SPB 301 may have the same or similar features and/or functionalities as the SPB 300, and vice versa, except as otherwise described. The SPB 301 may be an uppermost or lowermost chamber of a multi-chamber SPB. The SPB 301 may have skin 1620 made of gores 1625, which may be heat sealed, gore shaped film pieces, and the resultant circular top opening 1612 and bottom opening 1617 of the assembled SPB 301 may each include regions 1610 of alternating non-uniform layers of sealed seam allowance stack-ups along with the gores 1625. The SPB 301 may include one or more tendons 1630 extending longitudinally as shown. The skin 1620, gores 1625 and tendons 1630 of the SPB 301 may have the same or similar features and/or functionalities as, respectively, the skin 320, gores 325 and tendons 330 of the SPB 300, and vice versa.

To alleviate the problem of trying to make a gas tight seal against the uneven layering of the gores 325 and their attachment seam construction, a single, flat annulus shaped film piece or annulus pattern piece 1605 may be heat sealed at its outer diameter to this non-uniform balloon opening 1612 where the gores 1625 converge, and then clamped at an interface 1700 (see FIG. 19B) at its inner diameter. The interfaces 1700 may include various fitting assemblies, for example as shown in FIGS. 19C-19E. The annulus pattern piece 1605 may create a flat, uniform surface for clamping, thus ensuring a more gas tight seal between the balloon film and the apex/nadir interfaces 1700. The annulus pattern piece 1605 may be configured to address stress risers in the transition from the bulge shape of the inflated gores 1625 to the flat shape of the annulus pattern piece 1605. In some embodiments, the gores 1625 may be attached to a single or double layer annulus (e.g., an "0" shape) of material that forms the structural connection of the gore 1625 film and can be clamped into an airtight seal in the interfaces 1700 at the apex and nadir sides of the SPB 301, as shown in FIG. 19A. Note that fitting hardware components and tendons are not shown for clarity.

As shown in FIG. 19B, the interface 1700 may include a single layer annulus pattern piece 1605 seamed (e.g. heat sealed) to the gores 1625 (a single gore 1625 is shown for clarity) or a two-layer annulus 1605 encapsulating the balloon gores 1625. The interface 1700 may be included at the top 1612 and/or bottom 1617 of the SPB 301. The annulus pattern piece 1605 may comprise the same material (but not necessarily the same thickness) as the gores 1625. In both cases seals 1705, such as silicone gaskets, etc., can be used to seal the clamp interface, as shown in FIG. 19B. A clamping ring 1710 may be secured to a plate 1715 with the annulus pattern piece 1605 and gores 1625 clamped in between the clamping ring 1710 and the plate 1715. A fastener 1717, such as a bolt, screw, etc., as shown may secure the clamping ring 1710 and the plate 1715 together. In some embodiments, in addition or alternatively to fasteners 1717, other suitable connections may be implemented, such as clamps, clips, adhesives, other suitable mechanical connections, or combinations thereof. The plate 1715, shown partially in cross-section, may be a structural member having a flat or generally flat shape and a circumferential, e.g. circular or otherwise rounded, perimeter. The plate 1715 and clamping ring 1710 may be made of metals, alloys, composites, polymers, plastics, other suitable materials, or combinations thereof. The SPB 301 may include on or more tendon termination posts 1720. The posts 1720 may be connected to the plate 1715 as shown. Each of the tendons 1630 may couple with, for example attach directly to, one or more of the tendon termination posts 1720.

FIG. 19C shows an embodiment of the pressurized SPB 301 having an upper fitting assembly 1801 and a lower fitting assembly 1802. FIGS. 19D-19E are close up views of, respectively, the fitting assemblies 1801 and 1802. The fitting assemblies 1801, 1802 may include the interface 1700 as described above. The fitting assemblies 1801, 1802 may be different. In some embodiments, the fitting assemblies 1801, 1802 may be the same. As shown, the outer diameter of the annulus pattern piece 1605 may be attached to the balloon gores 1625 with a sealer, for example a 12" portable impulse heat sealer. The seals may be carefully positioned so that pockets of ambient air are not trapped in crossing heat seal pattern as seen in the figures. This may prevent leakage at the attachment heat seal on either end of the SPB 301. The skin 1620 may transition from the gores 1625 to the annulus pattern piece 1605 at a gore/annulus transition 1805. The transition 1805 may be a region of the gores 1625 and annulus pattern piece 1605 where the gores 1625 and piece 1605 overlap, are adjacent to each other, etc.

The clamping ring 1710 may secure the annulus pattern piece 1605, as described, for example to the plate 1715. As shown, the fitting assembly 1802 may include an outer ring 1712. The outer ring 1712 may be connected to the plate 1715 and/or clamping ring 1710, for example by one or more connecting members 1714 (only some of which are labelled in the figures for clarity). The connecting members 1714 may be fasteners, such as bolts, etc., standoffs, or other structural connections. In some embodiments, one or more of the connecting members 1714 may be used as tendon termination posts 1720, or vice versa. The rings 1710, 1712 may be axially offset, for example by the connection members 1714. One or more cables 1718, such as hoists or other supporting members, may be connected to the SPB 301 by extending the cables 1718 through the opening between the offset rings 1710, 1712. The cables 1718 may be used to secure the SPB 301 to the ZPB 200, or to ground equipment such as a crane for manufacturing, assembly, testing, etc. The fitting assembly 1802 may include a fitting 1716, such as a plate with openings, protrusions, etc., which may be used for connecting the SPB 301 to another structure, such as to or with the payload support 700, the payload 730, the parafoil 680 or other descent vehicle, the ladder assembly 610, other structures, or combinations thereof. The ring 1712, connecting members 1714, plate 1715, and/or fitting 1716 may be formed from metals, alloys, composites, polymers, plastics, other suitable materials, or combinations thereof.

FIGS. 20A-20C depict schematics of systems and methods for constructing a rope ring fitting 305C. The fitting 305C may be used in some embodiments on the multi-chamber SPB's described herein. The fitting 305C may be used alternatively or in addition the fitting 305B. FIG. 20A depicts a stanchion system for forming the rope ring. FIGS. 20B and 20C depict detail views of a portion of the system of FIG. 20A where the portions 371, 372 are wrapped together. The rope ring construction can be done such that the strains from flight pressurization tension, slack strain, and/or temperature effects are accounted for during the room temperature low stress construction. The belt diameter of a multi-turn construction ring 305C (instead of one big rope, numerous wraps of a smaller rope so that there is only one small splice) can be accurate so as not to over stress the balloon material at the necking-in location. This is an example method to construct the rope ring 305C such that the slack strain is reduced or minimized and the splice can be constructed under tension to produce as accurate a length as possible with this material.

The portion 371 may have an end 371A and the portion 372 may have end 372A. The rope is wrapped around a first stanchion 374 and a second stanchion 376. The portions 371, 372 are then brought together. The portion 371 is wrapped around the portion 372 at the section 374. The portion 372 is wrapped around the portion 371 at the section 375. The wraps may be under nominal tension to reduce the slack strain. A splice link at the ends 371A, 372A may be bowed out slightly from the wraps. The splice may be made with an isolation tension. The ends 371A, 372A may be pulled to tighten the splice. The splice may be sewn while in this double-tensioned configuration.

P. Additional Considerations

The flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A continuous multi-chamber super pressure balloon (SPB) comprising:
    a continuous envelope configured to be inflated to form a plurality of two or more chambers, wherein each chamber comprises a maximum inflated width, and the continuous envelope when inflated defines a waist, the waist having an inflated waist width located between each chamber that is less than the maximum inflated width of each chamber;
    a barrier disposed inside the continuous envelope and fluidly separating a first fluid compartment from a second fluid compartment; and
    a fitting configured to be positioned around the waist.

2. The continuous multi-chamber super pressure balloon of claim 1, wherein the plurality of two or more chambers comprises a plurality of gores extending along an entire length of the continuous envelope.

3. The continuous multi-chamber super pressure balloon of claim 1, further comprising a compressor configured to pump air into the continuous envelope.

4. The continuous multi-chamber super pressure balloon of claim 1, further comprising a plurality of tendons configured to bias each chamber of the plurality of two or more chambers into a pumpkin shape when the continuous envelope is inflated.

5. The continuous multi-chamber super pressure balloon of claim 1, wherein the barrier forms a closed envelope that comprises the first fluid compartment.

6. The continuous multi-chamber super pressure balloon of claim 1, wherein:
    the continuous envelope is further configured to be inflated to form the plurality of two or more chambers extending along a central axis, and the plurality of two or more chambers comprises a first chamber defining a first interior volume and a second chamber defining a second interior volume,
    the first chamber comprises an upper portion and a first maximum inflated width, and the second chamber comprises a lower portion and a second maximum inflated width,
    the inflated waist width is less than each of the first and second maximum inflated widths and is located axially between the first and second maximum inflated widths, and
    the fitting comprises a ring body extending circumferentially about the central axis and defining an opening therethrough along the axis, the fitting configured to be positioned around the waist with the continuous envelope extending through the opening of the fitting; and
    the continuous multi-chamber super pressure balloon further comprising:
    a first plurality of tendons configured to extend from the fitting around the first chamber to the upper portion of the first chamber and to bias the first chamber into a first pumpkin shape when the continuous envelope is inflated; and
    a second plurality of tendons configured to extend from the fitting around the second chamber to the lower portion of the second chamber and to bias the second chamber into a second pumpkin shape when the continuous envelope is inflated.

7. The continuous multi-chamber super pressure balloon of claim 6, wherein:
    the plurality of two or more chambers further comprises a third chamber defining a third interior volume and having a third maximum inflated width and a lower portion,
    wherein the inflated second and third chambers define a second waist having an inflated second waist width that is less than each of the second and third maximum inflated widths, the second waist width located axially between the second and third maximum inflated widths;
    the continuous multi-chamber super pressure balloon further comprising:
    a second fitting comprising a second ring body extending circumferentially about the central axis and defining a second opening therethrough along the axis, the second fitting configured to be positioned around the second waist with the continuous envelope extending through the second opening of the second fitting; and
    a third plurality of tendons configured to extend from the second fitting around the third chamber to the lower portion of the third chamber and to bias the third chamber into a third pumpkin shape when the continuous envelope is inflated.

8. The continuous multi-chamber super pressure balloon of claim 7, further comprising a barrier forming a closed envelope disposed inside the continuous envelope and fluidly separating a first fluid compartment inside the closed envelope from a second fluid compartment outside the closed envelope.

9. A high altitude lighter-than-air balloon system comprising:
- a zero-pressure balloon configured to receive therein a lighter-than-air gas to provide an upward lifting force to the balloon system; and
- the continuous multi-chamber super pressure balloon of claim 1 configured to couple with the zero-pressure balloon and to receive therein a variable amount of ambient air from a surrounding atmosphere to provide a variable downward force to the balloon system.

10. A continuous multi-chamber super pressure balloon comprising:
- a continuous envelope comprising a first section, a second section, and a third section, wherein the first, second and third sections are configured to extend axially along a central axis with the third section located between the first and second sections, the third section having a smaller maximum inflated width than each of the first and second sections;
- a circumferential constriction configured to extend around the continuous envelope between the first and second sections; and
- a plurality of tendons configured to extend from the circumferential constriction and around the continuous envelope to bias the first and second sections into respective first and second pumpkin shapes when the continuous envelope is inflated.

11. The continuous multi-chamber super pressure balloon of claim 10, wherein the first section and the second section comprise a plurality of gores extending from an upper portion of the first section to a lower portion of the second section.

12. The continuous multi-chamber super pressure balloon of claim 10, further comprising a compressor configured to pump air into the continuous envelope.

13. The continuous multi-chamber super pressure balloon of claim 10, further comprising a barrier disposed inside the continuous envelope and fluidly separating a first fluid compartment from a second fluid compartment.

14. The continuous multi-chamber super pressure balloon of claim 13, wherein the barrier forms a closed envelope that comprises the first fluid compartment.

15. The continuous multi-chamber super pressure balloon of claim 10, wherein the continuous envelope further comprises one or more additional sections having a smaller maximum inflated width than sections adjacent to the one or more additional sections, and the super pressure balloon further comprises:
- one or more second circumferential constrictions each configured to extend around the continuous envelope at a respective one of the one or more additional sections; and
- the plurality of tendons comprising a first plurality of tendons, a second plurality of tendons, and one or more third plurality of tendons, wherein the first plurality of tendons is configured to extend from the circumferential constriction around the first section to bias the first section into a first pumpkin shape when the continuous envelope is inflated, the second plurality of tendons is configured to extend between the circumferential constriction and the second circumferential constriction and around the second section to bias the second section into a second pumpkin shape when the continuous envelope is inflated, and the one or more third plurality of tendons is each configured to extend from a respective one of the one or more second circumferential constrictions around a respective one of the sections adjacent to the one or more additional sections to bias the respective one of the sections adjacent to the one or more additional sections into respective pumpkin shapes when the continuous envelope is inflated.

16. The continuous multi-chamber super pressure balloon of claim 15, further comprising a barrier forming a closed envelope disposed inside the continuous envelope and fluidly separating a first fluid compartment inside the closed envelope from a second fluid compartment outside the closed envelope.

17. The continuous multi-chamber super pressure balloon of claim 10, wherein the first section comprises a first chamber, the second section comprises a second chamber, and the third section comprises a waist.

18. A method of adjusting an altitude of a high altitude balloon system comprising a continuous multi-chamber super pressure balloon (SPB), the method comprising:
- decreasing the altitude, wherein decreasing the altitude comprises:
  - causing air to enter a first section of a continuous envelope of the multi-chamber SPB, and
  - causing air to enter a second section of the continuous envelope, wherein the first and second sections each have a larger width than a third section of the continuous envelope that is located between the first and second sections; and
- increasing the altitude, wherein increasing the altitude comprises:
  - causing air to exit the first section, and
  - causing air to exit the second section.

19. The method of claim 18, wherein causing air to enter the second section comprises flowing air from the first section to the second section.

* * * * *